(12) United States Patent
Grimes et al.

(10) Patent No.: US 7,457,771 B2
(45) Date of Patent: Nov. 25, 2008

(54) SYSTEM, METHOD, AND COMPUTER READABLE MEDIUM FOR OUTSOURCING CONCRETE SERVICE ORDERS

(75) Inventors: Frederic Calvin Grimes, Oxford, GA (US); Michael Allan Caler, Alpharetta, GA (US); Robert Charles Pittard, Stone Mountain, GA (US); Robert Packard Bryant, Alpharetta, GA (US); Jon Packard Bryant, Alpharetta, GA (US)

(73) Assignee: 1-800 Concrete, Inc., Tucker, GA (US)

( * ) Notice: Subject to any disclaimer, the term of this patent is extended or adjusted under 35 U.S.C. 154(b) by 156 days.

(21) Appl. No.: 11/014,024

(22) Filed: Dec. 15, 2004

(65) Prior Publication Data
US 2005/0144895 A1    Jul. 7, 2005

Related U.S. Application Data

(60) Provisional application No. 60/529,995, filed on Dec. 15, 2003.

(51) Int. Cl.
G06Q 30/00    (2006.01)
G06F 17/30    (2006.01)
(52) U.S. Cl. .................. 705/26; 705/1; 705/27
(58) Field of Classification Search ......... 705/1, 705/26–27, 37
See application file for complete search history.

(56) References Cited

U.S. PATENT DOCUMENTS

| | | | | |
|---|---|---|---|---|
| 5,935,249 | A * | 8/1999 | Stern et al. | 726/21 |
| 6,393,410 | B1 * | 5/2002 | Thompson | 705/37 |
| 2001/0018670 | A1 * | 8/2001 | Tan et al. | 705/26 |
| 2001/0047284 | A1 * | 11/2001 | Blalock et al. | 705/8 |
| 2001/0056379 | A1 * | 12/2001 | Fujinaga et al. | 705/26 |

(Continued)

FOREIGN PATENT DOCUMENTS

KR    2003-0076131    * 10/2003

(Continued)

OTHER PUBLICATIONS

"Total quality management in the construction industry in Hong Kong: A supply chain management perseptive". Wong, Alfred. Fung, Patrick. Total Quality Management. Mar. 1999. vol. 10, Iss. 2. [receovered from Proquest database Sep. 19, 2006].*

(Continued)

*Primary Examiner*—Jeffrey A. Smith
*Assistant Examiner*—William J. Allen
(74) *Attorney, Agent, or Firm*—Thomas, Kayden, Horstemeyer, & Risley, LLP

(57) ABSTRACT

Included herein is a service outsourcing system for providing at least one purchaser with concrete. The system may include at least one central server comprising at least one central database and an interactive electronic ordering guide configured to allow the purchaser to place at least one concrete order. The concrete order may include a job site location. The outsourcing system may be configured to receive at least one concrete order and provide the purchaser with the ability to select at least one selected concrete supplier from at least one potential concrete supplier. In addition, the service outsourcing system is further configured to access the at least one central database. Finally, the service outsourcing system may be further configured to outsource the concrete order with the selected concrete supplier.

33 Claims, 140 Drawing Sheets

U.S. PATENT DOCUMENTS

| | | | | |
|---|---|---|---|---|
| 2002/0007321 | A1* | 1/2002 | Burton | 705/26 |
| 2002/0035495 | A1* | 3/2002 | Spira et al. | 705/7 |
| 2002/0065679 | A1* | 5/2002 | Laberge | 705/1 |
| 2003/0041010 | A1* | 2/2003 | Yonao-Cowan | 705/37 |
| 2003/0074209 | A1* | 4/2003 | Tobin | 705/1 |
| 2003/0101127 | A1* | 5/2003 | Cornelius | 705/37 |
| 2005/0021599 | A1* | 1/2005 | Peters | 709/203 |
| 2006/0293965 | A1* | 12/2006 | Burton | 705/26 |

OTHER PUBLICATIONS

"Accurate Concrete". www.accurateconcrete.com. May 20, 2000. [recovered from www.Archive.org on Sep. 20, 2006].*

"Concrete.com". www.concrete.com. Oct. 11, 2001. [recovered from www.Archive.org on Sep. 20, 2006].*

"Home Improvement Net". www.improvenet.com. Jan. 5, 2001. [recovered from www.Archive.org Sep. 21, 2006].*

Grimes et al., U.S. Appl. No. 60/529,995, filed Dec. 15, 2003.

Grimes et al., Non Final Office Action, Jul. 16, 2006, U.S. Appl. No. 11/013,874, filed Dec. 15, 2004.

Grimes et al., Final Office Action, mailed Feb. 27, 2007, U.S. Appl. No. 11/013,874, filed Dec. 15, 2004.

Grimes et al., Non Final Office Action, mailed Aug. 13, 2007, U.S. Appl. No. 11/013,874, filed Dec. 15, 2004.

Grimes et al., Utility Application, U.S. Appl. No. 11/013,874, filed Dec. 15, 2004.

* cited by examiner

1-800 CONCRETE

ConC.O.D.™

Order Management System

Logout Attorney Attorney

Order Menu
▲Administration Menu
Order Wizard
▸Start Here
Search
▸Estimates
▸Order
▸Estimates / Orders
▸History
General
▸Yardage Calculator
▸My Info
▸Help Advertisement
How did you hear about us? (Check all that apply)
☐ Add on Truck
☐ Billboard
☐ Magazine
☐ Newspaper
☐ Radio
☐ Repeat Customer
☐ Television
☐ Website
☐ Word of Mouth
☐ Other Concrete Company
☐ Home Depot Costumer — 82
☐ Home Depot Account Holder — 84
☑ 1-800 Special Pricing Customer — 86

Store : [    ] [    ] [    ] — 92
Assoscate # : [ atlanta ] — 94

| | | |
|---|---|---|
| ☐ Calcium 1% | Cost $3.00 | = $0.00 |
| ☐ Calcium 2% | Cost $25.00 | = $0.00 |
| ☐ Calcium 1% per Bag | Cost $5.00 | = $0.00 |
| ☐ Fiber | Cost $6.00 | = $0.00 |
| ☐ Hot Water | Cost $2.00 | = $0.00 |
| ☐ Non-Chloride 1% | Cost $4.00 | = $0.00 |
| ☐ Non-Chloride 2% | Cost $6.00 | = $0.00 |
| ☐ Retarter | Cost $5.00 | = $0.00 |
| ☐ Super Plasticizer | Cost $5.00 | = $0.00 |
| Other: ☐ | Cost: [0.00] — 214 | |

Color — 216
Company: [(select color company)] — 215   Color: [(select color)] — 217   = $0.00
Sales Tax  7% — 130   Qty: [0] — 218   Cost: [0.00] — 219   = $16.80 — 132

Additional Services
Environmental Fee:  # of Trucks: [1] — 131   Fee: [10.00]   = $10.00

Delivery Fees
  Standard       Cost [90]   = $0.00  ⎫
  Additional     Cost [0.00]  = $0.00  ⎬ — 133
  WheelBarrel  Cost [0.00]  = $0.00  ⎭

Total Cost                                $266.80

[Calculator] — 134

[Save] — 135   [Cancel] — 136

FIG. 26B

ConC.O.D.™

Logout Fred Grimes

260 — Order Management System

View Order # 27

* This Order was Entered By: Fred Grimes on 12/8/2003 3:42:12 PM.

Called In By: Joe Test - Desingee
Phone: (770)123-4567

Ship To
    Adderss : 123 Concrete Street
    City, State Zip : Renton, Georgia 30016
    County ' Lot Newton Bill To
    Adderss : 123 Concrete Street
    City, State Zip : Renton, Georgia 30016

Direction / Truck Access
Edit see attached map
Miscellanous Notes
Edit finisher on site

}— 261

Concrete
* The Concrete Order was Entered By : Fred Grimes on 12/8/2003 3:36:35 PM.

Delivery Date : 12/12/2003 10:00:00 AM.    Alt. Delivery Date :
    Supplier : TUCCO      Truck : AKT
    Plant : Covington      Job : Slab
    Mix : 3000 Residential 57 Stone - 3000 Res.    Yards : 3
Pour Site : behind house

| | | |
|---|---|---|
| Cost / Yard : $80.00 | Total : $240.00 | |
| Additives : | | |
| Sales Tax (7 %) | $16.00 | |
| AdditionalServives : | | |
| Environmental Fee | $10.00 | |
| Concrete Delivery Fee : | | |
| Standard | $90.00 | |
| Additional | No Charge | |
| Total Concrete | $356.80 | |

}— 262

1-800 CONCRETE

Order Menu
▶ Administration Menu
Order Wizard
  ▶ Start Here
Search
  ▶ Estimates
  ▶ Order
  ▶ Estimates / Orders
General
  ▶ Yardage Calculator
  ▶ My Info
  ▶ Help

Concrete Order #752

1-800 CONCRETE
2337 Highway 78
Loganville, Georgia 30052
(770)266-6223

TUCCO - Tucker
Purchase Order # 752
12/13/2004 5:57:06 PM

Customer information
Called in By : John Doe - Property Owner
Phone : (232)222-2343
Phone 2 :

Ship To
    Address : 100 Gallena Parkway
    City, State Zip : Atlanta, Georgia 30319
    County / Lot: Cobb

⎬ —271

Concrete / Delivery information
Delivery Date : 12/10/2004 10:00:00 AM
    Supplier : TUCCO
      Plant : Tucker
        Mix : 2000 #7 Stone Com. 2" Line Mix
Customer Requested Truck Type: AKT
Additives :
    Project :
    Pour Site : fsadfe Alt. Delivery Date:
Job : Wall Yards : 34

Payment Cash

Please read and sign at the bottom as an agreement to this order : (1) 1-800 Concrete and our affiliates may assist in estimating concrete amounts needed but AMOUNT ORDERED is the responsibility of the purchaser. All "EXTRA TRIP CONCRETE" not arranged for at the time of the order. may incur extra charges and delivery of any "extra trip concrete" is at the option of the delivering concrete company. Jobs not completed due to insufficient amounts of concrete ordered are the responsibility of the purchaser ("Purchaser" denotes the property owner or the property owner designee). (2) CANCELLATIONS called in after a 90-MINUTE PERIOD BEFORE DELIVERY can result in full charges. The delivering concrete companies have the discretion whether to fulfill an order after this time frame. (3) 1-800 Concrete and the delivering concrete company are responsible for the concrete meeting the declared STRENGTH as per the concrete companies mix design within 56 calendar days. (4) The concrete finisher is responsible for COMPLYING WITH ASTM and ACI guidelines involing the handing, finishing and curing of concrete. (5) The concrete finisher is responsible for the concrete's APPEARANCE. JOINT LOCATION, CRACKING, DUSTING and all other concrete CURING CONCERNS. (6) STANDING TIME is calculated beginning at the time the truck arrives and is ready for the concrete to be discharged at the job site and concludes when last concrete needed is discharged. Standing time is free for the first half hour when the load is five yards or less. The first hour is free for all loads above 5 yards. (7) At the delivering concrete companies discretion POURING MAY BE INTERRUPTED or canceled. (8) SAFE JOB SITE ACCESS is the responsibility of the purchaser. (9) Any and all DAMAGE TO PROPERTY OR PERSONS while accessing the pouring site is the responsibility of the purcaser. (10) Incidents requiring a WRECKER. or damage to the delivering companies property, due to problems at the job site are the responsibility of the purchaser, and therefore the purchaser must make Immediate payment arrangements with the appropriate company. (11) ALL MUD and DEBRIS in roadway or property caused by concrete vehicles accessing the site is the responsibility of the purchaser.(12) A WASHOUT AREA. to hold a minimum of a full chute and hopper of concrete plus washout for each truck, must be provided by the purchaser at the pouring site. (13) The concrete delivering company and 1-800 Concrete DO NOT GUARANTEE DELIVER TIMES IN ANY WAY and are not liable for any costs due to lateness or cancellation. (14) PAYMENT must be arranged for prior to delivery and the DELIVIRY TICKET MUST BE SIGNED prior to truck leaving public street ' road or the discharging of any concrete. (15) All amounts not paid to 1-800 Concrete or to the delivering concrete company are subject to LIENS, INTEREST (18% ANNUALLY) LEGAL FEES (10% of outstanding balance) and any other legal remedies. (16) Purchaser agrees that they may incur ADDITIONAL EXPENSES and CHARGES. in the form of standing time. additional concrete. environmental fee. etc. above and beyond those outlined above at the time of delivery. Purchaser further agrees and hereby authorizes 1-800 Concrete to secure payment for the additional charges and expenses in the same manner as abtained for the original order. (17) 1-800 Concrete and our affiliates are not responsible for any damage done to unmarked or un- located utilities or septic / sewer lines on the jobsite. (18) in the unlikely event that you have a dispute with 1-800 Conctete or our affiliates. you hereby agree that the dispute shall be settled by arbitration through the better buisness bureau of Atlanta. (19) ALL traffic interruptions or blockage are the responsibility of the purchaser or their onsite representative and you agree to meet ALL DOT regulations. 1-800 Concrete and our affiliates are not authorized or responsible in anyway to blocck or direct traffic.

◄—272

Order Taken By :   __Attorney  Attorney  Attorney__

Dispatcher : _____
                Print

Driver : _____
        Print

On Site Time :_____ Depart Site Time : _____

Purchaser : _____
            Print

Dispatcher : _____
                Signature

Driver : _____
        Signature

Purchaser : _____
            Signature

1-800 Concrete - Finisher Order #741

1-800 CONCRETE
2337 Highway 78
Loganville, Georgia 30052
(770)266-6223

Customer Information
Called In By : Salko Behoo - Property Owner
Phone : (770)935-3234
Phone 2 :

Finisher Information
Name : Ultimate Scape (678)758-3748
Contact : Jerome Lawrence
Job Type : Remove Replace
Finisher Notes Payment Cash
Please read and sign at the bottom as an agreement to this order :
(1)
Order Taken By : Patrick Krummel / Patrick Krummel Finisher : _____ print
Purchaser : _____ print Page 1 Of 1

TUCCO - Tucker
Purchase Order # 741
12/13/2004 10:22:43 AM

Costumer Address
Address : 100 Gallena Parkway
City, State Zip : Atlanta, Georgia 30319
County / Lot: Cobb Customer Contact Date : 12/13/2004 10:00:00 AM
Job Schedule Date :

} 281

Finisher : _____ signature
Purchaser : _____ signature

1-800 Concrete - Finisher Order #741

2337 Highway 78
Loganville, Georgia 30052
(770)266-6223

Customer Information
Called in By : Salko Behoo - Property Owner
Phone : (770)935-3234
Phone 2 :

Total Concrete     $5,710.00
Total Finisher     $115.00

Total Order        $5,825.00

Payment Information

Cash    Total : $2,855.00

Cash    Total : $115.00

Cash    Total : $2,855.00

Page 1 Of 1

Purchase Order # 741
12/7/2004 4:24:09 PM

Ship To
    Address : 100 Gallena Parkway
    City, State Zip : Atlanta, Georgia 30339
    County / Lot: Cobb

 2337 Highway 78
Loganville, Georgia 30052
(770)266-6223
CONCRETE

1-800 Concrete / Accounting
Purchase Order # 741
12/7/2004 4:24:09 PM

Customer information
Called in By : Salko Behoo - Property Owner
Phone : (770)935-3234
Phone 2 :

Ship To
Address : 100 Gallena Parkway
City, State Zip : Atlanta, Georgia 30339
County / Lot: Cobb Concrete
* This Concrete order was Entered By : Attorney Attorney on 12/7/2004 3:52:44 PM.

Delivery Date : 12/12/2004 10:00:00 AM                     Alt. Delivery Date :

Supplier : RMC / Allied                                    Truck : AKT
      Plant : Downtowm                                       Job : Wall
        Mix : 2000 Residential 4" Line Pump mix - 2004 L Res        Yards : 30
      Project :
      Pour Site : behind house

| | |
|---|---|
| Price / Yard : $90.00 | Total : $2,700.00 |
| Additives : | |
| Sales Tax (5%) | $135.00 |
| Additional Services : | |
| Environmental Fee | $20.00 |
| Standing Time | No Charge |
| Additional Charges | None |
| Notes : | |
| Delivery Fees : | |
| Standard | No Charge |
| Total Concrete | $2,855.00 |

* This Concrete Order was Entered By : Attorney Attorney on 12/7/2004 4:16:01 PM.

Delivery Date : 12/12/2004 10:00:00 AM                     Alt. Delivery Date :
Supplier : RMC / ALLIED                                    Truck : AKT
Plant : Downtown                                           Job : Wall
    Mix : 2000 Residential 4" Line Pump Mix - 2004 L Res        Yards : 30
    Project :
    Pour Site : behine house

| | |
|---|---|
| Price / Yard : $90.00 | Total : #2,700.00 |
| Additives : | |
| Sales Tax (5%) | $135.00 |
| Additional Services : | |
| Environmental Fee | $20.00 |
| Standing Time | No Charge |
| Additional Charges | None |

FIG. 35A

1-800 Concrete - Purchase Order # 741                                             Page 2 Of 2

Notes :
Delivery Fees :
Standard                          No Charge
Total Concrete                    $2,855.00
Total Concrete                    $2,855.00
Grand Total Concrete              $5,710.00
Grand Total Yardage               60.00

Finisher
* This Finisher Order was Entered By : Patrick Krummet on 12/13/2004 10:21:51 AM.
    Finisher : Ultimate Scapes  (678)758-3748
    Contact : Jerome Lawrence
    Address : 100 Galleria Parkway
    City, State Zip : Atlanta, Georgia
    Job Type : Remove Replace
    Contact Date : 12/13/2004 10:00:00 AM      Job Scheduled Date :
    Job Rate : $100.00
    1800 Rate : 15 % - $15.00
    Add'l Charges : $0.00
    Notes :
    SQ FT : 112
    Finisher Notes :
Pay To : 1-800 Concrete           $115.00
Total Finisher                    $115.00

Grand Total Finisher              $115.00
_____
Total Order                       $5,825.00
Payment Information
Cash                              Total $2,855.00
Cash                              Total $115.00
Cash                              Total $2,855.00

FIG. 35B

ConC.O.D.™

Logout Fred Grimes

Order Management System

1-800 CONCRETE

Order Menu
▶ Administration Menu
Order Wizard
  ▶ Start Here
Search
  ▶ Estimates
  ▶ Order
  ▶ Estimates / Orders
General
  ▶ Yardage Calculator
  ▶ My Info
  ▶ Help Cancel Order # 27

* This Order was Entered By: Fred Grimes on 12/8/2003 3:42:12 PM.

Called In By: Joe Test - Desingee
Phone: (770)123-4567

Ship To
   Adderss : 123 Concrete Street
   City, State Zip : Renton, Georgia 30016
   County / Lot Newton Bill To
   Adderss : 123 Concrete Street
   City, State Zip : Renton, Georgia 30016

12/8/2003 3:42:12 PM
Western Union     Amount : $479.75

Western Union Fee    $12.95
Concrete - 3 Yards    $356.80 Cancel / Refund Concrete
Contractor - Walker    $100.00 Cancel / Refund Concrete
Contractor - 1-800 Concrete    $10.00

Total Order    $479.75 Cancel Order # 27

[ Cancel ] —306

2003 Advertisement Report

| | Category | Total | Jan | Feb | Mar | Apr | May | Jun | Jul | Aug | Sep | Oct | Nov | Dec |
|---|---|---|---|---|---|---|---|---|---|---|---|---|---|---|
| ☐ | AD on Truck | 45 | 0 | 0 | 0 | 0 | 0 | 0 | 0 | 14 | 13 | 4 | 3 | 11 |
| ☐ | Billboard | 18 | 0 | 0 | 0 | 0 | 0 | 0 | 0 | 7 | 6 | 1 | 2 | 2 |
| ☐ | Magazine | 4 | 0 | 0 | 0 | 0 | 0 | 0 | 0 | 3 | 1 | 0 | 0 | 0 |
| ☐ | Newspaper | 4 | 0 | 0 | 0 | 0 | 0 | 0 | 0 | 1 | 1 | 1 | 1 | 0 |
| ☐ | Radio | 14 | 0 | 0 | 0 | 0 | 0 | 0 | 0 | 5 | 6 | 1 | 0 | 2 |
| ☐ | Repeat Customer | 14 | 0 | 0 | 0 | 0 | 0 | 0 | 0 | 0 | 10 | 3 | 1 | 0 |
| ☐ | Television | 3 | 0 | 0 | 0 | 0 | 0 | 0 | 0 | 0 | 0 | 0 | 3 | 0 |
| ☐ | Website | 8 | 0 | 0 | 0 | 0 | 0 | 0 | 0 | 4 | 3 | 0 | 1 | 0 |
| ☐ | Word of Mouth | 2 | 0 | 0 | 0 | 0 | 0 | 0 | 0 | 1 | 0 | 0 | 1 | 0 |
| ⊞ | Other Concrete Company | 6 | 0 | 0 | 0 | 0 | 0 | 0 | 0 | 5 | 1 | 0 | 0 | 0 |
| ⊞ | Other Source | 1 | 0 | 0 | 0 | 0 | 0 | 0 | 0 | 0 | 1 | 0 | 0 | 0 |

Administration Menu

▸ Order Menu

Reports
- ▸ Advertisement
- ▸ Ad History
- ▸ Supplier Activity
- ▸ Supplier Contacted
- ▸ Supplier Rejected
- ▸ Zip Code / Supplier
- ▸ Plant / Zip Code

General
- ▸ Users
- ▸ Companies
- ▸ Counties
- ▸ Zip Codes
- ▸ Help

Concrete
- ▸ Mix Descriptions
- ▸ Mix Pricing
- ▸ Additives
- ▸ Additive Pricing
- ▸ Color

Pump
- ▸ Equipment
- ▸ Equipment Pricing

Suppliers
- ▸ Suppliers
- ▸ Supplier Plants
- ▸ Suppliers Zip Codes
- ▸ Plant Zip Codes ConC.O.D.™ — Order Management System — Logout Fred Grimes 1-800-CONCRETE

FIG. 52A

1-800 CONCRETE - 2004 Advertisement Report

2004 Advertisement Report

| Category | Total | Jan | Feb | Mar | Apr | May | Jun | Jul | Aug | Sep | Oct | Nov | Dec |
|---|---|---|---|---|---|---|---|---|---|---|---|---|---|
| AD on Truck | 823 | 0 | 36 | 196 | 156 | 93 | 70 | 59 | 56 | 54 | 46 | 36 | 21 |
| Billboard | 61 | 0 | 14 | 17 | 7 | 7 | 11 | 5 | 0 | 0 | 0 | 0 | 0 |
| Magazine | 7 | 0 | 0 | 6 | 0 | 0 | 0 | 0 | 0 | 0 | 0 | 0 | 1 |
| Newpaper | 10 | 0 | 3 | 4 | 2 | 0 | 0 | 0 | 1 | 0 | 0 | 0 | 0 |
| Radio | 4 | 0 | 4 | 0 | 0 | 0 | 0 | 0 | 0 | 0 | 0 | 0 | 0 |
| Repeat Customer | 250 | 0 | 20 | 28 | 31 | 23 | 32 | 24 | 27 | 25 | 19 | 15 | 6 |
| Television | 1 | 0 | 0 | 1 | 0 | 0 | 0 | 0 | 0 | 0 | 0 | 0 | 0 |
| Website | 2 | 0 | 0 | 2 | 0 | 0 | 0 | 0 | 0 | 0 | 0 | 0 | 0 |
| Word of Mouth | 62 | 0 | 8 | 13 | 11 | 8 | 7 | 2 | 2 | 1 | 2 | 7 | 1 |
| Other Concrete Company | 115 | 0 | 7 | 28 | 20 | 9 | 6 | 11 | 6 | 6 | 12 | 8 | 2 |
| Home Depot | 5 | 0 | 0 | 0 | 0 | 0 | 0 | 0 | 0 | 0 | 0 | 0 | 5 |
| Home Depot Account Holder | 9 | 0 | 0 | 0 | 0 | 0 | 0 | 0 | 1 | 1 | 0 | 1 | 9 |
| 1-800 Customer | 8 | 0 | 0 | 0 | 2 | 0 | 0 | 0 | 5 | 1 | 0 | 0 | 6 |
| Other Source | 1357 | 0 | 92 | 295 | 229 | 140 | 126 | 101 | 92 | 86 | 76 | 66 | 51 |

Commissions Report
Consultant : 1-800 Concrete
Date : 12/10/2004 - 12/13/2004

| Order # | Shipped | Yardage | Price / Yard | Total Order | Gross Profit | Est. Entered By | Order Entered By |
|---|---|---|---|---|---|---|---|
| 742 | 12/10/2004 | 8.00 | $80.00 | $723.40 | $0.00 | Patrick Krummel | Patrick Krummel |
| 744 | 12/10/2004 | 1.50 | $105.00 | $263.53 | $157.50 | Patrick Krummel | Patrick Krummel |
| 745 | 12/10/2004 | 2.00 | $90.00 | $287.60 | $31.00 | Patrick Krummel | Patrick Krummel |
| 741 | 12/12/2004 | 30.00 | $90.00 | $2,855.00 | $2,700.00 | Attorney Attorney | Attorney Attorney |
| 746 | 12/13/2004 | 5.00 | $90.00 | $482.00 | $50.00 | Attorney Attorney | Attorney Attorney |
| 747 | 12/13/2004 | 18.00 | $105.00 | $2,013.40 | $360.00 | Patrick Krummel | Patrick Krummel |
| 748 | 12/13/2004 | 36.00 | $74.00 | $2,870.48 | $216.00 | Patrick Krummel | Patrick Krummel |
| 749 | 12/13/2004 | 5.00 | $90.00 | $486.50 | $77.50 | Patrick Krummel | Patrick Krummel |
| 750 | 12/15/2004 | 27.00 | $70.50 | $2,634.54 | $13.50 | Patrick Krummel | Patrick Krummel |
| 751 | 12/15/2004 | 9.00 | $80.00 | $857.26 | $49.50 | Patrick Krummel | Patrick Krummel |
| 721 | 12/17/2004 | 18.00 | $80.00 | $1,625.80 | $90.00 | Patrick Krummel | Patrick Krummel |
| Totals : 11 | | 159.50 | | $15,099.51 | $3,745.00 | | |

Page 1 of 1

975

FIG. 56

1-800 Concrete - Consultant Activity Report
Consultant Activity Report
Date : 12/10/2004 - 12/13/2004
Service : Concrete Page 1 of 1

| Consultant | Est # | Date | Yardage | Total Estimate | Costomer |
|---|---|---|---|---|---|
| Patrick Krummel | 1142 | 12/10/2004 | 36.00 | $2,870.48 | Reginald L Jackson |
| Totals : Patrick Krummel | 1 | | 36.00 | $2,870.48 | |
| Totals : 1-800 CONCRETE | 1 | | 36.00 | | |

Finisher Zip Code Assignments Report
State : Georgia

| Finisher | Zip Code |
|---|---|
| OPEN | Assign Zip Code |

| Finisher | Zip Codes | | | | | | | |
|---|---|---|---|---|---|---|---|---|
| A Boss Constuction | 30002 | 30008 | 30021 | 30002 | 30030 | 30031 | 30033 | 30034 |
| | 30035 | 30038 | 30060 | 30067 | 30068 | 30080 | 30082 | 30083 |
| | 30084 | 30085 | 30086 | 30087 | 30088 | 30106 | 300126 | 30168 |
| | 30260 | 30273 | 30274 | 30288 | 30294 | 30295 | 30296 | 30297 |
| | 30303 | 30305 | 30306 | 30307 | 30308 | 30309 | 30310 | 30311 |
| | 30312 | 30313 | 30314 | 30315 | 30316 | 30317 | 30318 | 30319 |
| | 30324 | 30326 | 30327 | 30328 | 30329 | 30331 | 30334 | 30335 |
| | 30336 | 30337 | 30338 | 30339 | 30340 | 30341 | 30342 | 30344 |
| | 30345 | 30346 | 30349 | 30350 | 30354 | 30360 | | |
| A Almazan Enterprises | 30205 | 30215 | 30222 | 30223 | 30224 | 30228 | 30230 | 30233 |
| | 30234 | 30236 | 30238 | 30240 | 30241 | 30248 | 30251 | 30252 |
| | 30253 | 30256 | 30257 | 30258 | 30259 | 30260 | 30263 | 30265 |
| | 30258 | 30269 | 30273 | 30274 | 30275 | 30277 | 30281 | 30285 |
| | 30286 | 30288 | 30290 | 30291 | 30292 | 30293 | 30294 | 30295 |
| AAA Quality Concrete Inc. | 30008 | 30041 | 30064 | 30101 | 30102 | 30106 | 30120 | 30017 |
| | 30132 | 30134 | 30137 | 30141 | 30144 | 30152 | 30153 | 30157 |
| | 30178 | | | | | | | |
| ABC Concrete | 30002 | 30011 | 30012 | 30013 | 30014 | 30015 | 30016 | 30017 |
| | 30019 | 30021 | 30022 | 30024 | 30025 | 30030 | 30032 | 30033 |
| | 30034 | 30035 | 30038 | 30039 | 30043 | 30044 | 30045 | 30047 |
| | 30052 | 30054 | 30058 | 30071 | 30078 | 30079 | 30083 | 30084 |
| | 30087 | 30088 | 30092 | 30093 | 30094 | 30096 | 30097 | 30294 |
| | 30317 | 30329 | 30340 | 30341 | 30345 | 30360 | 30517 | 30518 |
| | 30519 | 30542 | 30548 | 30620 | 30621 | 30622 | 30641 | 30655 |
| | 30656 | 30663 | 30666 | 30680 | 31024 | | | |
| ALS Driveway Replacement & Specialty Con. | 30002 | 30021 | 30022 | 30033 | 30041 | 30044 | 30045 | 30046 |
| | 30047 | 30071 | 30079 | 30083 | 30084 | 30085 | 30086 | 30087 |
| | 30088 | 30091 | 30092 | 30093 | 30094 | 30095 | 30096 | 30097 |
| | 30319 | 30324 | 30326 | 30327 | 30328 | 30329 | 30331 | 30334 |
| | 30335 | 30336 | 30337 | 30338 | 30339 | 30340 | 30341 | 30342 |
| | 30344 | 30345 | 30346 | 30349 | 30350 | 30354 | 30360 | |
| Artistic Surfaces | 30005 | 30087 | 30097 | | | | | |
| Beck Construction Inc. | 30011 | 30017 | 30018 | 30019 | 30024 | 30039 | 30043 | 30044 |
| | 30045 | 30046 | 30047 | 30048 | 30052 | 30071 | 30078 | 30087 |
| | 30093 | 30096 | 30097 | 30518 | 30519 | 30620 | | |
| Bernard Walker Concrete | 30002 | 30011 | 30012 | 30014 | 30021 | 30030 | 30032 | 30033 |
| | 30034 | 30035 | 30038 | 30039 | 30047 | 30058 | 30071 | 30079 |
| | 30083 | 30084 | 30087 | 30088 | 30093 | 30236 | 30260 | 30273 |
| | 30081 | 30285 | 30286 | 30288 | 30294 | 30297 | 30303 | 30305 |
| | 30306 | 30307 | 30308 | 30309 | 30310 | 30311 | 30312 | 30313 |
| | 30314 | 30315 | 30316 | 30317 | 30318 | 30319 | 30324 | 30326 |
| | 30327 | 30328 | 30329 | 30337 | 30338 | 30339 | 30340 | 30341 |
| | 30342 | 30344 | 30345 | 30346 | 30349 | 30350 | 30354 | 30360 |
| | 30656 | 30680 | | | | | | |
| C J Concrete | 30168 | 30236 | 30238 | 30250 | 30281 | 30288 | 30297 | |

1-800 Concrete - Home Depot Report

2337 Highway 78
Loganville, Georgia 30052
(770)266-6223

1-800 CONCRETE

Home Depot Costomer's Report
12/10/2004 - 12/13/2004

Total Orders : ← 821

FIG. 64

1-800 Concrete - Home Depot Accounts Report
2337 Highway 78
Loganville, Georgia 30052
(770)266-6223
Home Depot Accounts Report
12/10/2004 - 12/13/2004
Page 1 of 1
| Order # | Name | Yardage | Delivery | Addtl chg | WheelBarrel | Total Order |
|---------|------|---------|----------|-----------|-------------|-------------|
|         |      | 36.00   | $0.00    | $0.00     | $0.00       | $0.00       |
| Totals : 0 | | 36.00 | $0.00 | $0.00 | $0.00 | $0.00 |
| Totals : 0 | | | | | | |
953 
FIG. 66

1-800 Concrete - Order Canncellation Report
Order Canncellation Report
Date : 12/10/2004 - 12/13/2004

| Order # | Yardage | Total Refund | Cancellation Fee | Est. Entered By | Order Entered By |
|---|---|---|---|---|---|
| Totals : 0 | 0.00 | $0.00 | $0.00 | $0.00 | |

Page 1 of 1

1-800 Concrete - Plant Zip Code Assignments Report

Zip Code Assignments Report
Service : Concrete

| Supplier | Plant | Zip Code - Ranking |
|---|---|---|
| AAA / Albany | Albany | 31702 - 1  31701 - 2  31705 - 2  31707 - 2 |
| American Concrete,Inc. | Aiken | Assign Zip Code |
| American Concrete,Inc. | Augusta | Assign Zip Code |
| American Concrete,Inc. | Gracewood | Assign Zip Code |
| American Concrete,Inc. | Martinez | Assign Zip Code |
| B.H. Hall | Duplin | 31021 - 1  31027 - 1 |
| Basic Ready Mix & Pump | Basic Pump | 30002 - 1  30103 - 1  30104 - 1  30105 - 1  30115 - 1<br>30120 - 1  30121 - 1  30124 - 1  30125 - 1  30137 - 1<br>30145 - 1  30147 - 1  30153 - 1  30161 - 1  30165 - 1<br>30171 - 1  30173 - 1  30178 - 1  30184 - 1  30701 - 1<br>30705 - 1  30707 - 1  30708 - 1  30710 - 1  30711 - 1<br>30720 - 1  30721 - 1  30725 - 1  30728 - 1  30730 - 1<br>30731 - 1  30733 - 1  30734 - 1  30735 - 1  30736 - 1<br>30738 - 1  30739 - 1  30740 - 1  30741 - 1  30742 - 1<br>30746 - 1  30747 - 1  30750 - 1  30752 - 1  30753 - 1<br>30755 - 1  30757 - 1  31805 - 1 |
| Basic Ready Mix & Pump | Calhoun Plant | 30103 - 1  30105 - 1  30139 - 1  30171 - 1  30701 - 1<br>30733 - 1  30734 - 1  30735 - 1  30746 - 1 |
| Basic Ready Mix & Pump | Dalton | 30705 - 1  30710 - 1  30720 - 1  30721 - 1  30735 - 1<br>30736 - 1  30739 - 1  30740 - 1  30746 - 1  30755 - 1 |
| Basic Ready Mix & Pump | Rome Plant | 30104 - 1  30105 - 1  30124 - 1  30145 - 1  30147 - 1<br>30161 - 1  30165 - 1  30173 - 1  30178 - 1  30733 - 1 |
| Basic Ready Mix & Pump | Walker County Plant | 30002 - 1  30707 - 1  30725 - 1  30728 - 1  30736 - 1<br>30738 - 1  30739 - 1  30741 - 1  30742 - 1  30750 - 1<br>30752 - 1  30757 - 1 |
| ERNST | Dawsonville | 30040 - 3  30080 - 3 |
| ERNST | KENNESAW | Assign Zip Code |
| ERNST | Plant 1-Lawrenceville | 30003 - 2  30045 - 2  30058 - 2  30107 - 2  30144 - 2<br>30549 - 2  30002 - 3  30004 - 3  30011 - 3  30017 - 3<br>30019 - 3  30024 - 3  30025 - 3  30026 - 3  30029 - 3<br>30039 - 3  30042 - 3  30043 - 3  30044 - 3  30046 - 3<br>30047 - 3  30048 - 3  30052 - 3  30071 - 3  30078 - 3<br>30091 - 3  30092 - 3  30093 - 3  30095 - 3  30096 - 3<br>30518 - 3  30519 - 3  30620 - 3  30641 - 3  30655 - 3<br>30656 - 3  30666 - 3  30680 - 3 |
| ERNST | Plant 2-Lithonia | 30002 - 3  30012 - 3  30013 - 3  30014 - 3  30015 - 3<br>30016 - 3  30021 - 3  30030 - 3  30031 - 3  30032 - 3<br>30033 - 3  30034 - 3  30035 - 3  30038 - 3  30054 - 3<br>30056 - 3  30058 - 3  30079 - 3  30083 - 3  30084 - 3<br>30085 - 3  30086 - 3  30087 - 3  30088 - 3  30094 - 3<br>30294 - 3  30317 - 3  30319 - 3  30329 - 3  30338 - 3<br>30340 - 3  30341 - 3  30345 - 3  30346 - 3  30350 - 3<br>30360 - 3 |

952

FIG. 70

1-800 Concrete - Special Pricing Accounts Report

1-800 CONCRETE
2337 Highway 78
Loganville, Georgia 30052
(770)266-6223

Special Pricing Accounts Report
12/10/2004 - 12/13/2004

Page 1 of 1

| Order # | Name | Yardage | Delivery | Addtl chg | WheelBarrel | Total Order |
|---|---|---|---|---|---|---|
| Totals : | 0 | 0.00 | $0.00 | $0.00 | $0.00 | $0.00 |
| Totals : | 0 | 0.00 | $0.00 | $0.00 | $0.00 | $0.00 |

894

1-800 Concrete - Special Pricing Review
Special Pricing Review
Review Date : 12/13/2004

Page 1 of 1

| Acct Account Holder | Last Review | Env | Front | Color | Delivery | Wheel Barrel | Stand Time | Prime Pack |
|---|---|---|---|---|---|---|---|---|
| *** River Wood Homebuilders | 4/13/2004 | $5.00 | $90.00 | $3.00 | $0.00 | $0.00 | $75.00 | $70.00 |

Last Mix Review : 4/13/2004    Last Additive Review : 12/30/1899    Last Pump Equipment : 12/30/1899

*** This Special Pricing Account Holder has not been reviewed within the last 3 days.

FIG. 76

1-800 Concrete - Supplier Contacted Report

2337 Highway 78
Loganville, Georgia 30052
(770)266-6223

Supplier Contacted Report

| Supplier | Amount | # Times Contacted |
|---|---|---|
| Hulseu | $424.60 | 1 |
| hulsey | $424.60 | 1 |
| LAFARGE | $65.00 | 1 |
| THOMAS | $566.00 | 2 |
| Total Amount: | $1,480.20 | 5 |

← 888

1-800 Concrete - Supplier Rejected Report

1-800 CONCRETE
2337 Highway 78
Loganville, Georgia 30052
(770)266-6223

Supplier Rejected Report
AAA / Albany
12/10/2004 - 12/13/2004

Page 1 of 1

| Plant | Estimate # | Date Rejected | Yardage | Spoke With | Reason |
|---|---|---|---|---|---|
| Totals : | | | 0 ← 873 | | |

FIG. 80

1-800 Concrete - Supplier ZipCode Assignments Report  Page 1 of 20
Supplier ZipCode Assignments Report
State : Georgia
By : Supplier

| Zip Code | Supplier |
|---|---|
| 30002 | AAA / Albany |
| 30003 | ERNST |
| 30004 | Little Man Concrete |
| 30005 | TUCCO Fulton Concrete Morgan Concrete |
| 30008 | Assign Supplier |
| 30009 | Assign Supplier |
| 30011 | Assign Supplier |
| 30012 | Assign Supplier |
| 30013 | Assign Supplier |
| 30014 | Assign Supplier |
| 30015 | Assign Supplier |
| 30016 | Assign Supplier |
| 30017 | Assign Supplier |
| 30018 | Assign Supplier |
| 30019 | Assign Supplier |
| 30021 | Assign Supplier |
| 30022 | TUCCO |
| 30024 | Assign Supplier |
| 30025 | Assign Supplier |
| 30026 | Assign Supplier |
| 30028 | Assign Supplier |
| 30029 | Assign Supplier |
| 30030 | Assign Supplier |
| 30031 | Assign Supplier |
| 30032 | Assign Supplier |
| 30033 | Assign Supplier |
| 30034 | Assign Supplier |
| 30035 | Assign Supplier |
| 30038 | Assign Supplier |
| 30039 | Assign Supplier |
| 30040 | Assign Supplier |
| 30041 | Assign Supplier |
| 30041 | Assign Supplier |

1-800 Concrete - Quarterly Service Report
Quarterly Service Report

| Quarter | Total Orders | Yardage |
|---|---|---|
| 1st Quarter - 2004 (Concrete) | $151,034.64 | 1,601.00 Yards |
| 1st Quarter - 2004 (Pump) | $3,199.10 | 206.00 Yards |
| 1st Quarter - 2004 (Finisher) | $4,840.00 | 0.00 SQFT |
| 1st Quarter - 2004 (General Contractor) | $0.00 | 0.00 SQFT |
| Totals : | $159,073.74 | 1,807.00 Yards |
| | | 0.00 SQFT |

Page 1 of 1

978

CONCRETE

Order Management System    ConC.O.D.™

Logout Fred Grimes

Order Menu
▸ Administration Menu
Order Wizard
  ▸ Start Here
Search
  ▸ Estimates
  ▸ Order
  ▸ Estimates / Orders
General
  ▸ Yardage Calculator
  ▸ My Info
  ▸ Help View Order # 15
* This Order was Entered By : 1800 Webmaster on 10-24/2003 6:20:28 PM
Called In By : Mike Caler - Properyt Owner
Phone : (770)667-9993          Phone 2 : (770)722-1211
Ship To                        Bill To
   Address 1211 Friar Court       Address 1211 Friar Court
   City, State Zip : Alpharetta, Georgia 3005    City, State Zip : Alpharetta, Georgia 3005
   County / Lot : Fulton Directions / Truck Access
Edit Second house on right Miscellaneous Notes
Edit Payment Check - Western union Concrete
* This Concrete Order was Entered By : 1800 Webmaster on 10/24/2003 6:14:27 PM
Delivery Date : 10/25/2003 2:00:00 PM       Atl. Delivery Date :
   Supplier : TUCCO                            Truck : Front
   Plant : Dahlonega                           Job : DW
   Mix : 3000 Residential 57 Stone - 3000 Res   Yards : 11.25
   Pour Site : Front of House
Cost / Yard : $80.00          Total : $900.00
  Additives :
  Supper Plasiticizer           $56.25
  Color : SouthEastern Dye
  3 bags White                  $15.00
  Sales Tax (7 %)               $67.99
  Additional Services :
  Environmental Fee             $10.00
  Concrete Deliveryl Fees :
  Additional                    No Charge
  Front Truck                   $33.75
  Total Concrete                $1,139.23

Western Union Fee (1)           $12.95
Total Order                     $1,152.18
Payment Type
  Western Union
  Edit Payment ☐ Actg $  [Print Order]  ☑ Concrete
                         ☐ Customer

[Cancel] [Delete Order] [Amend Order] [Refund Order]

FIG. 87

| | | | | | |
|---|---|---|---|---|---|
| Supplier Rejected Report | | | | | |
| Service | Supplier | Plant | Date Rejected | Spoke With | Reason ◄── 461 |
| Concrete | Morgan Concrete | Athens | 9/30/2003 6:28:09 PM | Tom | Too Busy |
| | | | 9/18/2003 12:31:37 AM | | Too Busy |
| | | | 9/16/2003 7:42:08 PM | George | Couldn't deliver |
| | | | 9/16/2003 11:31:41 AM | | Too Busy |
| | TUCCO | Covington | 9/16/2003 12:17:31 PM | | Too Busy |
| | | Cumming | 11/12/2003 9:49:58 AM | Roger | Too Busy |
| | | | 9/16/2003 9:03:13 PM | | Cannot Deliver |
| | | | 9/16/2003 7:42:08 PM | | Cannot Deliver |
| | | | 9/16/2003 11:31:41 AM | | Too Busy |
| | | | 9/16/2003 10:44:17 AM | | Too Busy |
| | | | 9/12/2003 10:37:01 PM | | Too Busy |
| | | | 9/12/2003 3:00:40 PM | | Could not fulfill the order. |
| | | | 9/1/2003 10:11:45 PM | | Cannot Deliver |
| | | Grayson | 9/23/2003 8:04:10 AM | Matt | Blah Blah |
| | | Tucker | 11/17/2003 7:50:46 PM | | pump order only No concrete |
| Pump | AJ Pumping | Alpharetta | 9/30/2003 6:28:09 PM | Bonnie | Too Busy |
| | TUCCO | Cumming | 9/30/2003 6:40:51 PM | Tom | No Equipment Available |

Administration Menu
▸Order Menu

Reports
▸Advertisement
▸Ad History
▸Supplier Activity
▸Supplier Contacted
▸Supplier Rejected
▸Zip Code / Supplier
▸Plant / Zip Code

General
▸Users
▸Companies
▸Counties
▸Zip Codes
▸Help

Concrete
▸Mix Descriptions
▸Mix Pricing
▸Additives
  Additive Pricing
▸Colors

Pump
▸Equipment
▸Equipment Pricing

Suppliers
▸Suppliers
▸Supplier Plants
▸Supplier Zip Codes
▸Plant Zip Codes

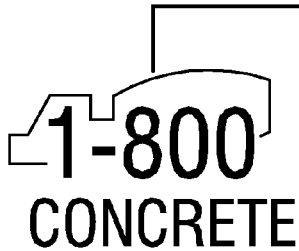

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

Ready Mix Supplier / Producer Service Agreement 1-800 Concrete Inc. (1-800) agrees to provide marketing services as a partner in obtaining COD/Retail concrete orders for _____ (Ready Mix - Producer = RM-PRO) As such 1-800 shall supply COD/Retail customers who call in from advertisements or who are transferred from your dispatchers to RM-PRO and guarantee payment for all sold to clients for RM-PRO, contingent on RM-PRO agreeing to the following conditions :

1. RM-PRO agrees to provide telephone contact availability, during business hours, to all plants and/or dispatch locations who supplies concrete per our initial agreement. ABC agrees to obtain all applicable licensing and insurance and agrees to operate within applicable state and federal taxes.

2. In general the concrete company who provides the material for a customer will guarantee that the concrete delivered will reach the specified strength within 56 days of the pour if no material including water is added to the concrete to reach the specified strength.

3. The RM-PRO will also accept responsibility for any misconduct of their employees which causes property damage.

4. STANDING TIME is calculated beginning at the time the truck arrives and is ready for the concrete to be discharged at the job site and concludes when the last concrete needed is discharged. Standing time is free for the first "half hour" when the load is five yards or less. The first "hour" is free for all loads above 5 yards 5. At the delivery RM-PRO's discretion PURING MAY BE INTERRUPTED or canceled with notice to 1-800 so we may appropriately inform the customer.

6. Incidents requiring a WRECKER, due to problems at the site, are the responsibility of the purchaser, unless the driver goes in an undesignated area, ane therefore the purchaser must make payment arrangements directly to the wrecker company.

7. All MUD and DEBRIS in ROADWAY or property caused by concrete vehicles accessing the site is the responsibility of the purchaser and not the RM-PRO.

8. A WASHOUT AREA, to hold a minimum of a full shoot and hopper of concrete plus washout for each truck must be provided by the purchaser at the pouring site.

9. The RM-PRO and 1-800 Concrete DO NOT GUARANTEE DELIVERY TIMES IN ANY WAY and are not liable for any costs due to latenes or cancellation.

10. THE DELIVERY TICKET MUST BE SIGNED by the property owner or their designee prior to truck leaving public street/road or the discharging of any concrete.

Ready Mix - Producer (RM - PRO)                    Date 1-800 Concrete Inc. (1-800)

FIG. 123A

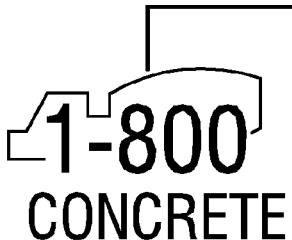

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

Ready Mix Supplier / Producer Service Agreement 1-800 Concrete Inc. (1-800) agrees to provide marketing serveces as partner in obtaining COD/Retail concrete orders for_____(Ready Mix-Supplier - RM-SUP) As such 1-800 shall supply COD/Retail customers who call in from advertisements or who are tranferred from your dispatchers to RM-SUP and guarantee payment for all sold to clients for RM-SUP, agreeing to the following conditions.

1. RM-SUP agrees to provide telephone contact availbility, during normal business hours and/or during deliveries, to all plants and/or dispatch locations who supplies concrete per our initial agreement.
2. The RM-SUP must give 1-800 as close as possible delivery times as to when the order is to be delivered. If delays occur before the delivery is underway the RM-SUP must give 1-800 as much notice as possible so the customer can be appropriately informed of the new expected delivery time.
3. In general the RM-SUP who provides the material for a customer will guarantee that the concrete delivered will reach the specified strength within 56 days of the pour if no material including water is added, per customers' instructions to the concrete to reach the specified strength. The RM-SUP will not be responsible for the appearance of the concrete which include cracking, dusting and all other curing concerns.
4. 1-800 highly recommends the RM-SUP inspect the jobsite before delivery to determine accessibitity, hazards, etc. therefore we rely on the RM-SUP to determine if they want to check the job before delivery.
5. the RM-SUP will also accept responsibilty for any misconduct of their employees which includes possible property damage.
6. STANDING TIME is calculated beginning at the time the truck <u>arrives and is ready for the concrete to be discharged at the job site,</u> and concludes when the last concrete needed is discharged. Standing time is free for the first "half hour" when the load is five yards or less. The first "hour" is free for all loads above 5 yards, up to a full load.
7. At the discretion of the delivering RM-SUP pouring may be interrupted or canceled with notice to 1-800 so we may appropriately inform the customer.
8. RM-SUP understands that if concrete is discharged any where other than the desisnated areas they may be responsible for cleanups/removal.
9. Incidents requiring a WRECKER, due to problems at the site, are the responsibility of the purchaser, unless the driver goes in an undesignated area, and therefore the purchaser must make payment arrangements directly to the wrecker company.
10 .All MUD and DEBRIS in ROADWAY or property caused by concrete vehicles accessing the site is the responsibility of the purchaser and not the RM-SUP.
11 A WASHOUT AREA, to hold a minimum of a full shoot and hopper of concrete plus washout for each truck, must be provided by the purchaser at the pouring site.
12. The RM-SUP and 1/800 Concrete DO NOT GUARANTEE DELIVERY TIMES IN ANY WAY and are not liable for any costs due to lateness or cancellation.
13. THE DELIVERY TICKET MUST BE SIGNED by the dispatcher, truck driver and the property owner or their designee prior to truck leaving public street/road or the discharging of any concrete.

_____     _____
Ready Mix - Producer (RM - PRO)                    Date

_____     _____
1-800 Concrete Inc. (1-800)                               Date

FIG. 123B

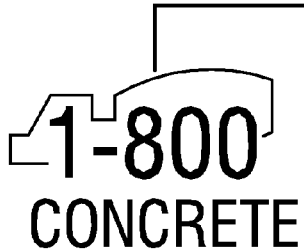

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

Finisher Service Agreement 1-800 Concrete Inc. (1-800 agrees to provide marketing services for Finisher (FIN). As such 1-800 shall provide clients for FIN and guarantee payment for all work performed from said clients for FIN, contingent on FIN agreeing to the following conditions.

1. FIN agrees to provide telephone contact availability during normal business hours and agrees to operate within applicable safetey standards and within OSHA regulations.
2. FIN agrees to obtain and maintain all applicable licensing and insurance and agrees to operate within applicable state and federal taxes.
3. Fin agrees to obtain all applicable permits, at property owner's direction, and shall pay all applicable state and federal taxes.
4. FIN agrees to cause each job inspected at the job site. Said inspection shall include; Securing safe access and egress for all equipment to be used and to discuss all applicable issues with the client (listing attached). ASTM and ACI standards (standards attached). All concrete finishing pricing shall include edge and joint toweling and be "picture framed" unless expressly requested otherwise in written form by the client. Joints and concrete thickness shall be within ASTM and ACI distances and depths, with curing compound applied to all slabs except footings. FIN agrees to accept responsibility for all properties of the concrete if water or any other material is added on the job. FIN also accepts responsibility for providing repair and finishing practices cause exposed aggregate, dusting, grade error or other reslts listed within ASTM and ACI finishing standards manual.
5. FIN agrees to consult 1-800 regarding material costs before providing the cilent with the free written estimate (see attached).
6. FIN agrees to obtain the property owners signature on the written estimate and payment authorization. FIN agrees to send a copy of all documents to 1-800 for verification and material delivery scheduling.
7. FIN agrees that upon completion of all site preparation and form "set up" FIN will resubmit the estimate for any final revisions for client's written approval for job completion and payment. 1-800 agrees to advance 20% of the labor esitmate to FIN and allow materials to be loaded for delivery to job site.
8. After final "job clean up" FIN agrees to obtain client's signature on the job completion form (sample attached) which is then forwarded to 1-800 for payment of entire amount due FIN.

Concrete Finisher 1-800 Concrete Inc.

FIG. 124

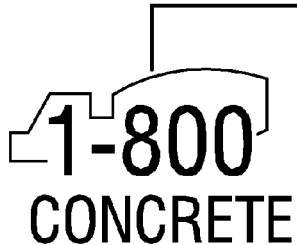

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

Concrete Pump Co. Service Agreement 1-800 Concrete Inc. (1-800) agrees to provide marketing services for_____
(Concrete Pump Company=CPC). As such 1-800 shall provide clients for CPC and guarantee payment for all work performed from said clients for CPC, contingent on CPC agreeing to the following conditions.

1. The CPC agrees to provide telephone contact availability during normal business hours and agrees to operate within applicable safety standards and within OSHA regulations.
2. The CPC agrees to obtain and maintain all applicable licensing and insurance and agrees to operate within applicable state and federal taxes.
3. The CPC agrees to obtain all applicable permits and shall pay all applicable state and federal taxes.
4. The CPC agrees to cause each job site to be inspected. Said inspection shall include; Securing safe access and agrees for all equipment to be used and to discuss all applicable issues with the client.
5. The CPC must coordinate with the ready mix supplier times to be at the site, setup and ready for concrete arrival times.
6. The CPC must also coordinate with the ready mix supplier the type of concrete being delivered and what, if any, priming material should be at the site or in the trucks (grout) before the job starts.
7. The CPC must coordinate with the property owner/designee a wash out area for the pump truck if no washout location is made available customer/designee will be billed for a one (1) hour clean out fee.
8. Disharge of concrete by the pumper in a non-designated area is the responsibility of the CPC.
9. Safe job site access with regards to utilities is the responsibility of the property owner.
10. Standing time is calculated from the time the pump truck sets up on the job site until the washout and teardown is completed.
11. Cancellations must be called in two (2) hours prior to scheduled delivery of the pump truck. Any cancellation after the two (2) hour period will result in a 7% fee of the order charged to the CPC.
12. Any additional charges to the customer will be addressed by 1-800 when the completion of the pump confirmation form received by us and confirmed.
13. 1-800 is not responsible in any way for labor cost incurred to the customer/finisher for a truck being late to the site.
14. All damages to persons or property by the CPC is the responsibility of the CPC.
15. Any job may be interrupted or stopped due to weather or prolonged scheduling time at the discretion of 1-800 or the CPC.

Concrete Pump Company 1-800 Concrete Inc.

FIG. 125

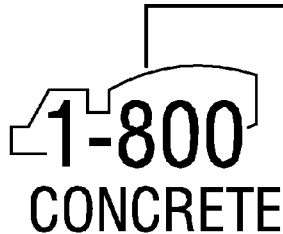

CONCRETE

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

JOB ESTIMATE

Name_____ Residence Phone _____
Address_____ Cell Phone _____
City _____ County _____ State _____ Zip _____
District_____ Land Lot_____ Subdivision_____ Lot _____
Inside_____ Outside_____ City Limits_____ Sewer Service by Septic_____ Sewer _____
General Job Description _____
_____
_____

Site Check List;
1. Trees_____ Who to remove _____ Stumps? _____
2. Bury or remove stumps or debris _____
3. Fencing _____ 4. Grading _____
4. Concrete pump or wheelbarrow _____
5. Retaining walls _____
6. Underground Utilities_____
      Power____ Phone_____ Gas_____ Cable_____ Sewer_____ Septic_____ Other_____
7. Underground water or rock job interuption _____
8. Drainage pipe installation_____

Equipment Access Area;
1. Marked_____ Unmarked_____ Finisher authorized _____
2. Overhead clearance_____
3. Damage permission granted to allow delivery of materials to ground, grass, plants, concrete,
   other_____
4. Repair to any damage_____
5. Exisiting property damang prior to any work _____
6. Customer has read and agrees to terms listed on attached disclaimer
   sheet _____

Project Cost;
Concrete PLUS additives, pumping equipment, misc. (where applicable) - COST _____
Labor and materials (to include misc. items) to complete project - COST _____

TOTAL _____

FIG. 126A

Notifications to property owner or his agent regarding accepted practices within delivering concrete industry.

1. In general the concrete company who provides the material for your job will guarantee that the concrete delivered will reach the specified strength within 56 days of the pour if no material including water is added to the concrete to reach the specified strength. They will also accept responsibility for any misconduct of their employees which causes property damage.
2. The delivering concrete company normally does not accept responsibility for the appearance or property of the finished concrete. Appearances and properties including scaling, cracking, dusting, aggregate exposure and grade problems are the responsibility of the concrete finisher.
3. The color of the finished concrete is often affected by sunlight and shade, chloride or non chloride accelerators in the concrete. slag cement, sand color and curing compounds on the finished concrete. Coloring of the finished concrete wil bleach into normal concrete color within an acceptable amount of time, depending on weather and the amount of sunlight exposure.
4. If there are problems with the concrete the delivering concrete company will normally recieve any computer generated weight tickets to verify the amounts of material in the mix. Since the scales are normally calibrated periodically and the computer weights are designs have historic evidence of strength sufficiently the delivering concrete company normally accepts these evidences as conclusive proof of the strength. In this case the investigation will end and the concrete company will not charge anyone for the cost of this investigation.
5. In the event there is no computer print out data available a "coring" of the concrete will be made to determine strength under ASTM and ACI guidelines. If the strength indicated from this test is lower than the specified strength the concrete company normally will accept at least some portion of the responsibly for the problem and will pay for the "coring" If the strength is as specified per design indications the investigation will end and the purchaser will be responsible to pay for the "coring
6. IN ANY CASE EXCEPTING STRENGTH AND TEMPORARY COLOR THE APPEARANCE OF THE CONCRETE IS DETERMINED BY THE FINISHER.

OTHER DISCLAIMERS AND INFORMATION

In order to best protect the purchaser and the concrete finisher payment shall be made by the purchaser in the following order; 1. The job will be estimated at no cost to the purchaser. 2. If the purchaser decides to accept the estimate he indicates by signing the estimate and initialing the disclaimers and information. 3. At a date acceptable to both parties the concrete finisher shall perform the appropriate pre-material delivery work to include; (A.) All concrete forms and depths are re-measured by the finisher and any necessary revisions to the estimate and notification to 1-800-Concrete, payment for the full job will occur. (B.) If by credit card or check the amount will be debited for the revised amount indicated on the estimate. (C.) If cash the amount must be put on deposit at the nearest "Western Union" office before any material is loaded for delivery . 4. If purchaser does not agree by signing the esitmate the work performed will be deemed to represent 50% of the total job cost (it will be at the concrete finisher's discretion as to whether he removes his work and the purchasers account will be debited accordingly).

Upon the purchaser signing the "revised" estimate, after the pre-material delivery work is completed, the concrete finisher and not the purchaser will be responsible for any extra charges from the concrete deliverer due to concrete needed in excess of the estimate unless specifically agreed to otherwise in writing by the purchaser (Addendum -A applies if a pump truck is deemed necessary).

Upon the purchaser signing the "revised" estimate after the pre-material delivery work is completed, the concrete finisher and not the purchaser will be responsible for any additional costs resulting from the identified notifications and information expressed following the items above, unless expressly excluded in writing by the purchaser and concrete finisher.

CUSTOMER:

_____
Print Name

_____
Signature

_____
Date

FINISHER:

_____
Print Name

_____
Signature

_____
Date

FIG. 126B

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

Estimate/Work Order

Customer Information

| Name | Resident Phone # | Cell Phone # |
|---|---|---|
| Adress | City | State Zip Code |
| County | Subdivision | Lot # |

| Pour Design : ( ) Slab ( ) Wall ( ) Footing ( ) Driveway ( ) Steps ( ) Other (List) : |
|---|
| Desgin Mix (PSI) : | Additives (List) : | Fiber (List) : |
| Will concrete be Wheel barrowed ? ( ) Yes ( ) No | Concrete Pump Needed? ( ) Yes ( ) No | If Yes, Size : Over 150 ft.? | Reach : ( ) Yes ( ) No |
| Dimensions : List ALL Work (including "no charge" work) to be performed : |

Utilities / Septic Tank : The homeowner is responsible for calling and arranging a "Locator" company to properly identify the location of ALL utilities. Septic tank and lines must also be located. Utilities and septic systems must be identified PRIOR to starting the job.

Equipment Access Area

| Access : ( ) Marked ( ) Unmarked ( ) Finisher Authorized | Traffic Obstructions MUST Meet D.O.T. Requirements |
|---|---|
| Overhead Clearance : Any Hindrance? ( ) Yes ( ) No If Yes Describe : | |
| Damage permission granted to allow delivery of materials to job site. Check all that apply : ( ) Grass ( ) Plants ( ) Concrete ( ) Other (List) | |
| Describe any property damage PRIOR to any work performed : | |

| Total Cost includes Labor and Materials. This is an ESTIMATE ONLY. Additional Labor and/or Materials may Be Needed to Complete the Job. | TOTAL COST $ |
|---|---|

| Customer has read and agreed to terms listed on the Estimate/Work Order and Disclaimer sheet (on back) ||
|---|---|
| Estimate Accepted by Customer | Estimate Accepted by Finisher |
| Customer Print Name : | Finisher Print Name : |
| Signature : | Signature : |
| Date : | Date : |

WHITE - CUSTOMER     YELLOW - 1-800 CONCRETE     PINK - FINISHER

Disclaimers
Notifications to property owner or his agent regarding accepted practice within the concrete industry.
1. In general the concrete company who provides the materials for your job will guarantee that the concrete delivered will reach the specified strength within 56 days of the pour if no material, including water, is added to the concrete, to reach the specified strength after dispatched from the plant. They will also accept additional respsonsibility for any misconduct by their employees which results in property damage.
2. The delivering concrete company does not accept responsibility for the appearance or properties of the finished concrete. Appearances and properties including scaling, cracking, dusting, aggregate exposure and grade problems are the responsibility of the concrete finisher per ASTM and ACI guidelines.
3. The color of the finished concrete is often affected by the sun light and shade. chloride or non-chloride accelerators in the concrete, slag cement, sand color and curing compounds on the finished concrete. Coloring of the finished concrete will bleach into normal color within an acceptable amount of time depending on weather and the amount of sunlight exposure.
4. If there are problems with the concrete, the delivering concrete company will normally retrieve any computer generated tickets to verify the amounts of materials in the mix. Since the scales are normally calibrated periodically and the computer weights are desinged to have historic evidence of sufficient strength that the delivering concrete company accepts these weights as evidence of conclusive proof of the strength. In this case the investigation will end and the concrete company will not charge anyone for the cost of the investigation.
5. In the event there is no computer printout data available a "coring" of the concrete will be made to determined strength under ASTM & ACI guidelines after 56 days. If the strength indicated from this test is lower than the specified strength, the concrete company normally will accept at least some portion of the responsiability of the problem and will pay for the "coring" If the strength is as specified per design, the investigation will end and the purchaser will be responsible to pay for the "coring".
6. In any case. excluding strength and temporary color. the appearance of the concrete is determined by the finisher.

Other Disclaimers and Information
In order to best protect the purchaser and the concrete finisher, payments shall be made by the purchaser in fhe folowing order;
1. The job will be estimated at no cost to the purchaser.
2. If the purchaser decides to accept the estimate and has read the disclaimer, he so indicates by signing the estimate and makes a 25% non-refundable deposit or full payment of which 25% in non-refundable. if desired to 1-800- Concrete.
3. At the date acceptable to both parties. the concrete finisher shall perform pre-material delivery work to include:
   a. All concrete forms and depths are measured by the finisher and any necessary revisions to the estimate are made and notification is made to 1-800-Concrete. At that time the remaining balance for the initial work order(s) and/or change orders(s) for materials and labor will be made in full.
   b. If payment is to be made by credit card or check, the amount will be debited for the revised amount indicated on the estimate/work order.
   c. If payment is to be made by cash, the total amount must be deposited with Western Union per instructions from 1-800-Concrete at any branch location material can be loaded for delivery.
4. If the purchaser does not agree by signing the estimate, the work performed by the finisher to that point will be deemed to represent up to 75% of the total estimated job cost. Therefore 1-800-Concrete shall only refund or credit purchaser's account accordingly at 1-800-Concrete's sole discretion.
5. Upon the purchacer signing the "revised" estimate where applicable, after the pre-material delivery work is completed, the concrete finisher and not the purchaser will be responsible for any extra charges from the delivering concrete company for any concrete or other material in excess of the estimate unless specifically agreed to otherwise.
6. Also upon the purchaser signing the "revised" estimate where applicable, after the pre-material delivery work is completed, the concrete finisher and not the purchaser will be responsible for any additional costs resulting from the identified notifications and information expressed following the items above unless expressly excluded in writing by the purchaser and concrete finisher.
7. 1-800-Concrete or any affiliate is not responsible for damage to any utilities or septic system nor cost to repair it.
8. The finisher has the right to reject a load of concrete based on mix being too wet or varied from what was requested after contacting 1-800-Concrete for rejection confirmation.
9. Any work done outside this contract in not authorized by 1-800-Concrete.
10. The Customer Satisfaction Report must be returned to 1-800-Concrete PRIOR to finalization of contract with finisher.
11. In the unlikely event the customer has a dispute with 1-800-Concrete. customer hereby agrees that the dispute shall be settled by arbitration through the Better Business Bureau of Metorpolitan Atlanta.

FIG. 127B

1-800 CONCRETE

2337 Highway 78 Suite B
Loganville, Georgia 30052
Fax : 770-266-6223
Email :
info@1-800conrete.com
1-800CONCRETE.COM
1-800-CONCRETE™
COD-CONCRETE ™

POUR CONFIRMATION 1-800-CONCRETE Order # : _____

Plant : _____

Pour Date : _____

Total Yardage Poured : _____

Supplier Ticket # : _____

Additional Charges : _____

Comment : _____

_____

Dispatcher Signature : _____

** <u>Return</u> VIA Fax, including signed ORDER, within 24 Hours of pour completion.

SYSTEM, METHOD, AND COMPUTER READABLE MEDIUM FOR OUTSOURCING CONCRETE SERVICE ORDERS

CROSS-REFERENCE TO RELATED APPLICATION

This application claims the benefit of U.S. provisional patent application No. 60/529,995 entitled "Outsourcing Methods and Software" filed on Dec. 15, 2003, which is entirely incorporated herein by reference.

TECHNICAL FIELD

Systems and methods for outsourcing service orders are disclosed. More particularly, systems and methods related to providing concrete to a purchaser are discussed. One method, among others, includes concrete suppliers allowing an independent party, or outsourcing entity, to take orders for and arrange for delivery of concrete.

BACKGROUND

Retail sales and cash on delivery (COD) sales are terms that are typically used to refer to concrete orders made by individuals such as, but not limited to, non-current account owners. Frequently, the retail orders are for jobs such as patios, driveways, pools, etc., and therefore require relatively small amounts of concrete compared to orders from construction companies and contractors. Although retail orders tend to be relatively small, the amount of time required to receive and process a retail order is frequently longer than the amount of time required to take the larger orders. Therefore, many concrete suppliers see retail sales as undesirable because their resources are diverted from taking orders for the larger jobs.

In addition, many currently existing businesses may be tentative in entering the concrete business, because of the infrastructure that must be established. As a no limiting example, a retail home improvement company may choose not to enter the concrete business because they would need to hire and train personnel. Such companies may also need to develop a way by which to take orders, and a way by which to determine approximate costs, profits, etc. With the plethora of additions to the structure of the existing business, some businesses may be deterred in expanding into the concrete supply business. In addition to the effort expended in creating such an infrastructure, many businesses will not see a profit for months or even years after the commencement of a concrete division. The delay in profit realization, and the risk that no profit will be realized, may put a strain on the company as a whole, and possibly risk the company's overall success. Consequently, many businesses choose not to expand their business into the concrete supply business, thereby possibly forfeiting a profitable source of income.

Thus, a heretofore unaddressed need exists in the industry to address the aforementioned deficiencies and inadequacies.

SUMMARY

Included in this discussion is a service outsourcing system for providing at least one purchaser with concrete. The system may include at least one central server, and an interactive electronic ordering guide configured to allow the purchaser to place at least one concrete order. The central server may include at least one central database. The concrete order may also include a job site location. Additionally, the outsourcing system may be configured to receive at least one concrete order and provide the purchaser with the ability to select at least one selected concrete supplier from at least one potential concrete supplier. Further, the service outsourcing system may be configured to access the at least one central database. Finally, the service outsourcing system may be configured to outsource the concrete order with the selected concrete supplier.

BRIEF DESCRIPTION OF THE DRAWINGS

The components in the drawings are not necessarily to scale relative to each other. Like reference numerals designate corresponding parts throughout the several views.

FIG. 8 is an alternate embodiment of the advertisement tracking screen of FIG. 5B with the 1-800 special pricing customer checkbox 86 selected.

FIG. 10 is an example search caller screen, responsive to entering account data into window 74 from FIG. 9.

FIG. 19 is an example of an MSN MapPoint® screen, responsive to selecting MSN MapPoint® icon 126 of FIG. 17.

FIGS. 25A-C illustrate examples of a concrete estimate screen, responsive to selection of the accept button icon 182 shown in FIG. 24.

FIGS. 26A-C illustrate the example concrete estimate screen of FIG. 20, further illustrating entry of information related to an example concrete job.

FIGS. 31A-B show an example view order screen that is responsive to selecting the save button icon 259 shown in FIGS. 30A-B.

FIGS. 32A-B illustrate an example concrete supplier purchase order screen, responsive to selecting the concrete supplier data checkbox 266 and print order icon 264 of FIGS. 31A-B.

FIG. 33 illustrates an example finisher purchase order screen, responsive to selection of the finisher checkbox (not shown).

FIGS. 35A-B illustrates an example accounting purchase order screen, responsive to selection of the customer checkbox 265 from FIG. 31B.

FIG. 37 is an example refund screen, responsive to the refund order button icon 279 shown in FIGS. 31A-B.

FIG. 52A illustrates an example advertisement report screen responsive to selection of the generate report icon from FIG. 51.

FIG. 56 illustrates an example commissions report 975, responsive to selection of the generate report icon 998 from FIG. 55.

FIG. 58 illustrates a consultant activity report 961, responsive to selection of the generate report icon 998, from FIG. 57.

FIG. 62 illustrates a finisher zip code assignments report, responsive to selection of the generate report icon 998 from FIG. 61.

FIG. 64 illustrates a Home Depot customer's report, responsive to selection of the generate report icon 998 from FIG. 63.

FIG. 66 illustrates a Home Depot accounts report, responsive to the generate report icon 998 from FIG. 65.

FIG. 68 illustrates an order cancellation report, responsive to selection of the generate report icon 998 from FIG. 67.

FIG. 70 illustrates a plant zip code assignments report, responsive to selection of the generate report icon 998 from FIG. 69.

FIG. 74 illustrates a special pricing review report, responsive to selection of the generate report icon 998 from FIG. 73.

FIG. 76 illustrates a supplier activity report, responsive to selection of the generate report icon 998 from FIG. 75.

FIG. 80 illustrates a supplier rejected report, responsive to selection of the generate report icon 998 from FIG. 79.

FIG. 82 illustrates a supplier zip code assignment report, responsive to selection of the generate report icon 998 from FIG. 81.

FIGS. 87A-B illustrate an example view order screen, responsive to selecting order #15 icon 433.

FIG. 89 illustrates an example supplier rejected report screen responsive to selection of the supplier rejected subject icon from the reports subject group 205 of administration menu 201.

FIG. 115 illustrates an example equipment maintenance screen, responsive to selection of a particular piece of equipment from the equipment list 716, from FIG. 114.

FIG. 116 is an example add equipment screen, responsive to the selection of the add/remove equipment button icon 717 shown in FIG. 114.

FIG. 117 illustrates an example supplier listing screen, responsive to selection of the suppliers subject icon from the suppliers subject group 209.

FIG. 118 illustrates an example supplier maintenance screen, responsive to the selection of the add supplier button icon 747 shown in FIG. 117.

FIG. 119 illustrates an example supplier plant listing screen, responsive to selection of the supplier plants subject icon of the suppliers subject group 209.

FIG. 120 illustrates an example plant maintenance screen, responsive to selection of the add plant button icon 768 shown in FIG. 119.

FIG. 121 illustrates an example assigned supplier zip code screen, responsive to selection of the supplier zip code subject icon of the suppliers subject group 209.

FIG. 122 illustrates an example assigned plant zip code screen, responsive to selection of the plant zip code subject icon from the suppliers subject group 209.

FIG. 123A is an example ready mix supplier/producer service agreement in connection with outsourcing a concrete order, similar to that discussed with regard to FIGS. 1-122.

FIG. 123B is an alternate example ready mix supplier/producer service agreement in connection with outsourcing a concrete order, similar to that discussed with regard to FIGS. 1-122.

FIG. 124 is an example finisher service agreement in connection with outsourcing a concrete order, similar to that discussed with regard to FIGS. 1-122.

FIG. 125 is an example concrete pump service agreement in connection with outsourcing a concrete order, similar to that discussed with regard to FIGS. 1-122.

Figure 1:
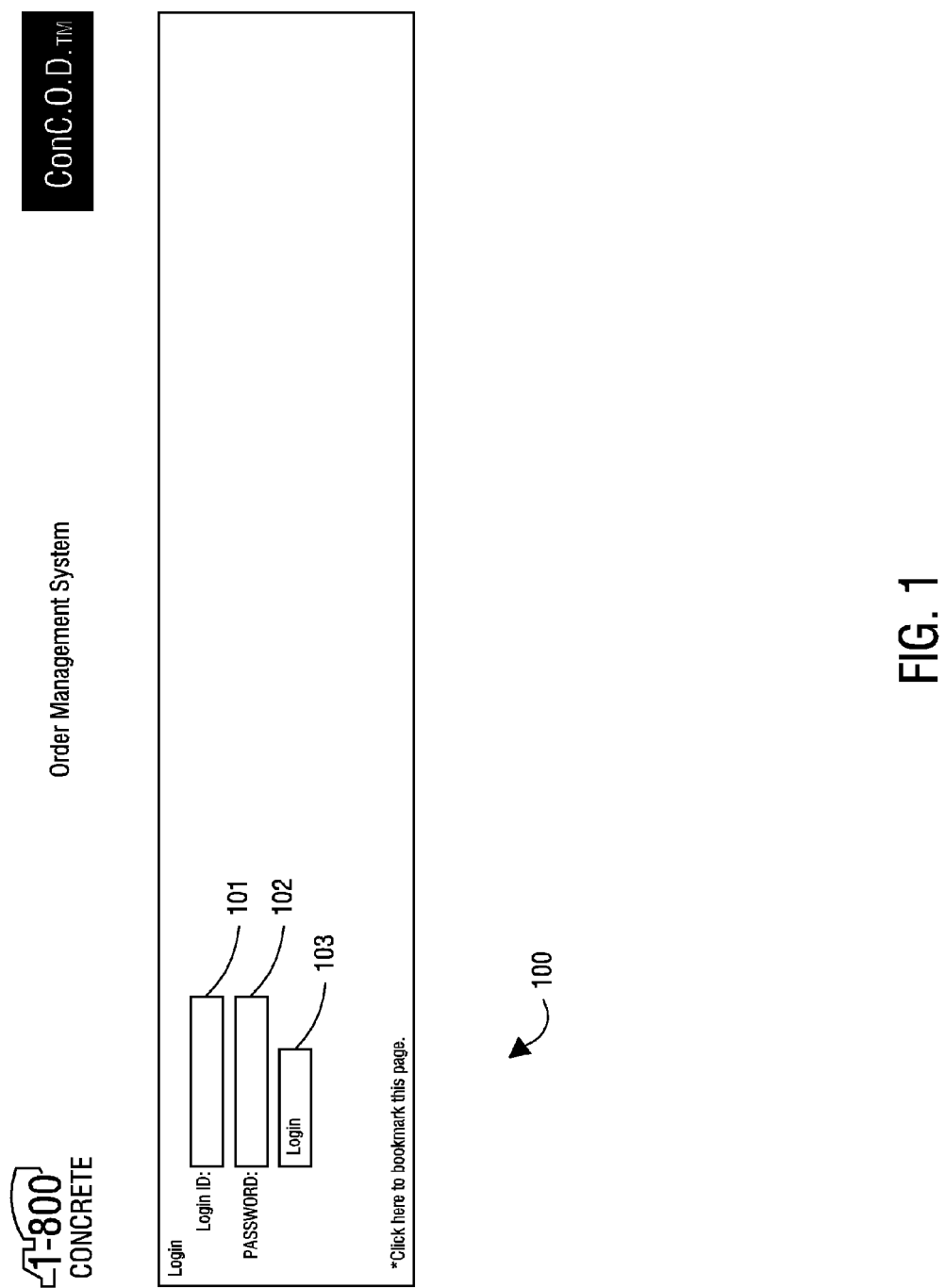
FIG. 1 illustrates an example of a login screen for access to the order management system.
Figure 122:
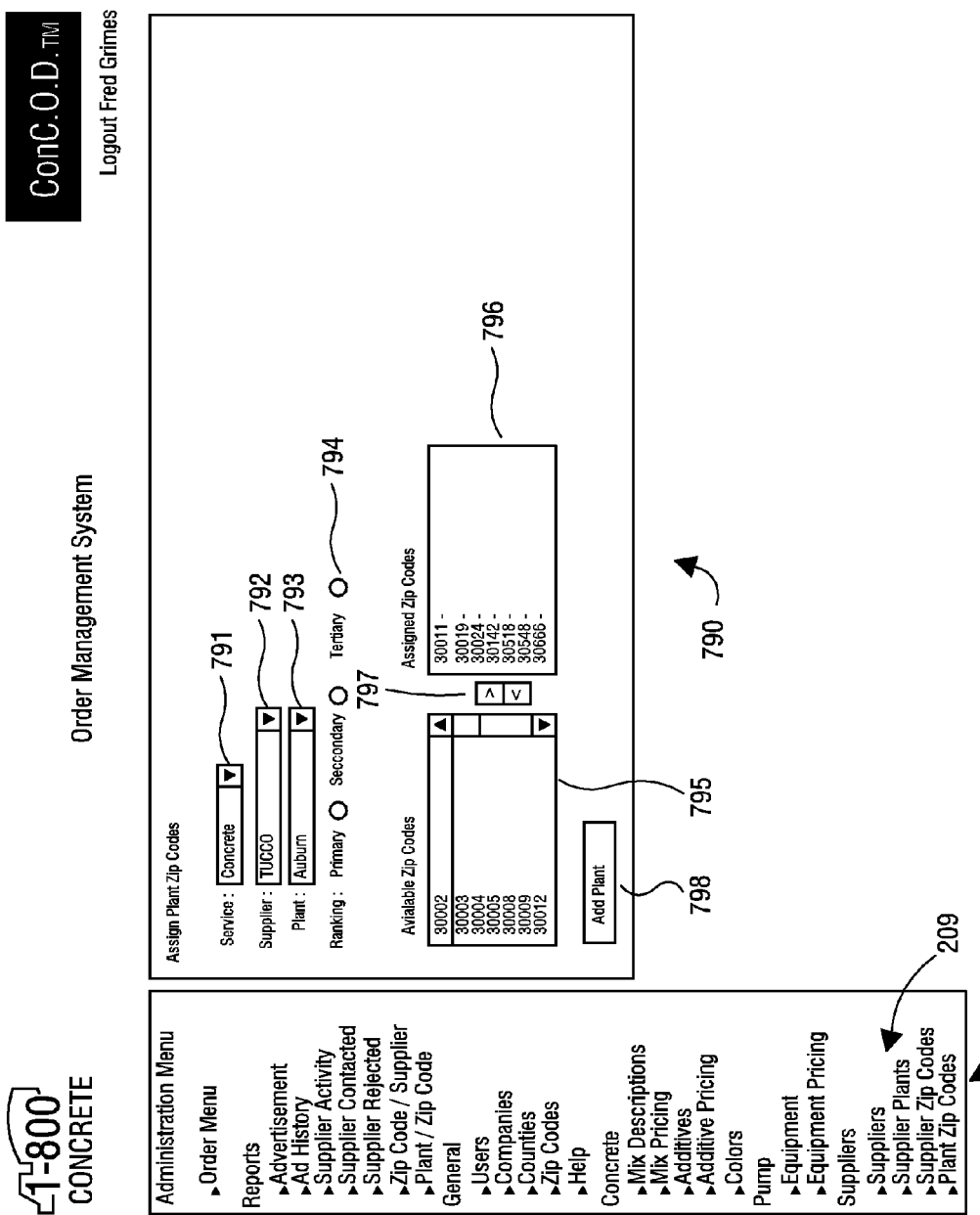

FIGS. 126A-B is an example job estimate for creating an estimate for a concrete order, similar to that discussed with regard to FIGS. 1-122.

FIGS. 127A-B is an example job estimate for creating an estimate for a concrete order, similar to that discussed with regard to FIGS. 1-122.

Figure 128:
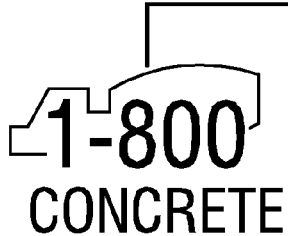

FIG. 128 is an example pour confirmation for a concrete order, similar to that discussed with regard to FIGS. 1-122.

Figure 129A:
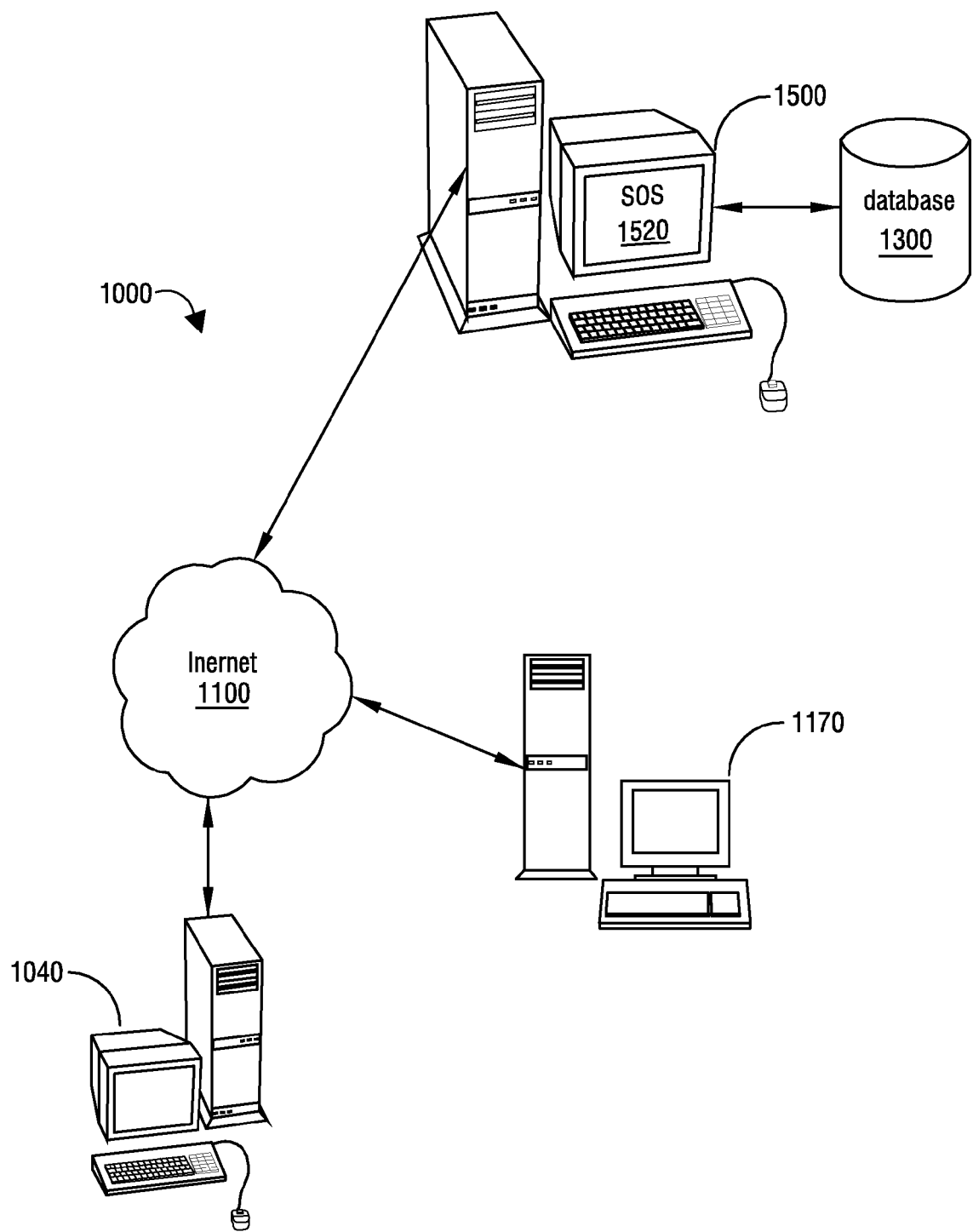

FIG. 129A is a block diagram depicting an example network infrastructure 1000 for implementing an embodiment of the service outsourcing system (SOS) 1520 similar to that discussed with regard to FIGS. 1-122.

Figure 129B:
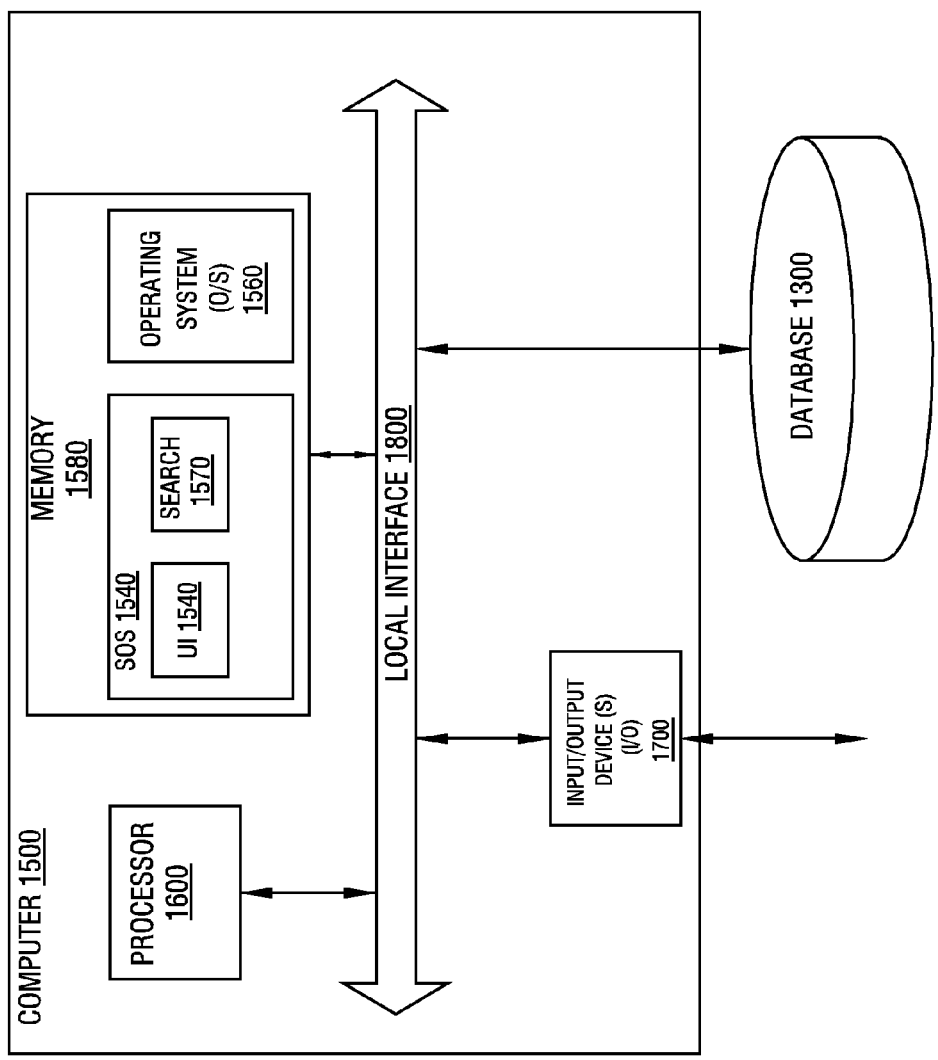

FIG. 129B is a block diagram depicting an example computer 1500 for implementing an embodiment of the service outsourcing system (505), similar to that discussed with regard to FIGS. 1-122.

DETAILED DESCRIPTION

Other systems, methods, features and/or advantages will be or may become apparent to one with skill in the art upon examination of the following drawings and detailed description. It is intended that all such additional systems, methods, features and/or advantages be included within this description and be protected by the accompanying claims.

Figure 81:
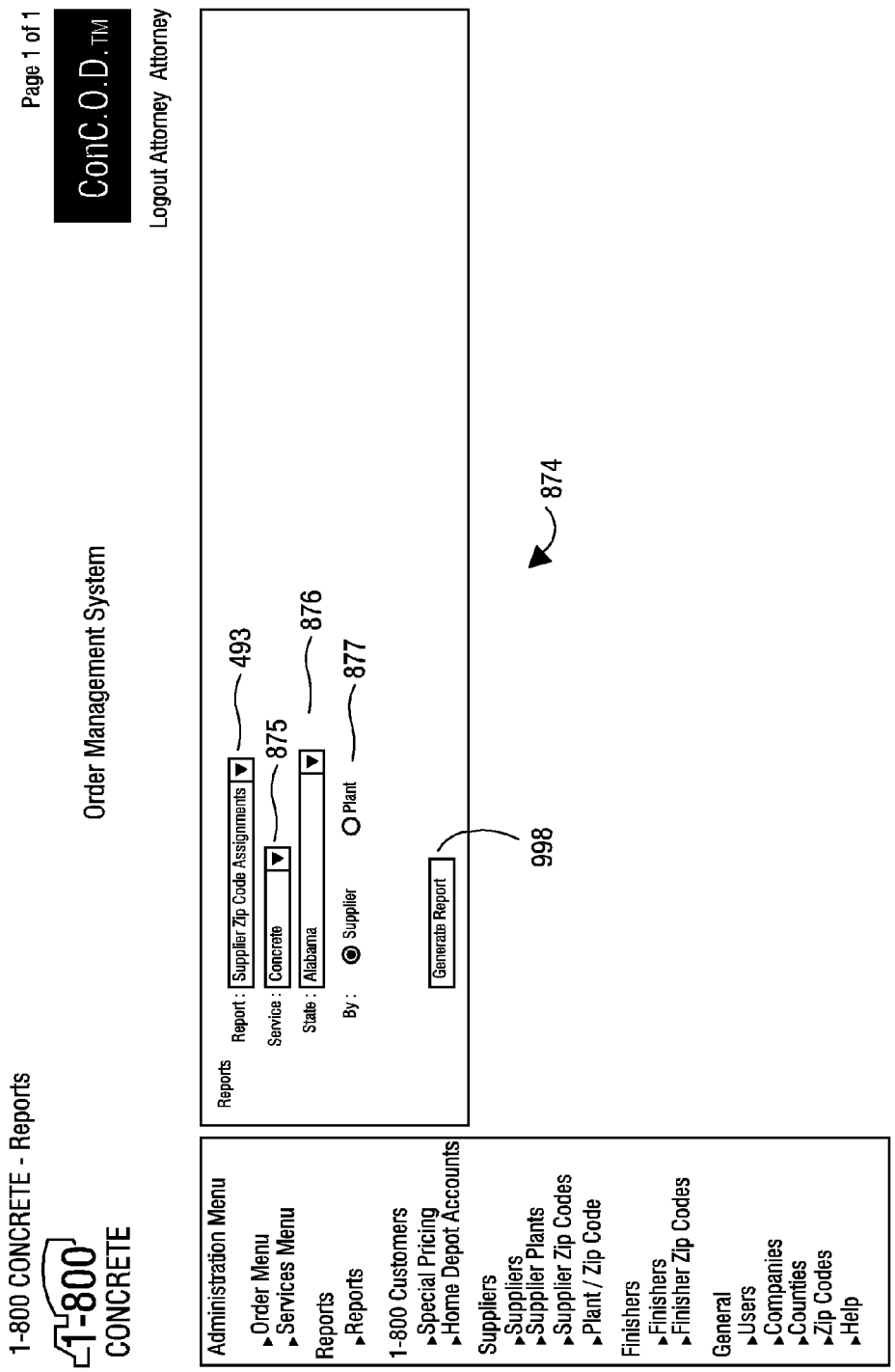
FIG. 81 illustrates a supplier zip code assignments block, responsive to selection of the supplier code assignments option in report dropdown menu 993.

One exemplary method of taking retail orders, among others, includes providing an outsourcing entity to handle retail orders for multiple concrete suppliers. The method may include securing agreements between an outsourcing entity and the various concrete suppliers, such as that shown in FIG. 80. The agreement in FIG. 80 defines various relationships and responsibilities between the outsourcing entity and the corresponding concrete supplier. Various other agreements may be desirable that define relationships and responsibilities between the outsourcing entity and the provider of various other services. For example, FIGS. 81 and 82 show agreements between the outsourcing entity and a concrete finisher and a concrete pump company, respectively. Although such services may not be required for each job, it is desirable to have these pre-existing agreements to allow for the timely coordination of services when creating an order.

Figure 91:
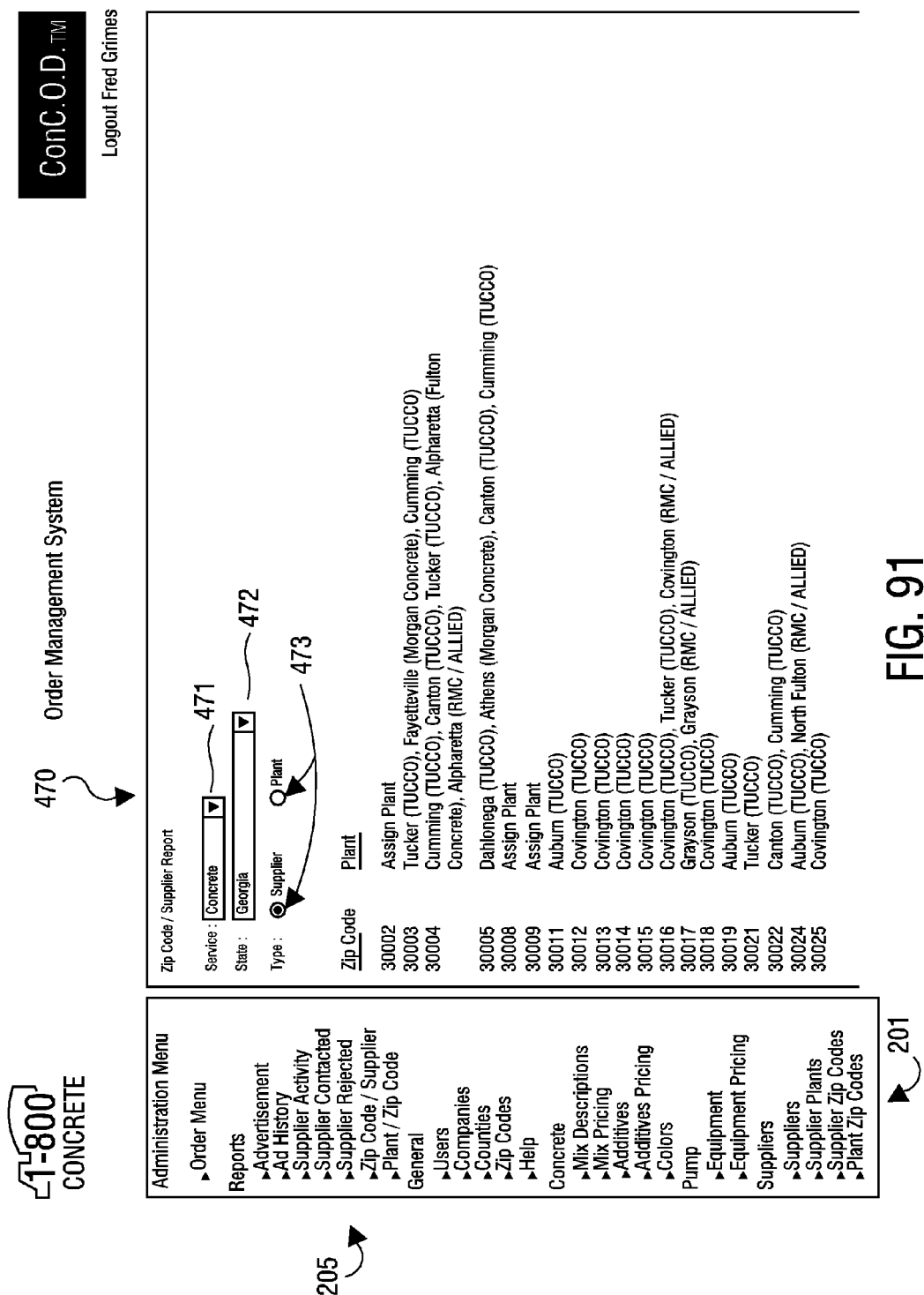
FIG. 91 is an example zip code/supplier report screen similar to FIG. 90, with plant icon selected.
Figure 92:
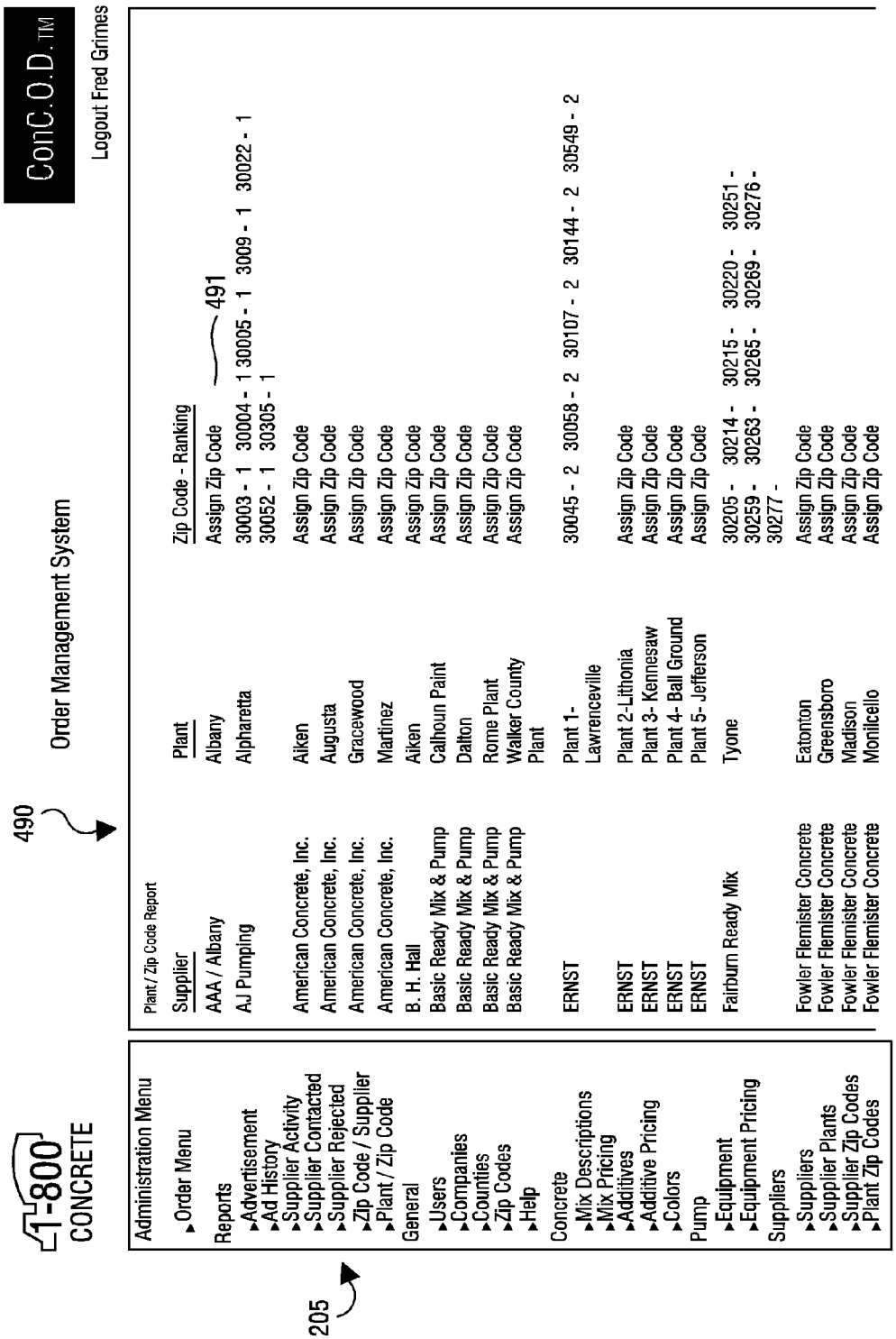
FIG. 92 illustrates a plant/zip code report, responsive to selecting the plant/zip code subject icon from the reports subject group 205.

Preferably, the method provides for determining which concrete supplier should receive a given retail order. One method, among others, includes assigning a retail order to a concrete supplier based upon taking the order from a geographic area that has been assigned to the concrete supplier. Geographic areas may assigned to specific concrete suppliers, as well as the individual plants operated by those suppliers, by assigning various zip codes and their related geographic areas. As shown in FIG. 91, the various concrete suppliers that service each zip code are listed. As shown in FIG. 92, individual plants operated by each concrete supplier are also assigned various zip codes. Note, multiple suppliers and/or plants can service the same zip code. However, each supplier and/or plant is assigned a priority ranking within each zip code service area. This allows an outsourcing entity to determine which supplier has a first right of refusal for the retail order being taken. Preferably, the zip codes may be assigned to the suppliers dependent upon a fee, or other compensation, provided to the outsourcing entity by the concrete suppliers. The fees can be varied, with the highest rank supplier paying the highest fee, and therefore having the first right to refusal for retail orders from a given geographic area.

In addition, the outsourcing entity may provide advertising that would prompt customers making retail orders to contact the outsourcing entity directly. For example, advertising could be placed on the cement trucks of the various concrete suppliers, the advertising preferably providing a number at which a customer can contact the outsourcing entity. However, those customers placing retail orders that contact the concrete supplier can simply be transferred or instructed to contact the outsourcing entity.

Each call for a retail order is handled by an outsourcing entity. Preferably, but not necessarily, the outsourcing entity utilizes a software program that prompts the outsourcing entity to elicit the desired information from the customer placing the retail order. The outsourcing entity inquires as to various aspects of the job in order to determine what services may be desired by the customer placing the retail order. For example, the outsourcing entity will determine whether a finisher or pump company services are required. The outsourcing entity then coordinates the actions of those parties providing those services. Because the outsourcing entity has pre-existing agreements with those entities providing the necessary services, coordination of the necessary services is expedited at the time of taking the retail order.

Figure 15:
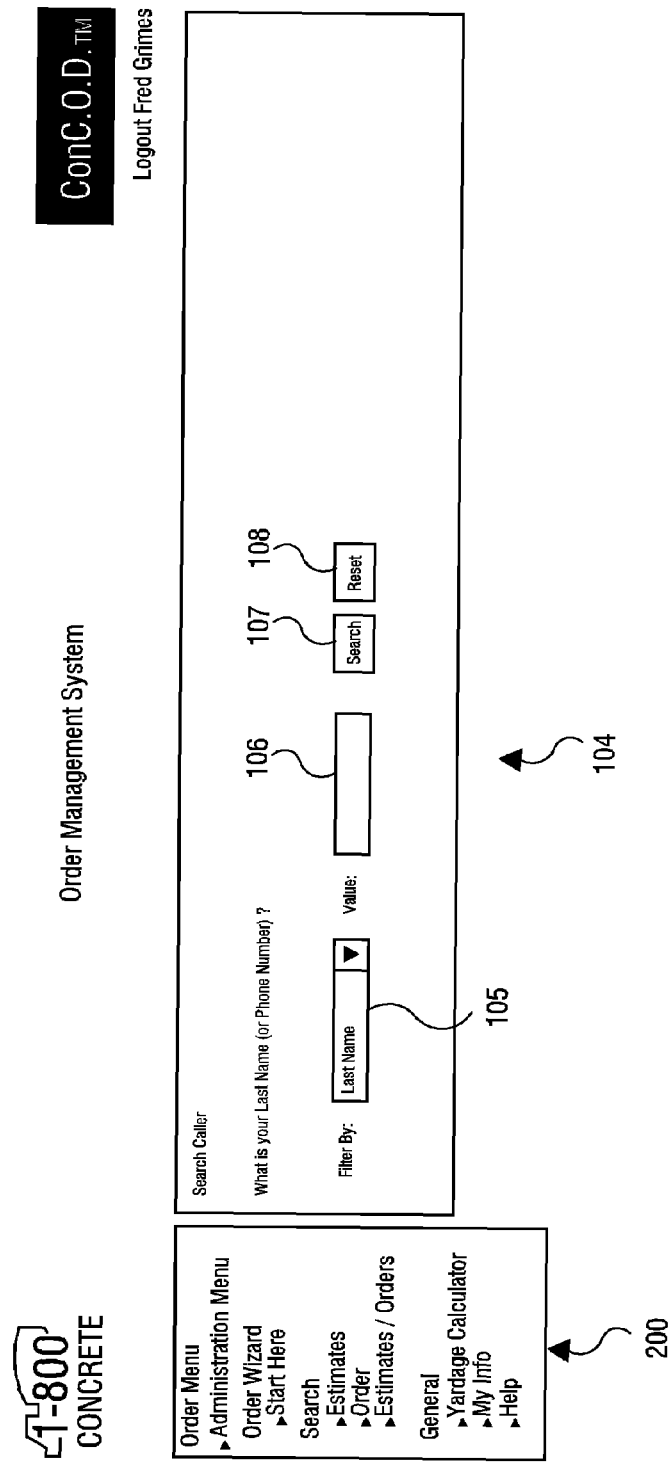
FIG. 15 is an example search caller screen, responsive to selection of the "YES" data checkbox 801 of FIG. 13.
Figure 28:
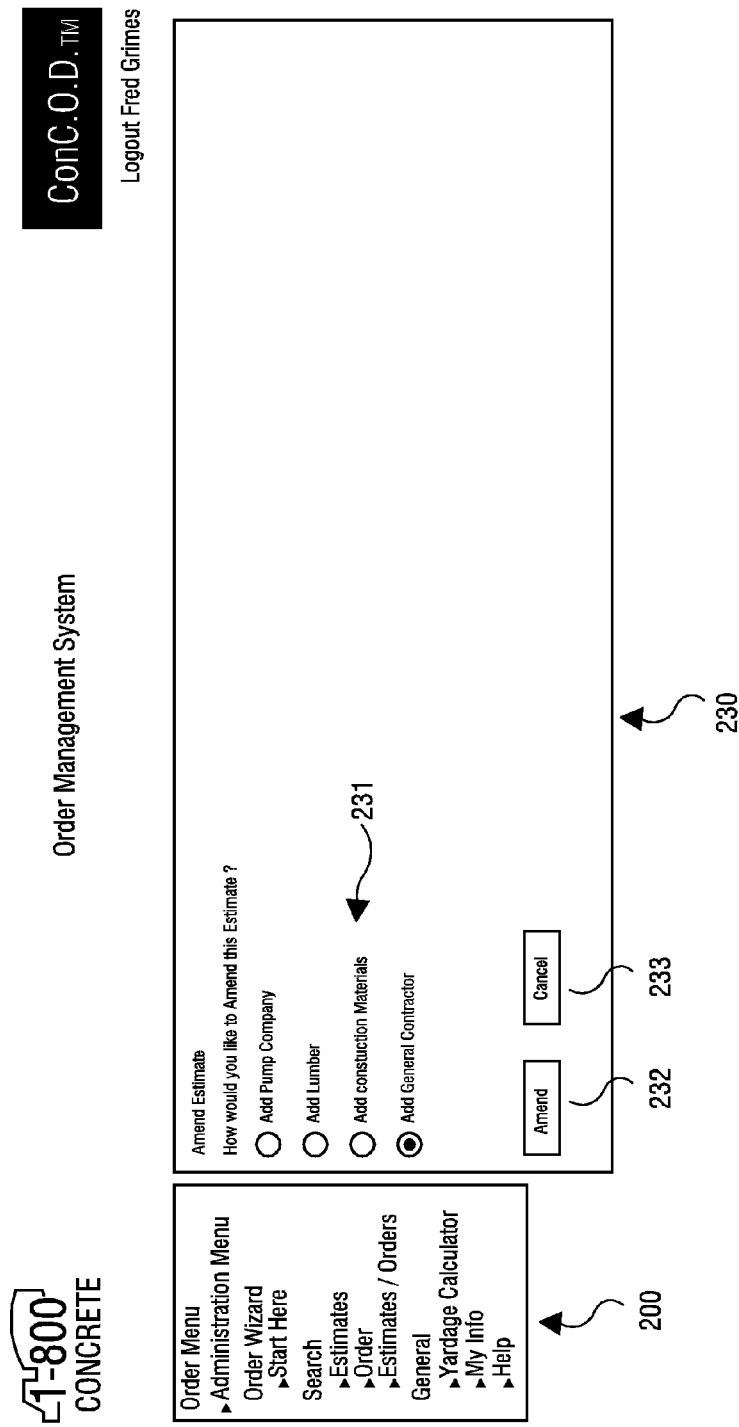
FIG. 28 illustrates an example estimate amendment screen, responsive to a user selecting the amend button icon 224 shown in FIG. 27.

As previously noted, the outsourcing entity preferably utilizes a software program when creating retail orders. An in-depth description of one such program is not required at this time, and will be reserved for the discussion of FIGS. 1-122 hereinafter. As shown in FIG. 15, the outsourcing entity elicits the zip code of the job site for which the customer is placing the retail order. This allows the outsourcing entity to determine which supplier and/or plant services that particular area and that supplier's rank within that area relative to other suppliers. As shown in FIG. 28, three plants are listed in the supplier section 141, with the first two plants being primary suppliers and the third listed plant being a secondary supplier. After the outsourcing entity has selected a supplier, the outsourcing entity then contacts that supplier to see whether that plant will accept or reject the retail order. If the retail order is rejected, the next supplier is contacted as determined by rank.

Figure 36:
FIGS. 36A-B illustrate an example customer purchase order screen, responsive to a user creating a purchase order of FIGS. 32A-B.

Once the outsourcing entity has elicited the required information and provided an estimate, the outsourcing entity can then create an order if the customer agrees with the given estimate. Preferably, a number of purchase orders are created, as shown in FIGS. 27A-29B, dependent upon which party will be receiving each given purchase order. For example, FIGS. 32A-B show a purchase order that is forwarded to the concrete supplier, FIG. 28 shows a purchase order that is retained by the outsourcing entity, and FIGS. 36A-B show a purchase order that is provided to the customer placing the retail order.

Figure 30:
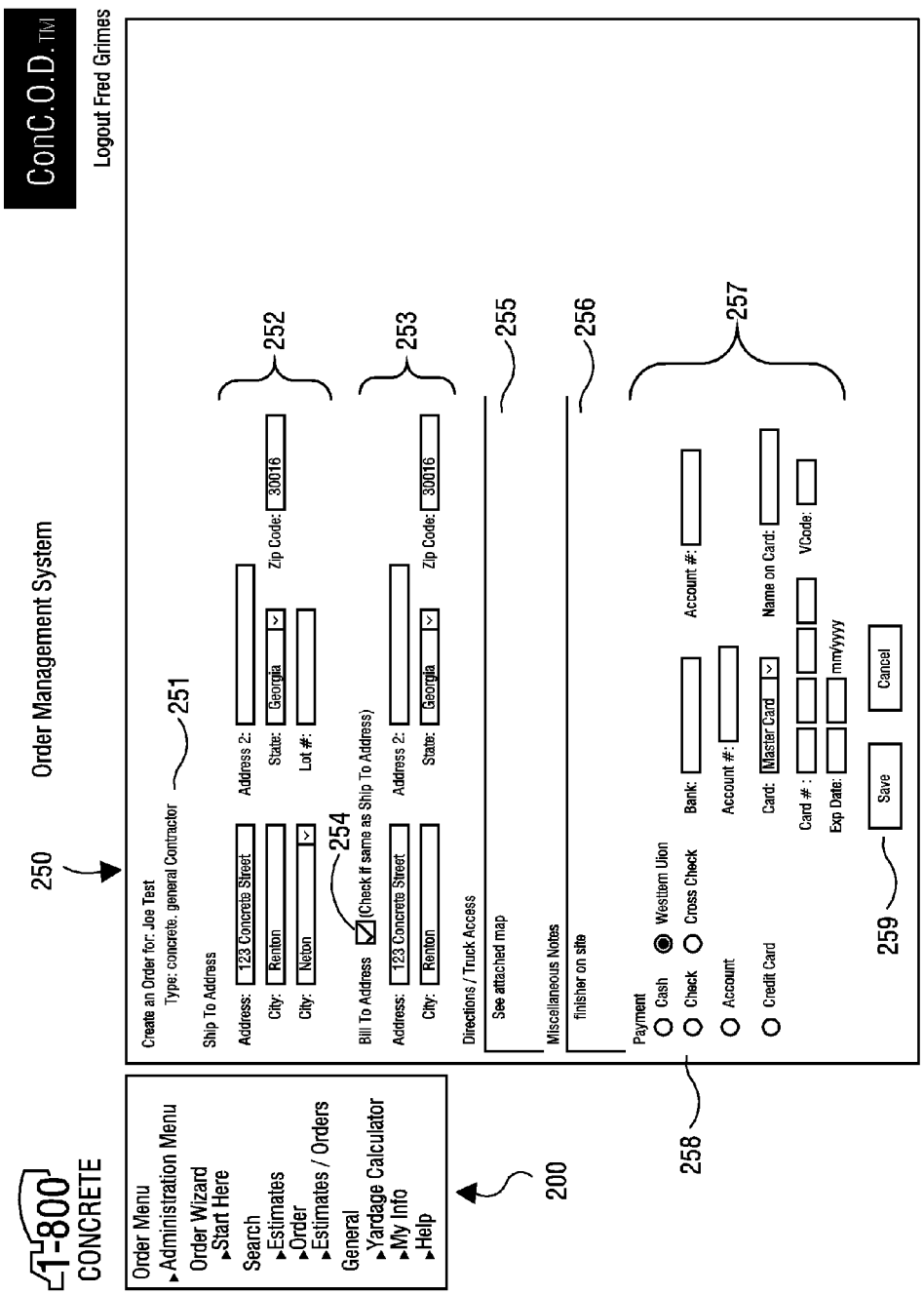
FIGS. 30A-B illustrate an example order creation screen, responsive to selection of the create order button icon 223 of FIG. 27.

Prior to creating the noted purchase orders, the outsourcing entity secures a method of payment from the customer placing the retail order. As shown in FIGS. 30A-B such methods can include, but are not limited to cash, checks, in-house accounts, credit cards, debit cards, and Western Union orders. Preferably, the method of payment is secured prior to creating the purchase orders and/or delivery of concrete to ensure that all parties providing services are assured of receiving payment.

Prior to the delivery of the concrete by the concrete supplier, the outsourcing entity may determine that the customer placing the retail order cannot provide all of the information that is required to ensure the concrete delivery can be properly performed. If this determination is made, the outsourcing entity preferably will send a concrete finisher to the job site with a job estimate form shown in FIGS. 127A-B. At this time, the concrete finisher determines whether or not the job site is accessible for delivery of the concrete and if the proper equipment and amount of concrete has been determined for the job. Note, sending the concrete finisher to the job site prior to delivery of the concrete is not required in all cases.

Once the outsourcing entity has created the purchase orders, the purchase order as shown in FIGS. 32A-B will be forwarded to the appropriate concrete supplier. At this time, a pour confirmation sheet, as shown in FIG. 128, may be forwarded to the concrete supplier as well. Preferably, the outsourcing entity may also obtain a verbal verification that the purchase order and pour confirmation sheets have been received by the concrete supplier. As shown in FIGS. 32A-B, the purchase order sent to the concrete supplier may include a signature area for the concrete supplier dispatcher, concrete supplier driver, and purchaser. After the purchaser has signed the purchase order indicating that he agrees to the disclaimers listed on the purchase order and desires delivery, the concrete supplier will pour the concrete as instructed. The pour confirmation sheet is then filled out by the concrete finisher and returned with the signed purchase order to the outsourcing entity to confirm the delivery.

Preferably, the outsourcing entity receives compensation from the various concrete suppliers for the outsourcing services provided. For example, the outsourcing entity can charge a fee related to the value of the retail orders processed for each concrete supplier. A fee related to each cubic yard of concrete purchased from the concrete supplier through the outsourcing entity is an example of one such fee. Also, a percentage of the sales of the concrete ordered through the retail sales can be charged.

Other embodiments of practicing this method could include providing outsourcing services for a retail enterprise such as Home Depot or Lowes, which presently do not participate in the ready mix concrete industry. For example, advertising located at a retail outlet could instruct customers to contact the outsourcing entity directly, or a representative of the outsourcing entity could be present at the retail location in order to field requests for retail orders. Utilization of the outsourcing entity allows the retail enterprise to expand into the ready mix concrete industry with minimal associated costs, such as training additional or existing employees. Preferably, the outsourcing entity allows the retail enterprise to provide advertising for display on the trucks of the concrete suppliers. As well, the outsourcing entity preferably accepts any payment cards (credit, debit, etc.) that are offered by the retail enterprise as payment options for the retail orders.

As a nonlimiting example, an outsourcer such as 1-800Concrete may contract with a retailer such as Home Depot. The agreement may include 1-800Concrete providing personnel within a Home Depot retail store. The personnel may advertise 1-800Concrete's services, and may even take orders from within the Home Depot retail store. The agreement between 1-800concrete and Home Depot may also include Home Depot providing compensation for this service. The compensation may be a fixed fee agreement, an agreement based on a percentage of an order, or other conceivable forms of payments. This allows Home Depot to enter the concrete supply business with minimal costs and effort. Additionally, 1-800Concrete may benefit from Home Depot's goodwill in the community for home improvement, thereby increasing sales.

Referring now to an exemplary embodiment, among others, of a software program for use by an outsourcing entity, an example login screen is shown in FIG. 1. As shown, the login screen includes a login block 100 having a login ID entry window 101, a password entry window 102, and a login button icon 103. To access the order management system, a user enters his/her login ID and password in the login ID entry window 101 and password entry window 102, respectively. By selecting the login button icon 103, the information entered in the login ID window 101 and password entry window 102 may be verified against information previously stored in one or more databases of the system.

Figure 2:
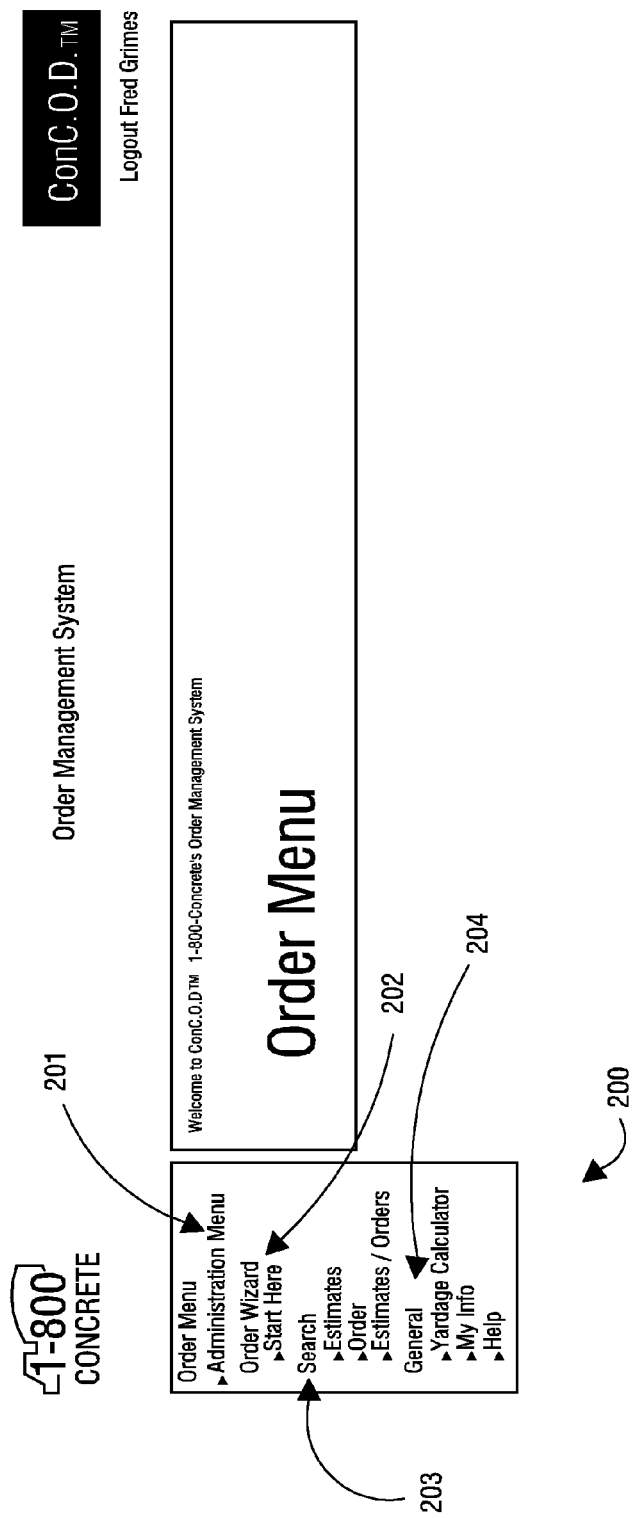
FIG. 2 illustrates an example order menu screen, responsive to the positive verification of the information entered in the login ID entry window 101 and password entry window 102 of FIG. 1.

FIG. 2 illustrates an example order menu screen, responsive to the positive verification of the information entered in the login ID entry window 101 and password entry window 102 of FIG. 1. As shown, the example order menu screen includes an order menu block 200 having an administration menu drop down icon 201, an order wizard subject group 202, a search subject group 203, and a general subject group 204. Each of the subject groups further includes subject icons for selecting various options within each subject group.

Figure 3:
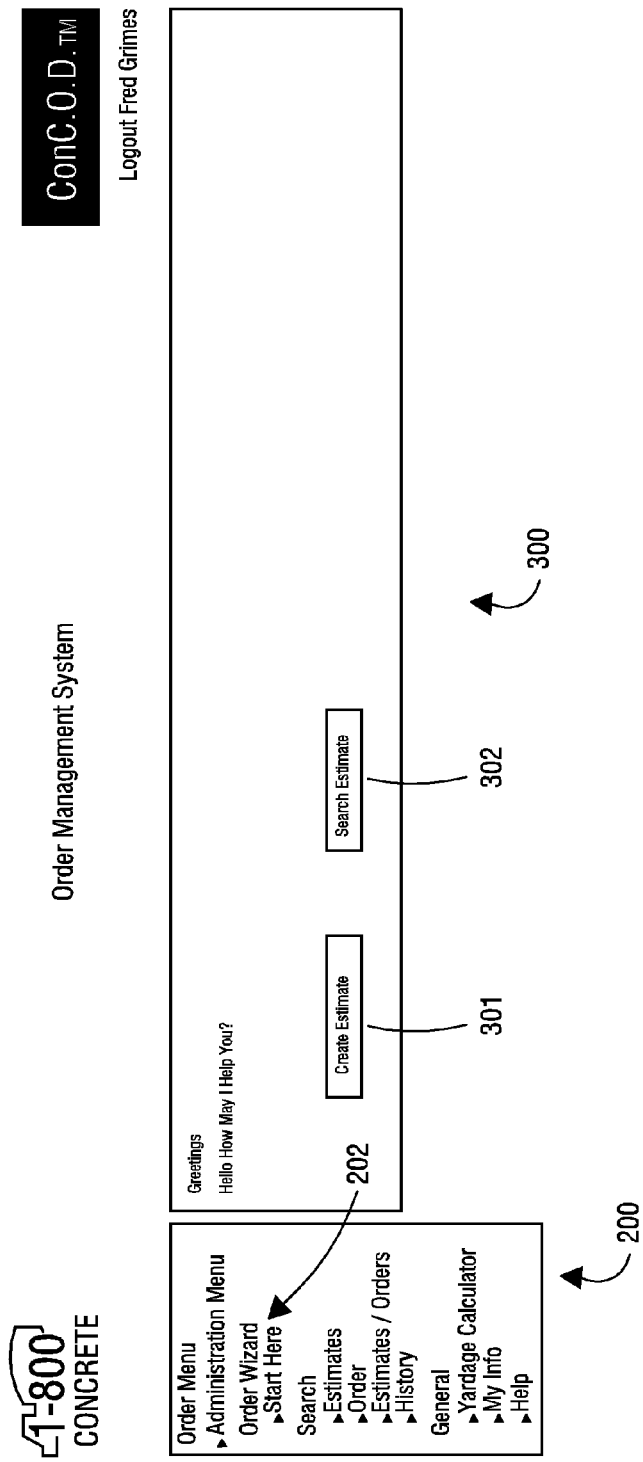
FIG. 3 is an example greeting screen, responsive to selection of the start here subject icon of the order wizard subject group 202 of FIG. 2.

FIG. 3 is an example greeting screen, responsive to selection of the start here subject icon of the order wizard subject group 202. The example greeting screen may include an estimate launch block 300 having a create estimate button icon 301 and a search estimate button icon 302.

Figure 4:
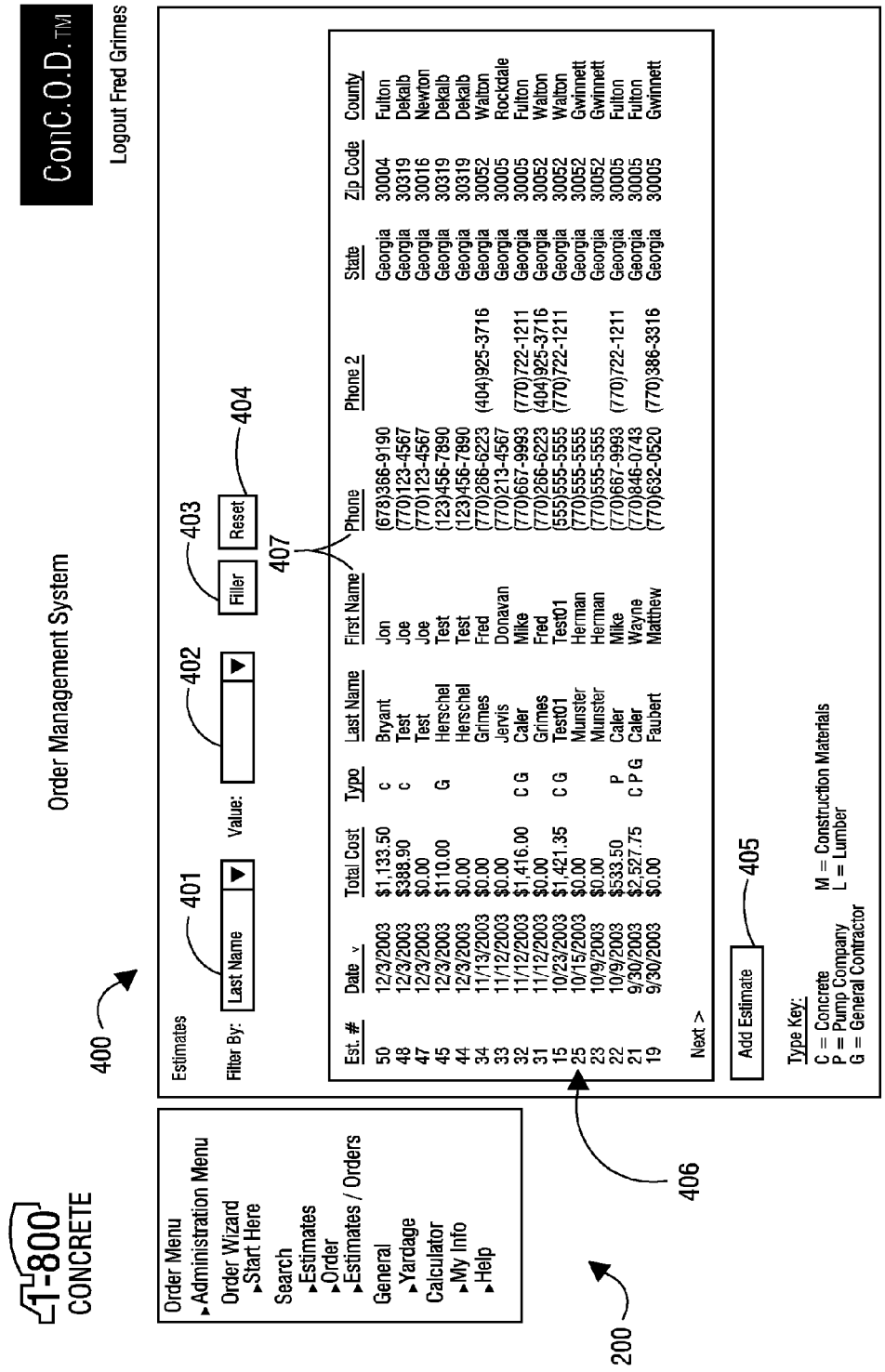
FIG. 4 illustrates an example estimate screen, responsive to selection of the search estimate button icon 302 of FIG. 3.

FIG. 4 illustrates an example estimate screen that is responsive to selection of the search estimate button icon 302 shown in FIG. 3. The example estimate screen includes an estimate block 400 having a data field drop down menu 401, a value entry window 402, a filter button icon 403, a reset button icon 404, and a list of estimates previously entered and stored within a database of the system. The list of estimates includes a series of data fields 407 that may provide information to and assist a user of the order management system in locating a particular estimate. Data fields 407 can include, but are not limited to, estimate number, date, total cost, type of estimate, last name of caller, first name of caller, phone number of caller, state, zip code, and county of potential job site. To search for a particular estimate, a user may access the data field drop down menu 401 and may select the data field 407 such as estimate number, last name, phone number, state, zip code, or county. After selecting the desired data field of the data field drop down menu 401, a user may enter the desired information in the value entry window 402 and selects the filter button icon 403. If the information provided in the value entry window 402 is located within the selected data field 407, those estimates including that information are displayed. Selection of the reset button icon 404 clears the information selected in the data field drop down menu 401 and provided in the value entry window 402. Estimate number icons 406 allow a user to select and view a particular estimate simply by selecting the desired estimate number icon 406. Further, the estimate block 400 may include an add estimate button icon 405 that permits a user to create a new estimate.

Figure 5A:
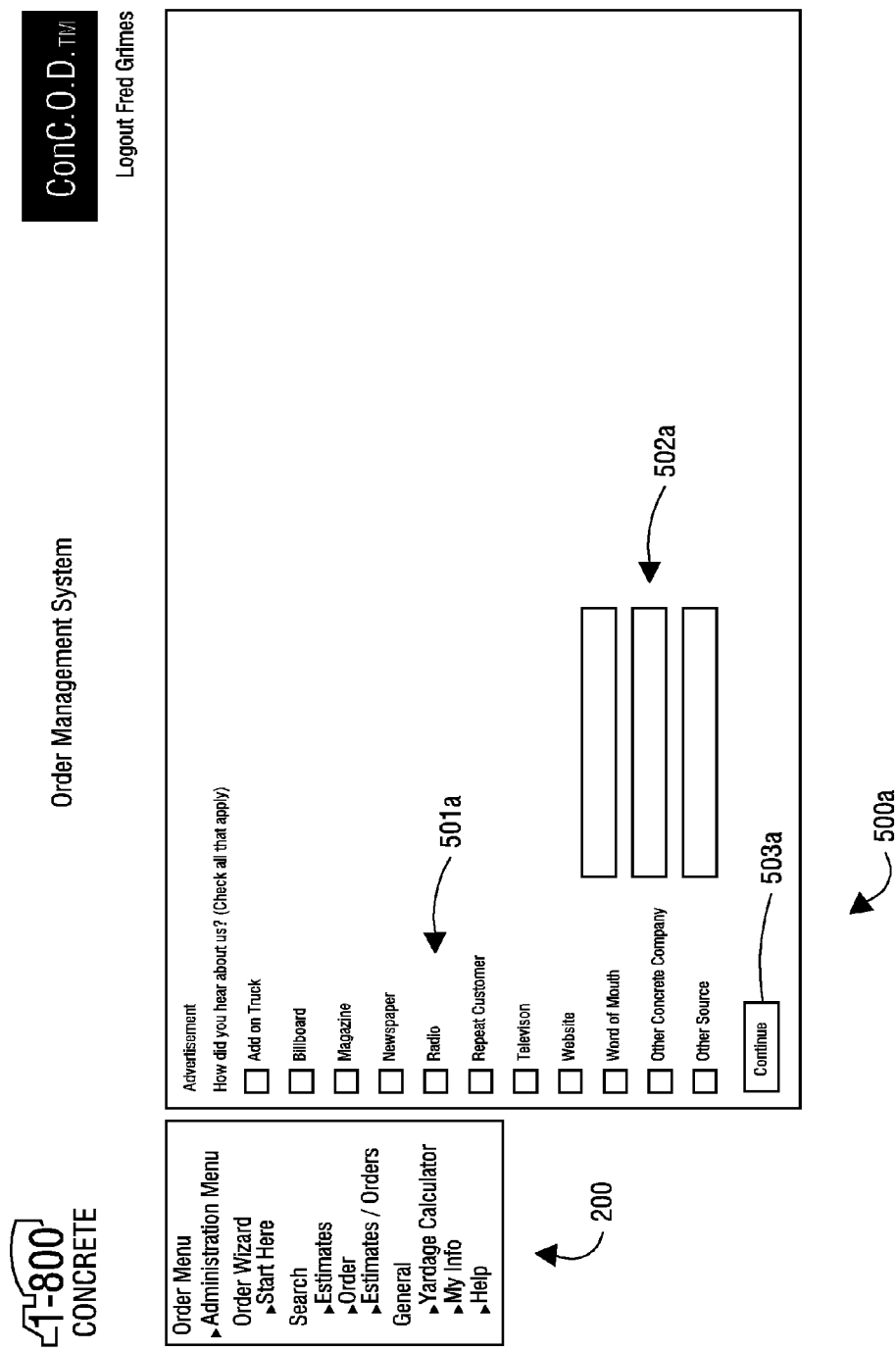
FIG. 5A illustrates an example advertising tracking screen, responsive to selecting either the create estimate button icon 301 shown in FIG. 3 or the add estimate button icon 405 of FIG. 4.

FIG. 5A illustrates an example advertising tracking screen, responsive to selecting either the create estimate button icon 301 shown in FIG. 3 or the add estimate button icon 405 shown in FIG. 4. The example advertising tracking screen may include an advertising block 500a having data checkboxes 501a, data entry fields 502a, and a continue button icon 503a. By selecting one or more of the data checkboxes 501a, a user can indicate those methods of advertising to which a caller was exposed. Data entry windows 502a permit the user to provide information not accounted for in the data checkboxes 501a. Selection of the continue button icon 503a causes that information recorded in the advertising block 500a to be saved in a database for use by an operating system.

Figure 5B:
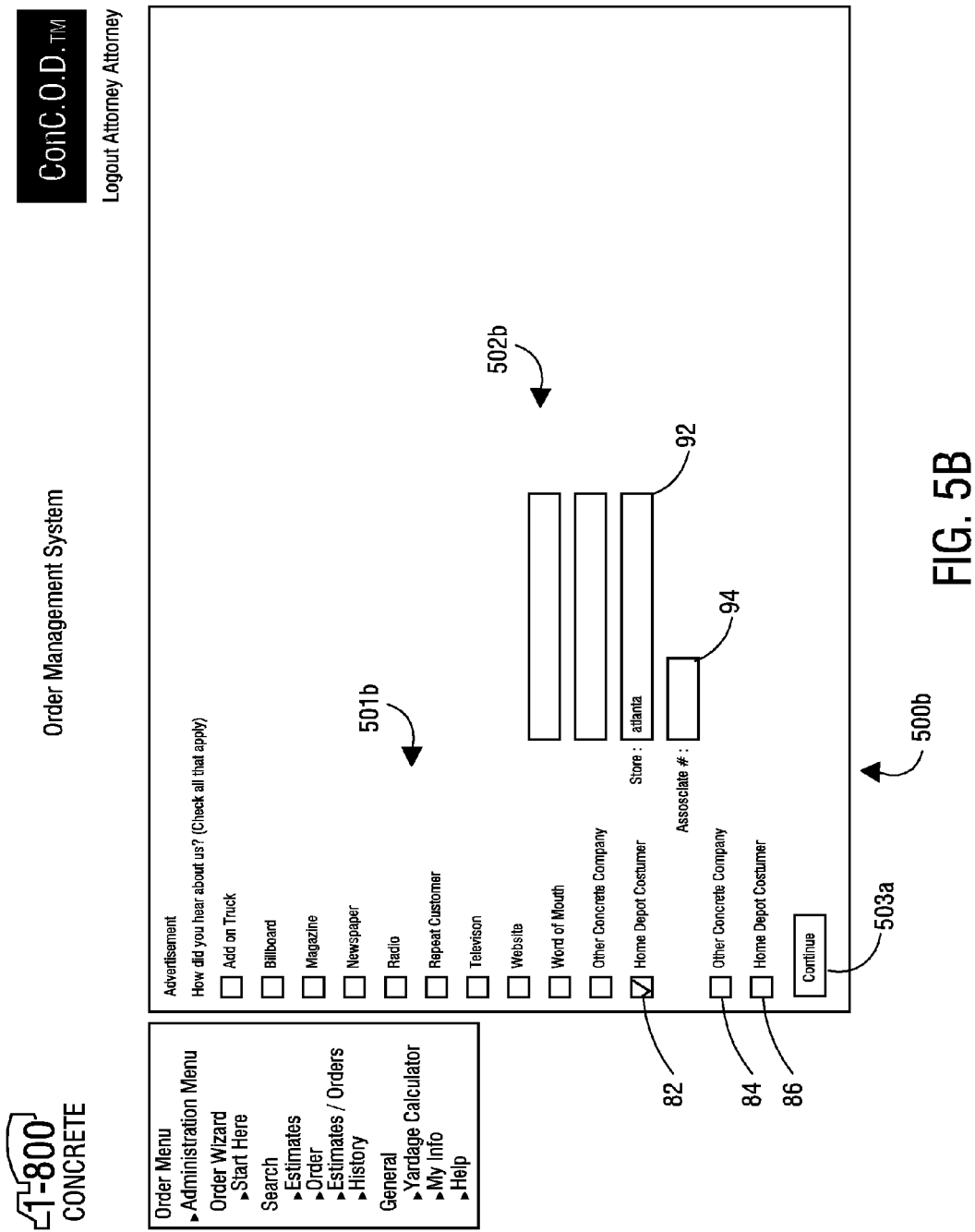
FIG. 5B is an alternate embodiment of the advertising tracking screen of FIG. 5A illustrating the selection of the Home Depot customer checkbox.

FIG. 5B is an alternate embodiment of the advertising tracking screen of FIG. 5A illustrating the selection of the Home Depot customer checkbox 82. As with FIG. 5A, FIG. 5B is an example tracking screen, responsive to selecting either the create estimate button icon 301 of FIG. 3 or the add estimate button icon 405 of FIG. 4. FIG. 5B, includes advertising block 500b, having data checkboxes 501b, data entry fields 502b, and a continue button icon 503a. However, in FIG. 5B, data checkboxes include Home Depot customer checkbox 82, Home Depot account holder checkbox 84, and 1-800 special pricing customer checkbox 86. These checkboxes facilitate sales acquired through a retailer, as described above. In this nonlimiting example, 1-800Concrete may have an agreement with Home Depot. Such an agreement may include 1-800Concrete sending a representative to a Home Depot retail store to take concrete orders. The representative may answer questions, take orders, or otherwise accommodate Home Depot Customers with their concrete needs. Alternatively, Home Depot may simply advertise the outsourcing agent's services in retail stores. When the customer contacts the outsourcing agent (in this example 1-800Concrete), the outsourcing agent may process the order for a Home Depot concrete division to perform the desired concrete job. This allows Home Depot to quickly and easily enter the concrete business. As is evident, Home Depot is merely a nonlimiting example of a retailer with which the concrete outsourcer may contract. Any retailer may be used in substitution for, or in addition to Home Depot.

If the user is a Home Depot customer (s)he may select Home Depot customer checkbox 82, and complete store entry window 92 and associate # entry window 94. The system may require this data when Home Depot customer checkbox 82 is selected. In addition, this data may indicate special pricing or service available only to Home Depot customers.

Figure 6:
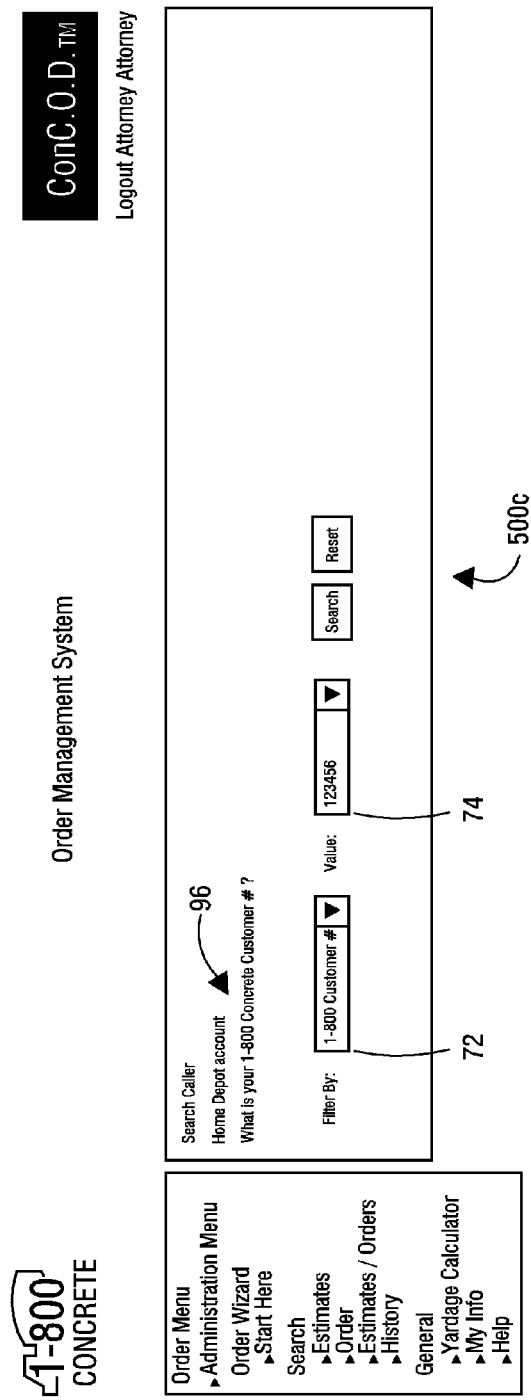
FIG. 6 is an example search caller screen, responsive to selecting the Home Depot account holder checkbox 84 from FIG. 5B.

FIG. 6 is an example search caller screen, responsive to selecting the Home Depot account holder checkbox 84 from FIG. 5B. As shown, search caller block 500c includes Home Depot account indicator 96, which signifies the user has an account with Home Depot. By selecting Home Depot account holder checkbox 84 from FIG. 5B, the user indicates (s)he holds an account with Home Depot. By holding a Home Depot account, the user may be entitled to special pricing or services available only to Home Depot account holders. As is evident, the user of Home Depot is merely a nonlimiting example, as any business may also be included in advertising block 500a.

Also included in search caller block 500c is a filter by dropdown window 72, and a value entry window 74. The filter by dropdown window 72 may include any of a number of categories including, but not limited to 1-800 customer #, last name, and phone number. Once the desired category is selected in filter by dropdown window 72, the user may enter that data in valve entry window 74.

Figure 7:
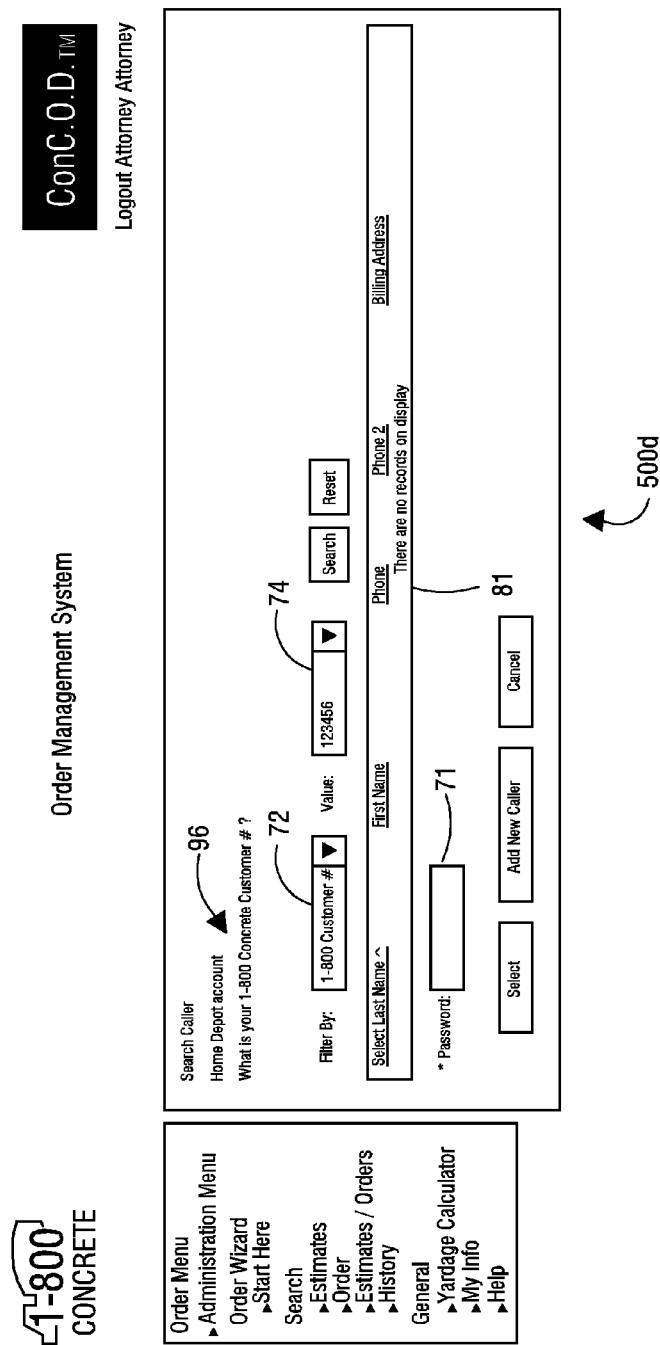
FIG. 7 is an example search caller screen, responsive to entering account data into valve window 74 of FIG. 6.

FIG. 7 is an example search caller screen, responsive to entering account data into valve window 74 of FIG. 6. As shown in FIG. 7, search caller block 500d includes the filter by dropdown window 72, the value entry window 74, and the Home Depot account indicator 96 from FIG. 6. Also included in search caller block 500d is account display window 81 and password entry window 71. Account display window 81 displays the possible accounts according to the data entered into fields 72 and 74. Desired account may be selected, and the user must provide a password in password entry window 71. If the password matches the password associated with the selected account, the system will proceed with creating an estimate based on the pricing and services available to the selected account.

FIG. 8 is an alternate embodiment of the advertisement tracking screen of FIG. 5B with the 1-800 special pricing customer checkbox 86 selected. Similar to selecting Home Depot account holder checkbox 84, by selecting 1-800 special pricing customer checkbox 86, the user indicates that special pricing and/or services are available.

Figure 9:
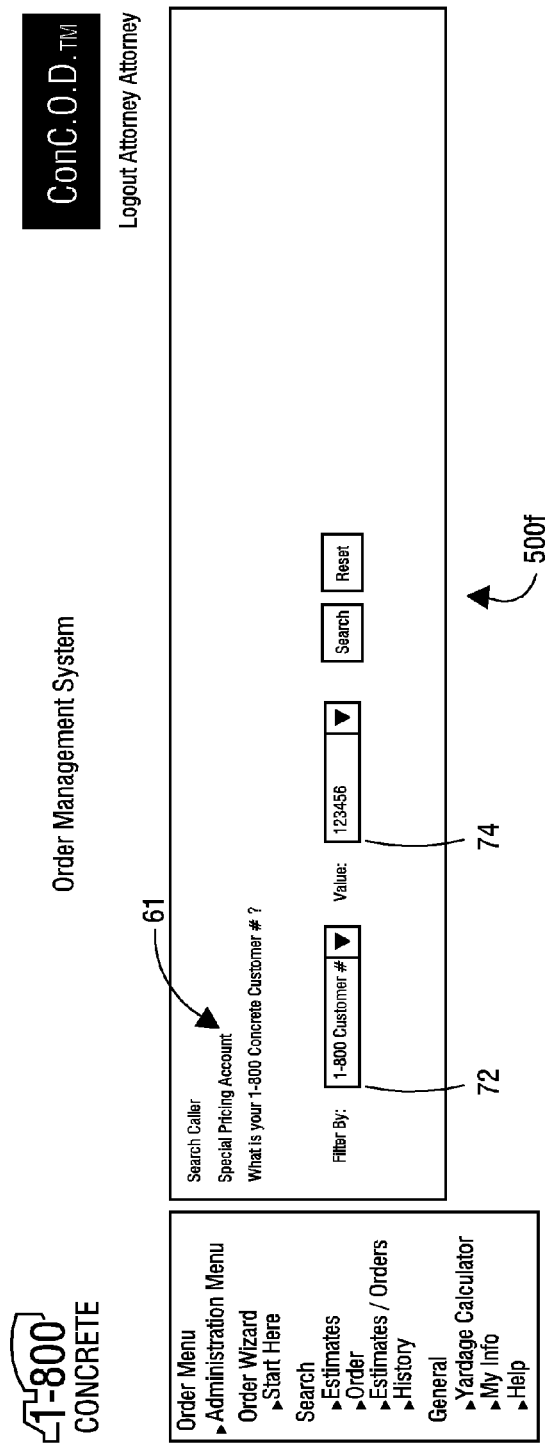
FIG. 9 is an example search caller screen, responsive to selecting the 1-800 special pricing customer checkbox 86 from FIG. 8.

FIG. 9 is an example search caller screen, responsive to selecting the 1-800 special pricing customer checkbox 86 from FIG. 8. As shown, search caller block 500f is similar to search caller block 500c, from FIG. 6. However, search caller block 500f includes a special pricing account indicator 61, indicating the user may be entitled to special pricing and/or services. The user may select the desired category in the filter by dropdown menu 72, and enter data corresponding to that selection in valve entry window 74 to find the desired account.

Figure 10:
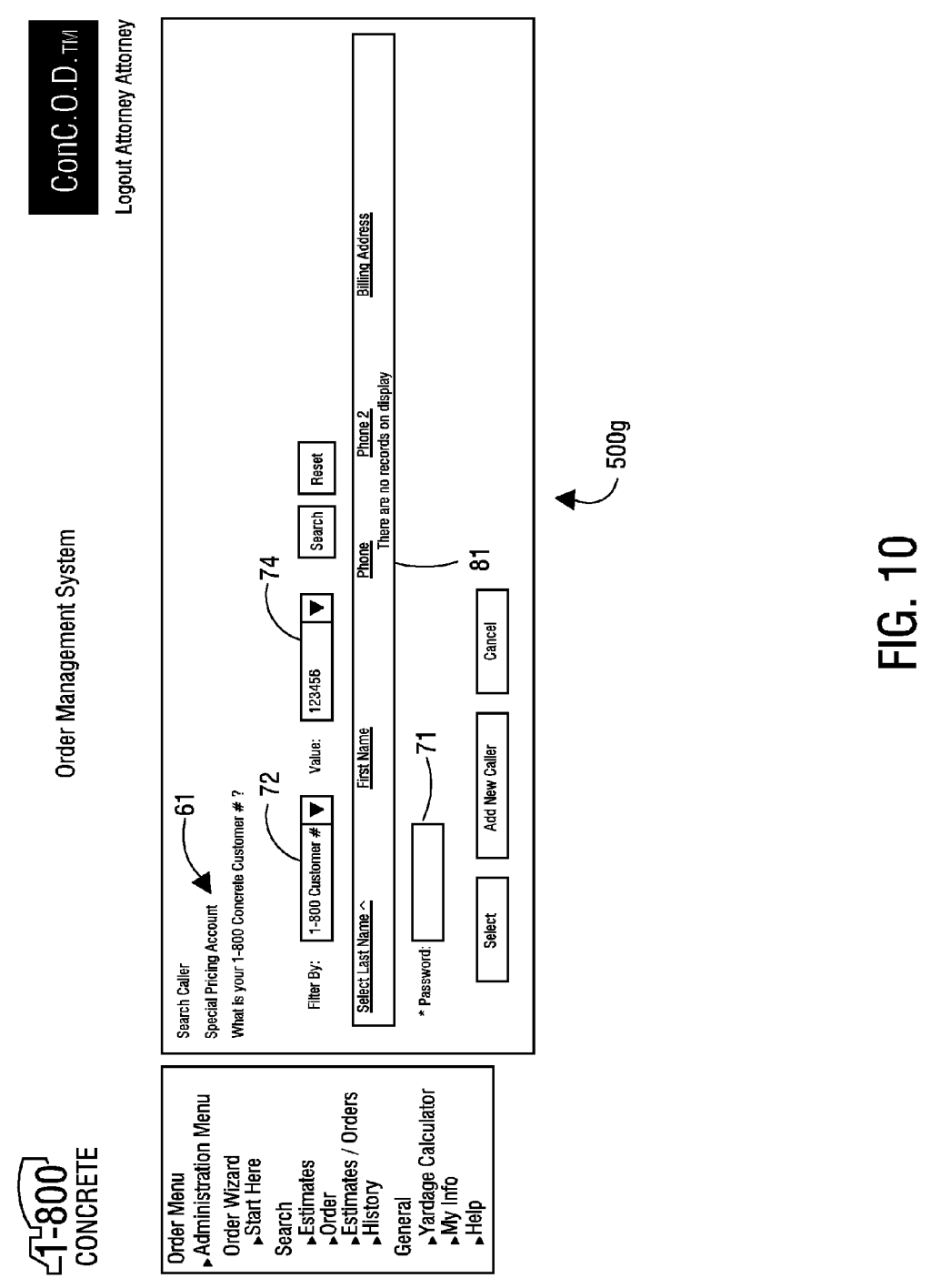

FIG. 10 is an example search caller screen, responsive to entering account data into window 74 from FIG. 9. Similar to search caller block 500d from FIG. 7, search caller block 500g includes filter by dropdown menu 72, valve entry window 74, account display window 81, and password entry window 71. However, in response to selecting special pricing account checkbox 86 from FIGS. 5B and 8, a special pricing account indicator 61 is also included in search caller block 500g.

Figure 11:
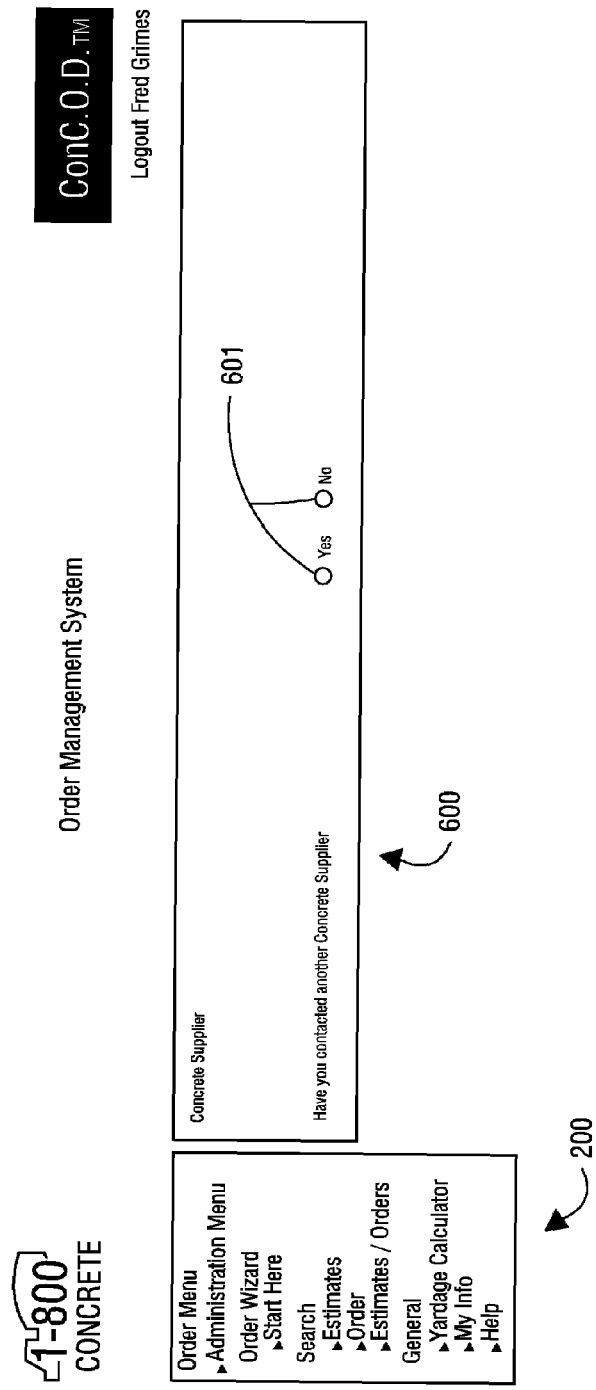
FIG. 11 shows an example query screen, responsive to selection of the continue button icon 503 of FIGS. 5A, 5B, and 8.

FIG. 11 illustrates an example query screen, responsive to selection of the continue button icon 503 shown in FIGS. 5A, 5B, and 8. The example query screen includes a concrete supplier query block 600 and data checkboxes 601 to indicate whether or not a concrete supplier has been previously contacted.

Figure 12:
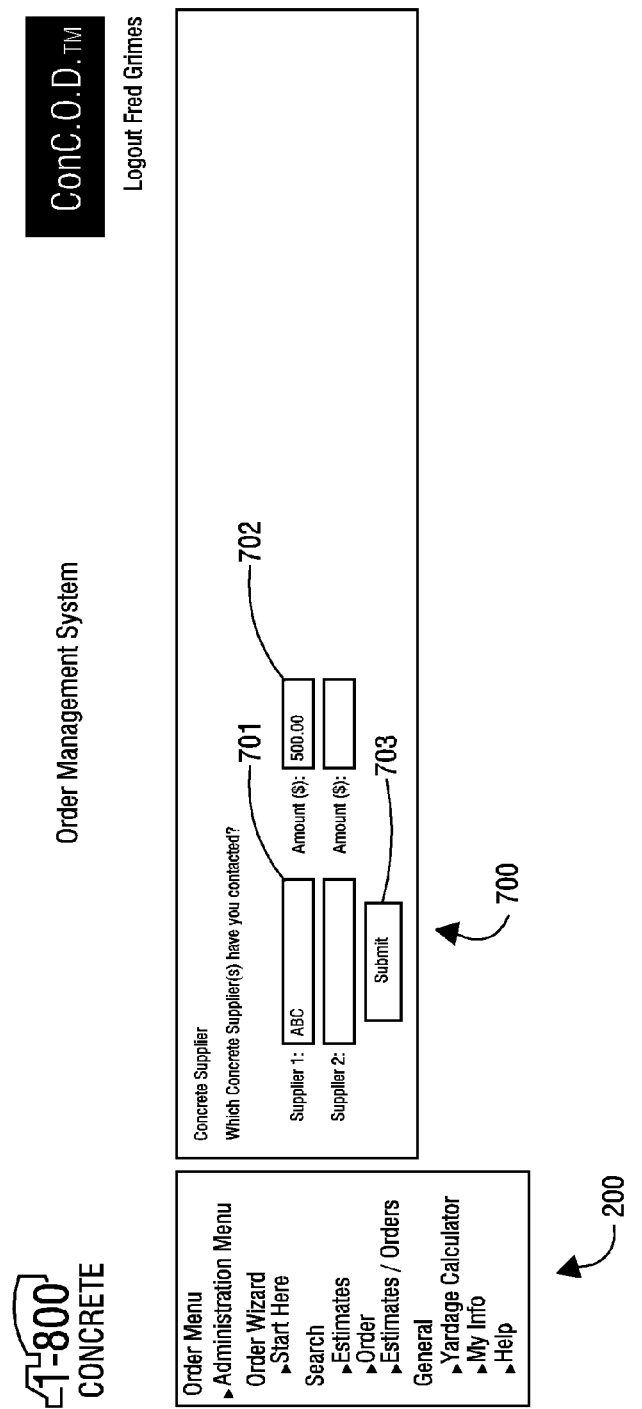
FIG. 12 shows an example data entry screen, responsive to selecting the "YES" data checkbox of FIG. 11.

FIG. 12 illustrates an example data entry screen, responsive to selecting the "YES" data checkbox shown in FIG. 11. The example data entry screen may include a supplier data block 700 having supplier entry windows 701, corresponding amount entry windows 702, and a submit button icon 703. If a caller has previously contacted a concrete supplier regarding the job related to the present call, the user may provide the name of the supplier in the supplier entry window 701 and the estimate amount provided by that supplier in the corresponding amount entry window 702. Selection of the submit button icon 703 saves the provided information in a database for later comparison with the estimate amount that the user will ultimately provide to the caller.

Figure 13:
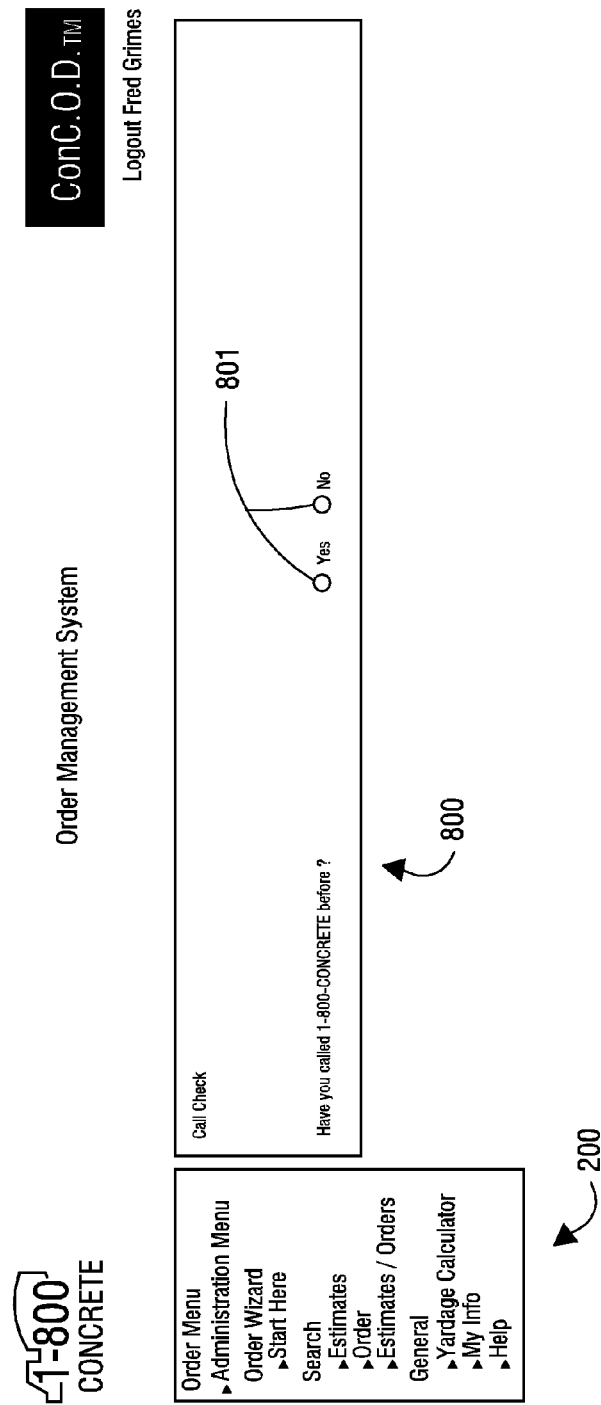
FIG. 13 is an example query screen, responsive to either the selection of the "NO" data checkbox 601 of FIG. 6 or selection of the submit button icon 703 of FIG. 12.

An example query screen is shown in FIG. 13. The example query screen of FIG. 13 is responsive to either the selection of the "NO" data checkbox 601 shown in FIG. 11 or selection of the submit button icon 703 shown in FIG. 12. The query screen may include a call check query block 800 and data checkboxes 801 to indicate whether or not the caller has utilized the order management in the past.

Figure 14:
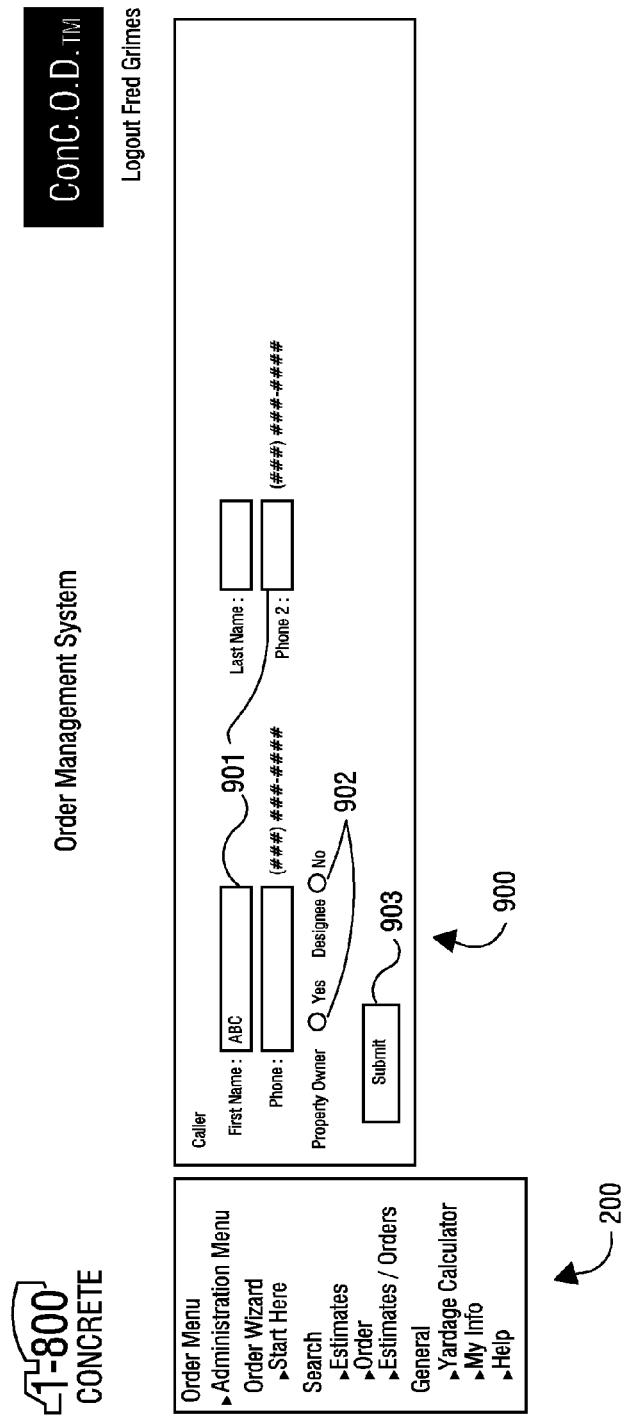
FIG. 14 is an example caller information screen, responsive to selection of the "NO" data checkbox 801 of FIG. 13.

FIG. 14 illustrates an example caller information screen that is responsive to selection of the "NO" data checkbox 801 shown in FIG. 13. The example caller information screen may include a caller information block 900 having caller data entry windows 901, caller data checkboxes 902, and a submit button icon 903. The caller data entry windows 901 may include, but are not limited to, first name, last name, and first and second phone numbers. The caller data checkboxes 902 can include, but are not limited to, whether or not the caller is a property owner or a designee of a property owner. Selection of the submit button icon 903 causes the provided information to be saved within a database of the system.

FIG. 15 illustrates an example search caller screen that is responsive to selection of the "YES" data checkbox 801 shown in FIG. 13. The example search caller screen may include a search caller block 104 having a caller data field drop down menu 105, a value entry window 106, a search button icon 107, and a reset button icon 108. As shown, the caller data field drop down menu 105 may include, but is not limited to, last name and phone number. After entering the desired information in the value entry window 106, a user selects the search button icon 107 to attempt to find a match for that information within the chosen data field of the drop down menu 105. Selection of the reset button icon 108 clears the information provided in both the caller data field drop down menu 105 and value entry window 106. If that information provided in the value entry window 106 is located in the selected data field of the data field drop down menu 105, a search caller result block 109 is displayed within the search caller block 104 as shown in FIG. 16.

Figure 16:
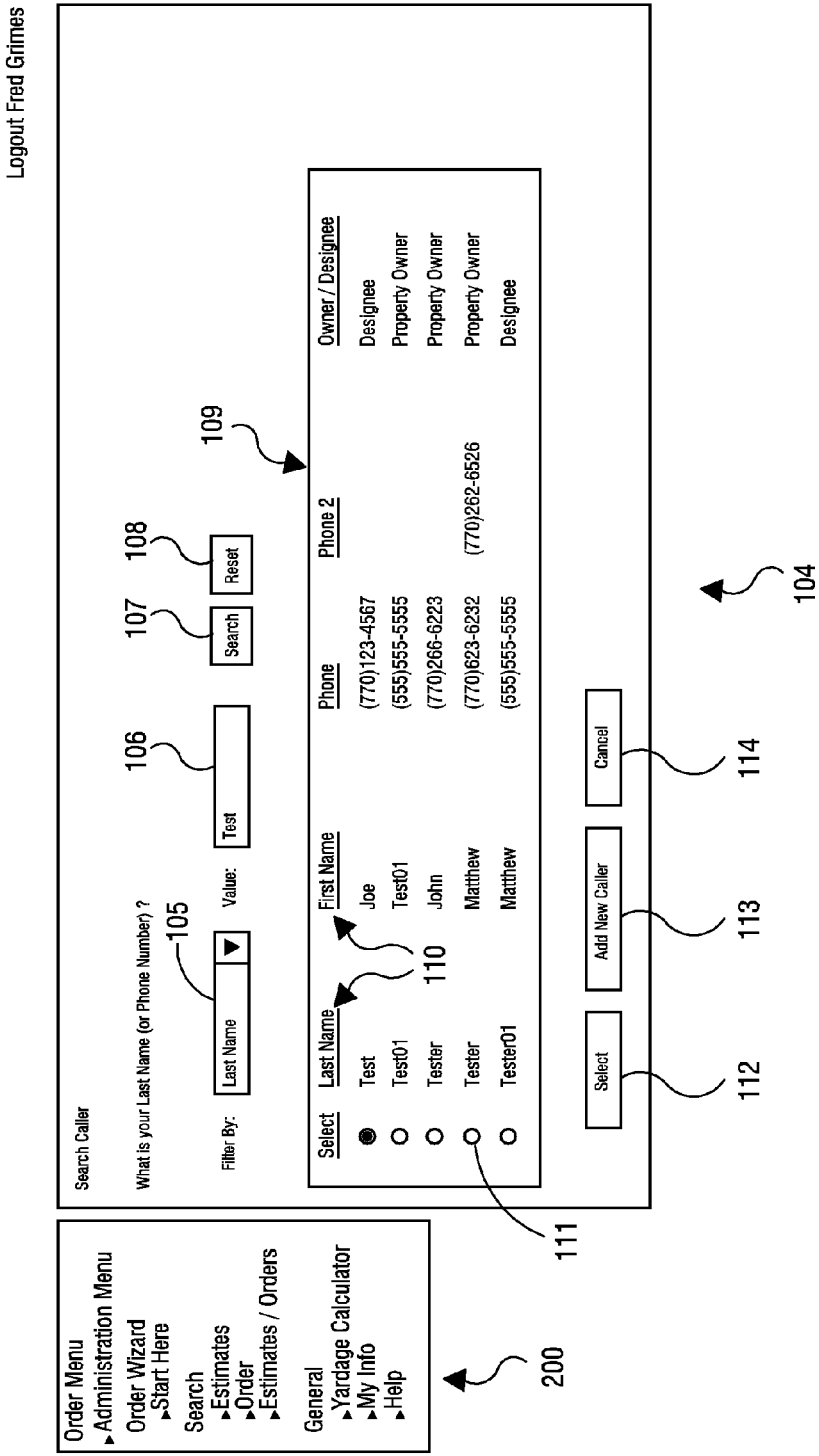
FIG. 16 is an example of a search caller screen, responsive to selection search icon 107 FIG. 15.

In FIG. 16, the search caller result block 109 may include a list of those callers for which the desired information corresponds. The search caller result block 109 may list information related to those callers under a number of data fields 110, that can include, but are not limited to, last name, first name, phone numbers, and whether or not the caller is a property owner or a designee. As well, the search caller result block 109 may include data checkboxes 111 that allow the user to select the desired caller from those listed. After selecting the desired data checkbox 111 the user may select the select button icon 112 to move along in the process. If the desired caller is not listed, the user may select the add new caller button icon 113, which will in turn display the example caller information screen, as shown in FIG. 14, so the user may enter the necessary information about the caller. Selection of the cancel button icon may return the user to the example greeting screen as shown in FIG. 3, so that the process may be restarted.

Figure 17:
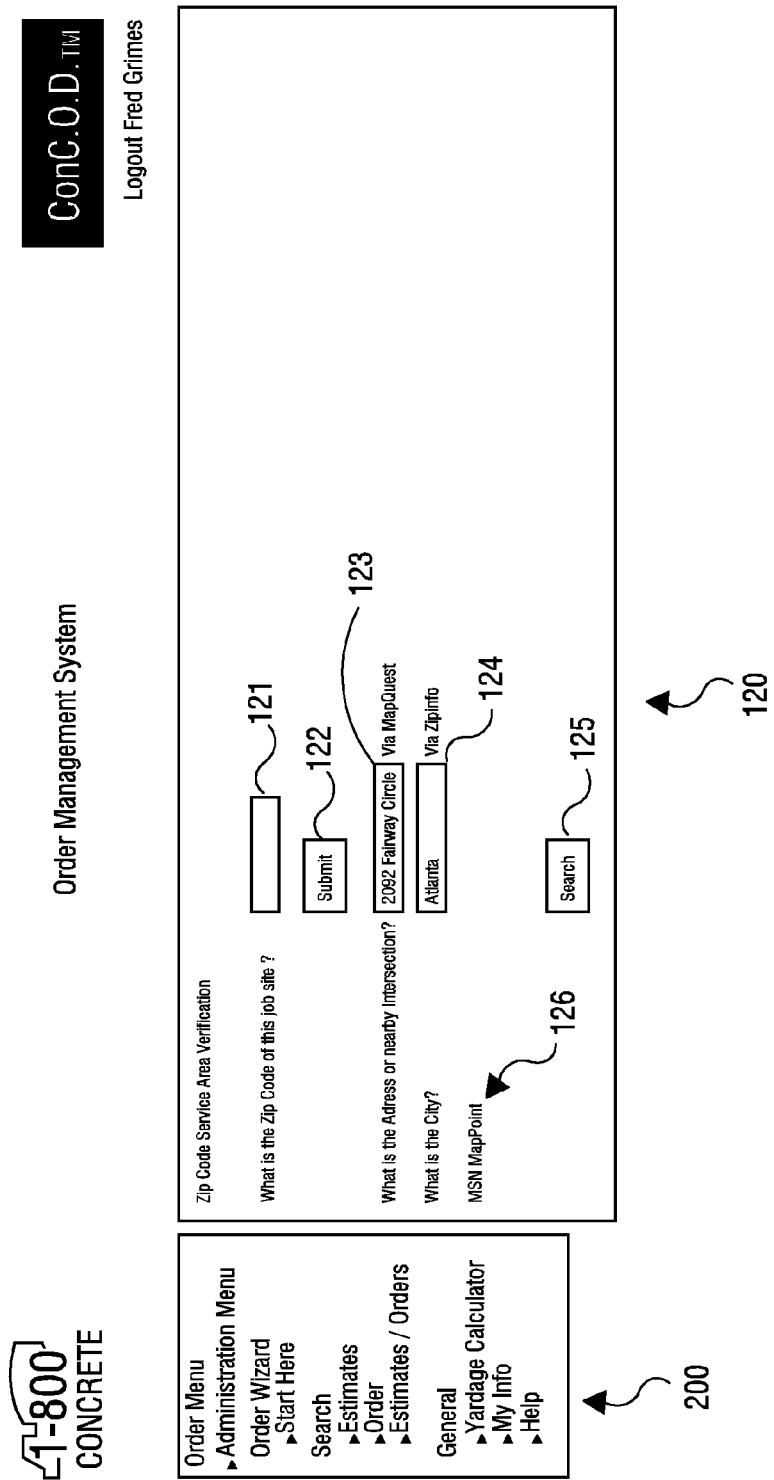
FIG. 17 is an example zip code service area verification screen, responsive to selection of the select button icon 112 of FIG. 16.
Figure 18:
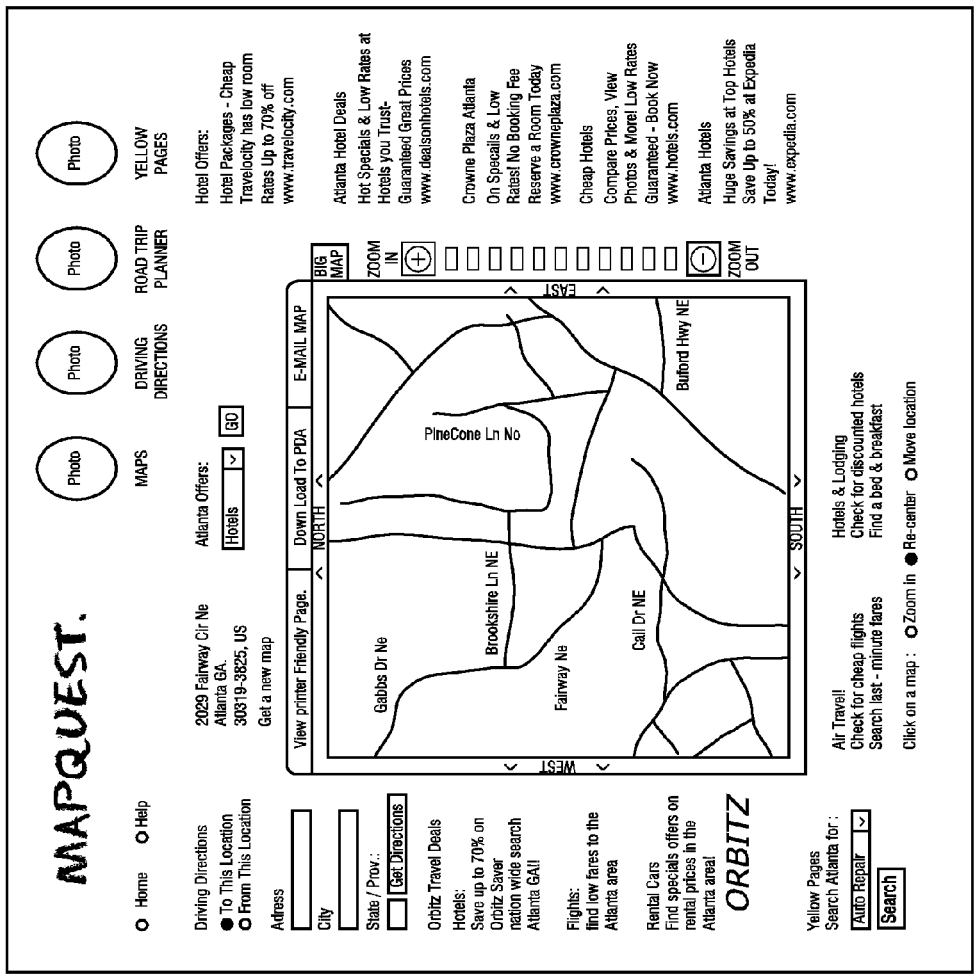
FIG. 18 is an example of a MapQuest® screen, responsive to entering data into entry window 123 of FIG. 17.
Figure 19:
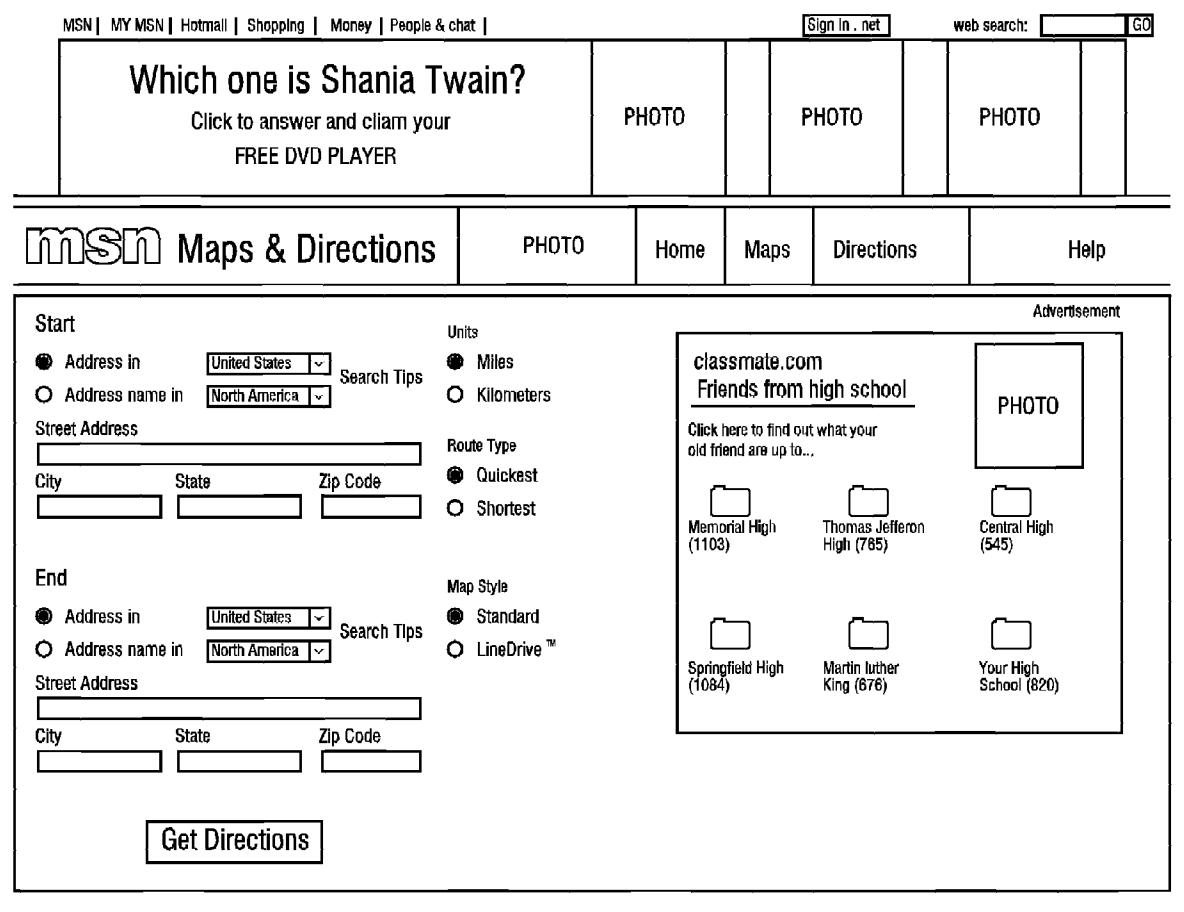

FIG. 17 illustrates an example zip code service area verification screen, responsive to selection of the select button icon 112 of FIG. 16. The example zip code service area verification screen may include a zip code service area verification block 120 having a zip code entry window 121, a submit button icon 122, an address entry window 123, a city entry window 124, and a search button icon 125. Entry of the desired zip code of the job site in the zip code entry window 121 and selection of the submit button icon 122 may allow the order management system to determine which supplier and/or plant should be contacted in regard to the caller's request. This may be accomplished by having the system compare the entered zip code to a database of zip codes assigned to corresponding suppliers and/or plants assigned to that zip code, as discussed in greater detail hereinafter. By entering the desired address and city in the address entry window 123 and city entry window 124, respectively, the user can create a map of the job site via MapQuest®, as shown in FIG. 18. Further, the user can create a map of the job site via MSN MapPoint® by selecting the MSN MapPoint® icon 126 and entering the required information as shown in FIG. 19. FIG. 17 shows the desired zip code as entered in the zip code entry window 121.

FIG. 18 is an example of a MapQuest® screen, responsive to entering data into entry window 123 of FIG. 17. This option allows a user to view the location of the jobsite and other capabilities offered by the MapQuest® website.

FIG. 19 is an example of an MSN MapPoint® screen, responsive to selecting MSN MapPoint® icon 126 of FIG. 17. Similar to FIG. 18, this option shows the user to find direction to or from a jobsite and other capabilities of the MapPoint® website.

Figure 20:
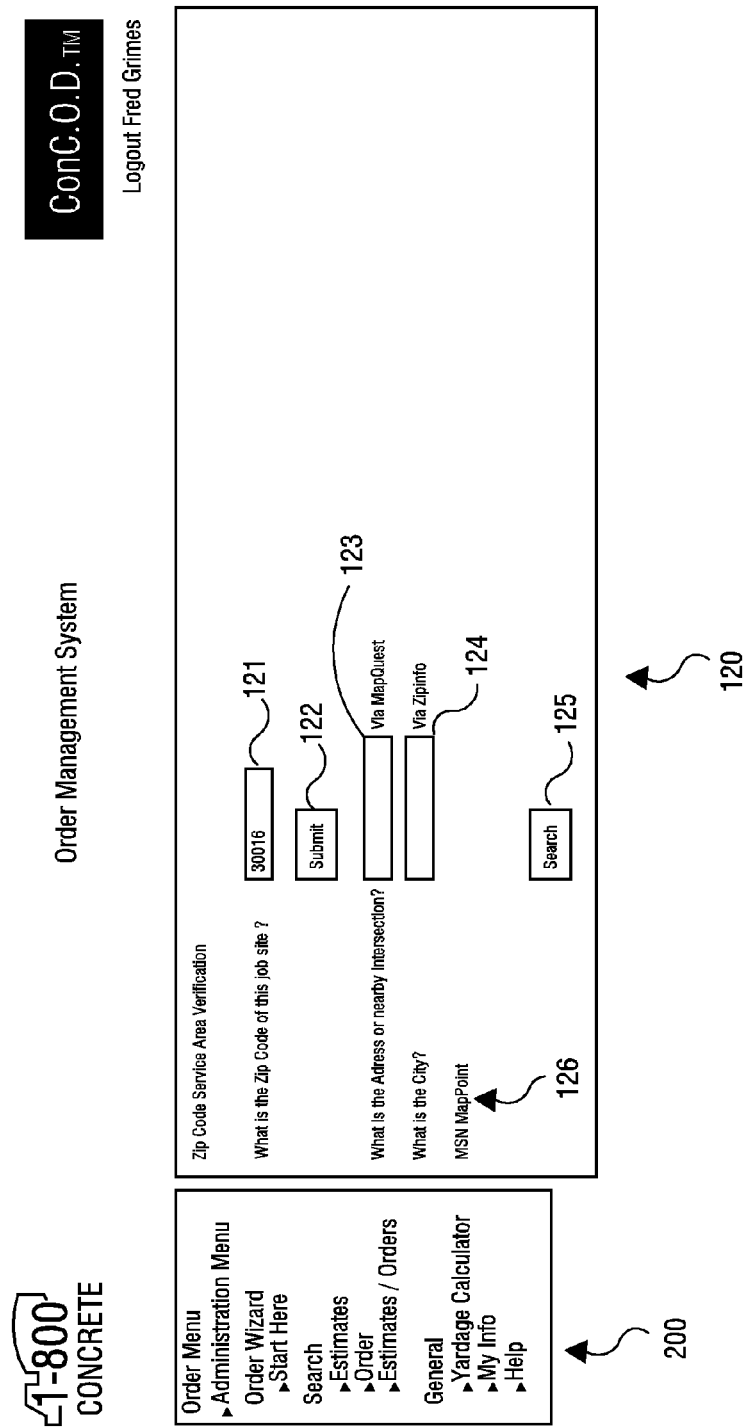
FIG. 20 illustrates a zip code service area verification screen, responsive to entry of a zip code in the zip code entry window, also illustrates in FIG. 17.

FIG. 20 illustrates a zip code service area verification screen, responsive to entry of a zip code in the zip code entry window 121, also illustrated in FIG. 17. This option allows a user to determine the available concrete suppliers in the geographical area of the web site.

Figure 21:
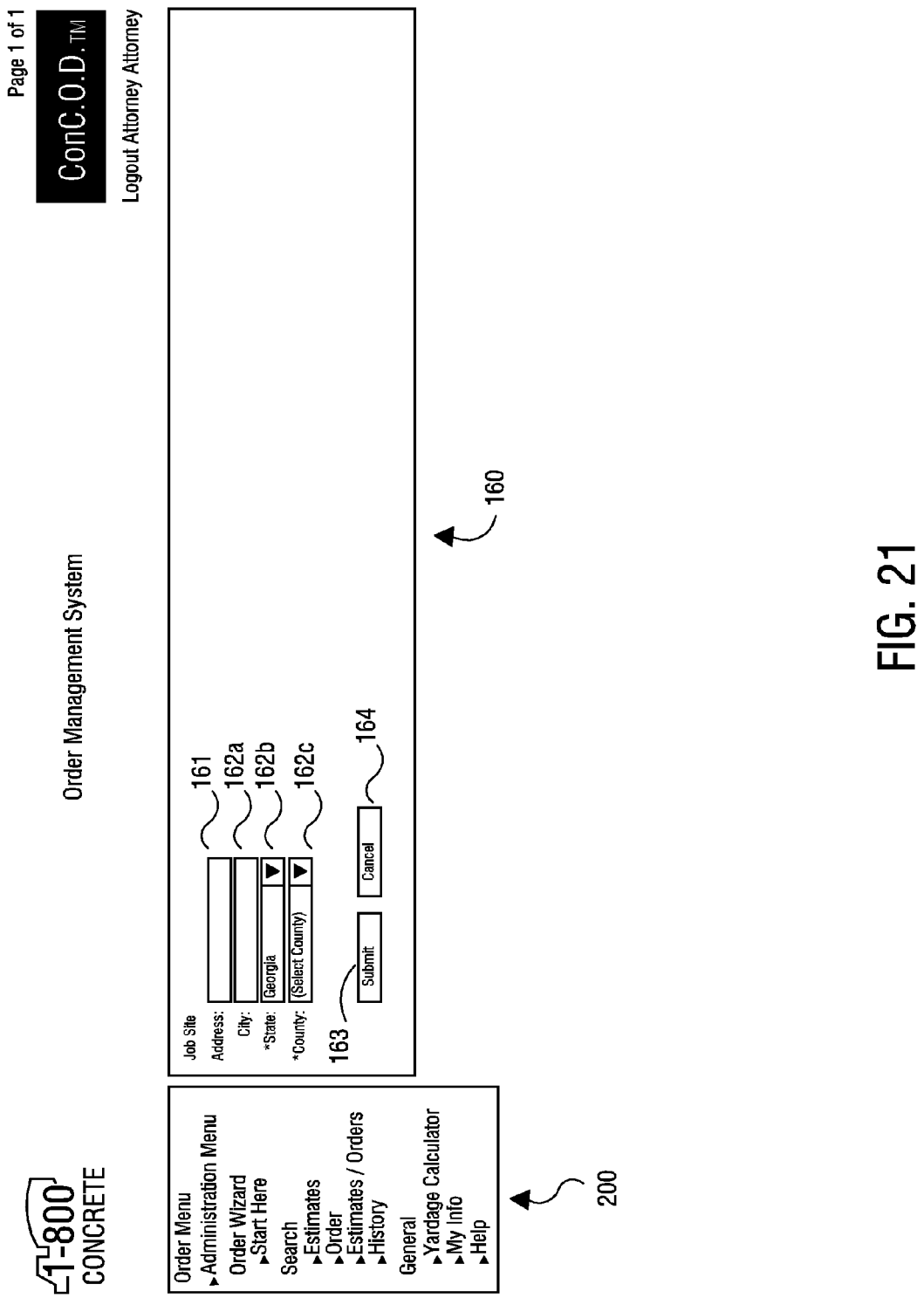
FIG. 21 is an example job site screen, responsive to selection of the submit button icon 122 of FIG. 15.

An example job site screen is shown in FIG. 21, responsive to selection of the submit button icon 122 shown in FIG. 15. The example job site screen may include a job site block 160 having an address entry window 161, a city entry window 162a, a state dropdown window 162b, a county dropdown menu 162c, a submit button icon 163, and a cancel button icon 164. State and county information can be used to determine the sales tax necessary to provide an estimate for a given job. The order management system may determine the correct sales tax for a given state and county by comparing the information provided to an existing database of the system. Selection of the cancel button icon 164 prompts a return to the example greeting screen as shown in FIG. 3.

Figure 22:
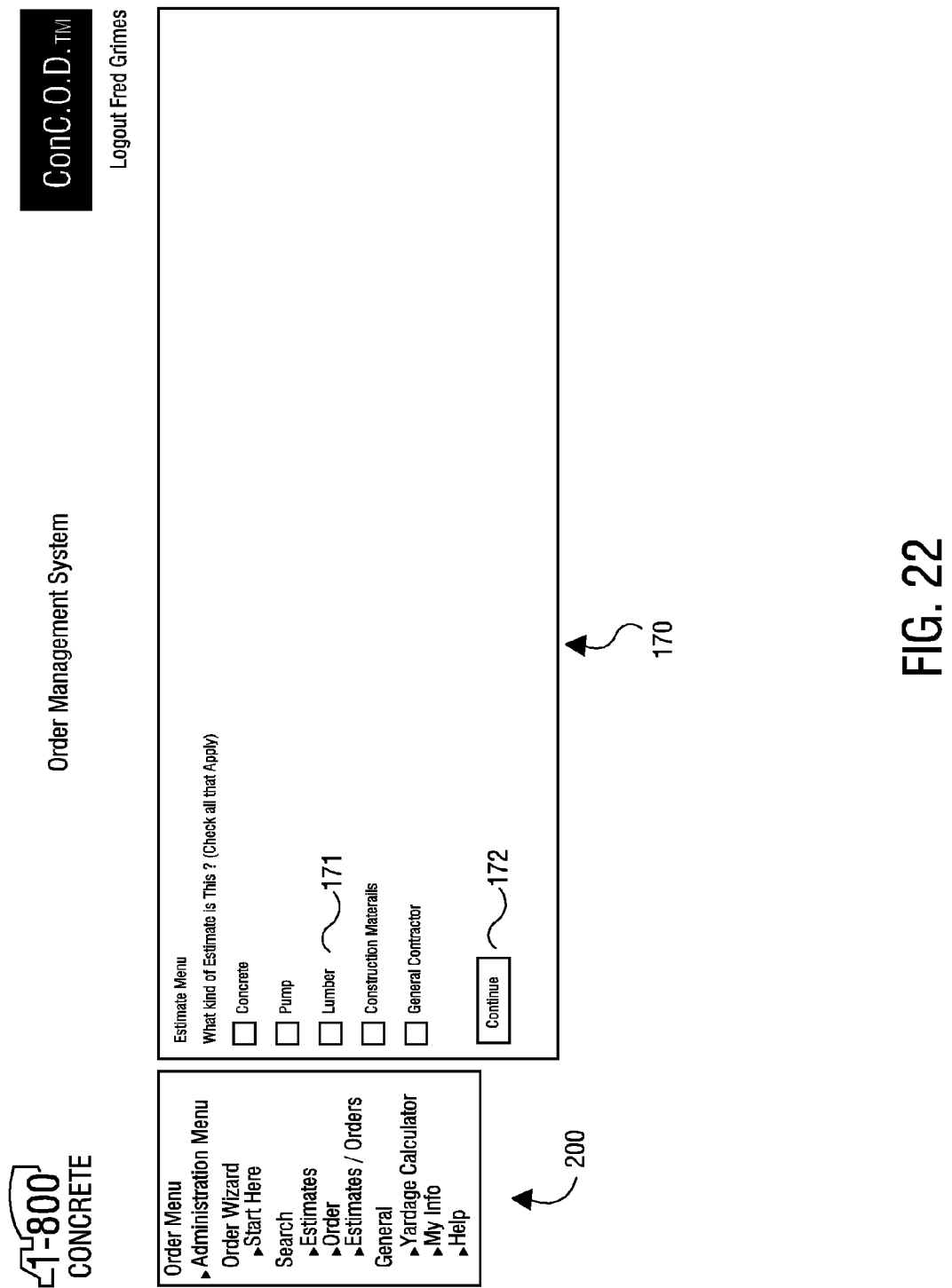
FIG. 22 is an example estimate type screen, responsive to selection of the submit button icon 163 shown in FIG. 21.

FIG. 22 illustrates an example estimate type screen, responsive to selection of the submit button icon 163 shown in FIG. 21. The example estimate type screen may include an estimate type block 170 including a plurality of data checkboxes 171 corresponding to the various types of possible estimates. As shown, the data checkboxes 171 may include, but are not limited to, concrete, pump, lumber, construction materials, and general contractor estimates. By way of example, a concrete type estimate is selected.

Figure 23:
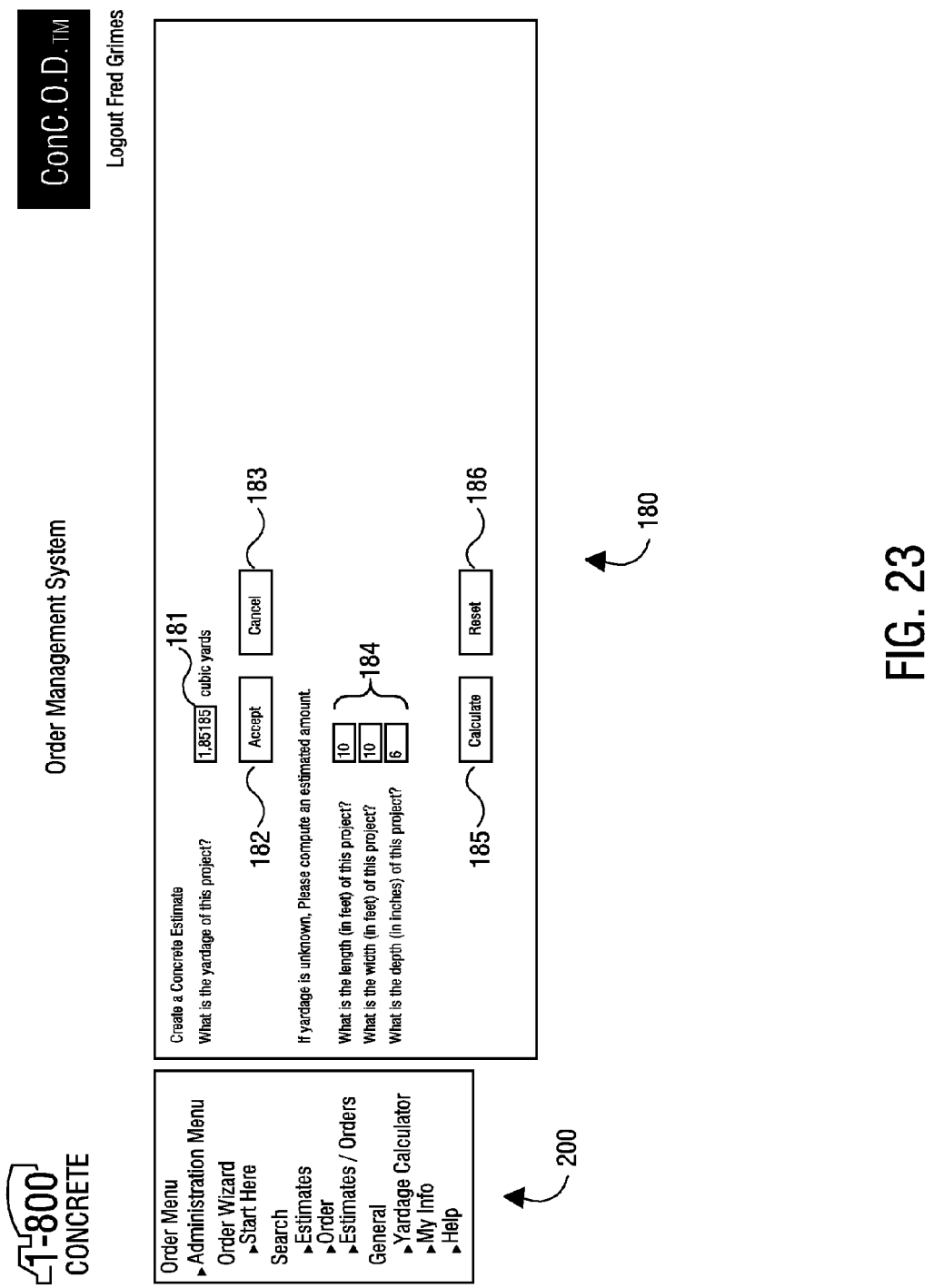
FIG. 23 is an example concrete yardage calculator screen, responsive to selection of the continue button icon 172 shown in FIG. 22.
Figure 24:
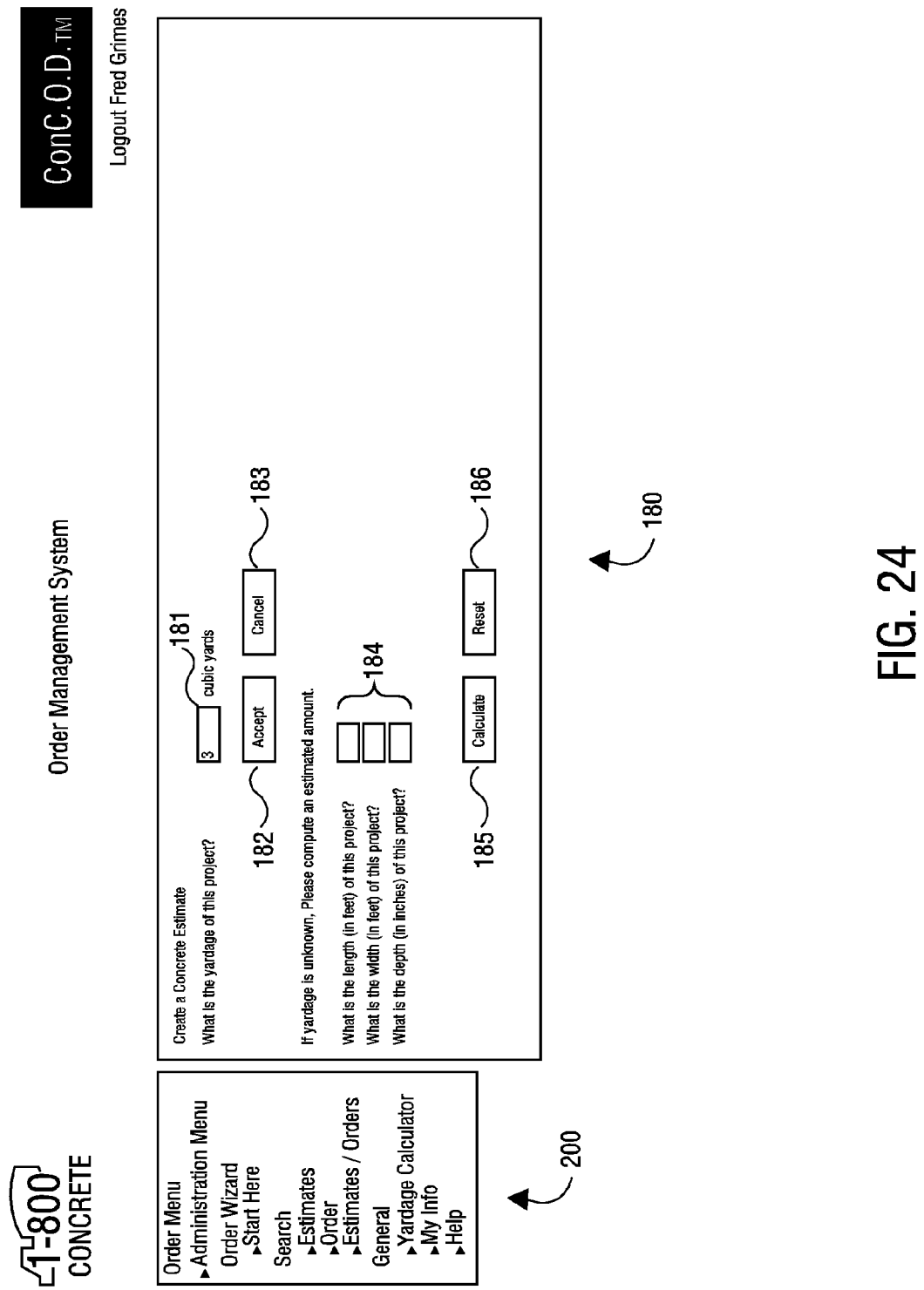
FIG. 24 is an example concrete estimation screen, similar to FIG. 23, illustrating direct entry of the known value of the concrete yardage.

FIG. 23 illustrates an example concrete yardage calculator screen, responsive to selection of the continue button icon 172 shown in FIG. 22. As shown, the example concrete yardage calculator screen may include a yardage entry window 181 and an accept button icon 182. If the required concrete yardage of a project is known, the user may enter that yardage in the yardage entry window 181 and select the accept button icon 182. However, if the yardage is unknown, the user can enter the required information in the volume data entry windows 184 and select the calculate button icon 185 to determine the required concrete yardage. As shown, selection of the calculate button icon 185 may result in the calculated concrete yardage being displayed in the yardage entry window 181. Selection of the reset button icon 186 returns the user to the example greeting screen as shown in FIG. 3. FIG. 24 shows direct entry of the known value of the concrete yardage into the yardage entry window 181.

FIG. 24 is an example of a concrete estimate screen, similar to FIG. 23, illustrating direct entry of the known usage of the concrete yardage. If the user knows the concrete yardage for the present order (s)he may enter this data in yardage entry window 181 by then selecting accept icon 182. The user may cancel creating a concrete estimate by selecting cancel icon 183.

Figure 25A:
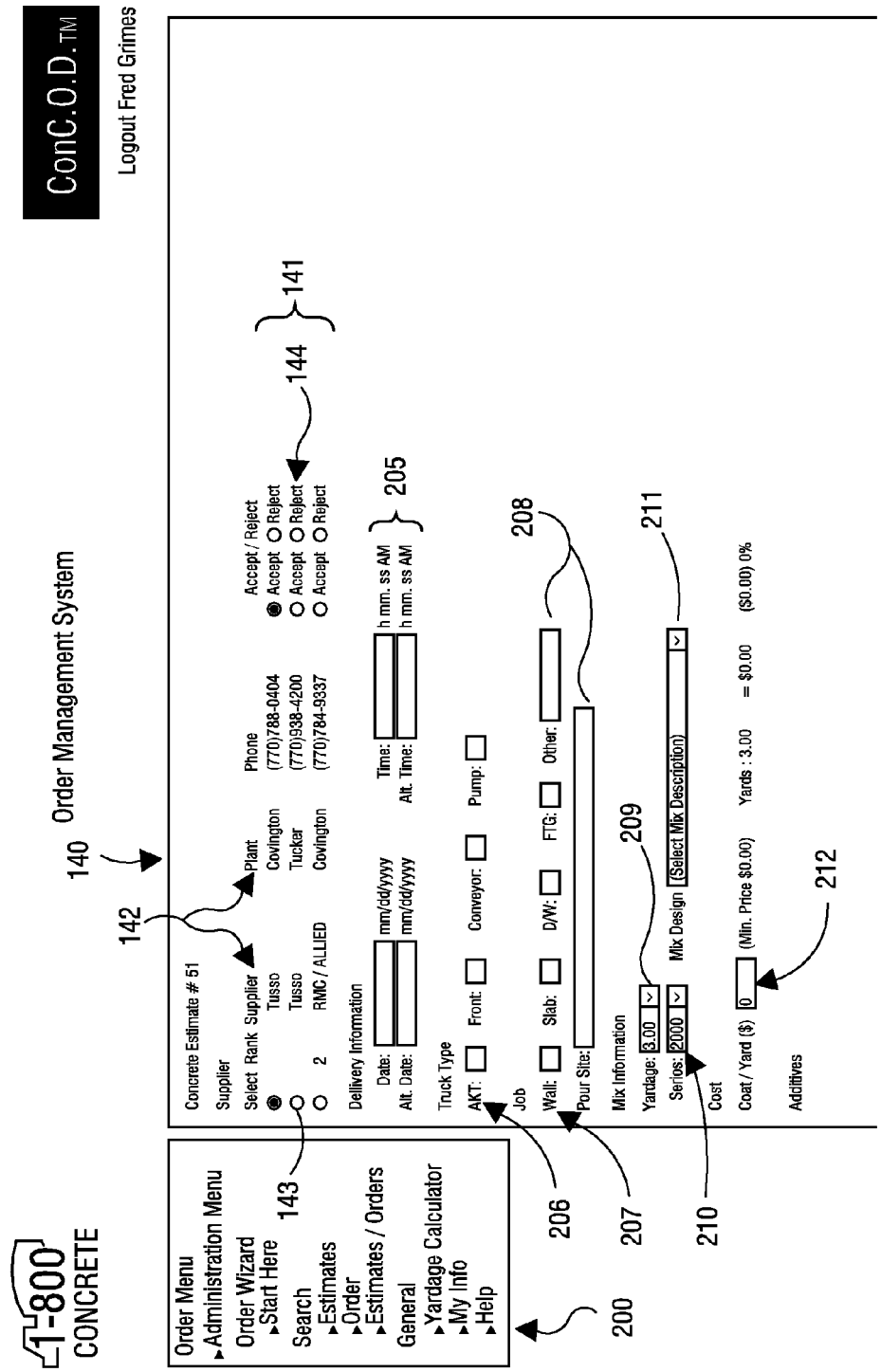
Figure 25B:
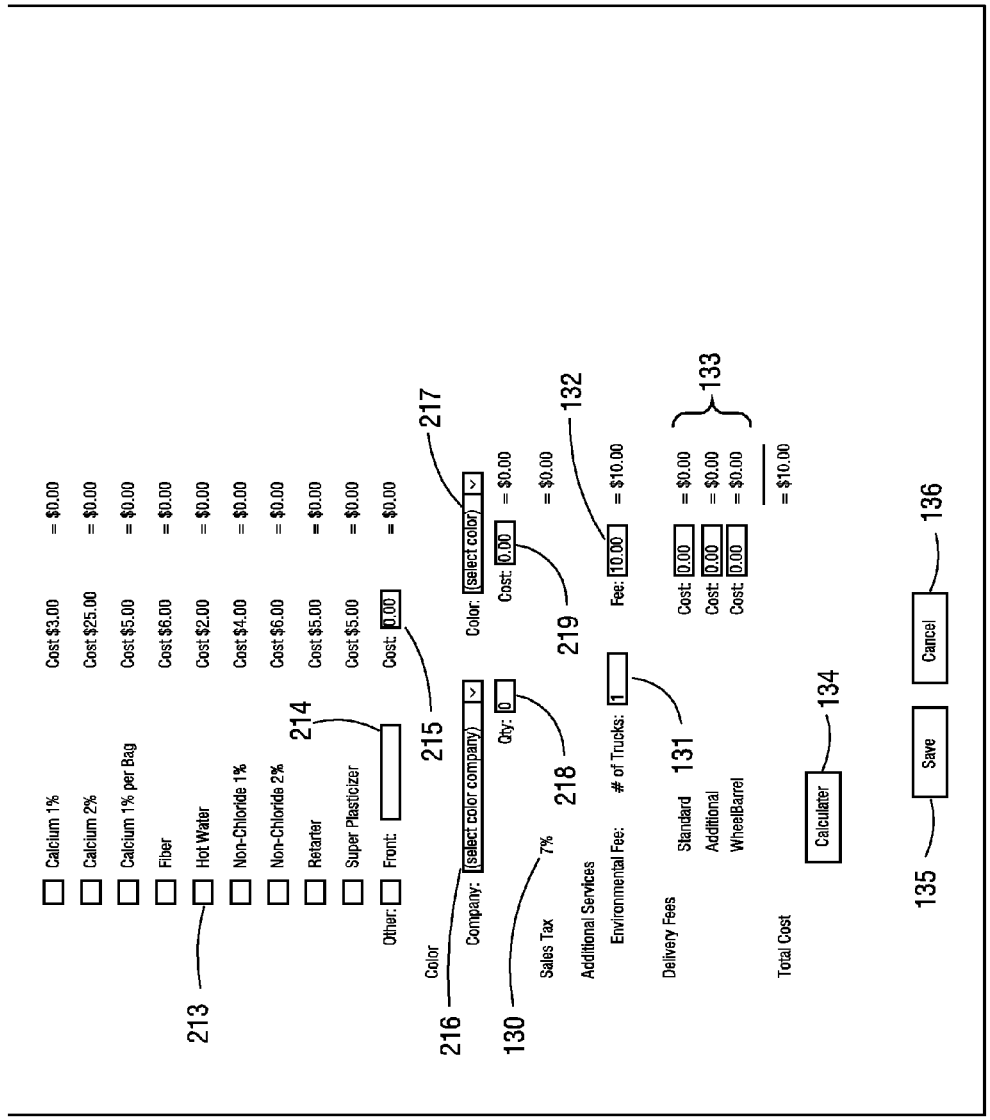

FIGS. 25A-C illustrate an example concrete estimate screen, responsive to selection of the accept button icon 182 shown in FIG. 24. The example concrete estimate screen may include a concrete estimate block 140 having a supplier section 141. The supplier section 141 may include a list of those suppliers and their related plants that service the job site in question, as determined by the provided zip code. The system also may include a database of suppliers and/or plants that service given zip codes, as is further discussed later with regard to the administration menu 201. The supplier section 141 may also include data fields 142, select data checkboxes 143, and accept/reject data checkboxes 144. The data fields 142 can include, but are not limited to, information pertaining to each supplier such as rank, plant, and phone number. As shown, the number "2" under the rank data field indicates that that supplier is not a primary supplier for that zip code, but rather a secondary supplier. The absence of a number (or the number "1") indicates that the supplier is a primary supplier. The user may select the desired supplier by selecting the appropriate select data checkbox 143. The user may then contact the desired supplier and records whether or not that supplier is willing to accept the job in question by indicating so with the appropriate accept/reject data checkbox 144. Information entered in the accept/reject data checkboxes 144 may be retained by the system to permit the system to track those jobs that are accepted and/or rejected by the various suppliers.

The concrete estimate block 140 also may include a delivery section 205 including a number of entry windows, such as date and time, at which the caller desires the concrete order to be delivered. A truck type section 206 of data checkboxes allows the user to indicate the type of truck required for the corresponding job. For example, the types of trucks can include, but are not limited to, any kind of truck (AKT), a front truck, a conveyor truck, or a pump truck. A job section 207 of data checkboxes allows the user to indicate the type of job, such as, but not limited to a wall, a slab, a driveway, or a footing, that the caller is requesting. Other types of jobs may be indicated in the job type entry window 208, which may also be used to provide information as to where the concrete will be poured on the job site. A mix information section may display the concrete yardage that was previously provided and/or calculated in the yardage entry window 209, a mix series drop down menu 210, and a mix design drop down menu 211. The mix series and mix designs indicated in the mix series drop down menu 210 and the mix design drop down menu 211 may be related to the selected supplier in the supplier section 141, as determined from a previously compiled database of mix series and mix designs that can be provided by that supplier. A cost per yard entry window 212 may indicate the price per yard that a given supplier charges for a yard of the selected series of concrete. This price may be automatically displayed in the cost per yard entry window 212 as determined from a database within the system.

A number of additive data checkboxes 213 allow a user to indicate which additives are required for a given order. The cost per yard of each additive is also provided, as determined from a database including information previously compiled related to the prices each supplier charges for each particular additive. An additive entry window 214 and additive cost entry window 215 may be further included in case an additive other than those listed is required. A color section may include a color company drop down menu 216 and a caller drop down menu 217, for selecting the desired company and color, respectively, for the particular job. The available color companies and colors for a job site within a given zip code may be determined by comparing that zip code to a database including the color companies that service that area. A quantity entry window 218 and a cost entry window 219 may also be included to permit entry of the number of bags of color and the cost per bag, respectively, that are desired for the given job.

As shown, the sales tax 130 as determined by the previously provided state and county information is shown on the example concrete estimate screen. The sales tax is only applicable to those materials, and not the services, required for the particular job. An additional services section may include a number of trucks entry window 131 and a fee per truck entry window 132, used to calculate the cost of clean out of each truck used on the job. A delivery fee section 133 may include entry windows pertaining to standard, as well as additional fees, as required for each job. The concrete estimate block 140 further includes a calculate button icon 134, save button icon 135, and a cancel button icon 136.

Figure 26A:
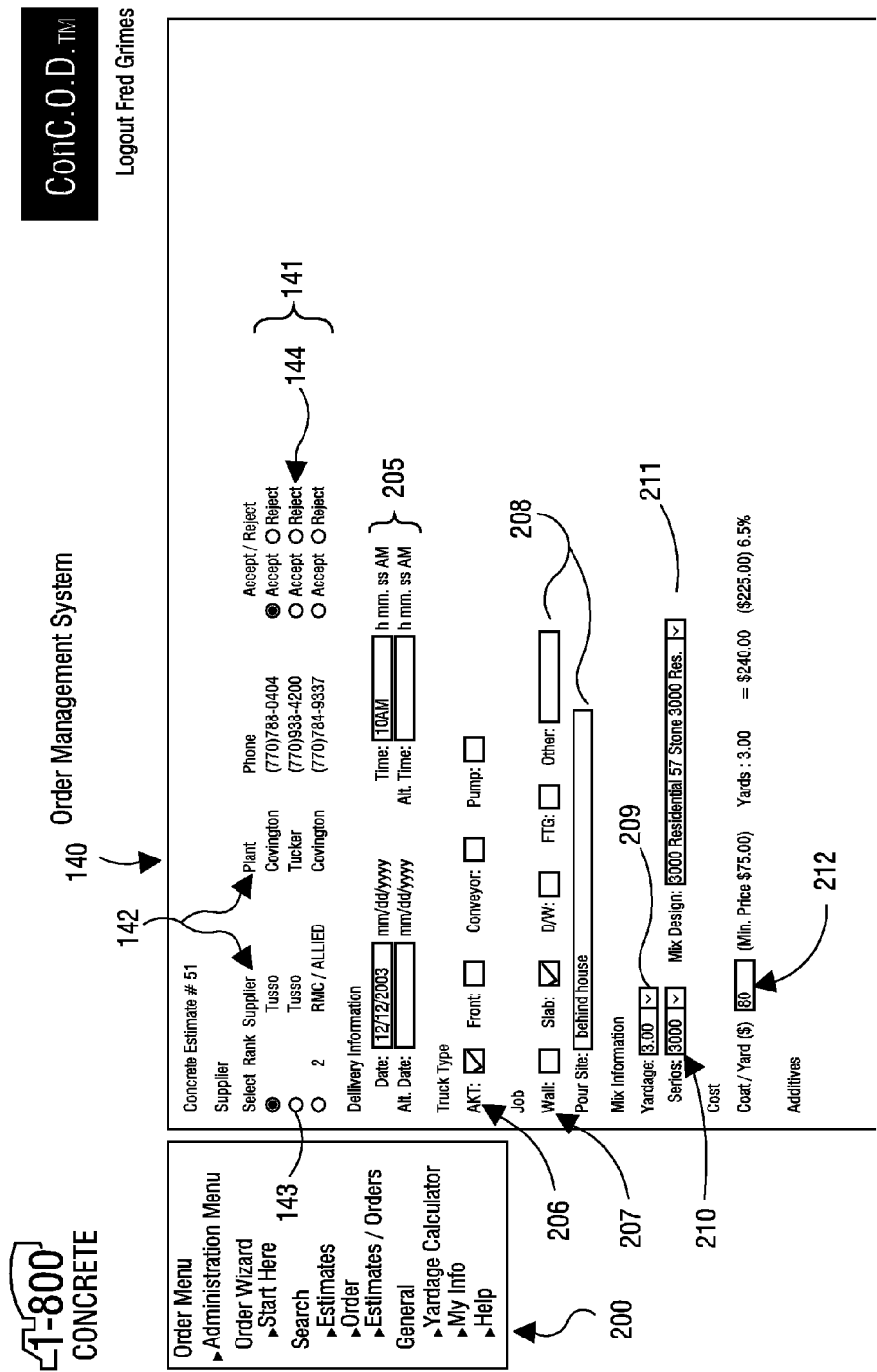

FIGS. 26A-C illustrate the example concrete estimate screen shown in FIG. 20, where information related to an example concrete job having been entered. As shown, the user has indicated that the first listed plant is acceptable by checking the appropriate select data checkbox 143 and that that plant has determined to accept the job related to the concrete estimate since the user has checked the associated accept data checkbox 144. The user has also entered the desired delivery information, truck type, job type, pour site, mix series and mix design information. Dependent upon the mix series and mix design selected, the cost per yard indicated in the cost per yard entry window 212 may be automatically retrieved by the system from a database that corresponds the selected mix series and mix design. As shown, the number of trucks entry window 131 shows that one truck will be required and that an environmental cleanup fee of $10.00 per truck is indicated in the fee entry window 132. As well, the standard delivery fee is disclosed in the delivery fee section 133, that being $90.00 in this particular case. To provide a sum total of the concrete costs, sales tax, and various services and delivery fees, the user selects a calculate button icon 134. After selecting the calculate button icon 134, the total cost of the concrete estimate is displayed in the concrete estimate block 140. Selection of the save button icon 135 results in the system saving the concrete estimate, sequentially numbered relative to when recorded by the user, to a database for later access. For example, once the concrete estimate has been saved, it may be viewed along with the other estimates by accessing the estimate screen, as shown in FIG. 4. Selection of the cancel button icon 136 returns the user to the example greeting screen shown in FIG. 3, thereby terminating the process of creating a concrete estimate.

Figure 27:
FIG. 27 illustrates an example view estimate screen, responsive to selection of the save button icon 135 shown in FIGS. 20 and 21.

FIG. 27 illustrates an example view estimate screen that is responsive to selection of the save button icon 135 shown in FIGS. 25A-C and 21A-C. The example view estimate screen includes a view estimate block 220 having a caller information section 221 and an estimate information section 222. The view estimate block 220 may include the information previously entered by the user into the concrete estimate block 140, shown in FIGS. 20 and 21. The view estimate block 220 may further include a create order button icon 223, an amend button icon 224, a cancel button icon 225, and a delete button icon 226. Selecting the cancel button icon 225 may return the user to the estimate screen shown in FIG. 4. Selection of the delete button icon 226 permits the user to terminate the estimate process currently in progress.

FIG. 28 illustrates an example estimate amendment screen, responsive to the user selecting the amend button icon 224 shown in FIG. 27. The example estimate amendment screen may include an amendment block 230 having one or more amendment data checkboxes 231, an amend button icon 232, and a cancel button icon 233. As shown, amendments may include, but are not limited to, addition of a pump company, lumber, construction materials, or a general contractor through selection of the appropriate data checkbox 231. To cancel the amendment process, the user may select the cancel button icon 233, at which time the system may return the user to the example view estimate screen shown in FIG. 27.

Figure 29:
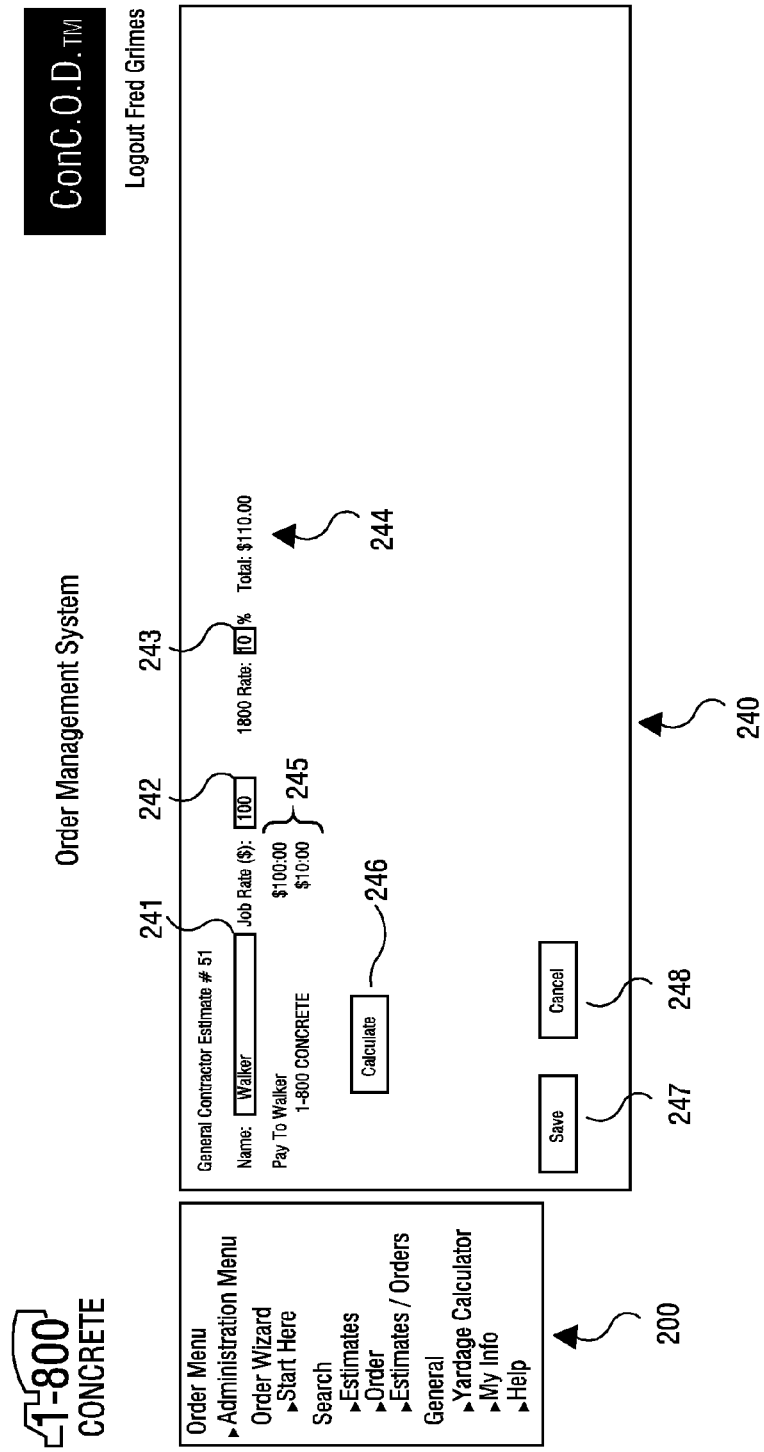
FIG. 29 illustrates an example contractor amendment screen, responsive to the selection of the add general contractor data checkbox 231 and amend button icon 232 of FIG. 28.

FIG. 29 illustrates an example contractor amendment screen, responsive to the selection of the add general contractor data checkbox 231 and amend button icon 232 shown in FIG. 28. The example contractor amendment screen may include a contractor amendment block 240 including a contractor name entry window 241, a job rate entry window 242, a percentage entry window 243, and a total 244. A user enters the contractor's name and fee the contractor will be charging in the contractor name entry window 241 and job rate entry window 242, respectively. By selecting the calculate button icon 246, the system may determine the total cost 244 of the contractor's services that is then broken down in the payment break down section 245 into the amount of money that will be provided to the contractor and the amount of money that will be provided to the operator of the order management system. As shown, with respect to this order, the operator of the order management system will receive a fee based on 10%, displayed in the percentage entry window 243, of the contractor's fee. The user may terminate the amendment process by selecting the cancel button icon 248. By selecting the save button icon 247, the user ensures the calculated fees may be included in the previously discussed concrete estimate.

FIGS. 30A-B illustrate an example order creation screen, responsive to selection of the create order button icon 223 shown in FIG. 27. The example order creation screen may include an order creation block 250 that includes an order type section 251 that indicates the type of estimate being viewed, in the present case a concrete and general contractor estimate. A shipping address section 252 allows the user to enter information in various entry windows indicating the location to which the concrete is to be delivered. A billing address section 253 allows the user to indicate where correspondence regarding payment of the concrete order is to be mailed. Note that if the billing address is the same as the shipping address, a bill to address data checkbox 254 may be selected by the user, thereby automatically transferring the information entered in the shipping address section 252 into the billing address section 253. The order creation block 250 may further include a direction/truck access entry window 255 and a miscellaneous notes entry window 256 that allow the user to input various information into the order as they see fit. A payment section 257 may include data checkboxes 258 for selecting a particular method of payment and information entry windows associated with the various methods of payment. As shown, the methods of payment include, but are not limited to cash, Western Union, check, cross check, credit card, and account. By selecting the cancel button icon, the user may cancel the process of creating an order, and the user may be returned to the example view estimate screen as shown in FIG. 27.

Figure 31B:
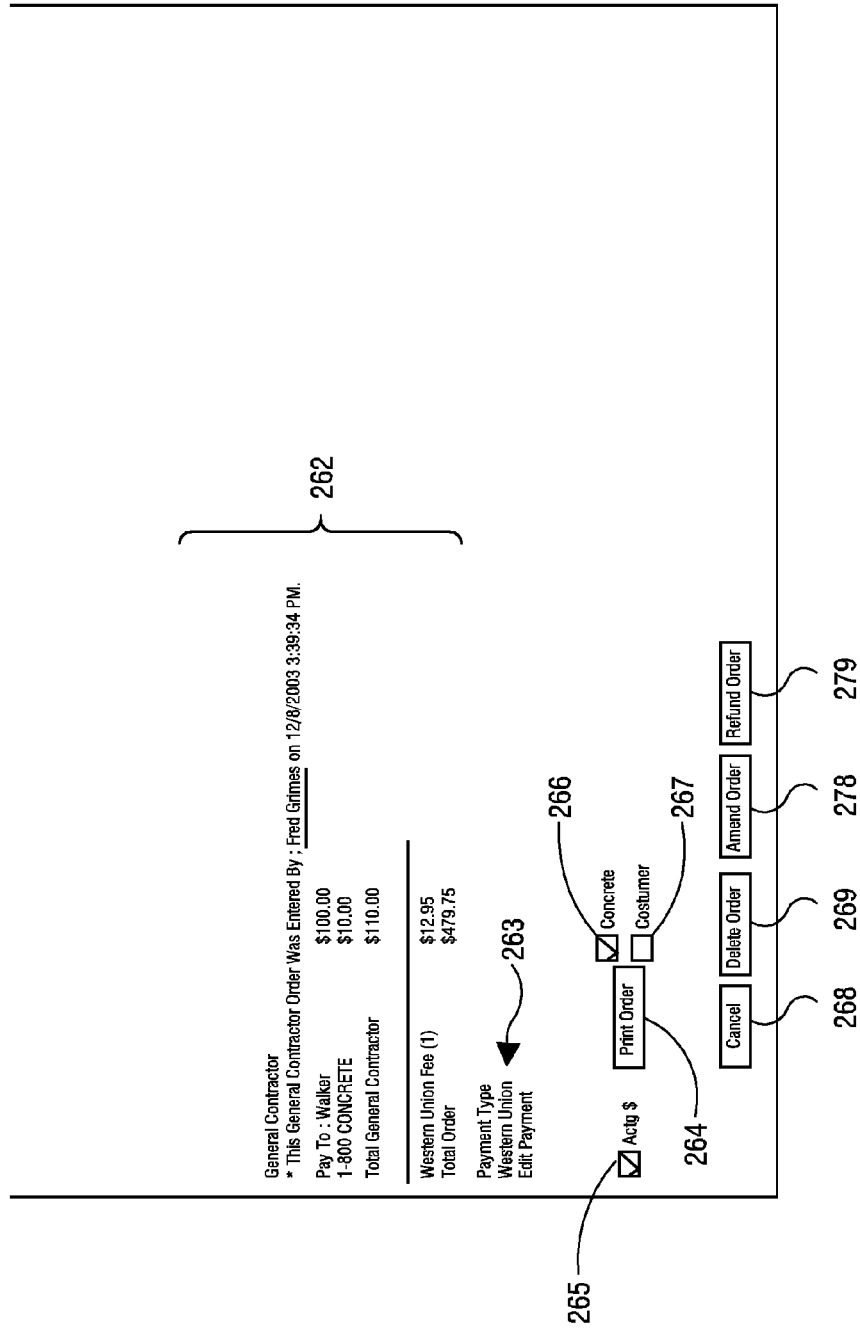

FIGS. 31A-B illustrate an example view order screen, responsive to selecting the save button icon 259 shown in FIGS. 30A-B. The example view order screen may include a view order block 260 having a caller information section 261, a concrete estimate information section 262, and a payment section 263, each of which includes information previously entered by the user when creating both the estimate and the order. The view order block 260 includes an accounting (ACTG$) data checkbox 265, a concrete supplier data checkbox 266, a customer data checkbox 267, and a print order button icon 264. Various print orders may be created by selecting either the concrete supplier data checkbox 266 or the customer data checkbox 267 with or without accounting data checkbox 265. For example, by selecting only the concrete supplier data checkbox 266 and then the print order button icon 264, the user can create the example concrete supply purchase order screen shown in FIGS. 32A-B. By selecting the concrete supplier data checkbox 266 in combination with the accounting data checkbox 265, the user may create the example concrete supplier purchase order screen as shown in FIG. 28. The example customer purchase order screen shown in FIGS. 36A-B may be is created by selecting the customer data checkbox 267 with or without selection of the accounting data checkbox 265. Selection of the cancel button icon 268 will return the user to the example estimate screen shown in FIG. 4, with the current order still displayed and accessible thereon. Selection of the delete order button icon 269 allows the user to delete the present order such that it is no longer accessible in the system.

The example concrete supplier purchase order screen shown in FIGS. 32A-B may include an order information section 271, a disclaimer section 272, and a signature section 273. The order information section 271 may include information entered during the estimate and order creation processes. One may note that monetary amounts are not included in this information since the accounting data checkbox 265 shown in FIGS. 31A-B was not selected by the user. The signature section 273 may provide an area where the concrete supplier dispatcher, the concrete truck driver, and the concrete purchaser may also sign indicating that they have read and agree to the disclaimers listed in the disclaimer section 272.

FIG. 33 illustrates an example finisher purchase order screen, responsive to selection of the finisher checkbox (not shown). The finisher purchase order screen may include an order information section 281 and a signature section 282. The example concrete supplier purchase order screen shown in FIG. 33 is intended for the internal use of the concrete supplier.

Figure 34:
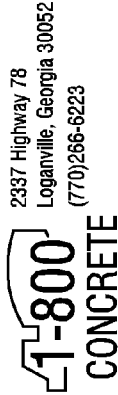
FIG. 34 illustrates an example customer purchase order screen, responsive to selection of the customer checkbox 267 from FIG. 31B.

FIG. 34 illustrates an example customer purchase order screen, responsive to selection of the customer checkbox 267 from FIG. 31B. The customer purchase order screen may include costs for the concrete and finisher. The customer purchase order may also include payments made, and the total order charge.

FIGS. 35A-B illustrate an example accounting purchase order screen, responsive to selection of the customer checkbox 265 from FIG. 31B. The accounting purchase order screen may include charges by all entities involved in the order, along with charges corresponding to the desired services. Totals may be calculated and displayed for each service, entity and/or the entire order. The customer purchase order may also include payments made, and the total order charge.

FIGS. 36A-B illustrate an example customer purchase order screen including a customer information section 290, a concrete order information section 291, a general contractor information section 292, and a payment section 293 that includes both the type of payment 294 and total amount 295. Because this is a customer purchase order screen, it includes those charges related to the general contractor, as they are relevant to the customer. These charges are not included on the previously discussed concrete supplier purchase order screens since they are not relevant to the concrete supplier.

FIG. 37 is an example refund screen, responsive to the refund order button icon 279 shown in FIGS. 31A-B. The example refund screen includes a cancel order block 303 having a customer information section 304, a refund amount section 305, and a cancel button icon 306. The refund amount section 305 indicates the value of that portion of the order that may be refunded to the purchaser. Selection of the cancel button icon 306 may return the user to the example view order screen shown in FIGS. 31A-B, thereby canceling the refund process.

Figure 38:
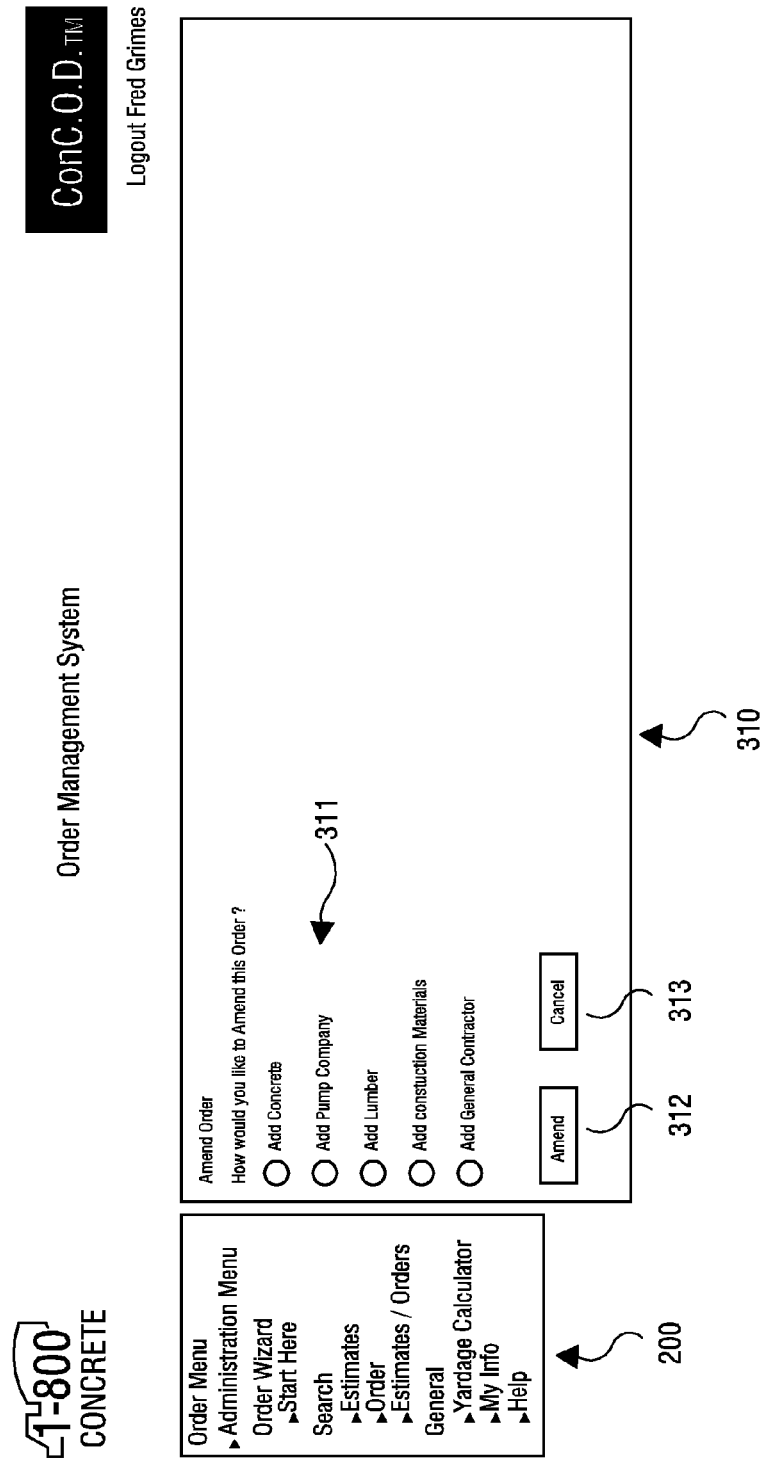
FIG. 38 is an example order amendment screen, responsive to the amend order button icon 278 shown in FIG. 26.

FIG. 38 is an example order amendment screen, responsive to the amend order button icon 278 shown in FIG. 26. The function of the example amend order screen is substantially the same as that of the example estimate amend screen shown in FIG. 28. The example amend order screen includes an amendment block 310 and amendment data checkboxes 311 indicating which amendments may be made to the order. As shown, the amendments include, but are not limited to, adding concrete, adding a pump company, adding lumber, adding construction materials, or adding a general contractor. Selection of the cancel button icon 313 allows the user to terminate the amend order process.

Figure 39:
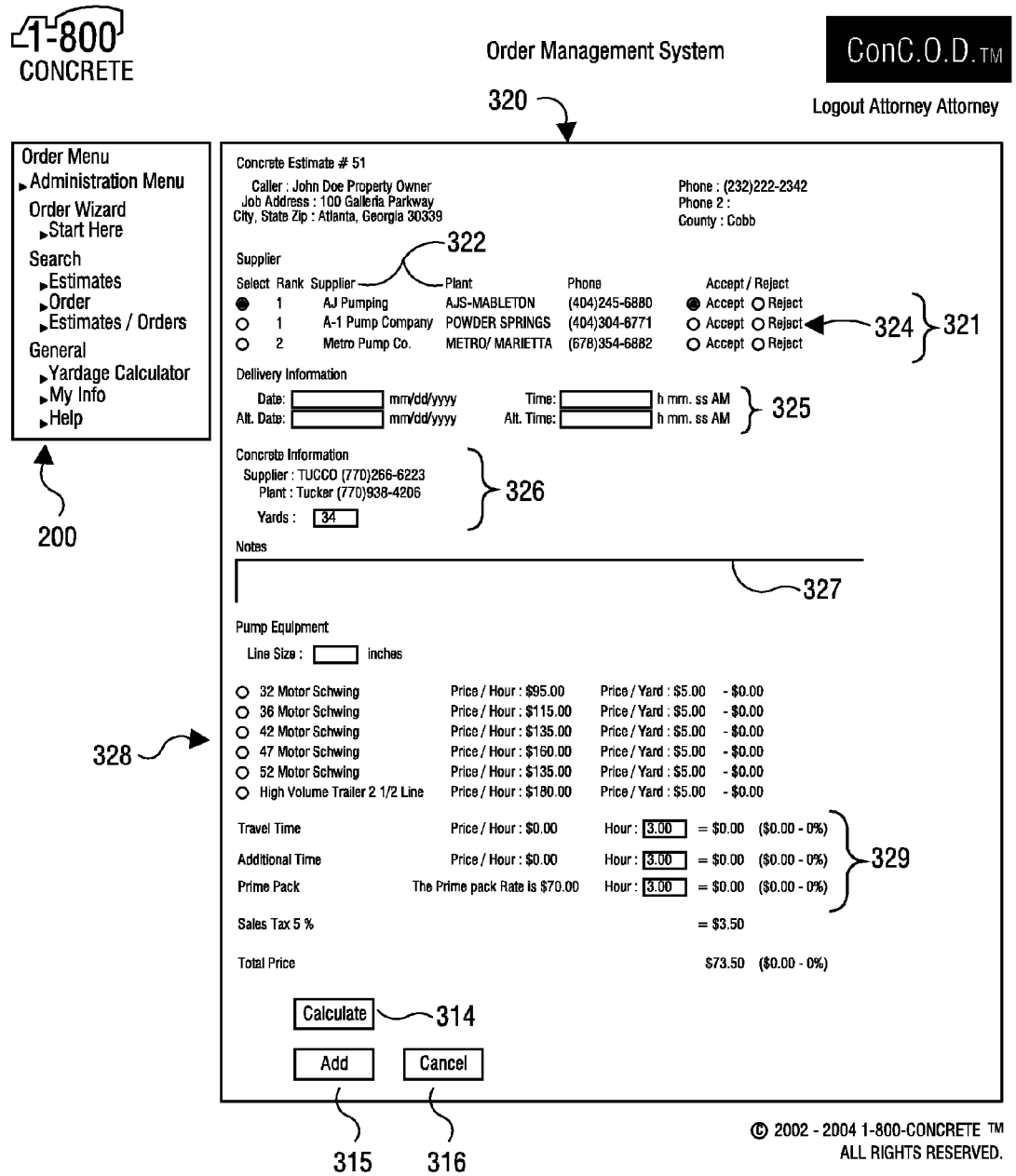
FIGS. 39A-B illustrate an example pump amendment screen, responsive to selecting the add pump company data checkbox 311 and amend button icon 312 shown in FIG. 38.

FIGS. 39A-B illustrate an example pump amendment screen responsive to selecting the add pump company data checkbox 311 and amend button icon 312 shown in FIG. 38. The example pump amendment screen may include a pump amendment block 320 having a supplier section with select data checkboxes 323, accept/reject data checkboxes 324, and the plurality of data fields 322 under which information related to each supplier is listed. As shown, the user has selected AJ Pumping because it is listed the primary supplier for this job (Rank No. 1). As well, the user has selected the accept data checkbox 324 indicating that the supplier has accepted the job. A delivery information section 325 may allow a user to enter the date and time at which the noted equipment is required. A concrete supplier information section 326 may indicate the concrete supplier and concrete yardage for the job. A notes entry window 327 allow the user to include various notes and instructions in the order. Equipment selection data checkboxes 328 allow the user to indicate the type of equipment that is required for the specific job. Cost per hour for use of the equipment as well as cost per yard of concrete on which the equipment is used is indicated, thereby allowing an estimate for each piece of equipment to be totaled. Any additional costs encountered may be entered by the user into the additional cost section 329. By selecting the calculate button icon 315 the user may receive a total of the entire estimate for the equipment indicated. By selecting the save button icon the user may ensure that the total amount calculated will be added to the order in question. Selection of the cancel button icon 316 may return the user to the view order screen shown in FIGS. 31A-B.

Figure 40:
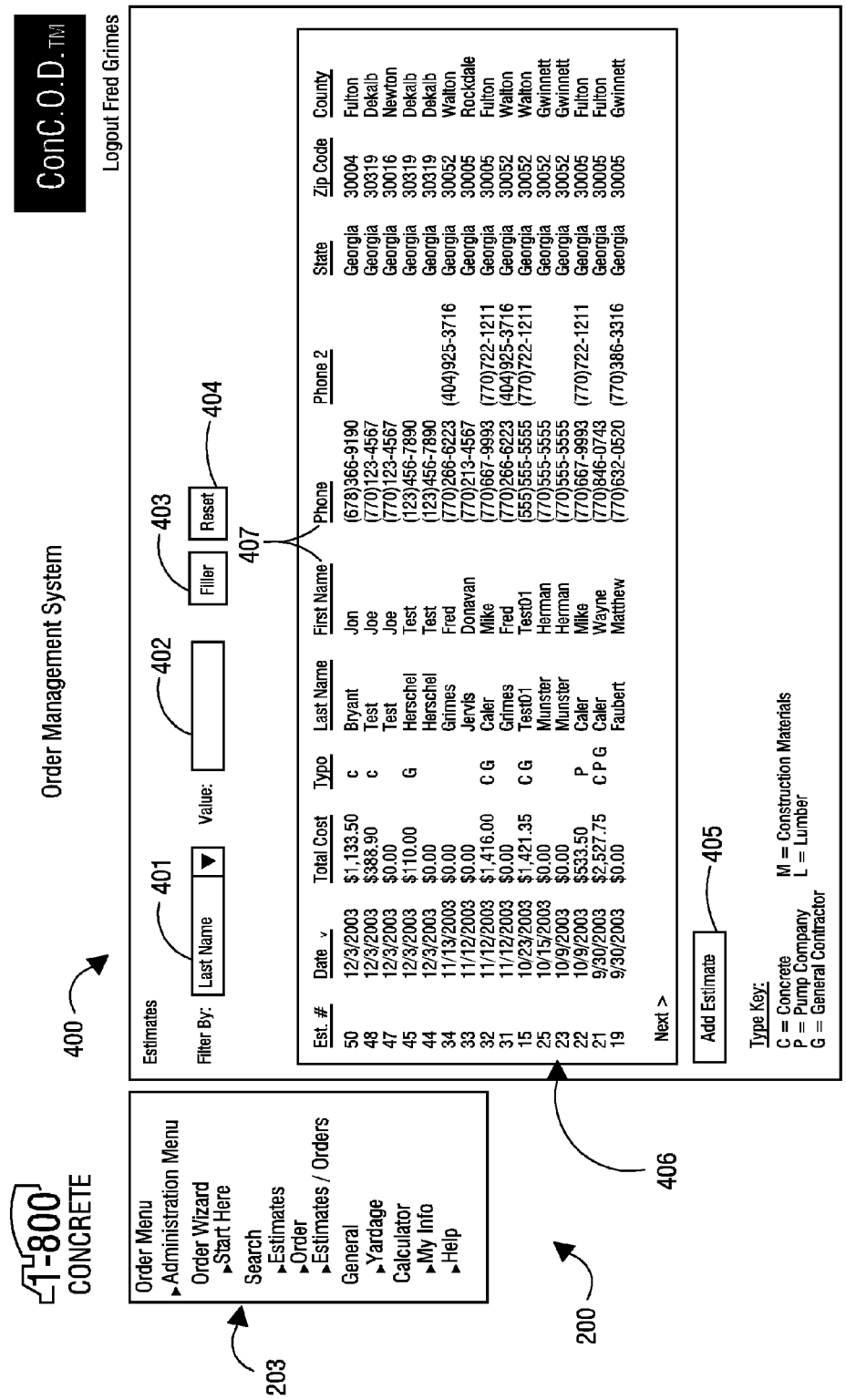
FIG. 40 illustrates the example estimate screen previously shown in FIG. 4, responsive to selecting the estimates title icon in the search subject group 203 of the order menu block 200.

FIG. 40 illustrates the example estimate screen previously shown in FIG. 4. However, in the instant case, the user has accessed the example estimate screen by selecting the estimates title icon in the search subject group 203 of the order menu block 200. As the functioning of the example estimate screen has been previously discussed, it will not be further discussed here.

Figure 41:
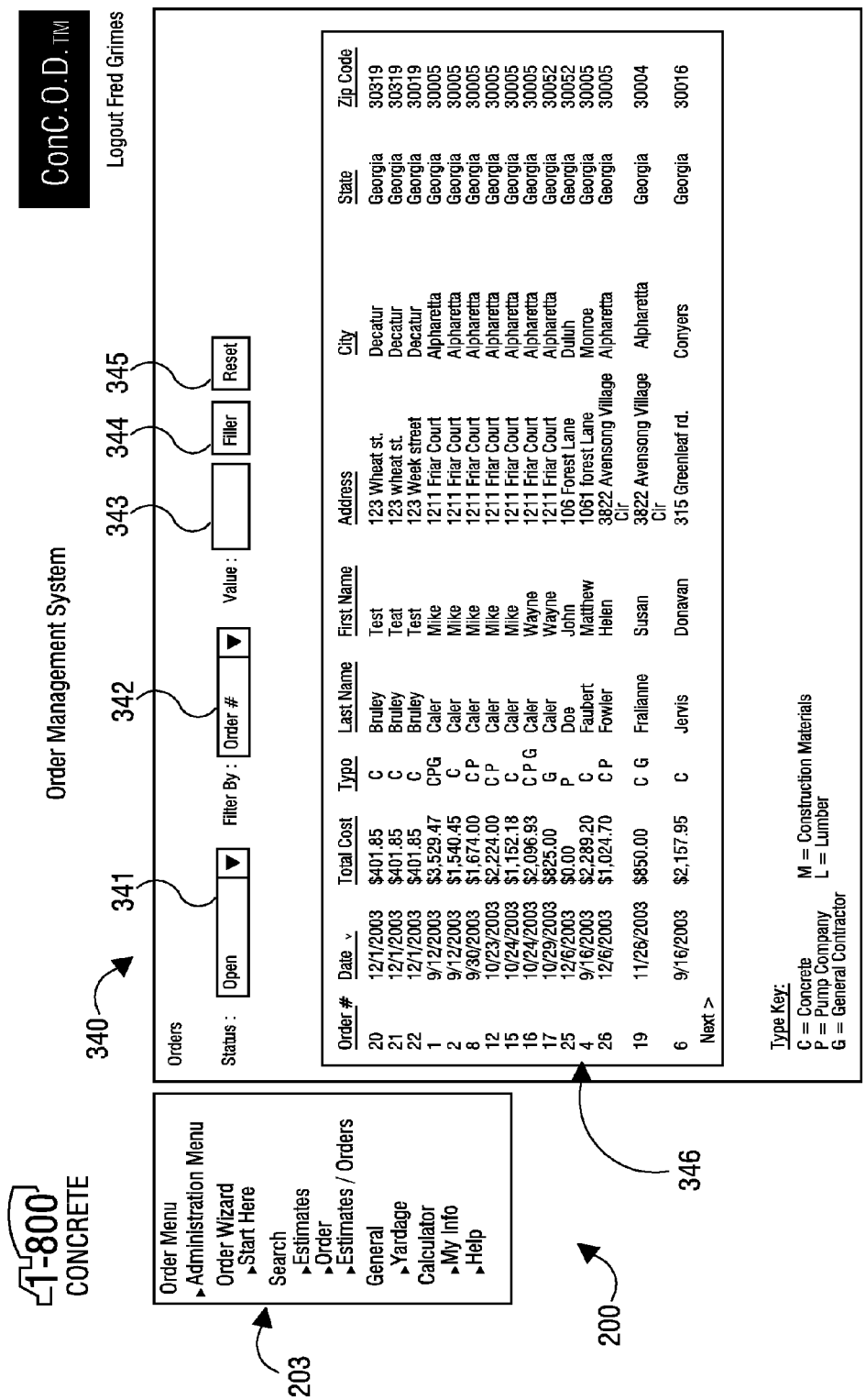
FIG. 41 illustrates an example order screen, responsive to selecting the orders subject icon in the search subject group 203 of the order menu block 200.

FIG. 41 illustrates an example order screen, responsive to selection of the orders subject icon in the search subject group 203 of the order menu block 200. The example order screen includes an order block 340, a status drop down menu 341, a data field drop down menu 342, a value entry window 343, a filter button icon 344, and a reset button icon 345. The status drop down menu 341 allows the user to search either open or closed orders. By selecting the desired data field with the data field drop down menu 342 and entering the desired information in the value entry window 343, the user may retrieve those orders having that information within the selected data field by choosing the filter button icon 344. Selection of the reset button icon 345 may delete the information previously entered in the status drop down menu 341, data field drop down menu 342, and value entry window 343.

Figure 42:
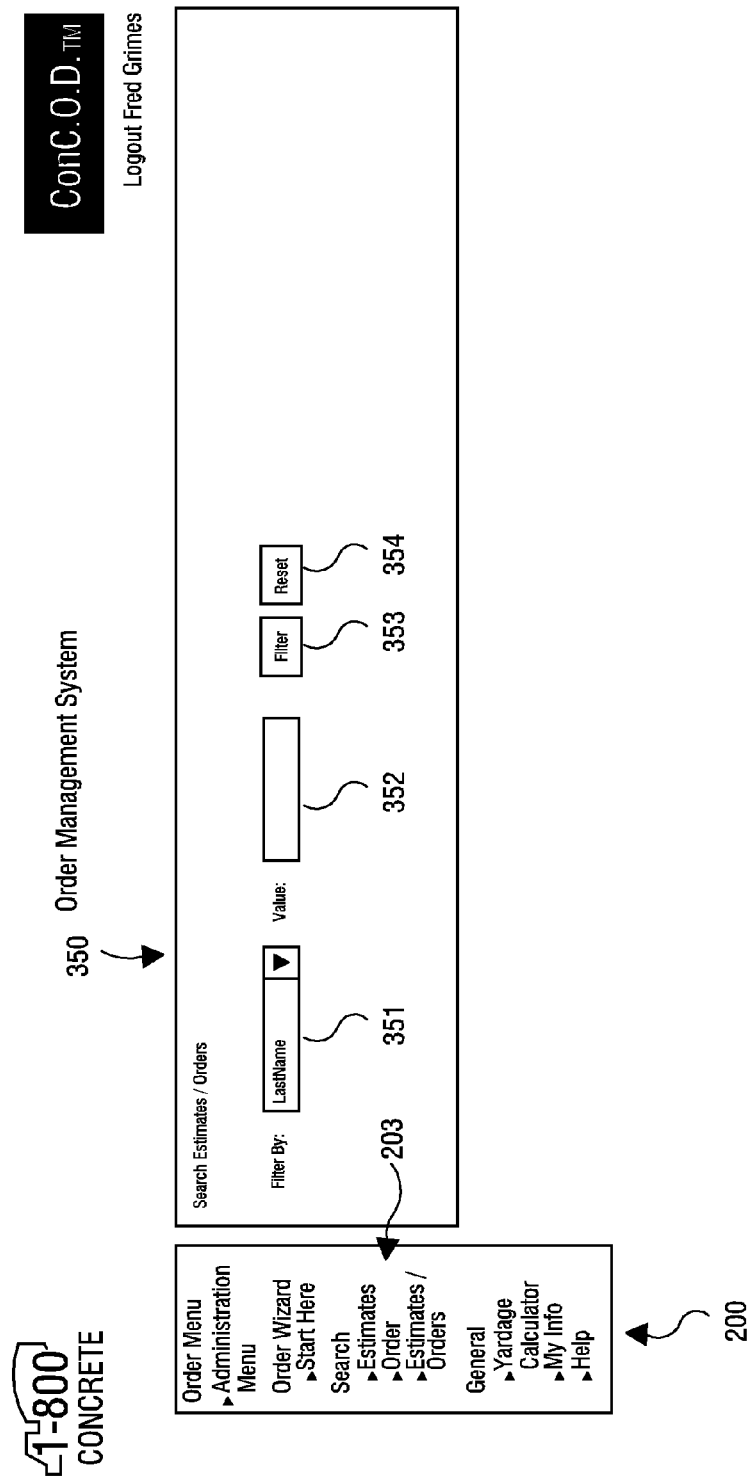
FIG. 42 illustrates an example search estimates/orders screen, responsive to selection of the estimates icon 203 of order menu block 200.

FIG. 42 illustrates an example search estimates/orders screen. The search estimate/orders screen may be accessed by selecting estimates/orders icon under search subject group 203, and may include a search estimates/orders block 350 having a data field drop down menu 351, a value entry window 352, a filter button icon 353, and a reset button icon 354. A user may search the estimates and orders by selecting a desired data field from the data field drop down menu 351 and entering the desired information in the value entry window 352. The search estimates/orders screen is responsive to selection of the estimates/orders subject icon in the search subject group 203.

Figure 43:
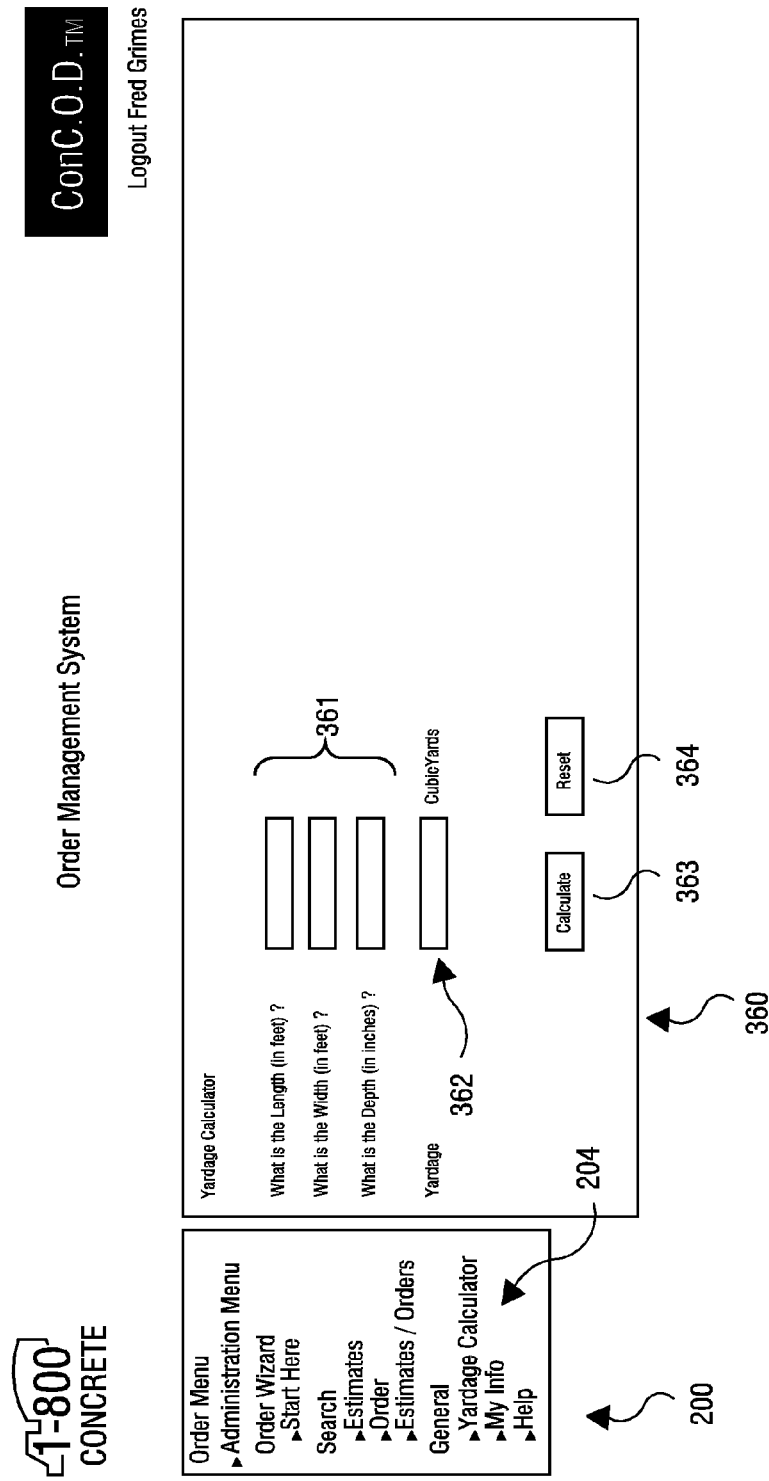
FIG. 43 illustrates an example yardage calculator screen, responsive to selection of the yardage calculator subject icon in the general subject group 204 of the order menu block 200.

FIG. 43 illustrates an example yardage calculator screen that is responsive to selection of the yardage calculator subject icon in the general subject group 204 of the order menu block 200. The example concrete yardage calculator screen includes volume data entry windows 361 and a yardage entry window 362. To determine the concrete yardage required for a job, the required measurements may be entered in the volume data entry windows 361 and the calculate button icon 363 is selected. The resultant concrete yardage value may be displayed in the concrete yardage entry window 362. Selection of the reset button icon 364 clears all the previously entered information from the volume data entry windows 184 and the concrete yardage entry window 362.

Figure 44:
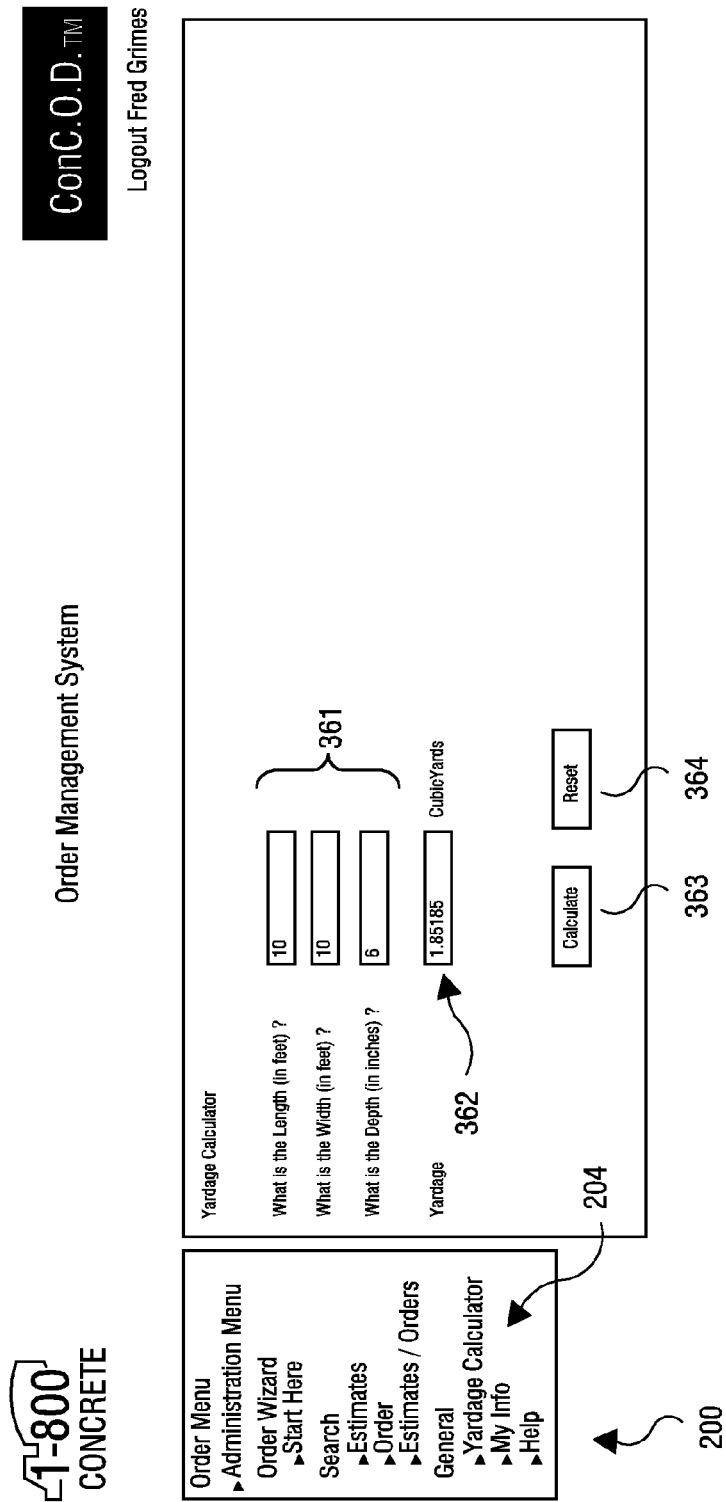
FIG. 44 illustrates the concrete yardage calculator screen of FIG. 43 as used to determine a value for concrete yardage.

FIG. 44 illustrates the concrete yardage calculator screen as used to determine a value for concrete yardage. As illustrated, volume entry windows 361 have been filled and a volume has been calculated and displayed in the yardage entry window 362. As in FIG. 43, the calculate button icon 363 is used to calculate the volume, based on values entered in the yardage entry windows 361. Reset button icon clears all previously entered information.

Figure 45:
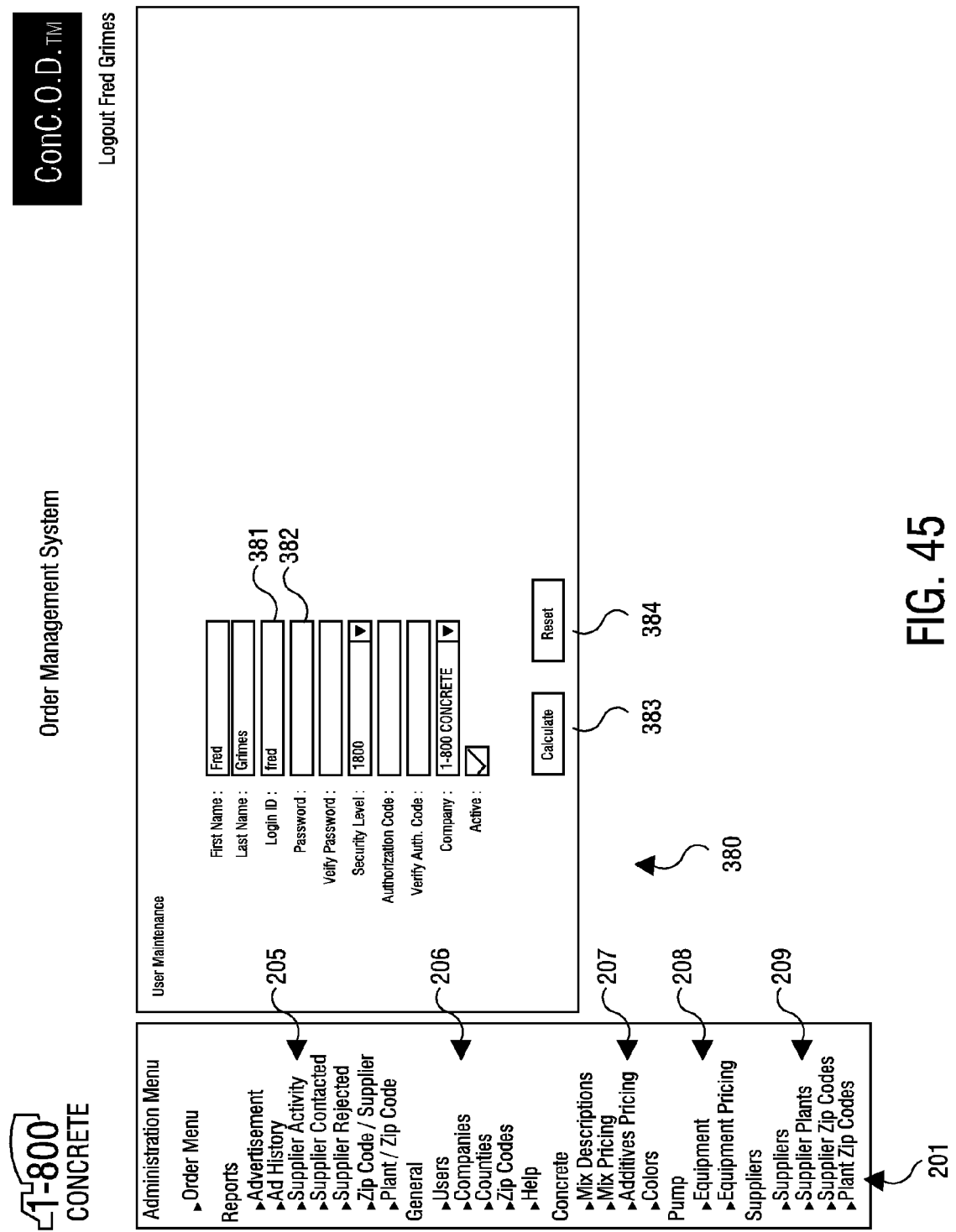
FIG. 45 is an example of user maintenance screen, responsive to the selection of the my info subject icon in the general subject group 204 of the order menu block 200.
Figure 93:
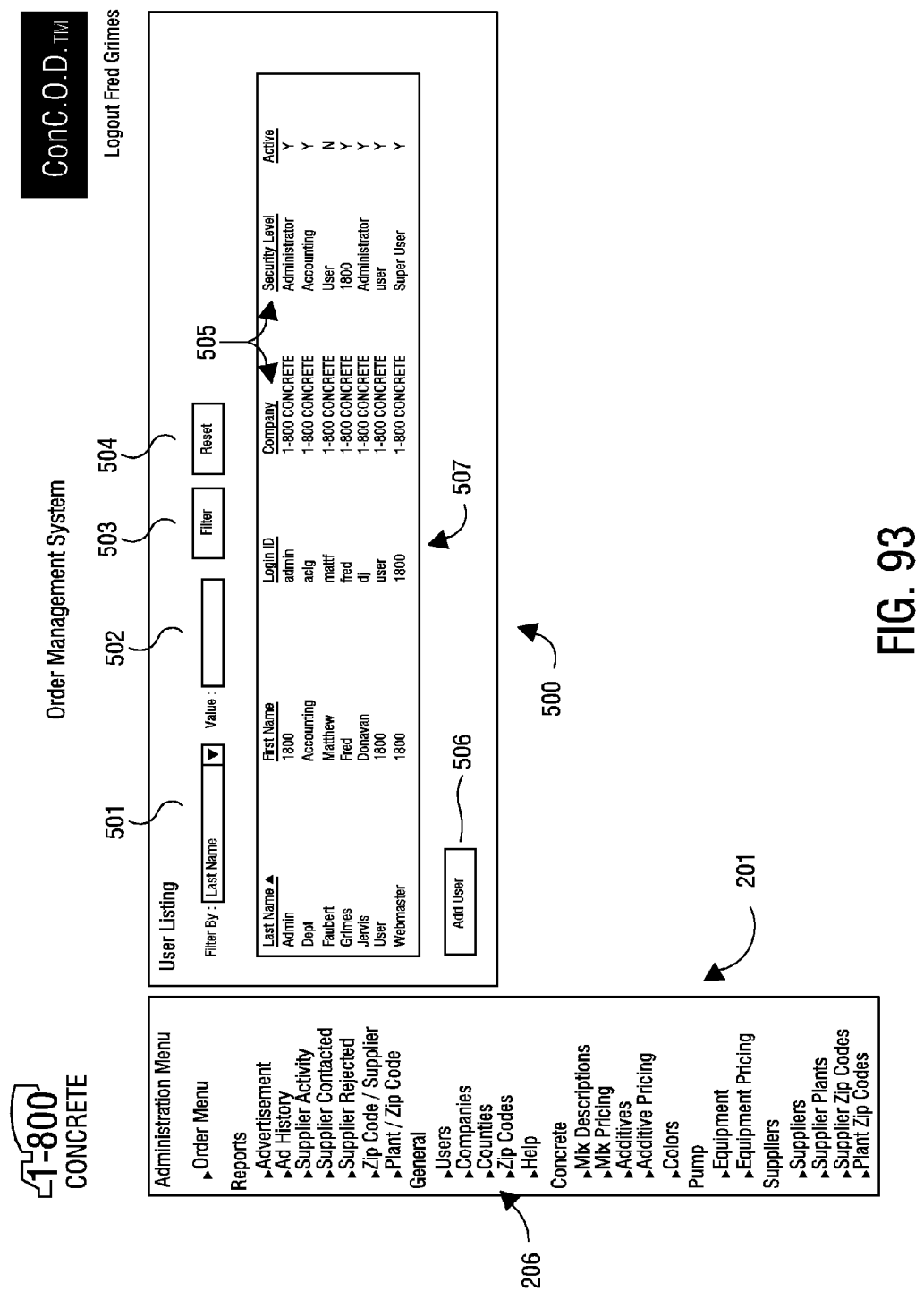
FIG. 93 is an example user listing screen, responsive to selection of the users subject icon from the general subject group 206.

FIG. 45 is an example of user maintenance screen, responsive to the selection of the my info subject icon in the general subject group 204 of the order menu block 200. The example user maintenance screen includes a user maintenance block 380 including a number of entry windows for entering information pertaining to an authorized user of the order management system into a database thereof. For example, the user maintenance block 380 may include a login ID entry window 381 and a password entry window 382 for recording the information that is necessary for user to access the order management system. As previously shown in FIG. 1, a login ID and password are required by the user to enter the order management system. The user maintenance block 380 may display that information previously recorded for a user within a database of the system, and may permit the user to amend that information. After amending the information, the save button icon 383 may be selected to ensure that information is updated within the database. Selection of the cancel button icon 384 may forward the user to an example user listing screen, as shown in FIG. 93, discussed hereinafter.

Figure 46:
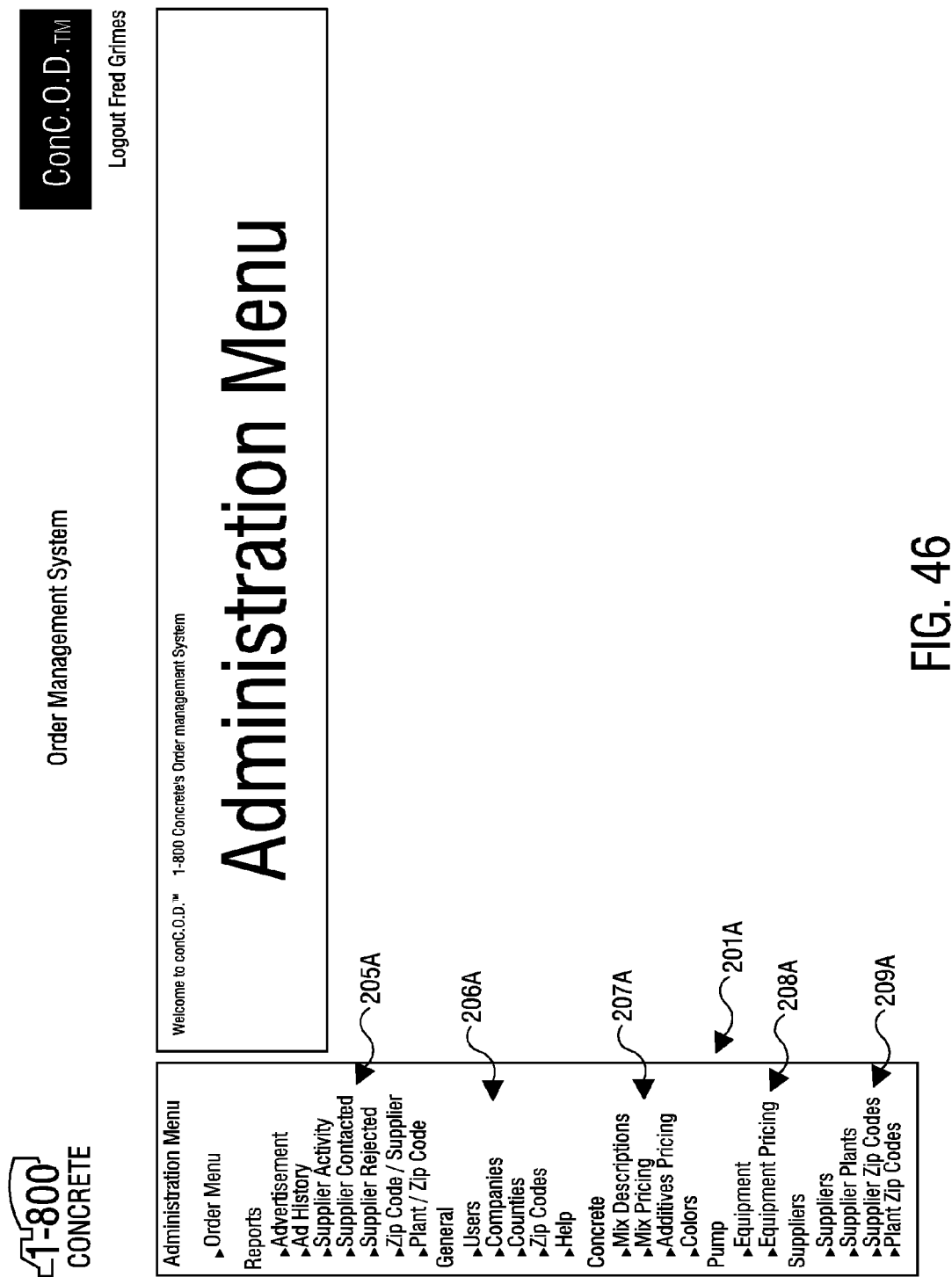
FIG. 46 illustrates an example administration menu welcome screen, responsive to selection of the administration menu drop down icon in the order menu block 200.

FIG. 46 illustrates an example administration menu welcome screen, responsive to selection of the administration menu drop down icon in the order menu block 200. As shown, the administration menu 201*a* may include a report subject group 205*a*, a general subject group 206*a*, a concrete subject group 207*a*, a pump subject group 208*a*, and a supplier subject group 209*a*.

Figure 47:
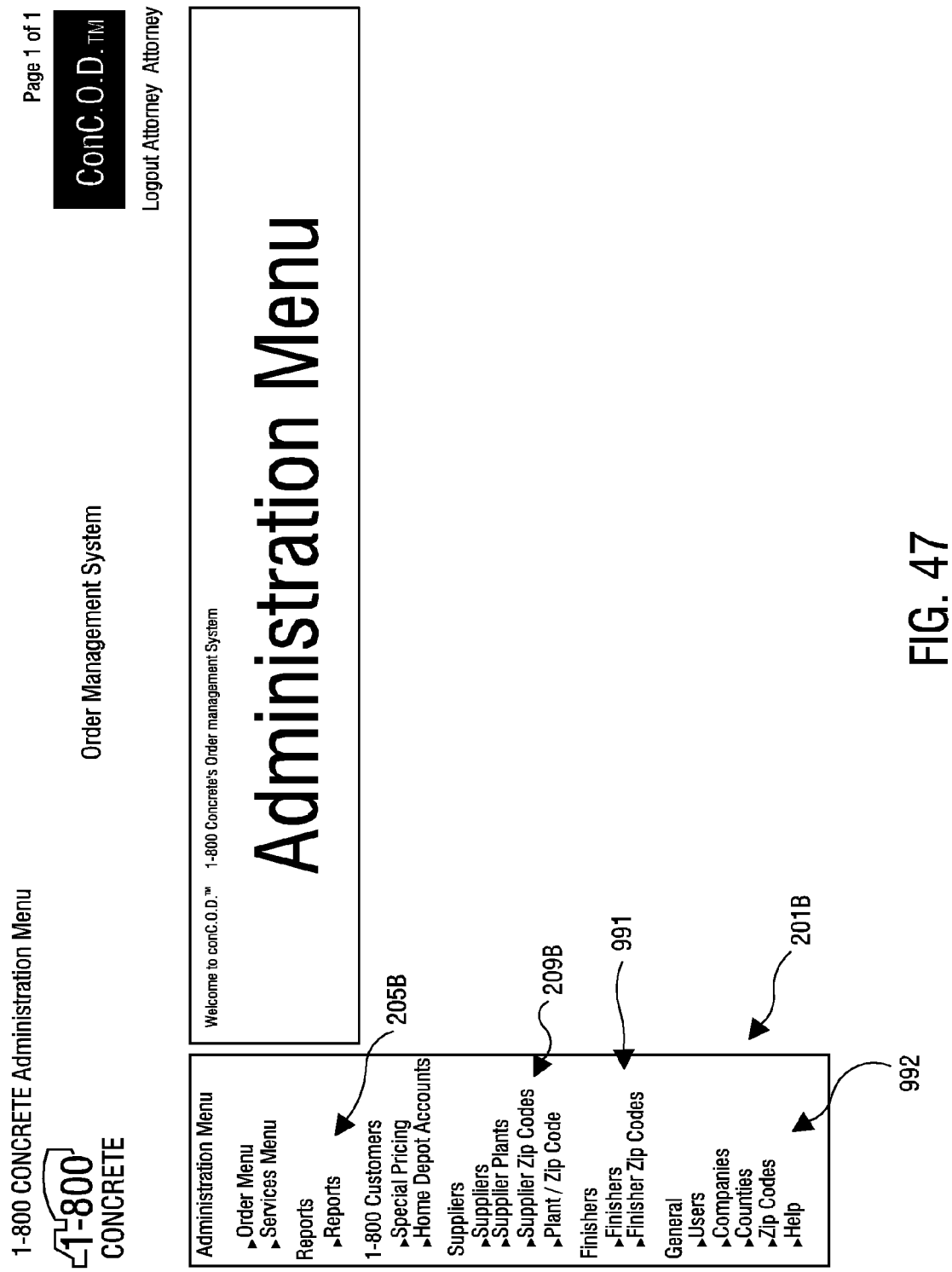
FIG. 47 illustrates an alternative embodiment of the example administration menu welcome screen, also responsive to selection of the administration menu dropdown icon from the order menu block 200.

FIG. 47 illustrates an alternative embodiment of the example administration menu welcome screen, also responsive to selection of the administration menu dropdown icon from the order menu block 200. The administration menu 201*b* differs slightly from the administration menu 201*a* in the administration menu 201*b* includes a reports menu screen 205*b*, a suppliers subject group 209*b*, a finishers subject group 991, and a general subject group 992.

Figure 48:
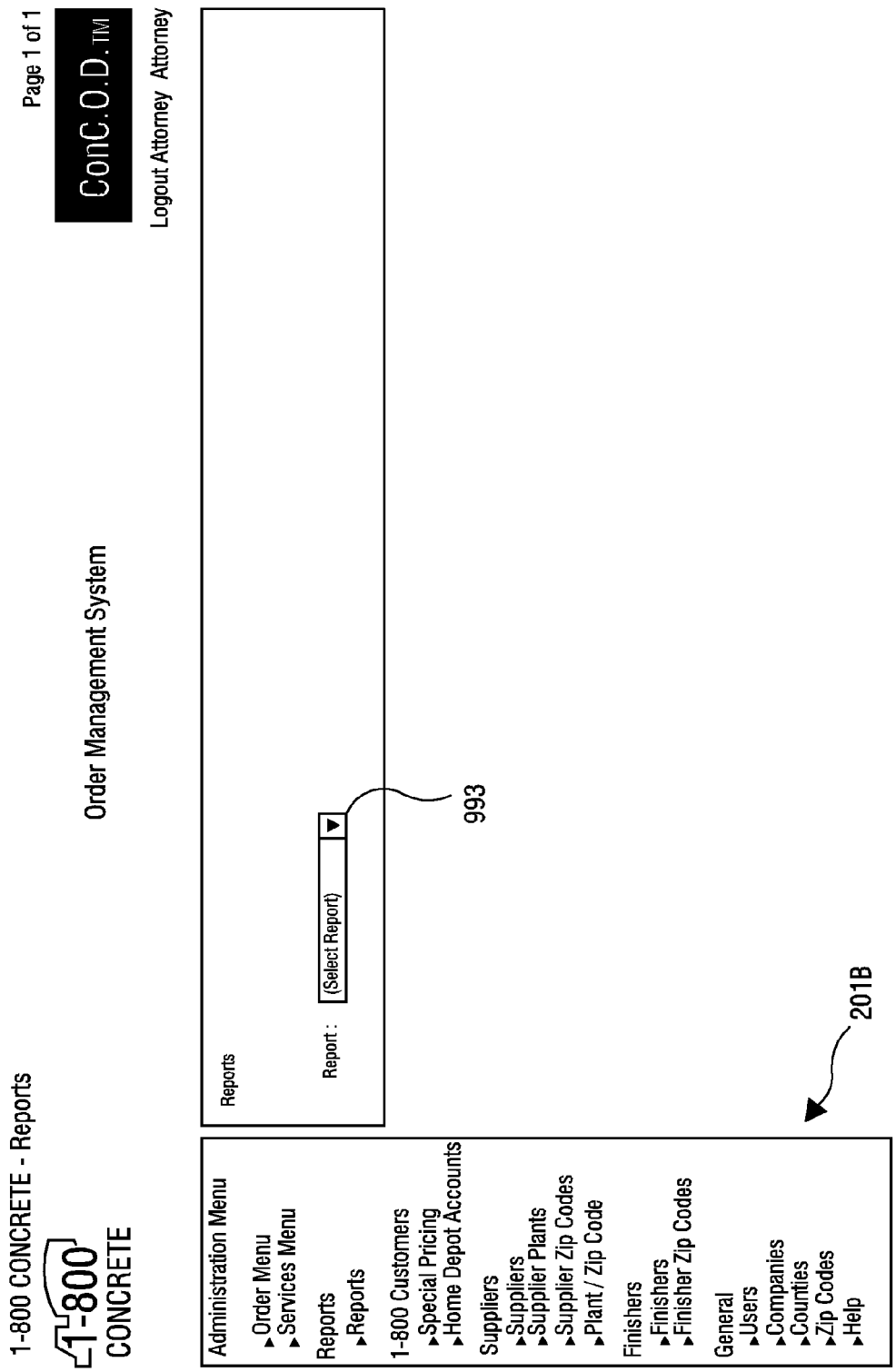
FIG. 48 illustrates an example reports menu screen, responsive to selecting the reports subject group 205B, from FIG. 47.

FIG. 48 illustrates an example reports menu screen, responsive to selecting the reports subject group 205*b*, from FIG. 47. As shown, reports menu screen includes a report dropdown menu 993 for the user to select a desired report.

Figure 49:
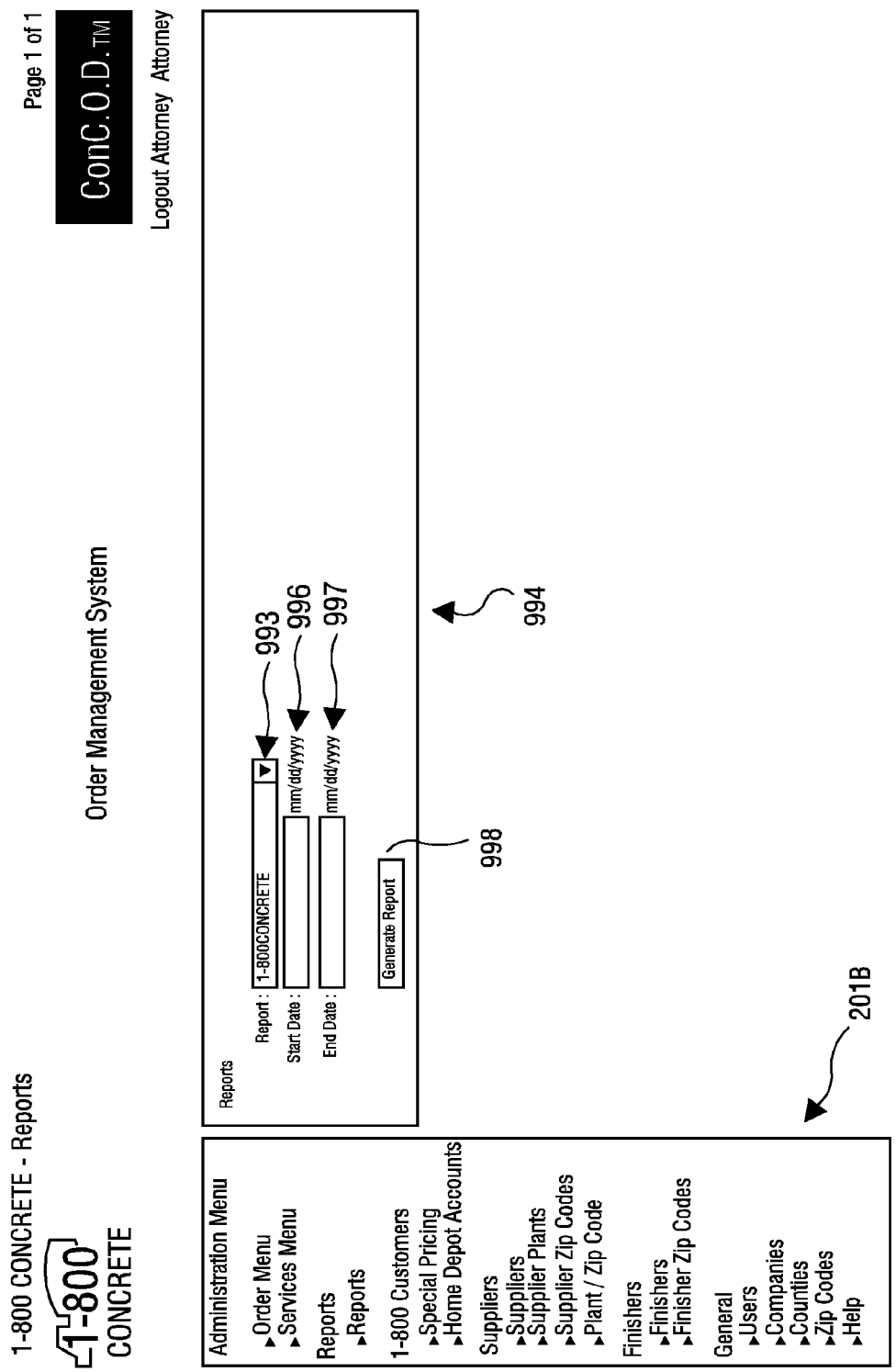
FIG. 49 illustrates selection of 1-800Concrete option from report dropdown menu 993.

FIG. 49 illustrates selection of 1-800Concrete option from report dropdown menu 993. Included in 1-800Concrete reports option block 994 are a start date entry window 996, end date entry window 997, and a generate report icon 998.

Figure 50:
FIG. 50 illustrates a 1-800Concrete report, responsive to completing the required data and selecting the generate report icon 998 from FIG. 49.

FIG. 50 illustrates a 1-800Concrete report, responsive to completing the required data and selecting the generate report icon 998 from FIG. 49. By completing the required data, the user gains access to the 1-800Concrete report. As shown, this portion may be under construction.

Figure 51:
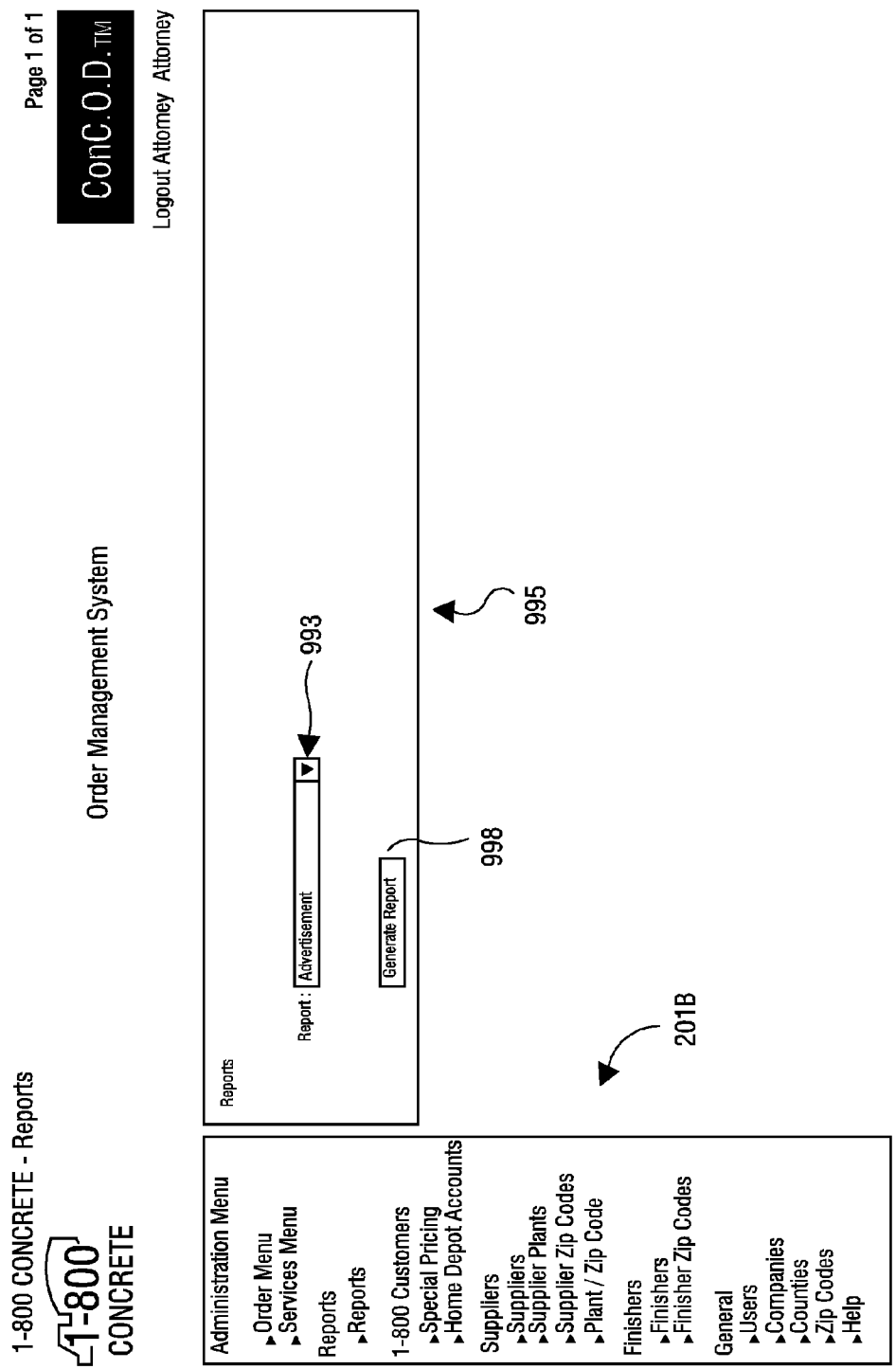
FIG. 51 illustrates selection of the advertisement option from report dropdown menu 993.

FIG. 51 illustrates selection of the advertisement option from report dropdown menu 993. Included in advertisement reports block 995 is the report dropdown menu 993 and the generate report icon 998.

FIG. 52A illustrates an example advertisement report screen responsive to selection of the generate report icon from FIG. 51. The example advertisement report screen includes an advertisement report block 400 that displays the results of how a caller became aware of the services provided. In this example, the information was previously entered by the user in the advertisement block 500*a* or 500*b*, shown in FIGS. 5A and 5B, respectively, during the creation of an estimate.

Figure 52B:
FIG. 52B illustrates an advertisement report, responsive to selection of the generate report icon from FIG. 51.

FIG. 52B illustrates an advertisement report, responsive to selection of the generate report icon from FIG. 51. The advertisement report 400B differs from advertisement report 400A in the addition of a Home Depot data row, a Home Depot Account Holder data row, and a 1-800 Customer data row. As is evident, any number of additions or alterations may also be included.

Figure 53:
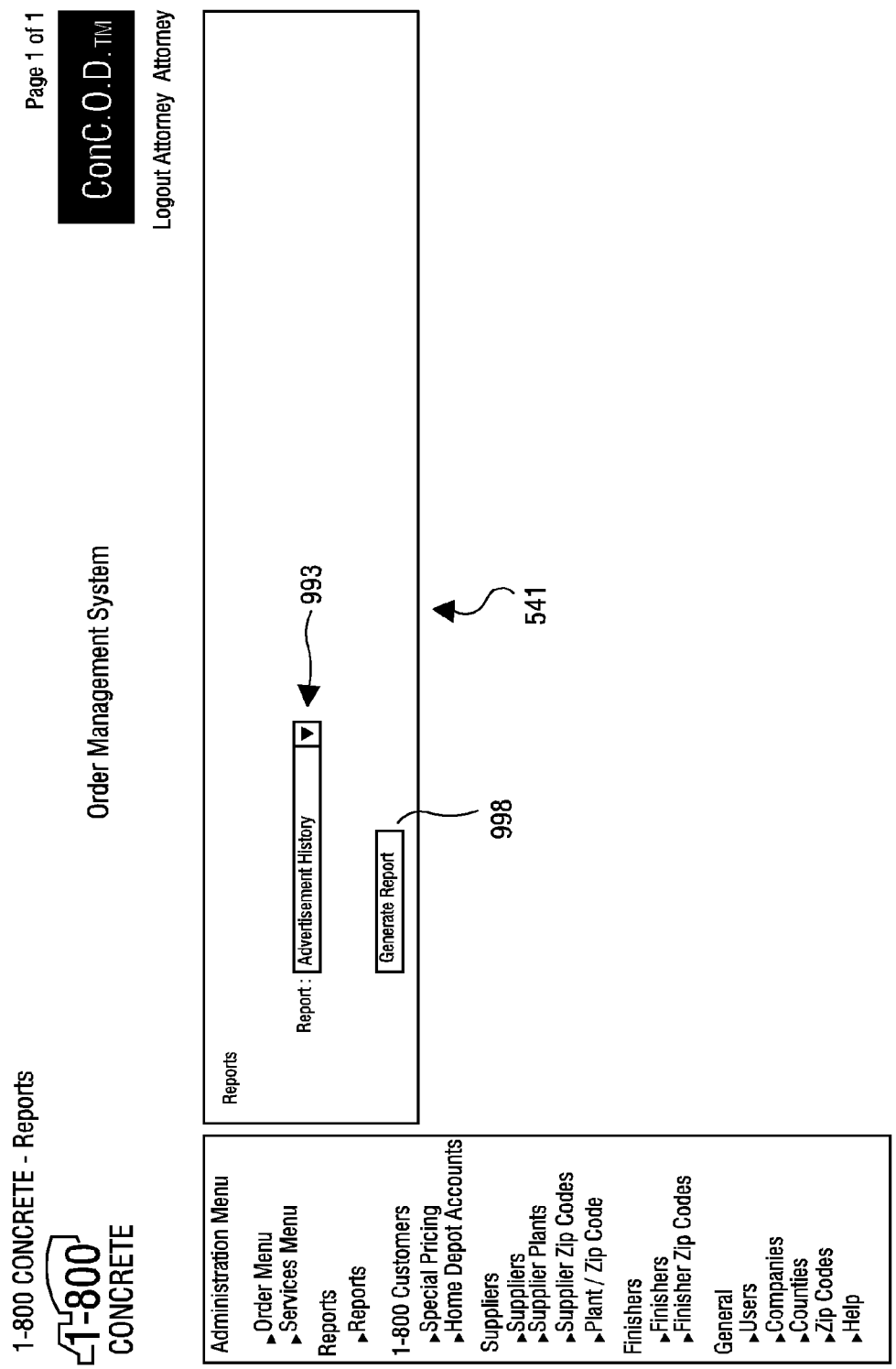
FIG. 53 illustrates an advertisement history report block, responsive to selection of the advertisement history option from report dropdown menu 993.

FIG. 53 illustrates an advertisement history report block, responsive to selection of the advertisement history option from report dropdown menu 993. The advertisement history report block 841 includes the report dropdown menu 993 and the generate report icon 998.

Figure 54:
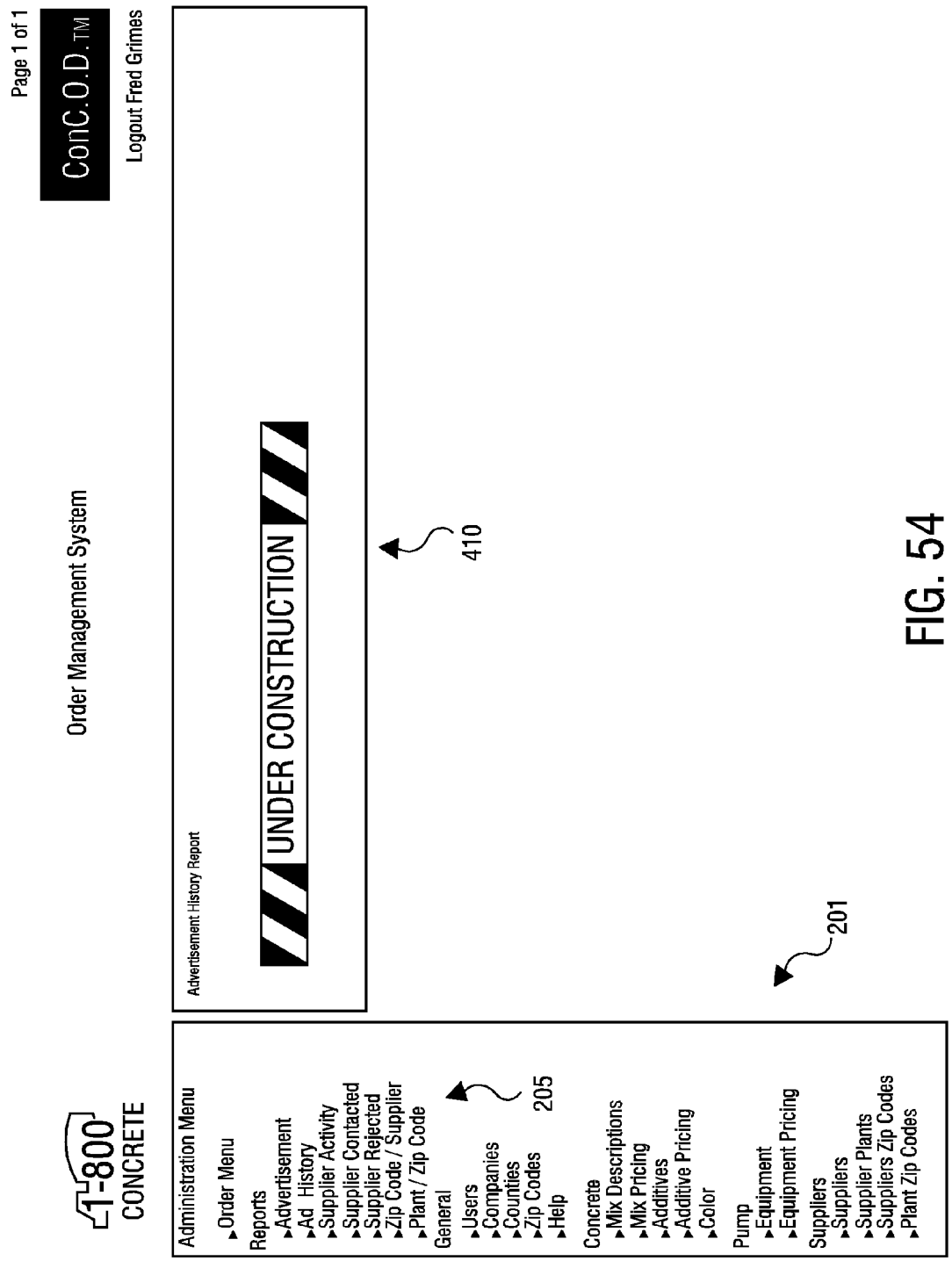
FIG. 54 illustrates an advertisement history report screen that is responsive to selection of the generate report icon 998 for FIG. 53.

FIG. 54 illustrates an advertisement history report screen that is responsive to selection of the generate report icon 998 for FIG. 53. As shown in an advertisement history report block 410, the advertisement history report screen is under development, showing that the system is expandable and adaptable.

Figure 55:
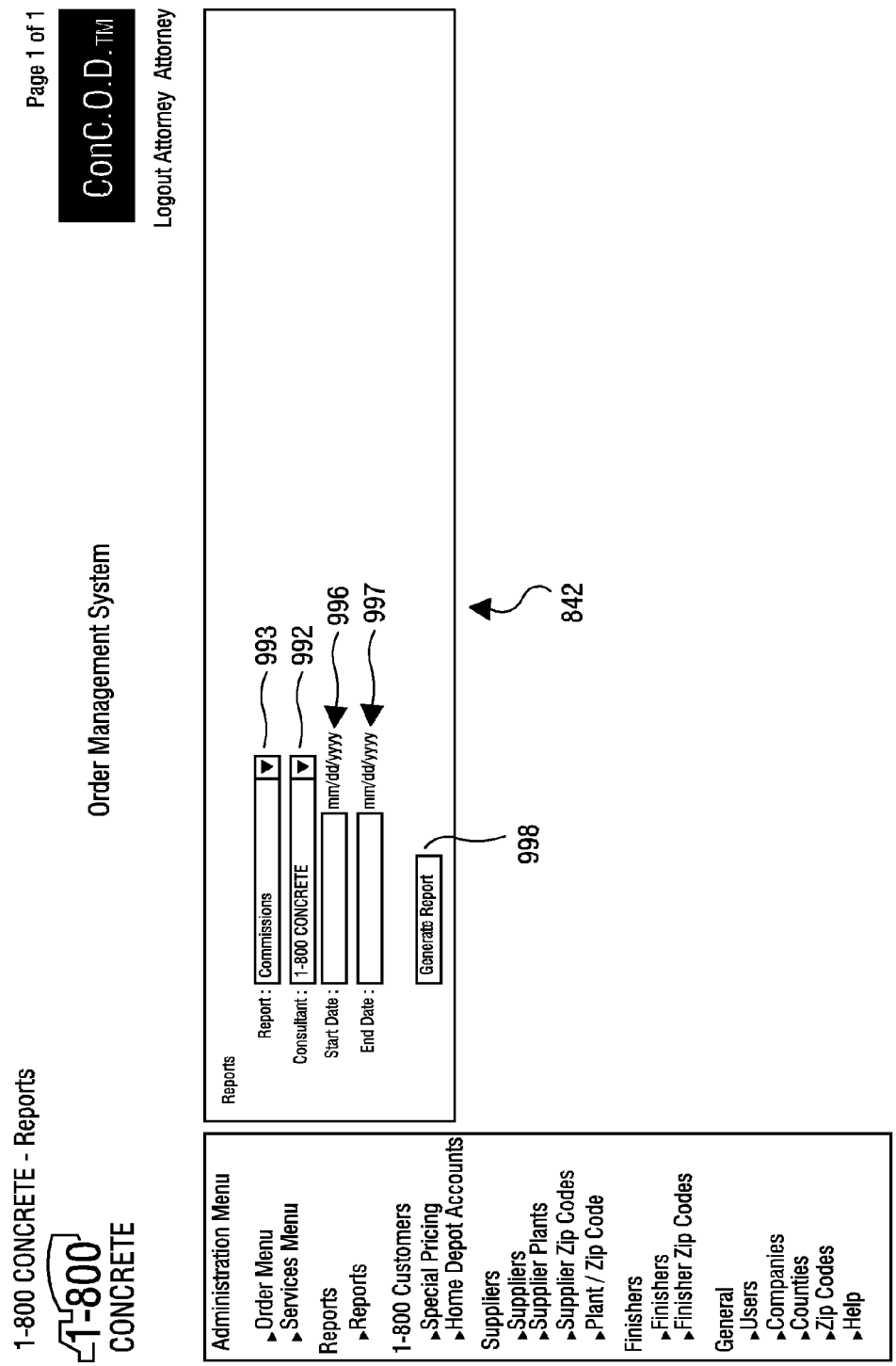
FIG. 55 illustrates a commissions report block, responsive to selection of the commissions option from report dropdown menu 993.

FIG. 55 illustrates a commissions report block, responsive to selection of the commissions option from report dropdown menu 993. Commissions report block 842 includes report dropdown menu 993, consultant dropdown menu 972, start date entry window 996, end date entry window 997, and the generate report icon 998.

FIG. 56 illustrates an example commissions report 975, responsive to selection of the generate report icon 998 from FIG. 55. Commissions report 975 may include order number, date shipped, yardage, price per yard, total order price, gross profit, who entered the estimate, and who entered the order for each order. The commissions report may also total such values as total number of orders, yardage, total order price, and gross profit.

Figure 57:
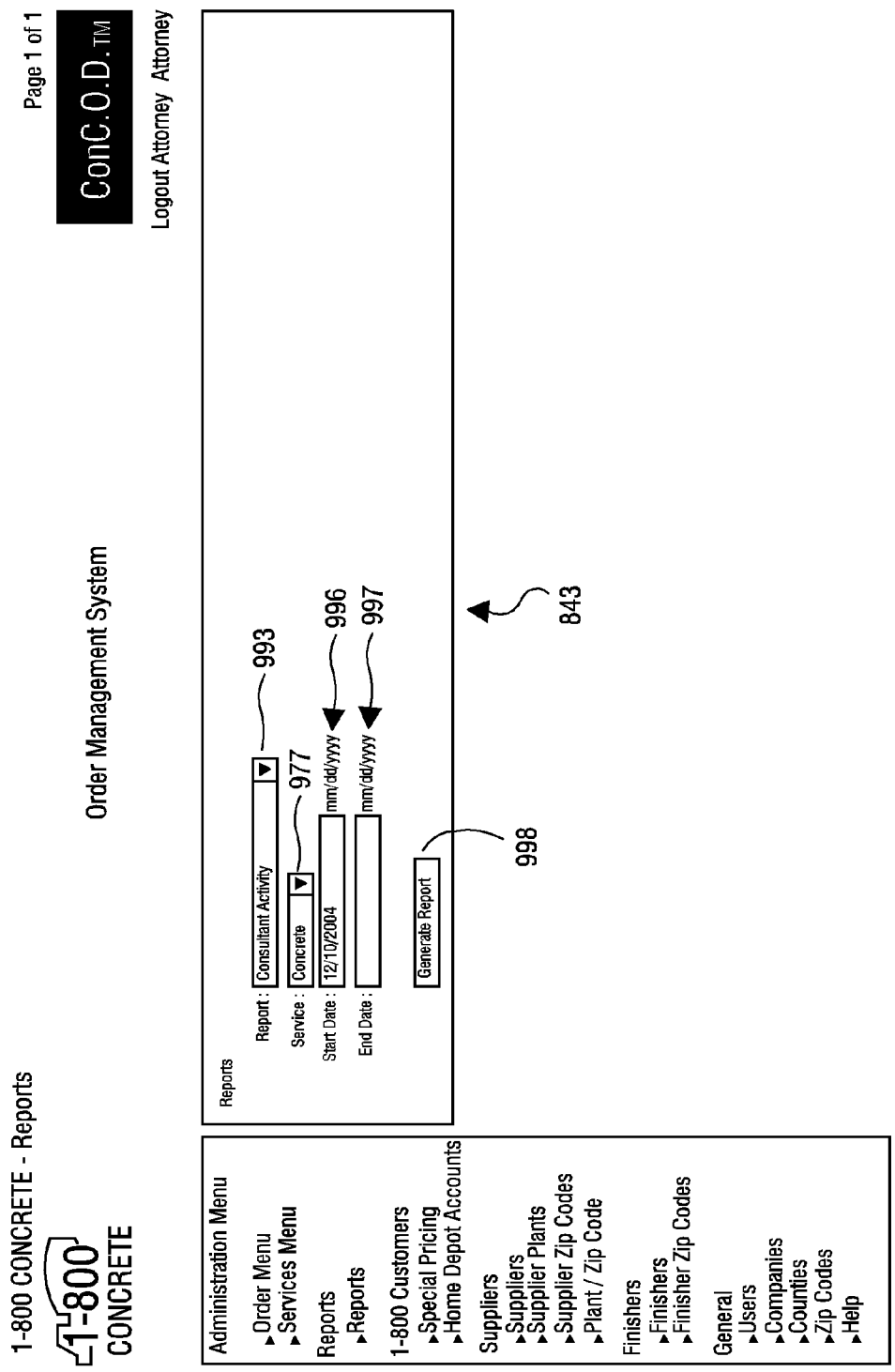
FIG. 57 illustrates a consultant activity report block 843, responsive to selection of the consultant activity option from report dropdown menu 993.

FIG. 57 illustrates a consultant activity report block 843, responsive to selection of the consultant activity option from report dropdown menu 993. Consultant activity report block includes the report dropdown menu 993, a service dropdown menu 977, the start date data menu 996, the end date entry window 997, and the generate report icon 998.

FIG. 58 illustrates a consultant activity report 961, responsive to selection of the generate report icon 998, from FIG. 57. Consultant activity report 961 may include a list of consultants, estimate number, date, yardage, total estimate price, and customer. In addition, totals of these values for all estimates may be computed and displayed for the yardage and total estimate price.

Figure 59:
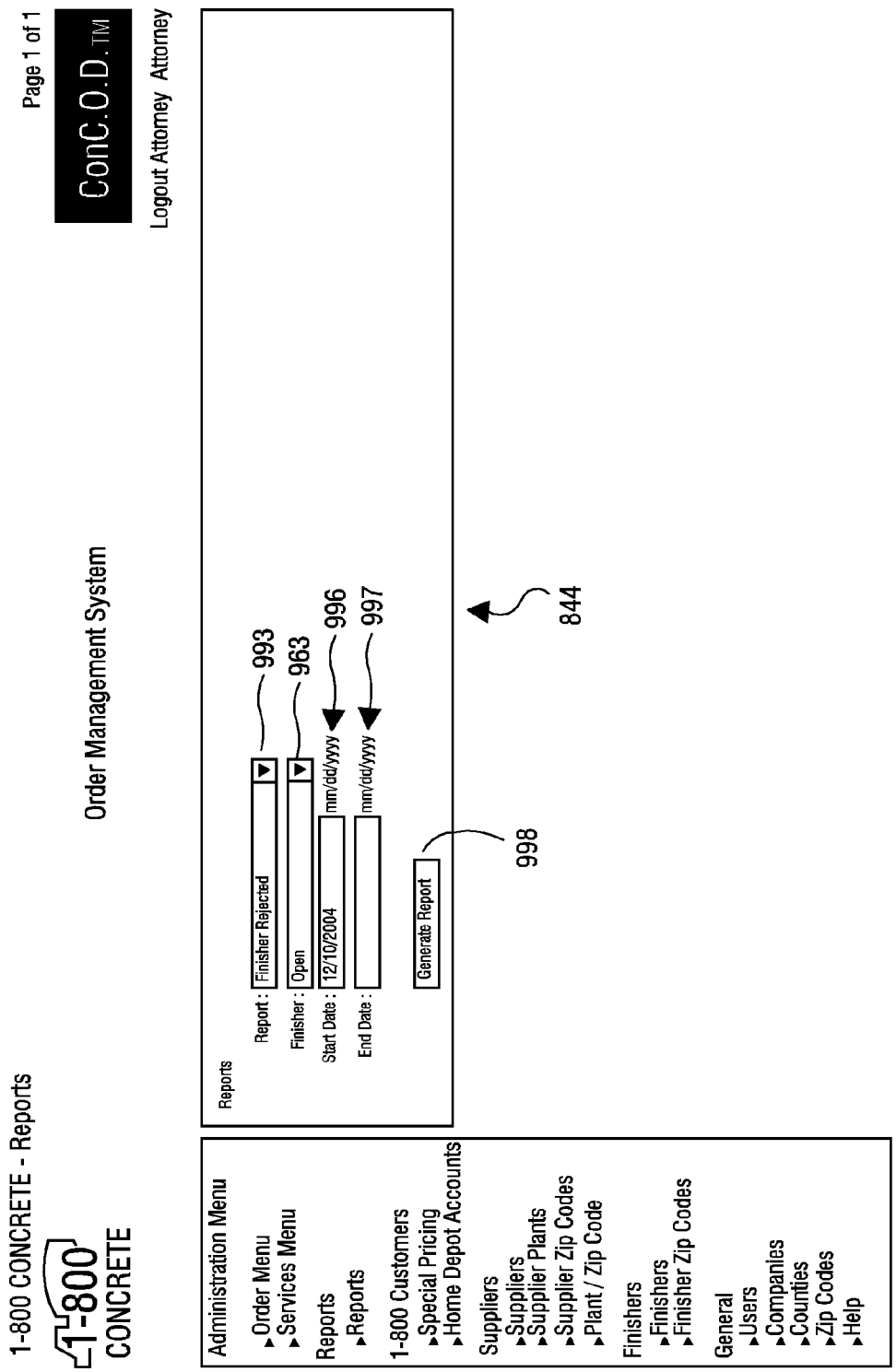
FIG. 59 illustrates a finisher rejected block, responsive to selection of the finisher rejected option from report dropdown menu 993.

FIG. 59 illustrates a finisher rejected block, responsive to selection of the finisher rejected option from report dropdown menu 993. Finisher rejected block 844 includes report dropdown menu 962, a finisher dropdown menu 963, a start date entry window 996, and an end date entry window 997. Also included in finisher rejected block 844 is the generate report icon 998.

Figure 60:
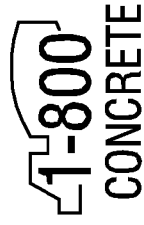
FIG. 60 illustrates a finisher rejected report, responsive to selection of the generate report icon of FIG. 59.

FIG. 60 illustrates a finisher rejected report, responsive to selection of the generate report icon of FIG. 59. The finisher rejected report 966 may include an estimate number column, a date rejected column, a "spoke with" column, and a reason for rejection column.

Figure 61:
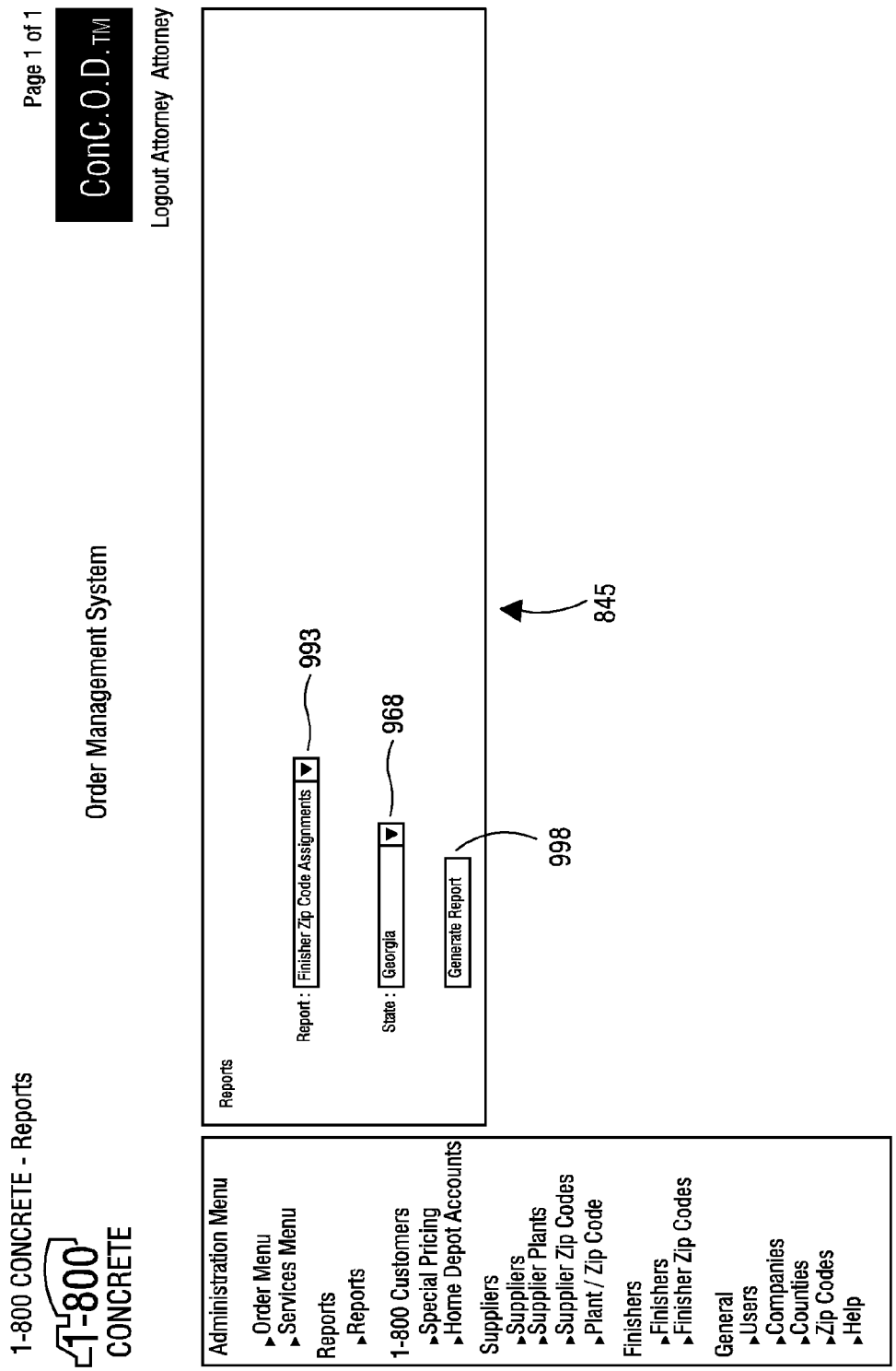
FIG. 61 illustrates a finisher zip code assignments block, responsive to selection of the finisher zip code assignments option in the report dropdown menu 993.

FIG. 61 illustrates a finisher zip code assignments block, responsive to selection of the finisher zip code assignments option in the report dropdown menu 993. Finisher zip code assignments block 845 includes the report dropdown menu 993, and a state dropdown menu 968. Also included in finisher zip code assignments block 845 is the generate report icon 998.

FIG. 62 illustrates a finisher zip code assignments report, responsive to selection of the generate report icon 998 from FIG. 61. The finisher zip code assignments report 967 illustrates the finishers associated with the outsourcing entity, and the various zip codes they service.

Figure 63:
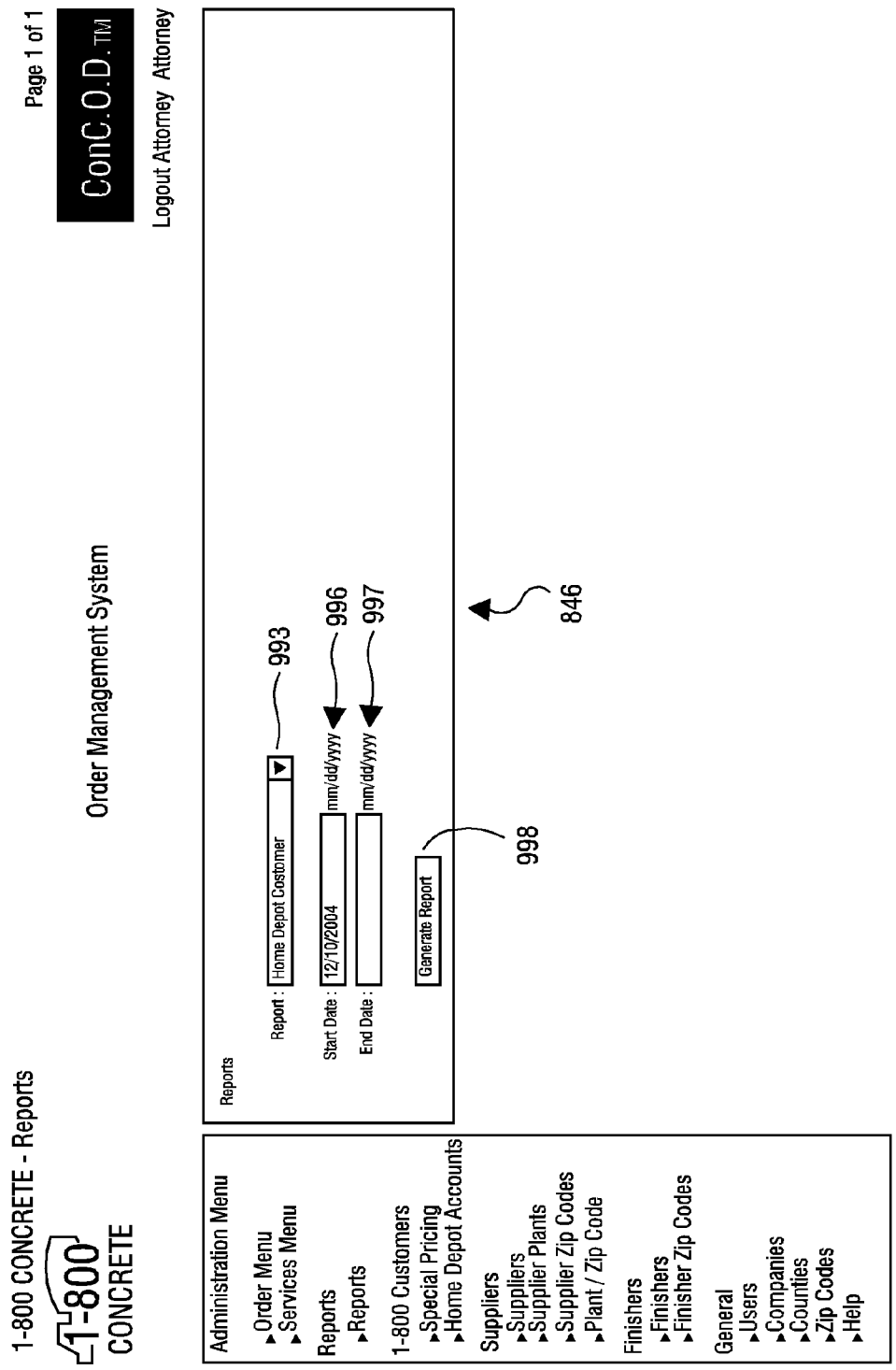
FIG. 63 illustrates a Home Depot customers block, responsive to selection of the Home Depot customers option from report dropdown menu 993.

FIG. 63 illustrates a Home Depot customers block, responsive to selection of the Home Depot customers option from report dropdown menu 993. Home Depot customers block 846 includes the report dropdown menu 993, the start date entry window 996, and the end date entry window 997. Also included is the generate report icon 998.

FIG. 64 illustrates a Home Depot customer's report, responsive to selection of the generate report icon 998 from FIG. 63. The Home Depot customer's report may include a list of total orders placed by Home Depot customers.

Figure 65:
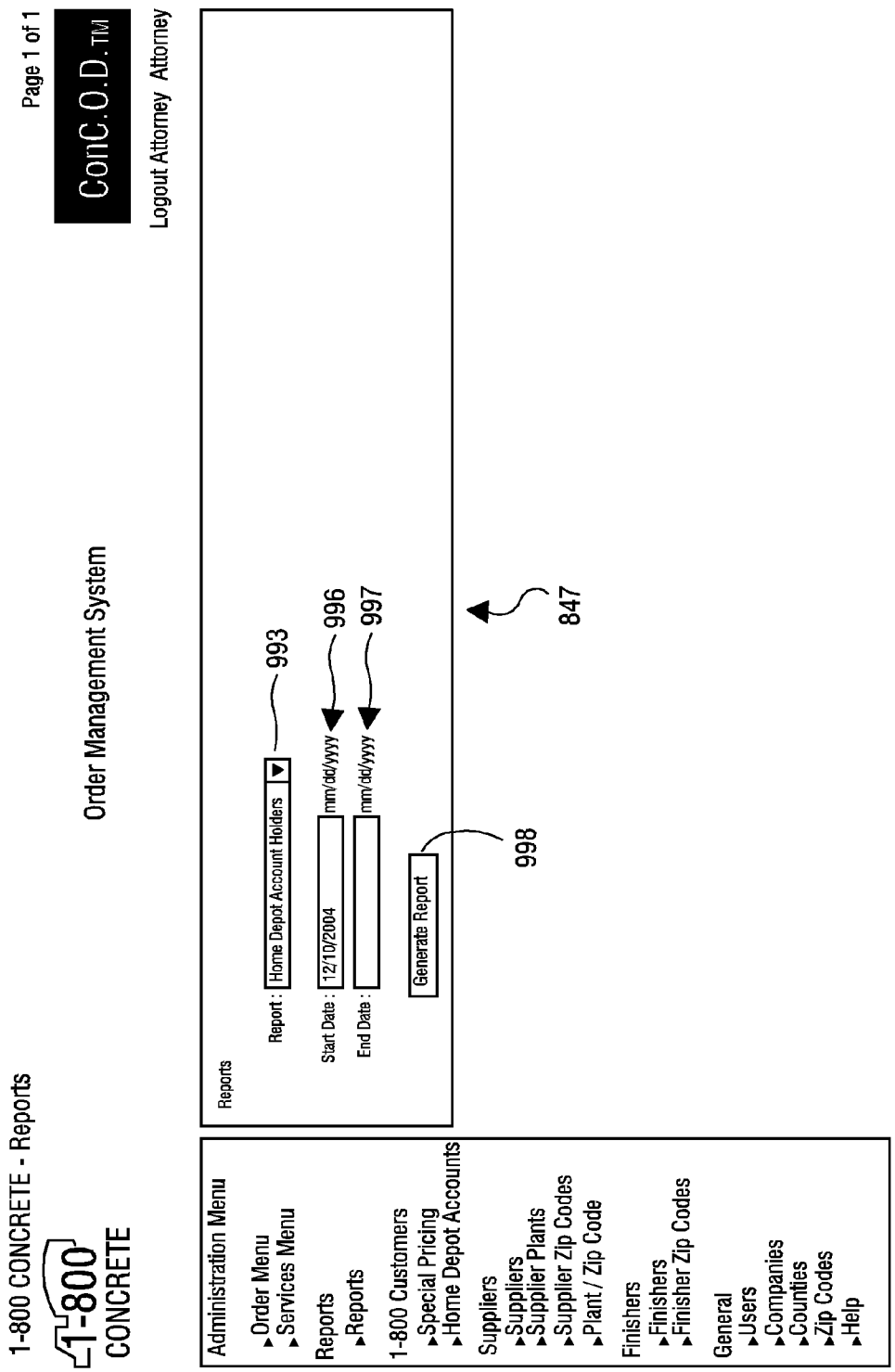
FIG. 65 illustrates a Home Depot account holders block, responsive to selection of the Home Depot account holders option in the report dropdown menu 993.

FIG. 65 illustrates a Home Depot account holders block, responsive to selection of the Home Depot account holders option in the report dropdown menu 993. Home Depot account holders block 847 includes the report dropdown menu 993, the start date entry window 996, the end date entry window 997, and the generate report icon 998.

FIG. 66 illustrates a Home Depot accounts report, responsive to the generate report icon 998 from FIG. 65. The Home Depot accounts report 953 includes an order number column, a name column, a yardage column, a delivery column, and additional charges column, a wheel barrel column and a total order column. Totals for the numerical values may also be calculated an listed as totals under the previously stated columns.

Figure 67:
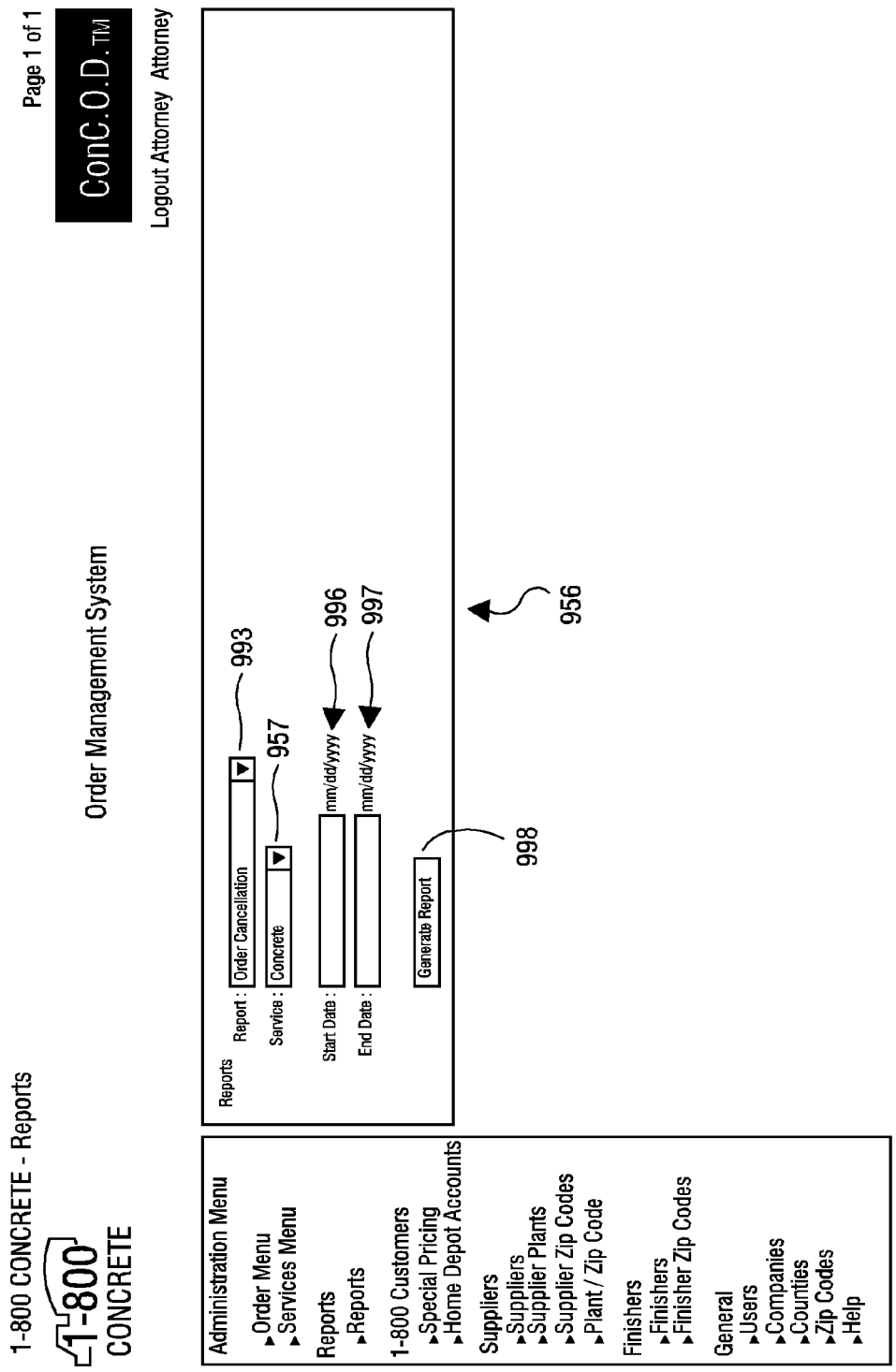
FIG. 67 illustrates an order cancellation block, responsive to the order cancellation option in the report dropdown menu 993.

FIG. 67 illustrates an order cancellation block, responsive to the order cancellation option in the report dropdown menu 993. The order cancellation block 956 includes the report dropdown menu 993, the start date entry window 996, the end date entry window 997, and the generate report icon 998. Also included in the order cancellation block 956 is service dropdown menu 957.

FIG. 68 illustrates an order cancellation report, responsive to selection of the generate report icon 998 from FIG. 67. The order cancellation report 984 includes an order number column, a yardage column, a total order column, a total refund column, a cancellation fee column, an estimate entered by column, and an order entered by column. As in the previous reports, totals for the numerical columns may be computed and displayed below the respective column.

Figure 69:
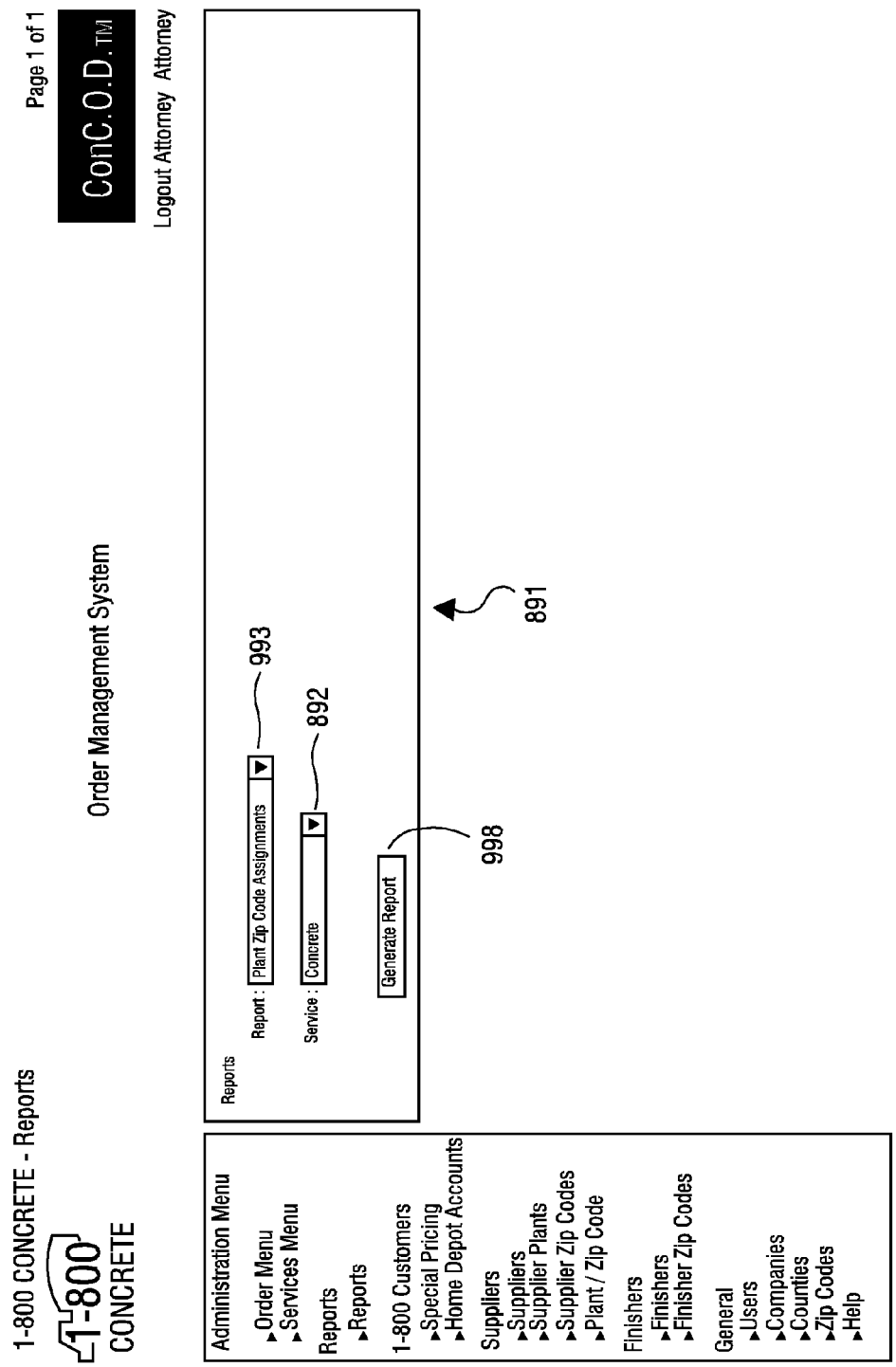
FIG. 69 illustrates a plant zip code assignments block, responsive to selection of the plant zip code assignments option in the report dropdown menu 993.

FIG. 69 illustrates a plant zip code assignments block, responsive to selection of the plant zip code assignments option in the report dropdown menu 993. The plant zip code assignments block 891 includes the report dropdown menu 993 and the generate report icon 998. Also included is a service dropdown menu 892.

FIG. 70 illustrates a plant zip code assignments report, responsive to selection of the generate report icon 998 from FIG. 69. The plant zip code assignments report 952 lists the supplier, the plants, and the zip codes that supplier and plant service. Also listed in the zip code column is the zip code ranking, which indicates the preferred zip codes for each supplier and plant.

Figure 71:
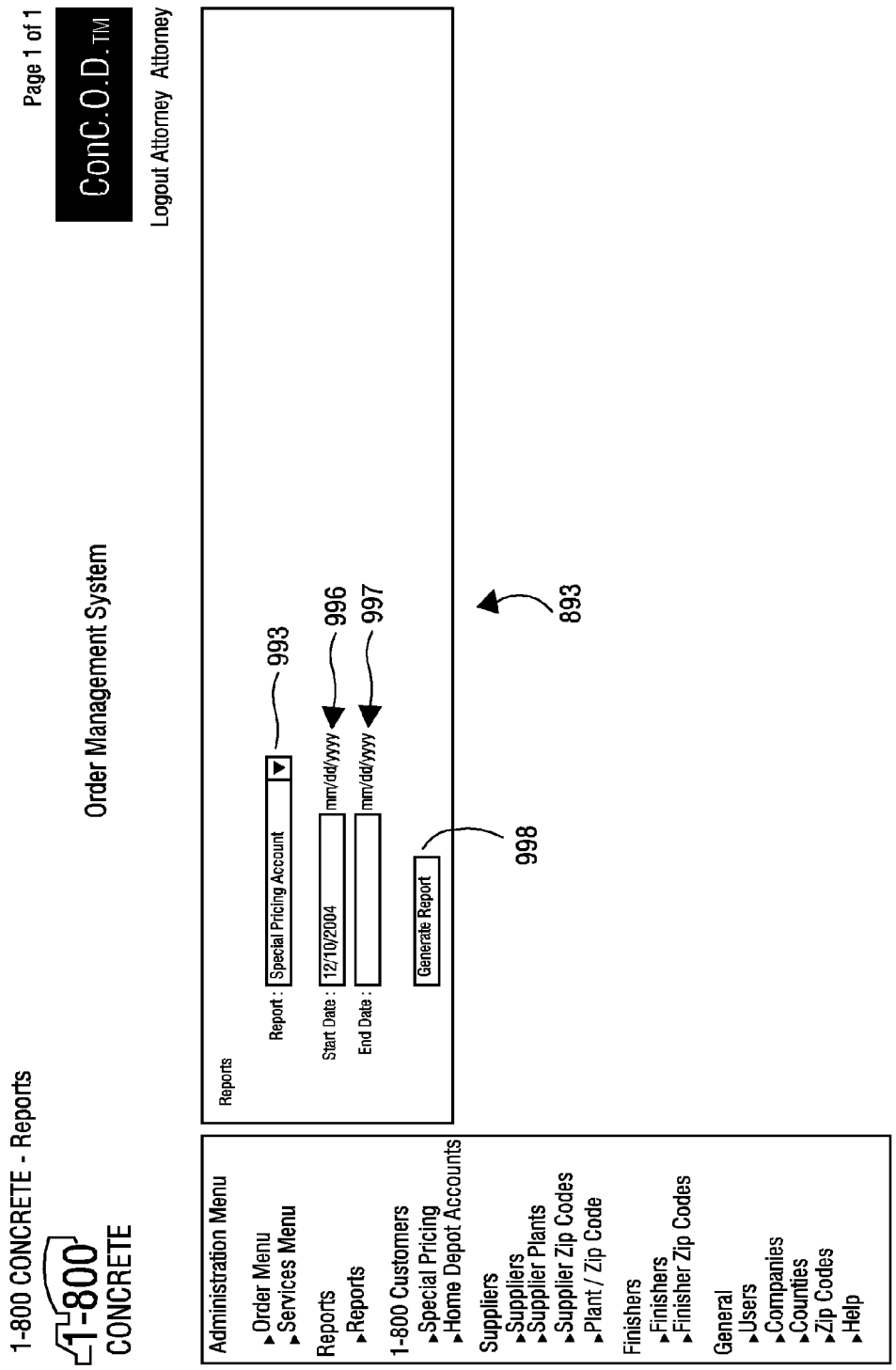
FIG. 71 illustrates a special pricing accounts block, responsive to selection of the special pricing accounts option from the report dropdown menu 993.

FIG. 71 illustrates a special pricing accounts block, responsive to selection of the special pricing accounts option from the report dropdown menu 993. The special pricing accounts block 893 includes the report dropdown menu 993, the start date entry window 996, the end date entry window 997, and the generate report icon 998.

Figure 72:
FIG. 72 illustrates a special pricing accounts report, responsive to selection of the generate report icon 998 from FIG. 71.

FIG. 72 illustrates a special pricing accounts report, responsive to selection of the generate report icon 998 from FIG. 71. The special pricing accounts report 894 may include a column for order number, name, yardage, delivery charge, additional charge, wheel barrel charge, and total order charge for each order. In addition, totals may be calculated and displayed for each of the numerical columns.

Figure 73:
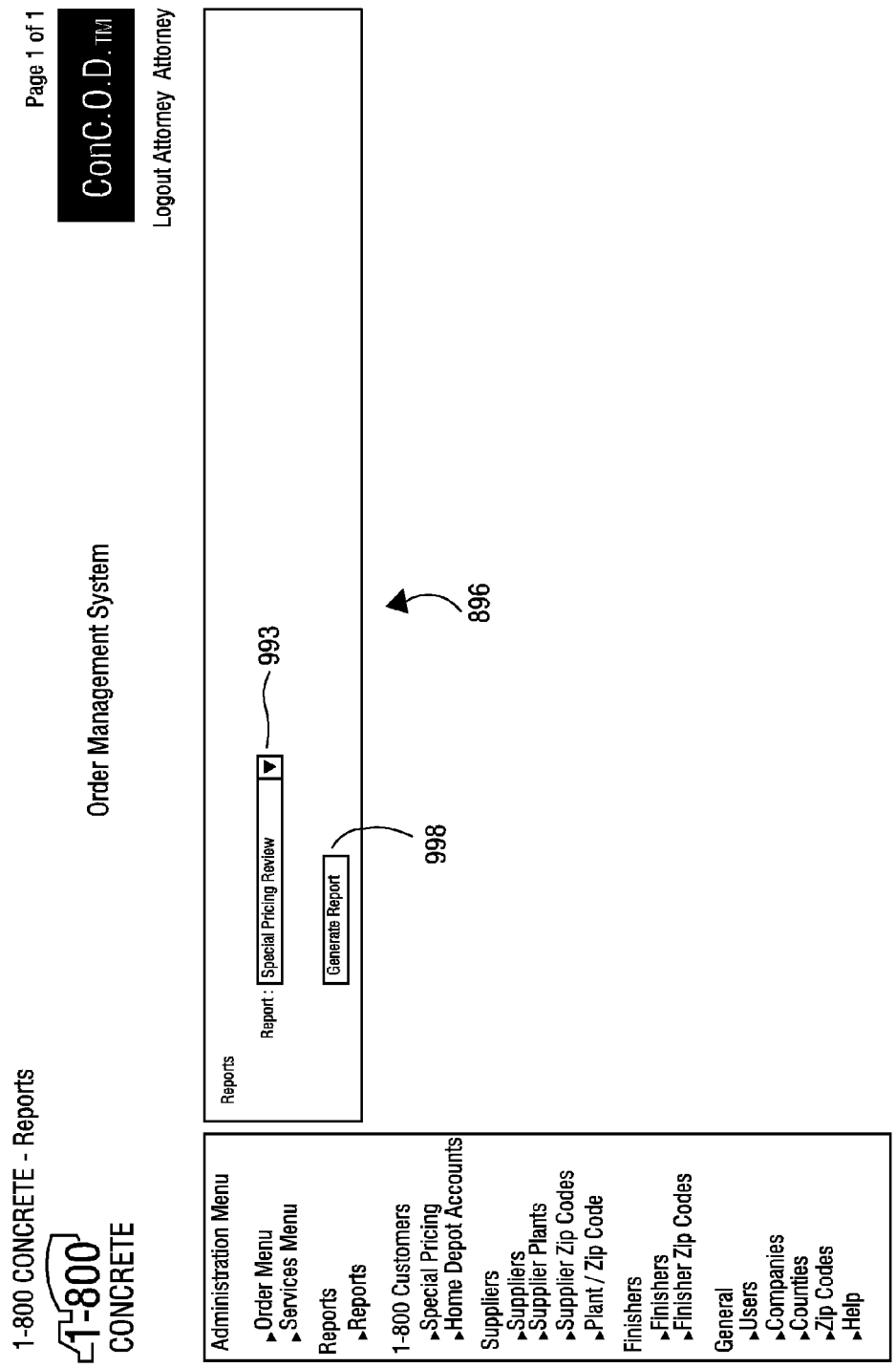
FIG. 73 illustrates a special pricing review block, responsive to selection of the special pricing review option in the report dropdown menu 993.

FIG. 73 illustrates a special pricing review block, responsive to selection of the special pricing review option in the report dropdown menu 993. The special pricing review block 896 includes the report dropdown menu 993 and the generate report icon 998.

FIG. 74 illustrates a special pricing review report, responsive to selection of the generate report icon 998 from FIG. 73. The special pricing review report 885 includes a column for account number, account holder, date last reviewed, Environmental charge, front charge, color charge, delivery charge, wheel barrel charge, standard time charge, and prime pack charge. Special pricing review report 885 may also include date of last mix review, date of last additive review, and date of last pump equipment review.

Figure 75:
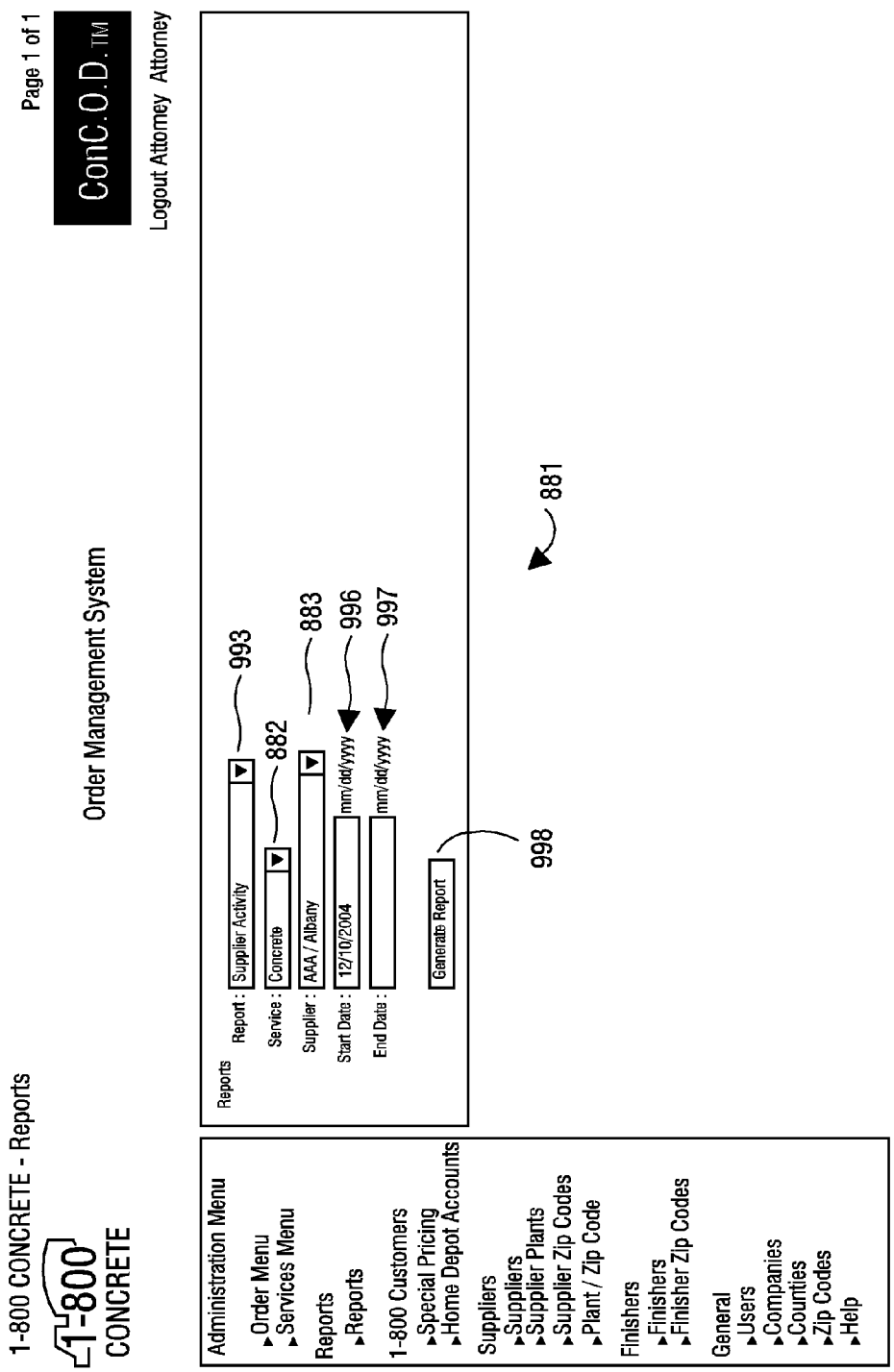
FIG. 75 illustrates a supplier activity report block, responsive to selection of the supplier activity option in the report dropdown menu 993.

FIG. 75 illustrates a supplier activity report block, responsive to selection of the supplier activity option in the report dropdown menu 993. The supplier activity block 881 include the report dropdown menu 993, the start date entry window 996, the end date entry window 997, and the generate report icon 998. Also included in the supplier activity block 881 is a service dropdown menu 882, and a supplier dropdown menu 883.

FIG. 76 illustrates a supplier activity report, responsive to selection of the generate report icon 998 from FIG. 75. The supplier activity report 88f includes columns for order number, yardage delivery fee, additional charges, wheel barrel fee and total order charge. As with reports described above, totals for the numerical valued columns may be calculated and displayed at the bottom of the report.

Figure 77:
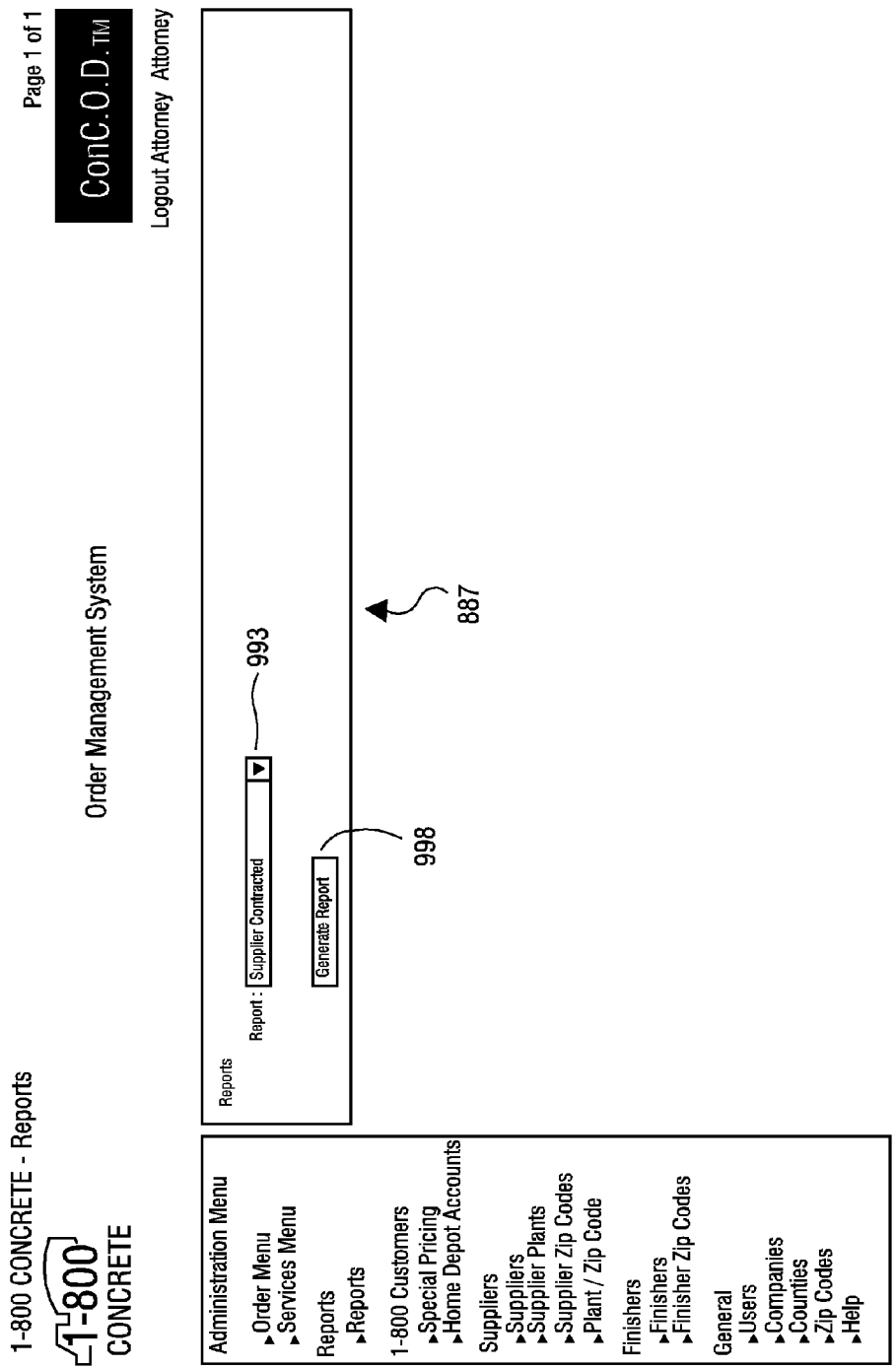
FIG. 77 illustrates a supplier contacted block, responsive to selection of the supplier contacted option in the report dropdown menu 993.

FIG. 77 illustrates a supplier contacted block, responsive to selection of the supplier contacted option in the report dropdown menu 993. The supplier contacted block 887 includes the report dropdown menu 993 and the generate report icon 998.

Figure 78:
FIG. 78 illustrates a supplier contacted report, responsive to selection of the generate report icon 998 from FIG. 77.

FIG. 78 illustrates a supplier contacted report, responsive to selection of the generate report icon 998 from FIG. 77. The supplier contacted report 888 includes a supplier column, an amount column and a # times contacted column. Totals may be calculated and displayed at the bottom of the report.

Figure 79:
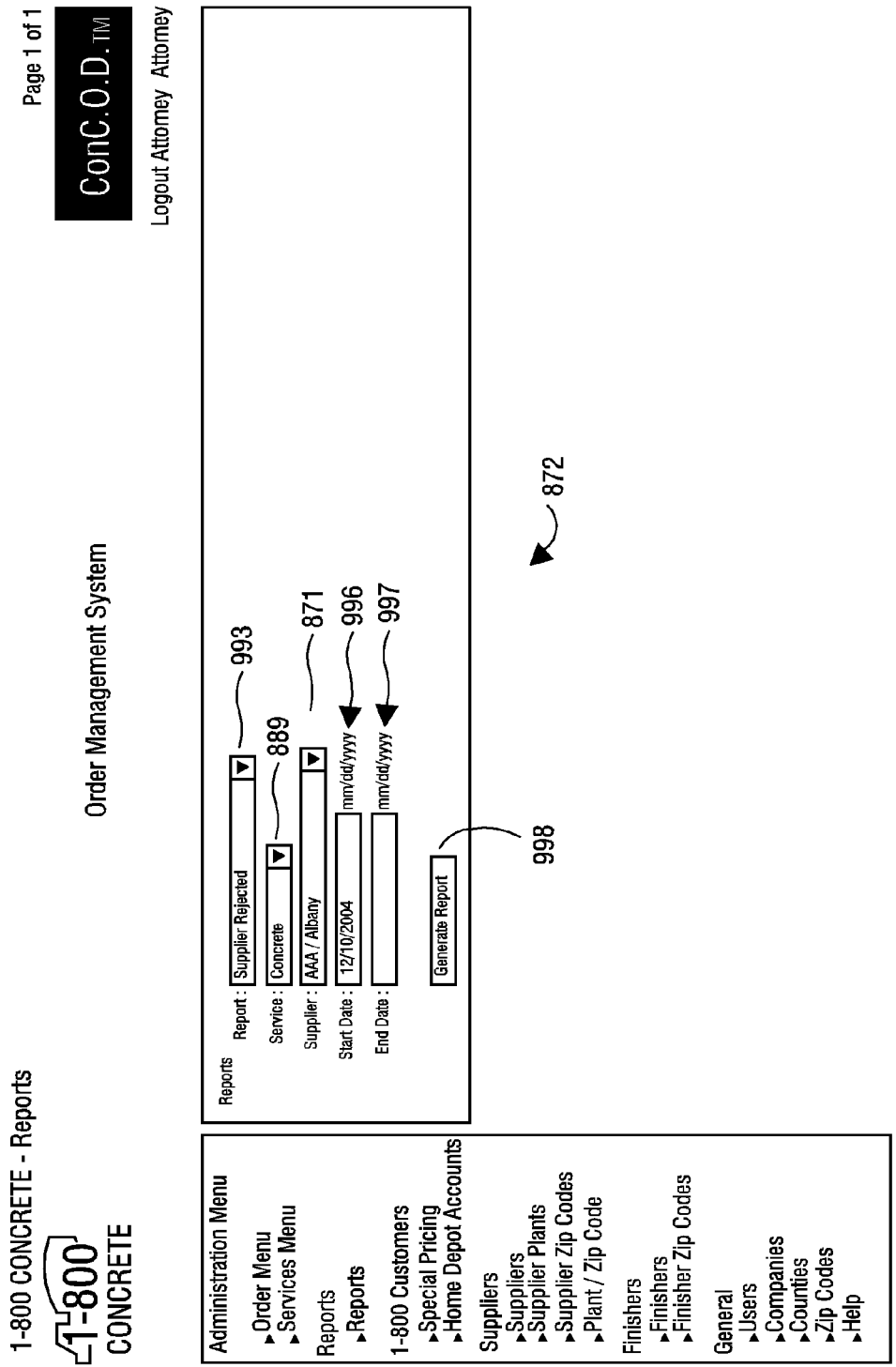
FIG. 79 illustrates a supplier rejected block, responsive to selection of the supplier rejected option from the report dropdown menu 993.

FIG. 79 illustrates a supplier rejected block, responsive to selection of the supplier rejected option from the report dropdown menu 993. The supplier rejected block 872 includes the report dropdown menu 993, the start date entry window 996, the end date entry window 997, and the generate report icon 998. The supplier rejected block 872 also includes a service dropdown menu 889, and a supplier dropdown menu 871.

FIG. 80 illustrates a supplier rejected report, responsive to selection of the generate report icon 998 from FIG. 79. The supplier rejected report 873 includes a plant column, and estimate number column, a date rejected column, a yardage column, a spoke with column, and a reason column. Totals may be calculated and displayed for each of the columns that contain numerical values.

FIG. 81 illustrates a supplier zip code assignments block, responsive to selection of the supplier code assignments option in report dropdown menu 993. The supplier zip code assignments block 874 includes the report dropdown menu 993, and the generate report icon 998. Also included is a service dropdown menu 875, a state dropdown menu 876, and a supplier/plant checkbox option 877.

FIG. 82 illustrates a supplier zip code assignment report, responsive to selection of the generate report icon 998 from FIG. 81. The supplier zip code assignment report 878 includes a listing of zip codes and the suppliers who service that zip code. As shown in FIG. 82, where no suppliers currently service a particular area, "assign supplier" is listed.

Figure 83:
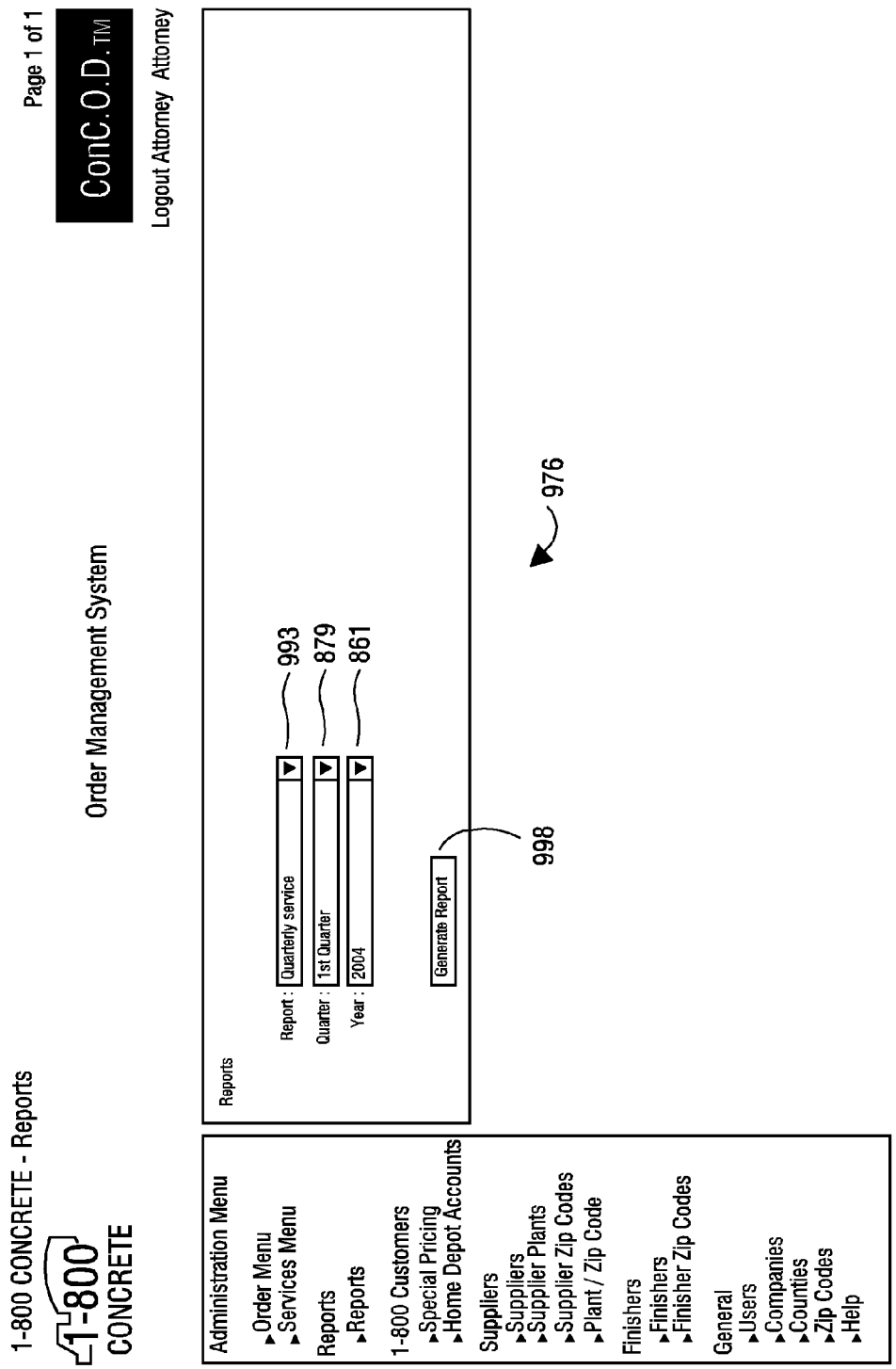
FIG. 83 illustrates a quarterly service block 976, responsive to selection of the quarterly service option in the report dropdown menu 993.

FIG. 83 illustrates a quarterly service block 976, responsive to selection of the quarterly service option in the report dropdown menu 993. Quarterly service block 976 includes the report dropdown menu 993 and the generate report icon 998. Also included are a quarter dropdown menu 879, and a year dropdown menu 861.

Figure 84:
FIG. 84 illustrates a quarterly service report, responsive to selection of the generate report icon 998 from FIG. 83.

FIG. 84 illustrates a quarterly service report, responsive to selection of the generate report icon 998 from FIG. 83. The quarterly service report 978 includes a quarter column, a total orders column, and a yardage column. Totals for the total orders and yardage columns may be calculated and displayed at the bottom of the report.

Figure 85:
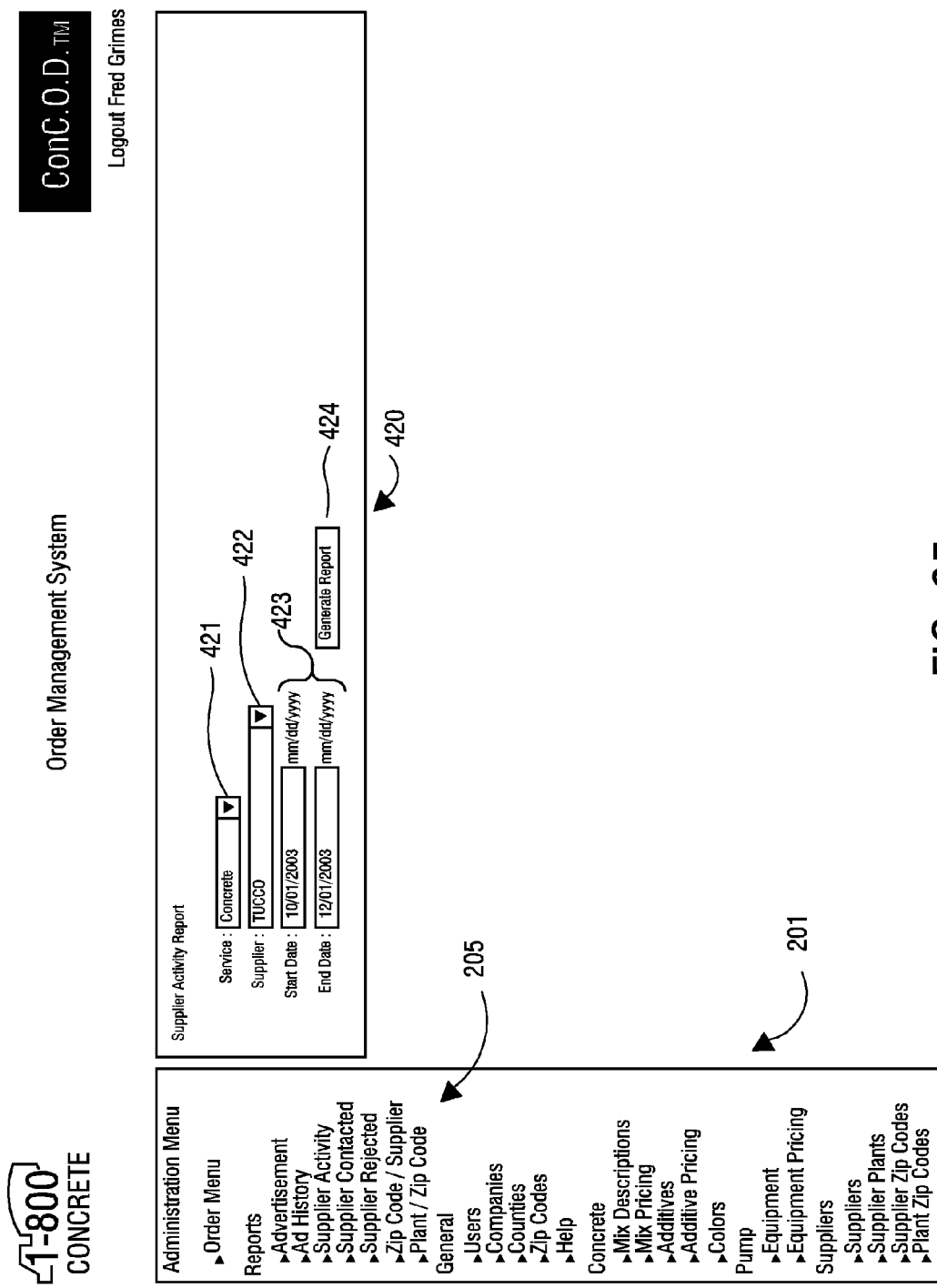
FIG. 85 is an example supplier activity report screen, responsive to selection of the supplier activity subject icon from the reports subject group 205.
Figure 86:
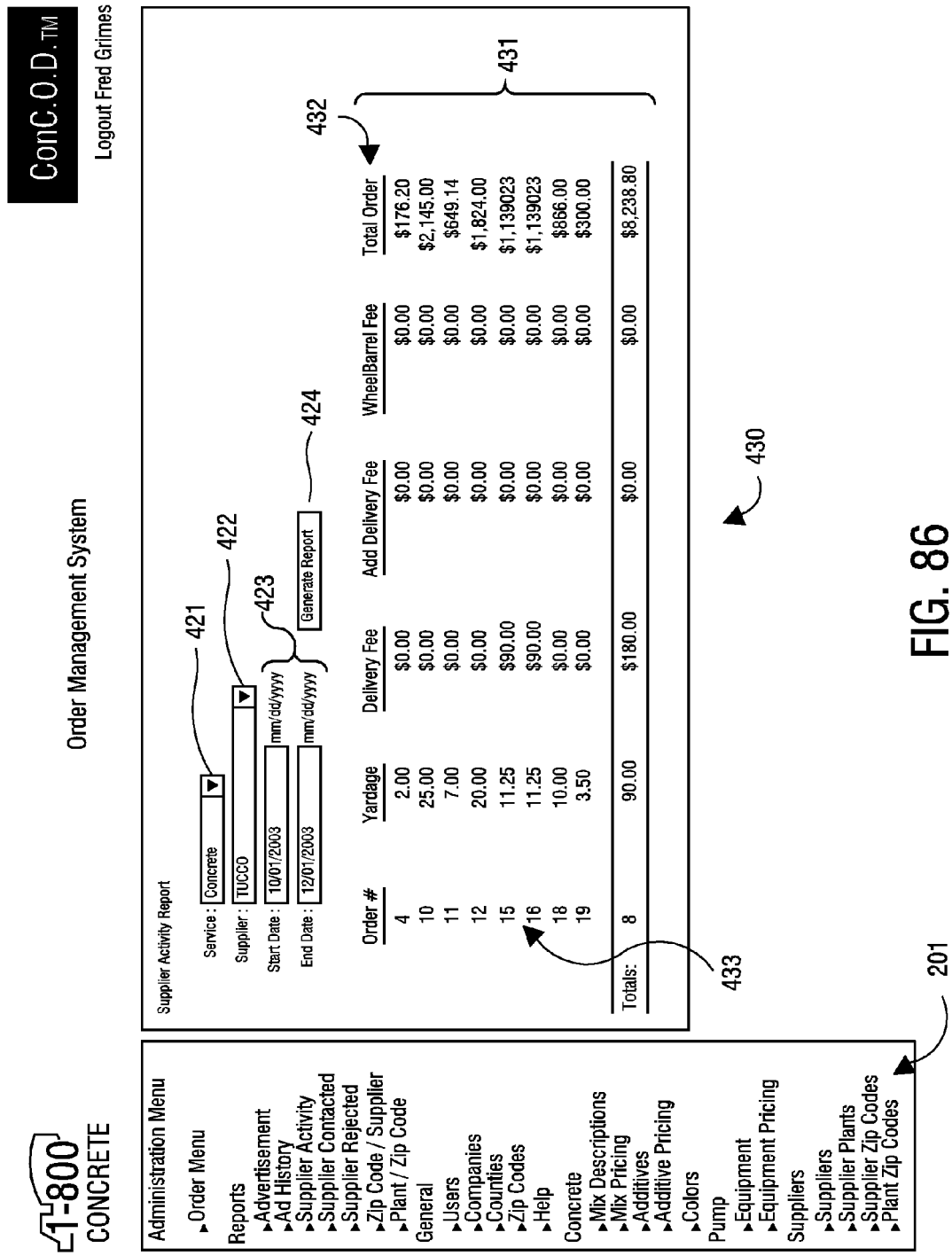
FIG. 86 is an example supplier activity report screen responsive to the generate report icon 424 of FIG. 85.

FIG. 85 is an example supplier activity report screen, responsive to selection of the supplier activity subject icon from the reports subject group 205. The supplier activity report screen may allow the user to determine a supplier's activity within the order management system over a given period of time. For example, the user may select a desired service, such as concrete, lumber, pump equipment, etc. from the service drop down menu 421 for a given supplier selected using the supplier drop down menu 422. The user may then enter a desired start date and end date in the time period entry windows 423 and may select the generate report button icon 424. Responsive to selection of the generate report button icon 424, the order management system generates a report listing information related to the desired supplier for the desired service over the desired time span, that information to include, but not limited to order number, yardage, delivery fees, additional delivery fees, total order amount, etc. As shown, order number icons 433 may allow customer orders to be viewed by merely selecting the order number as listed in the order number column, as shown in FIG. 86. For example, selection of the order number icon 433 for order number 15 results in the display of the view order screen shown in FIGS. 87A-B.

FIG. 86 is an example supplier activity report screen responsive to the generate report icon 424 from FIG. 85. As illustrated in FIG. 86, concrete has been selected in the supplier dropdown menu 422. The start date and end date have been entered into the time period entry windows 423. By selecting the generate report button icon 424, a list of orders 431 may be displayed, which includes data such as total order data 432 order #15 (labeled as 433) may be seledted to be displayed as in FIGS. 87A-B.

FIGS. 87A-B illustrate an example view order screen, responsive to selecting order #15 icon 433. As illustrated in FIGS. 87A-B, various data may be conveyed about the present order. In addition the user may select any of a plurality of options including, but not limited to, print reorder, canceling the order, deleting the order and rewinding the order.

Figure 88:
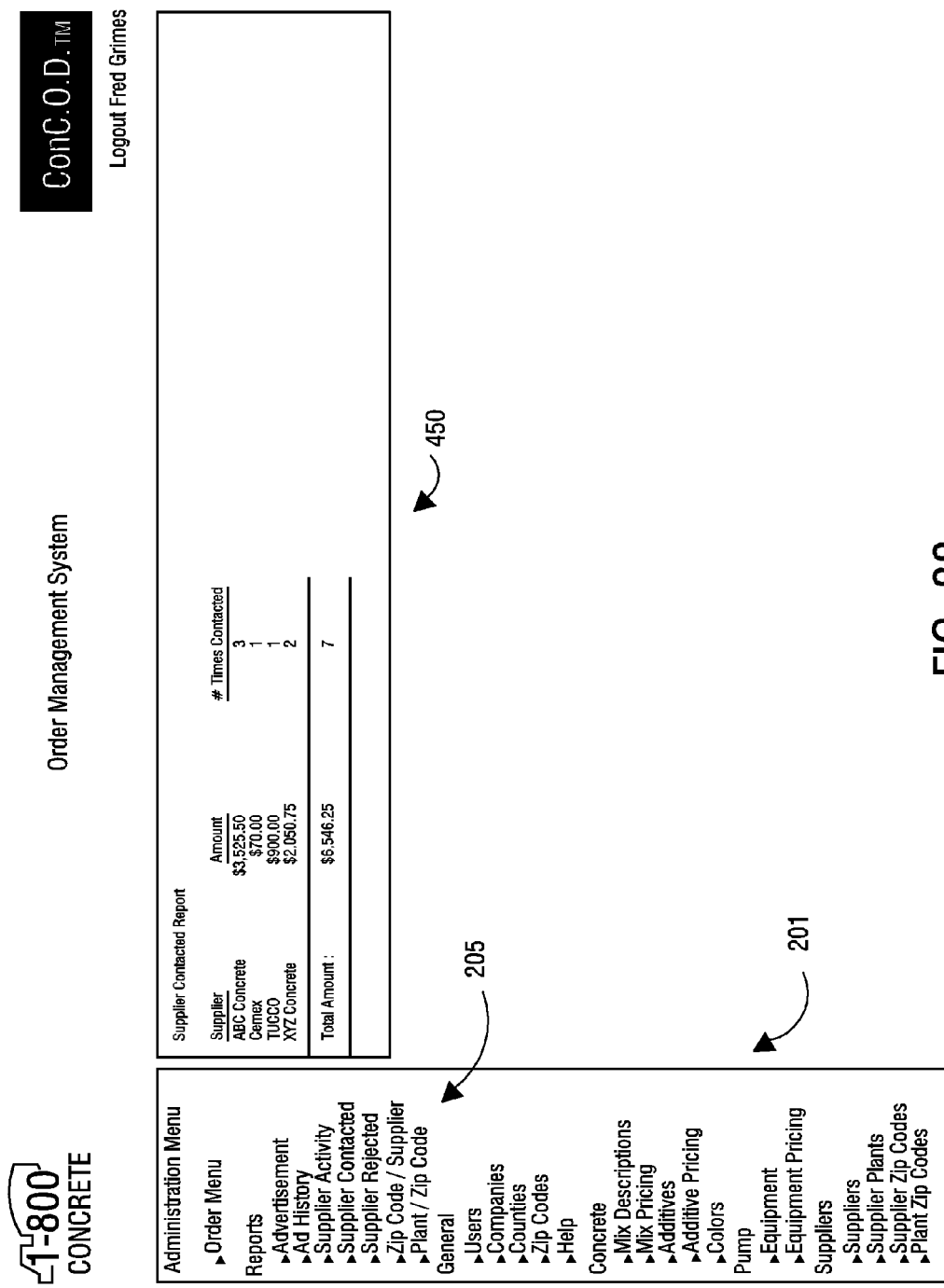
FIG. 88 illustrates an example supplier contacted report screen, responsive to selection of the supplier contacted subject icon of the reports subject group 205, of administration menu 201.

FIG. 88 illustrates an example supplier contacted report screen that is responsive to selection of the supplier contacted subject icon of the reports subject group 205. The supplier contacted report screen may include a supplier contacted block 450 that includes information as to the supplier contacted, the number of times contacted, and the amount of revenue generated for that supplier. The information displayed in the supplier contacted report block 450 may be generated by the order management system by accessing the information previously entered while generating estimates and orders, and recorded in databases.

FIG. 89 illustrates an example supplier rejected report screen, responsive to selection of the supplier rejected subject icon from the reports subject group 205. The supplier rejected report screen may include a supplier rejected report block 460 having a number of data fields 461 that provide information as to which suppliers, what date, and what reason, was given for rejecting a potential order. This information may be entered into a database of the order management system when a supplier rejects an order during the estimation process. For example, when a user selects a reject data checkbox 144, as shown in FIG. 21, the user may be prompted to elicit information related to the reason for rejection from a contact person from the specific supplier. This information may then be stored in a database of the order management system and used to generate the supplier rejected report.

Figure 90:
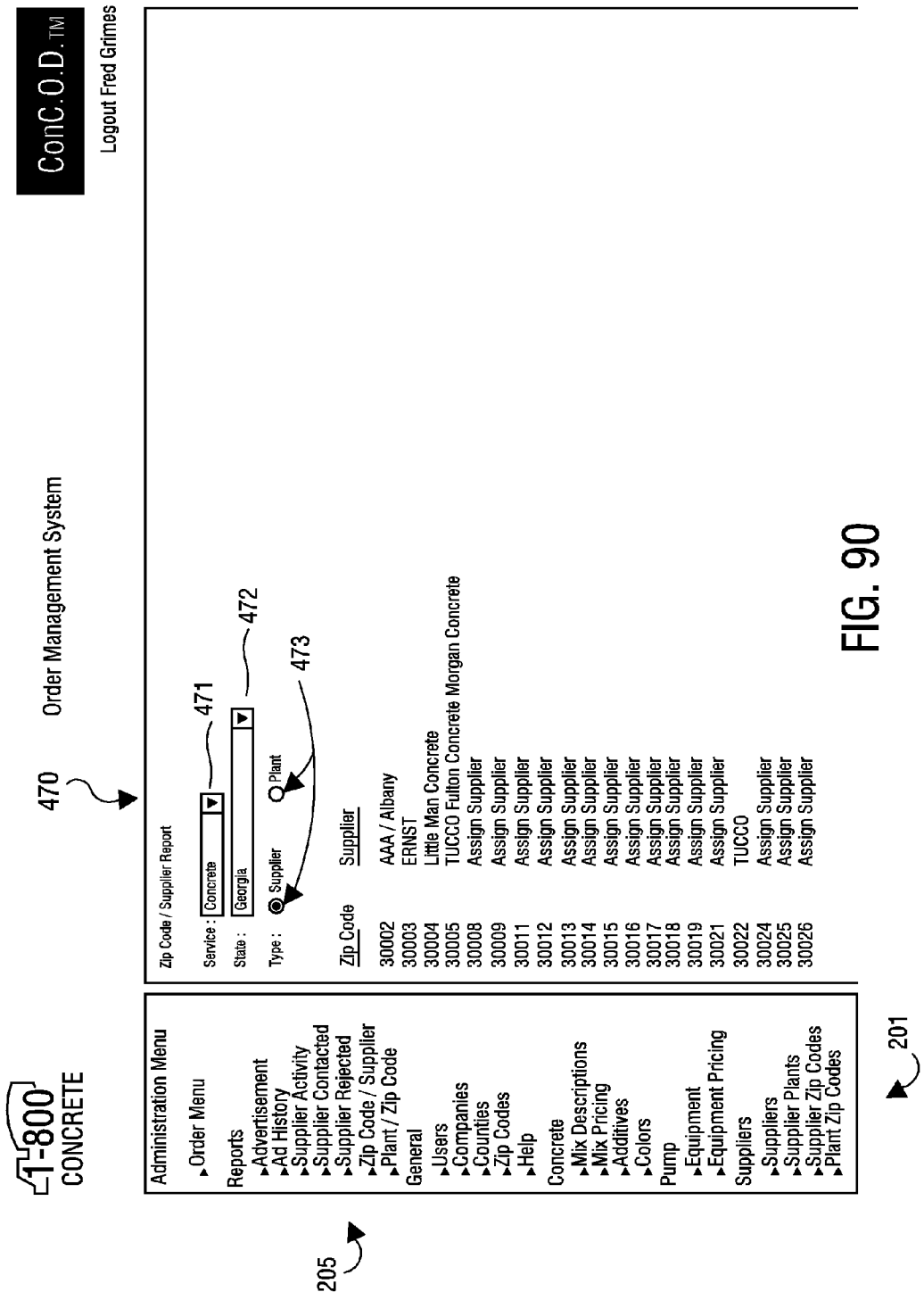
FIG. 90 is an example zip code/supplier report screen, responsive to selecting the zip code/supplier subject icon from the report subject group 205 of administration menu 201.

FIG. 90 is an example zip code/supplier report screen that is responsive to selecting the zip code/supplier subject icon from the report subject group 205. A zip code/supplier report block 470 may include a services drop down menu 471, a state drop down menu 472, and data checkboxes 473 for selecting either suppliers or plants. To generate the zip code/supplier report, a user selects a desired service from the service drop down menu 471, the desired state from the state drop down menu 472, and whether the report is to be generated for suppliers or plants by selecting the desired data checkbox 473. As shown, based on the selections made by the user, the zip code/supplier report may indicate which suppliers provide concrete for each zip code within the state of Georgia. As shown in FIG. 91, by selecting the plant data checkbox 473, the report indicates which customer plants of the suppliers provide concrete for the customer zip codes within the state of Georgia.

FIG. 91 is an example zip code/supplier report screen similar to FIG. 90, with plant data checkbox selected. As in FIG. 90, the service dropdown menu 471 and state dropdown menu 472 have been coupled. However, in FIG. 91, plant data checkbox has been selected.

FIG. 92 illustrates a plant/zip code report, responsive to selecting the plant/zip code subject icon from the reports subject group 205. As shown, the plant/zip code report may relay information as to each zip code serviced by a plant of a specific supplier, and indicates the ranking of that plant relative to the ranking of various other plants that service that same zip code.

FIG. 93 is an example user listing screen, responsive to selection of the users subject icon from the general subject group 206. The user listing screen may include a user listing block 500 including a data field drop down menu 501, a value entry window 502, a filter button icon 503 and a reset button icon 504. The list of users displayed in the user block 507 can be searched according to the various data fields 505 by selecting the desired data field from the data field drop down menu 501 and entering the desired information in the value entry window 502. Selection of the filter button icon 503 will result in the display of those users wherein the information entered in the value entry window 502 was found in the selected data field 505. Selection of the reset button icon 504 may clear the information from the data field drop down menu 501 and value entry window 502. In addition, selecting an add user button icon 506 allows for the addition of another user.

Figure 94:
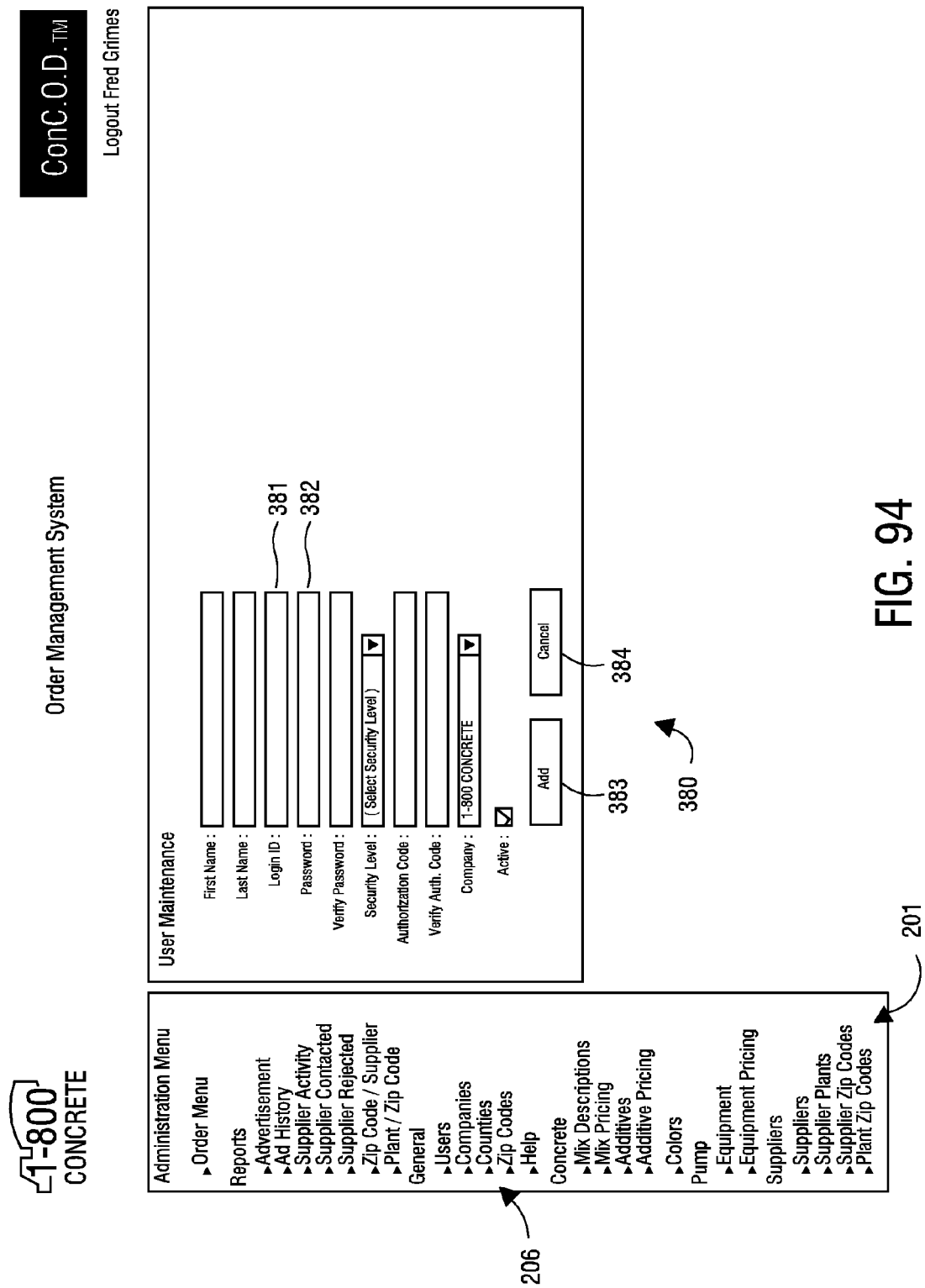
FIG. 94 illustrates the user maintenance screen of FIG. 45, responsive to selection of the add user button icon 506 of FIG. 93.

FIG. 94 illustrates the user maintenance screen, previously shown in FIG. 45, being responsive to selection of the add user button icon 506 of FIG. 93. Once again, a user may be added to the user listing block 507 by entering the required information within the various fields of the user maintenance screen and selecting the add button icon 383. Also included in user maintenance block 380 is a login ID window 381, password window 382, and cancel button icon 384.

Figure 95:
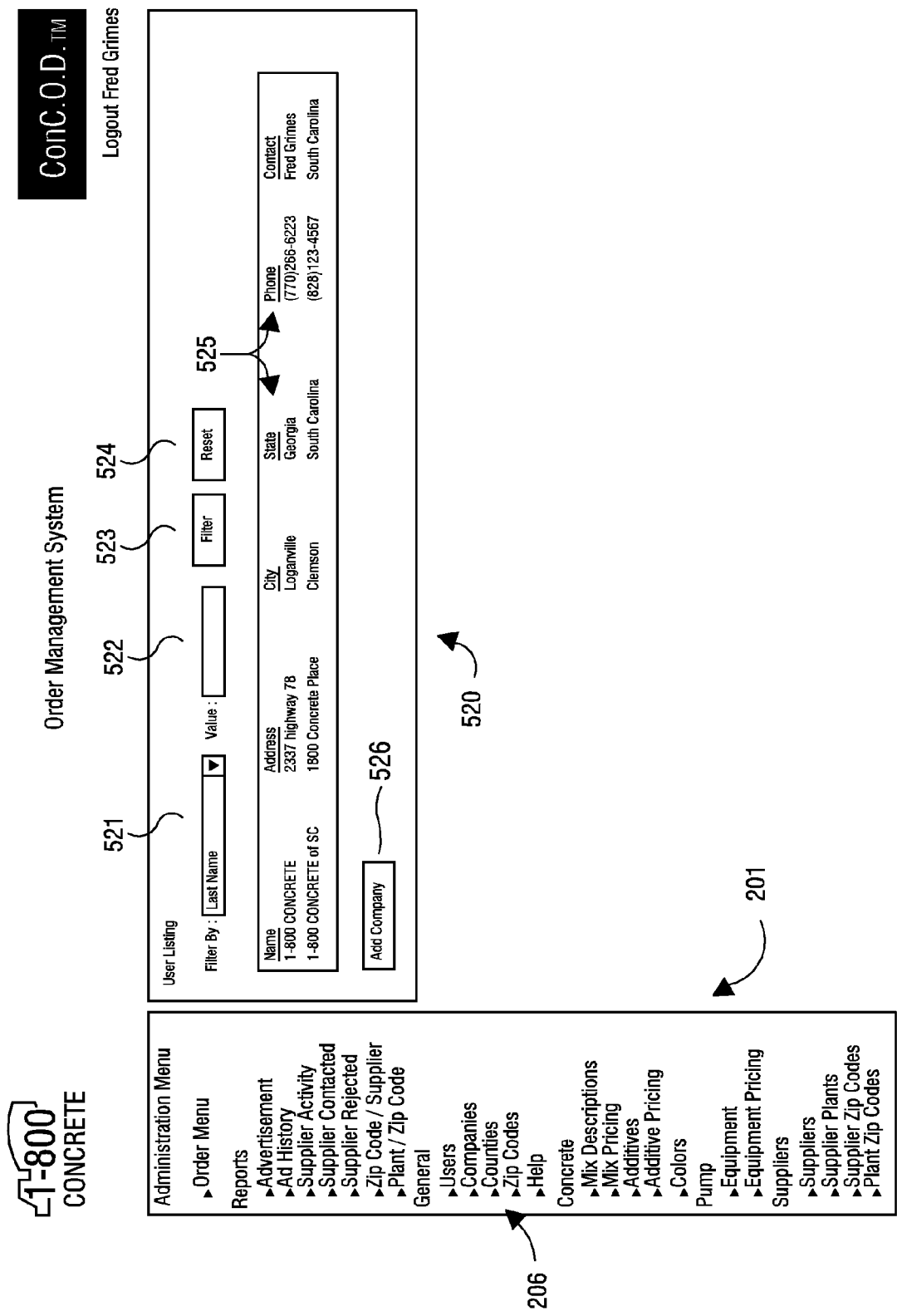
FIG. 95 illustrates an example company listing screen, responsive to selection of the company subject icon from the general subjects group 206.

FIG. 95 illustrates an example company listing screen, responsive to selection of the company subject icon from the general subjects group 206. Similar to the operation of the user listing screen shown in FIG. 93, a company may be searched for by selecting a desired data field 525 from the data field drop down menu 521 and entering desired information in the value entry window 522. Selection of the filter button icon 523 causes the order management system to search for the information displayed in the value entry window 522 in the selected data field. Selection of the reset button icon 524 causes the selected information in the data field drop down menu 521 and value entry window 522 to be cleared.

Figure 96:
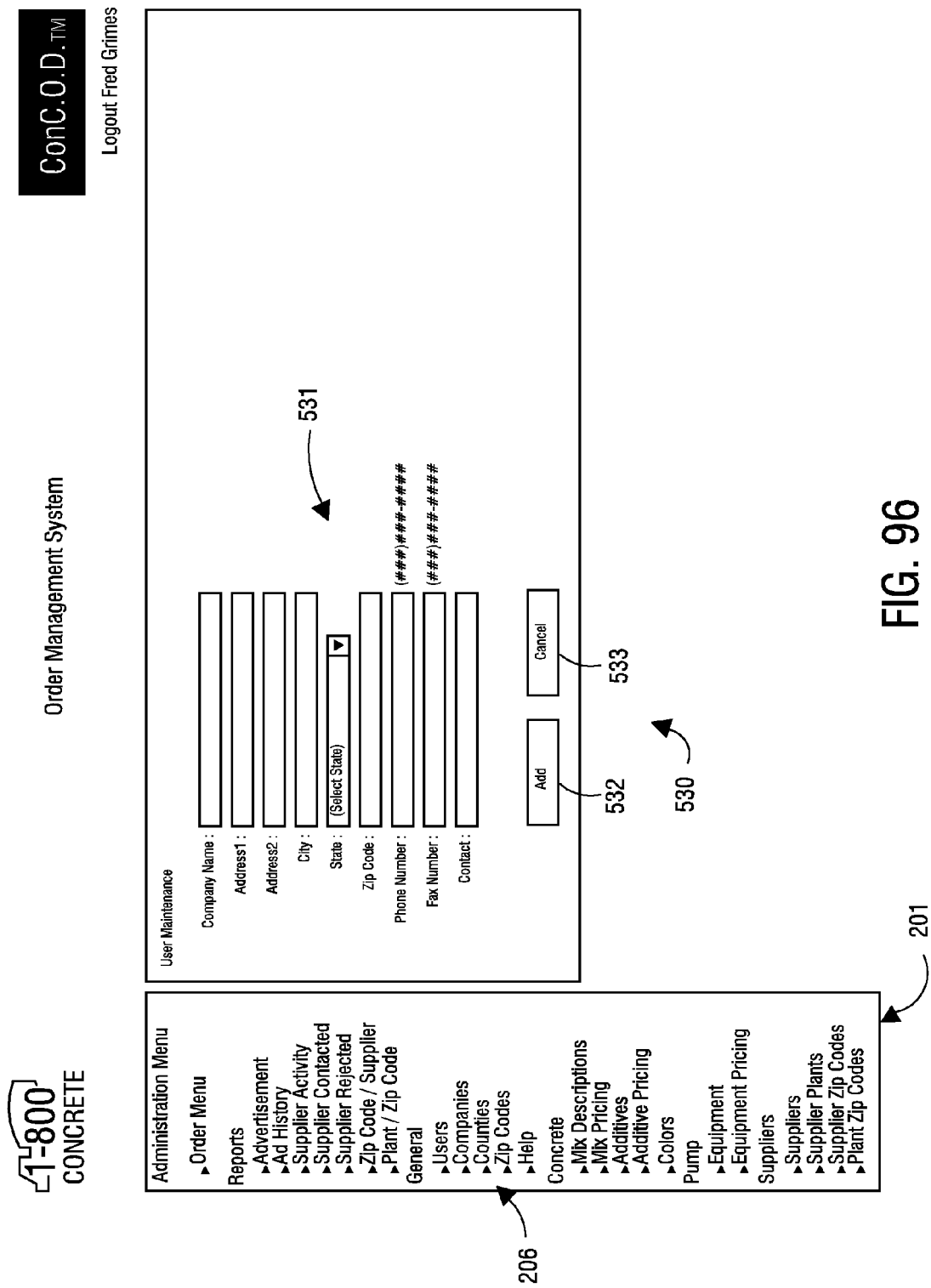
FIG. 96 illustrates an example company maintenance screen, responsive to selection of the add company button icon 526 of FIG. 95.

FIG. 96 illustrates an example company maintenance screen, responsive to selection of the add company button icon 526 shown in FIG. 95. A company may be added to the database of the order management system, and therefore the company listing screen, by entering the required information in the information entry windows 531 located in company maintenance block 530, and selecting the add button icon 532. Selection of the cancel button icon 533 causes the order management system to return to the company listing screen shown in FIG. 95.

Figure 97A:
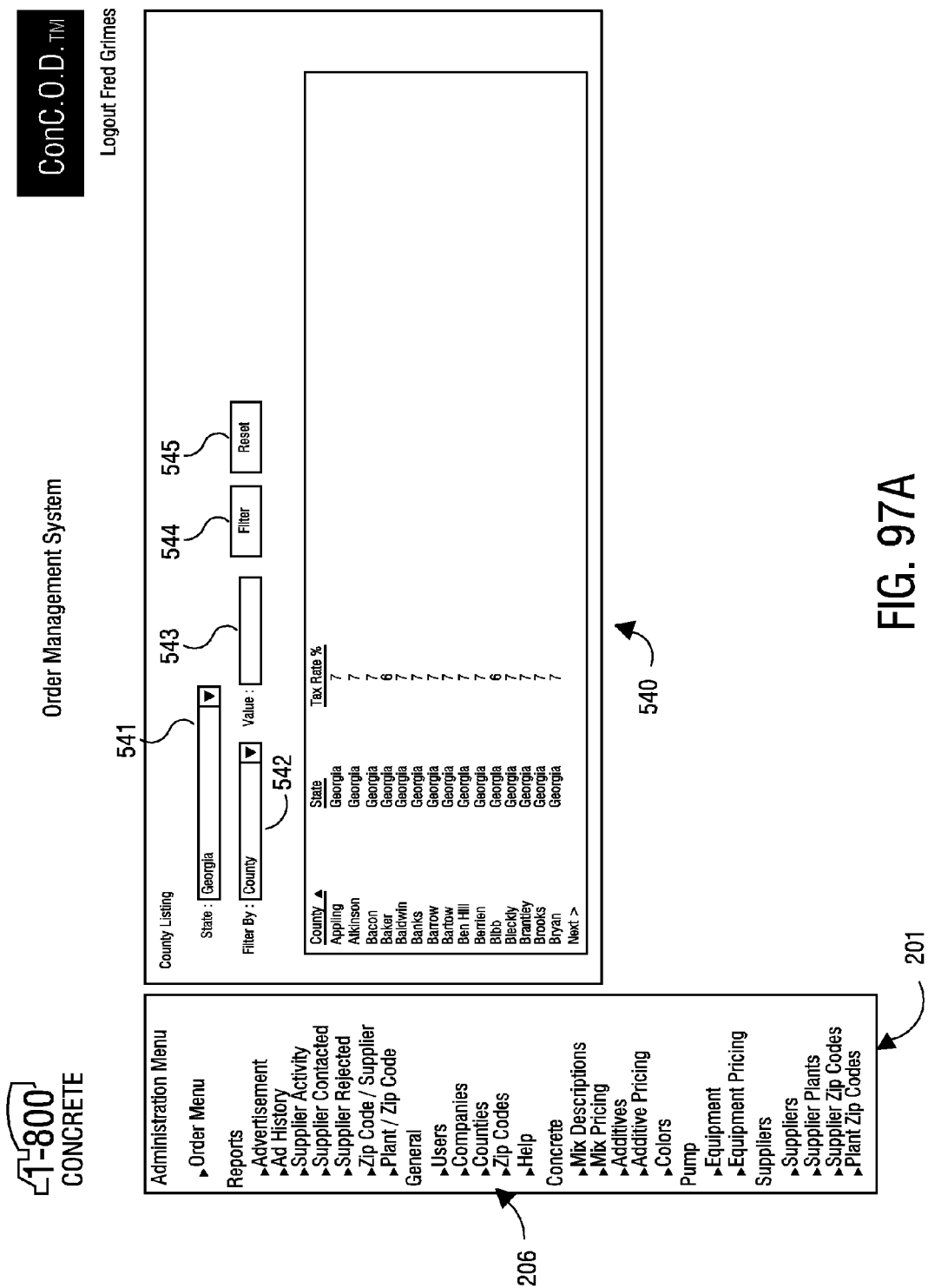
FIG. 97A is an example county listing screen, responsive to selection of the counties subject icon from the general subject group 206.

FIG. 97A is an example county listing screen, responsive to selection of the counties subject icon from the general subject group 206. A county listing block 540 may include a state drop down menu 541, a data field drop down menu 542, and a value entry window 543. Selection of the desired state from the state drop down menu 541 may cause the counties within that state as well as their applicable tax rates to be displayed. Next, the user may select either county or tax rate with the data field drop down menu 542 (county is shown), and then may enter the desired information in the value entry window 543. For example, entering the name of a desired county in the value entry window 543 and selection of the filter button icon 544 results in the display of the tax rate for that desired county. Selection of the reset button icon 545 clears the previously chosen and entered information.

Figure 97B:
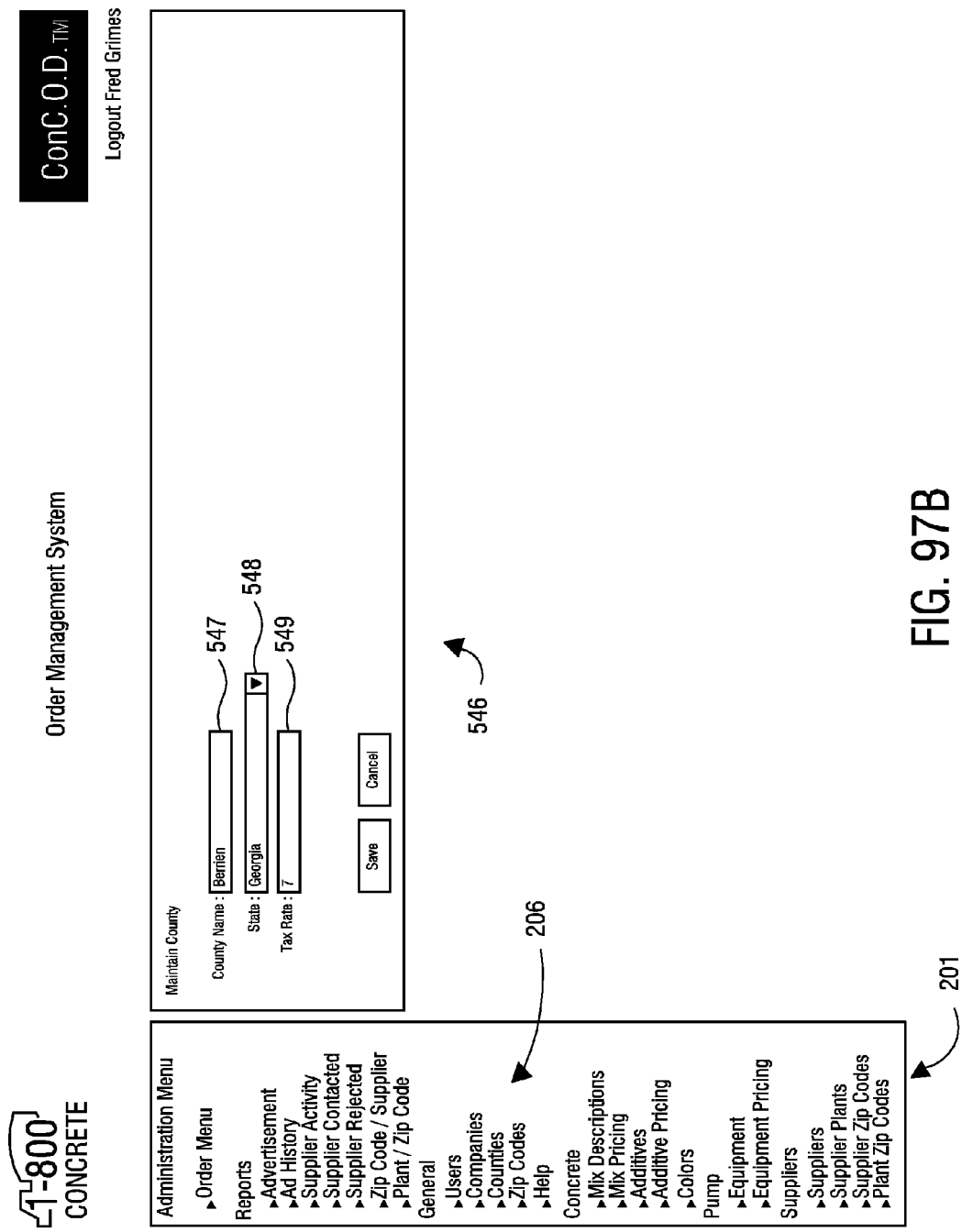
FIG. 97B illustrates an example county maintenance screen, responsive to the user selecting a county from the list of counties in FIG. 54.

FIG. 97B illustrates an example county maintenance screen that is responsive to the user selecting a country from the list of counties in FIG. 54. A county maintenance block 546 may include a county name entry window 547, a state drop down means 548, and a tax rate entry window 549. To enter or change a tax rate for a given county, the user may amend the information displayed and selects the same button icon. The cancel button icon returns the user to the county listing screen shown in FIG. 97A.

Figure 98:
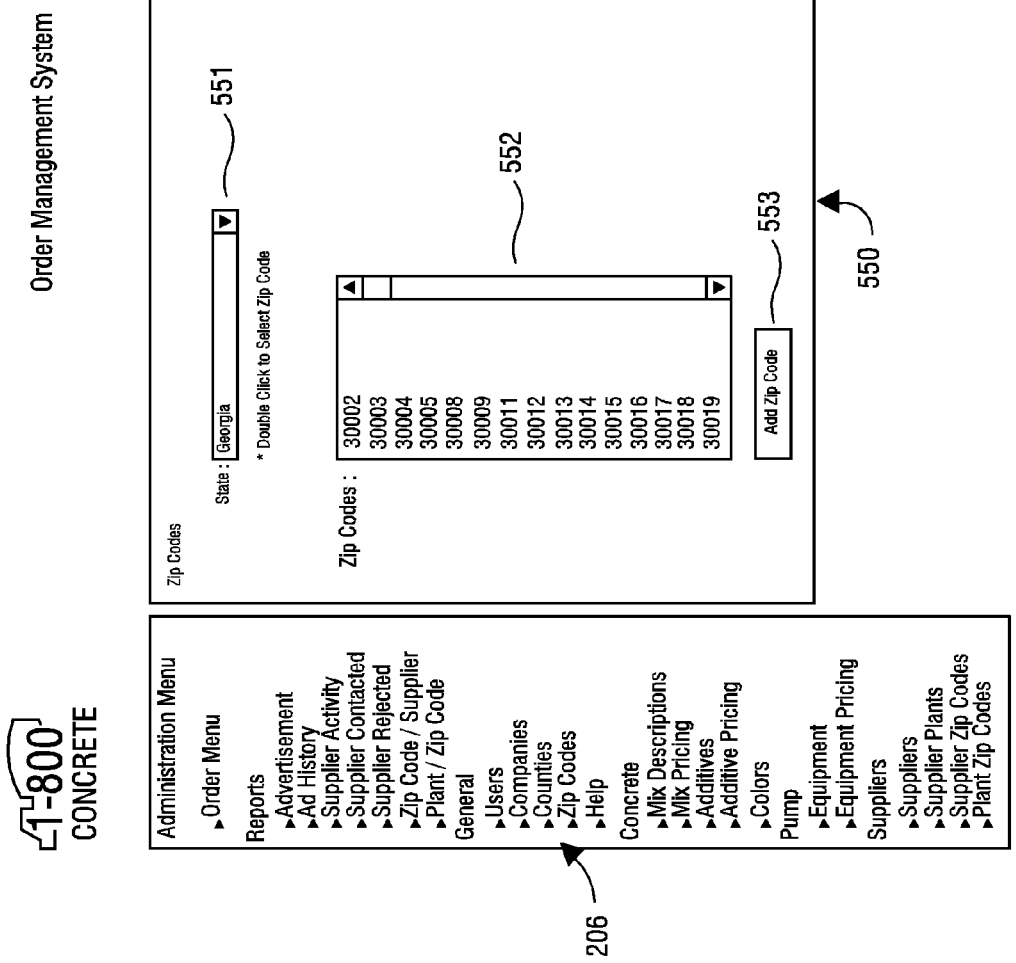
FIG. 98 illustrates an example zip code screen, responsive to selection of the zip code subject title from the general subject group 206.
Figure 99:
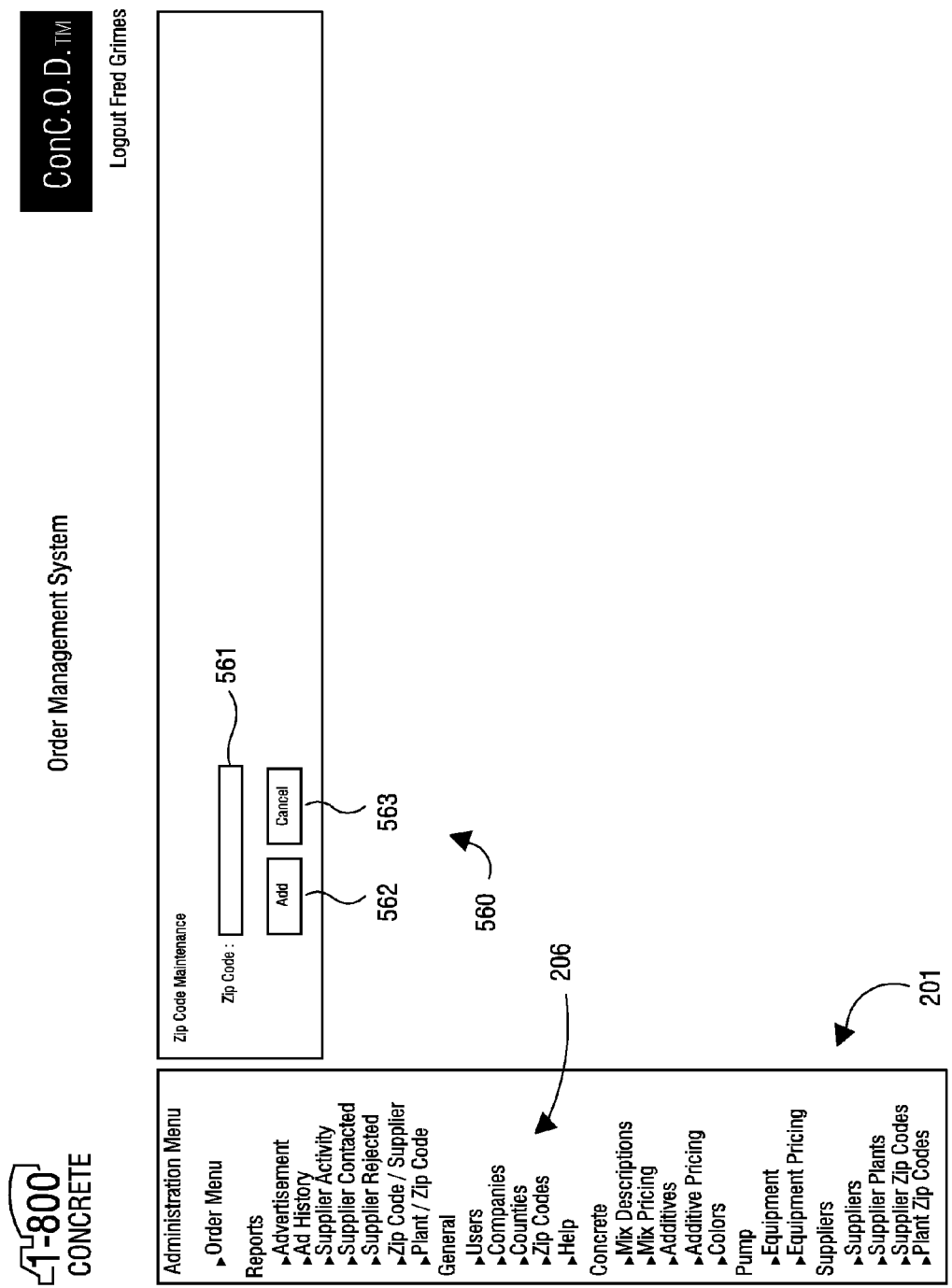
FIG. 99 is an example zip code maintenance screen, responsive to selection of add zip code icon 553 of FIG. 98.

FIG. 98 illustrates an example zip code screen, responsive to selection of the zip code subject title from the general subject group 206. The zip code block 550 may include a state pull down menu 551 and a list 552 of all the zip codes previously entered for that state. The example zip code maintenance screen shown in FIG. 99 may be responsive to either double clicking on a selected zip code from the list 552 shown in FIG. 98 or selecting the add zip code button icon 553, also shown in FIG. 98. When the zip code maintenance screen is accessed by double clicking on a desired zip code, that zip code may be displayed within the zip code entry window 561, and may be amended. When the zip code maintenance screen is accessed by way of the add zip code button icon 553, the zip code entry window 561 may be blank, as shown in FIG. 99. Selection of the add button icon 562 after either amending or adding a zip code in the zip code entry window 561 may commit that zip code to a database of the order management system. Selecting the cancel button icon 563 will result in the user being returned to the zip code screen shown in FIG. 98.

FIG. 99 is an example zip code maintenance screen, responsive to selection of add zip code icon 553 of FIG. 98. FIG. 99 may include a zip code maintenance block 560. Within the zip code maintenance block 560 may be zip code window 561, add button icon 562 and cancel button icon 563.

Figure 100:
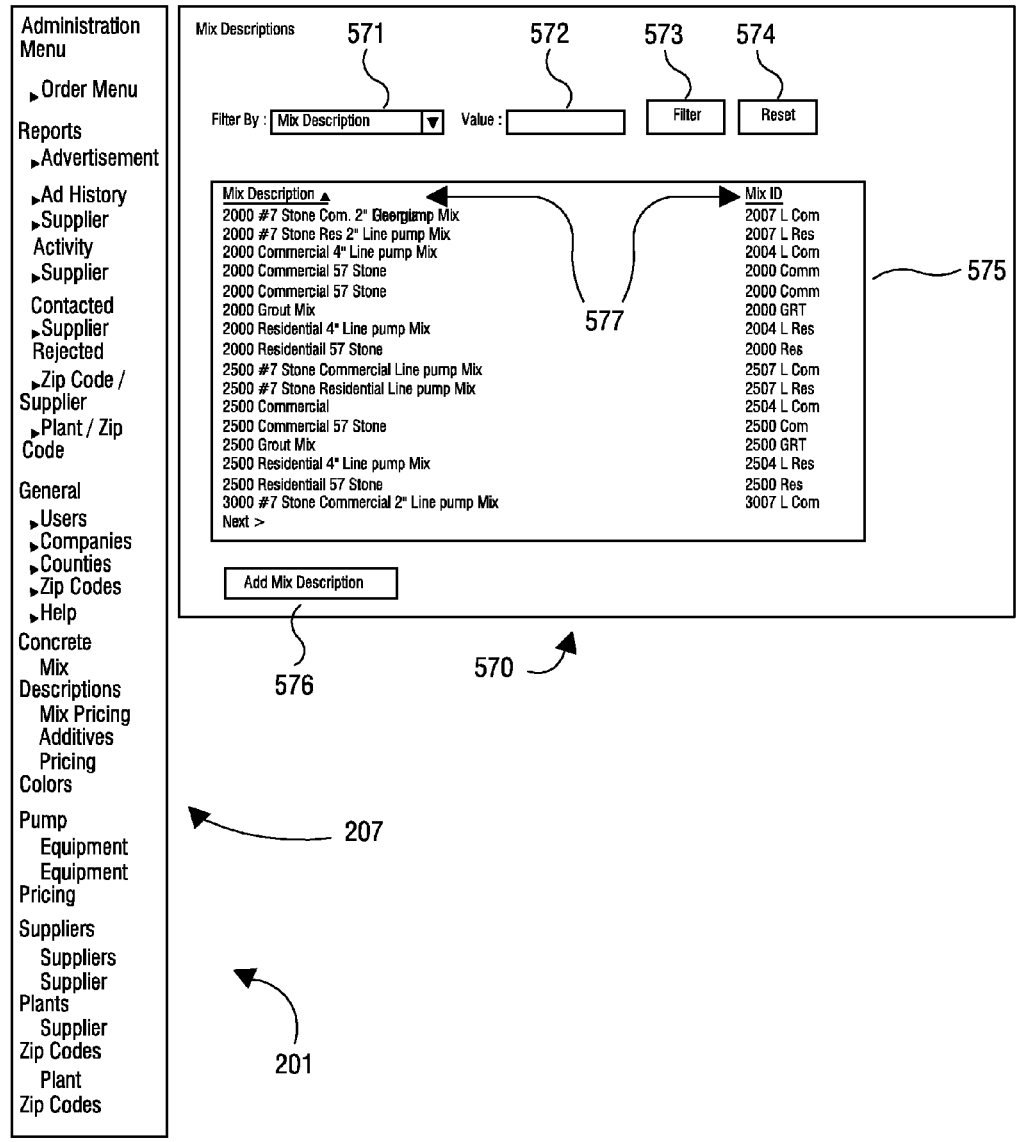
FIG. 100 illustrates an example mix description screen, responsive to selection of the mix description subject icon from the concrete subject group 207.

FIG. 100 illustrates an example mix description screen that is responsive to selection of the mix description subject icon from the concrete subject group 207. The mix description screen may include a mix description block 570 including a data field drop down menu 571 and a value entry window 572. The data field drop down menu 571 allows the user to select a desired data field 577 and then search that data field for a value entered in the value entry window 572 by selecting the filter button icon 573. Selection of the reset button icon 574 may clear the information previously entered with the data field drop down menu 571 and the value entry window 572.

Figure 101:
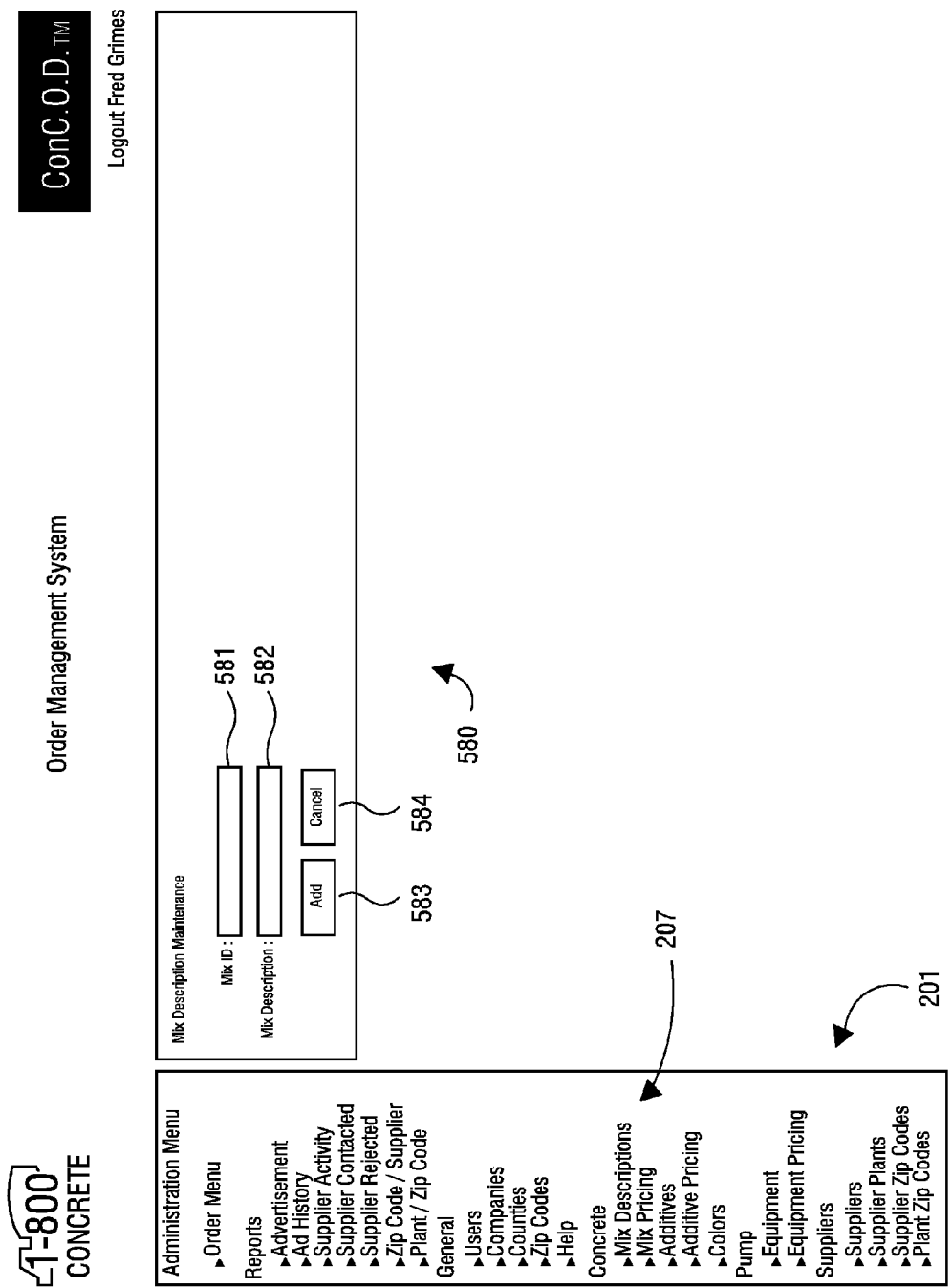
FIG. 101 illustrates an example mix description maintenance screen, responsive to either selection of the add mix description button icon 576 shown in FIG. 100 or selection of one of the mix descriptions.

The mix description maintenance screen shown in FIG. 101 is responsive to either selection of the add mix description button icon 576 shown in FIG. 100 or selection of one of the mix descriptions when the user clicking on that description. As shown, the mix description maintenance screen has been accessed by selection of the add mix description button icon 576, and therefore the mix ID entry window 581 and mix description entry window 582 are blank. Had the mix description maintenance screen been accessed by clicking on a mix description shown in FIG. 100, the previously entered mix ID and mix description related to the selected mix description might be displayed in the mix ID entry window 581 and mix description entry window 582, respectively. To add either the amended and/or new mix description and mix ID to the order management system's database, the add button icon 583 is selected. Selection of the cancel button icon 584 return the user to the mix descriptions screen shown in FIG. 100.

Figure 102:
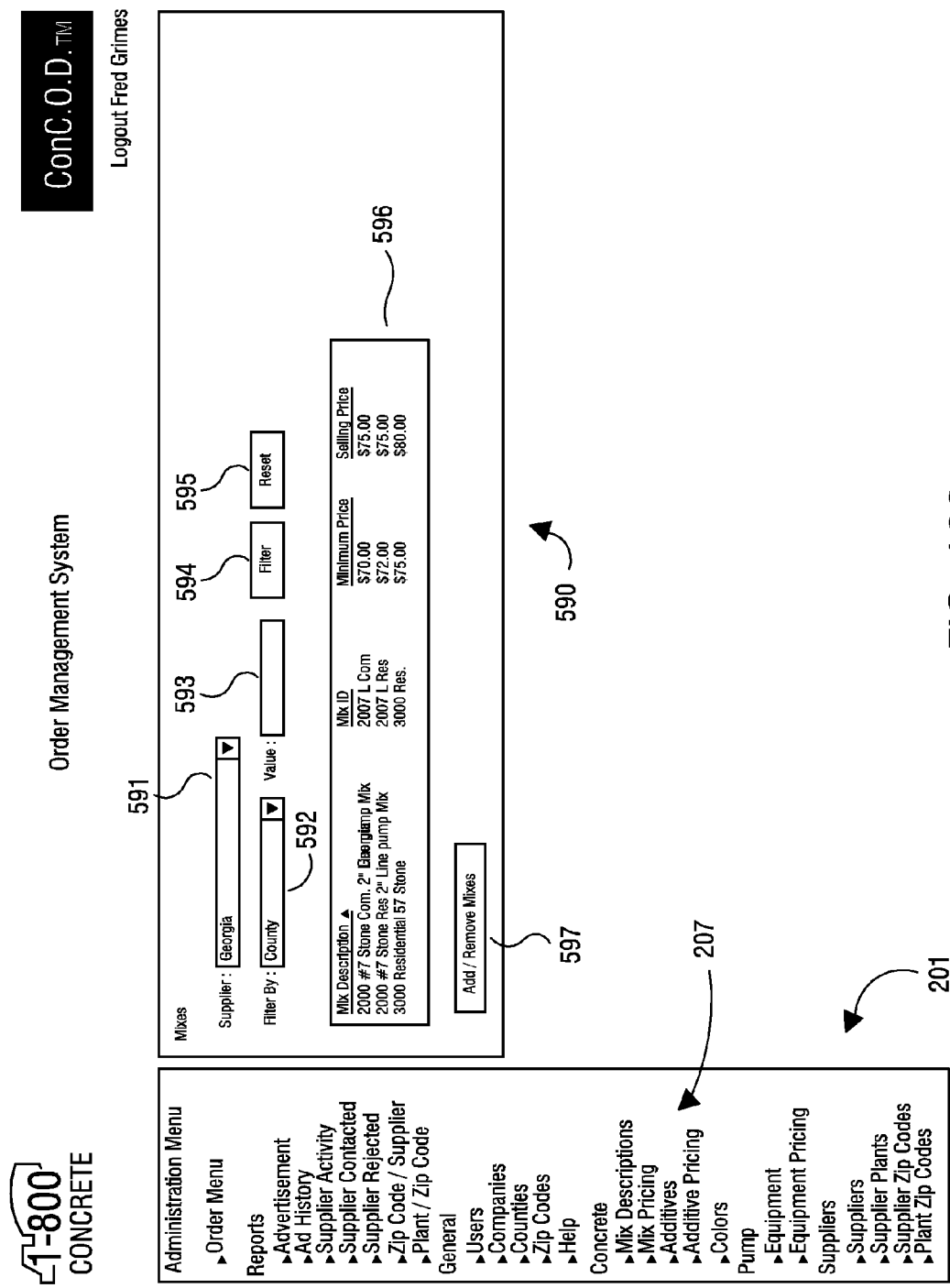
FIG. 102 illustrates an example mixes screen, responsive to selection of the mix pricing subject icon from the concrete subject group 207.

FIG. 102 illustrates an example mixes screen, responsive to selection of the mix pricing subject icon from the concrete subject group 207. A mixes block 590 includes a supplier drop down menu 591, a data field drop down menu 592, and a value entry window 593. By selecting the desired supplier and data field, entering a value in the value entry window 593, and selecting the filter button icon 594, the order management system will search the selected data field for the value entered in the value entry window 593. A list of the relevant mix descriptions and/or mix Ids may then be provided in block 596.

Figure 103:
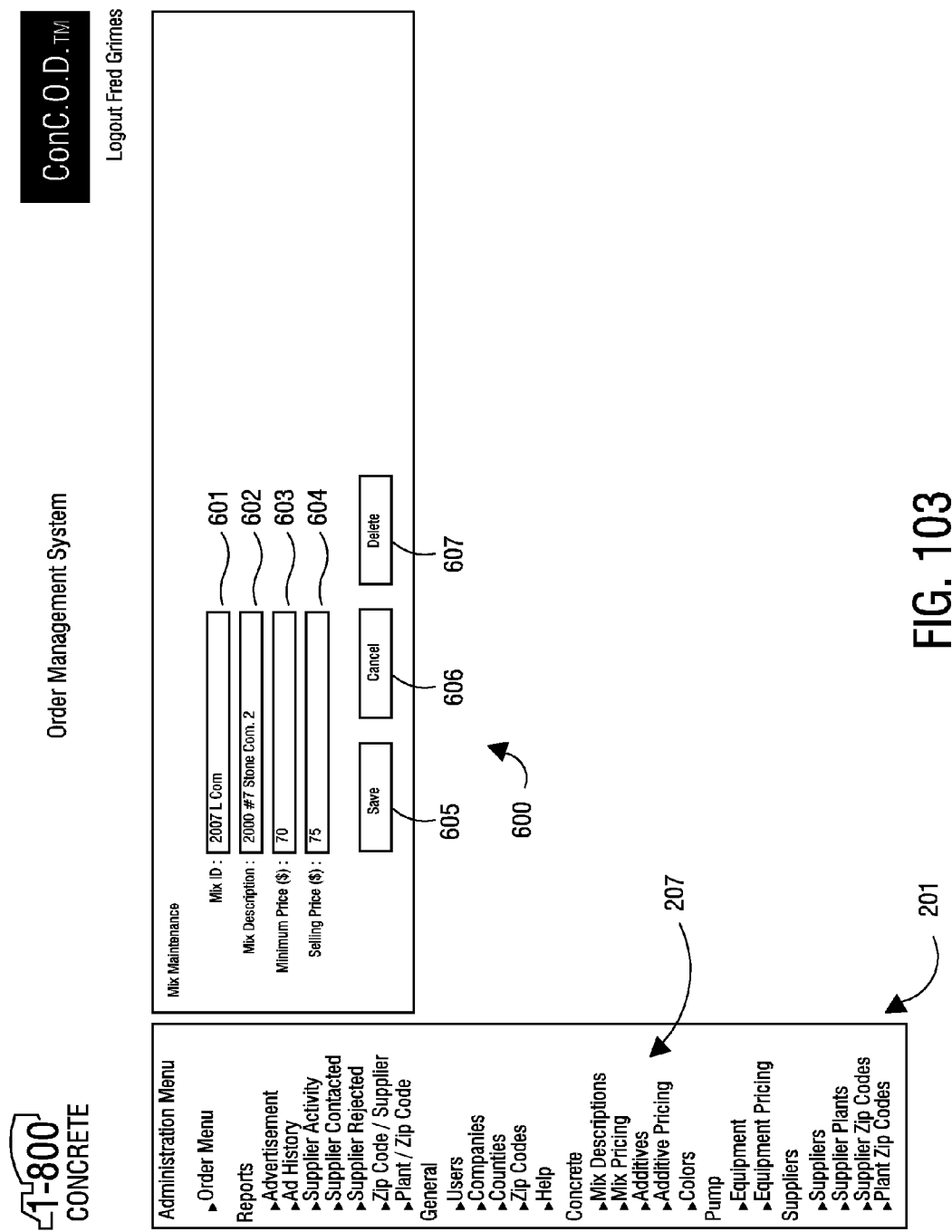
FIG. 103 is an example mix maintenance screen, responsive to either selecting a mix description from the list 596 or selecting the add/remove mixes button icon 597 shown in FIG. 102.

The example mix maintenance screen shown in FIG. 103 is responsive to clicking directly on a mix description from the list 596 and selecting the add/remove mixes button icon 597 shown in FIG. 102. As shown, the mix maintenance screen was selected by clicking directly on one of the mix descriptions shown in the list 596, and therefore the mix ID entry window 601, mix description entry window 602, minimum price entry window 603, and selling price entry window 604, all display information previously entered for that mix description and saved within a database of the order management system. This information may be amended and saved by directly altering the information within the entry windows and selecting the save button icon 605. The noted entry windows may be blank if the mix maintenance screen is accessed by way of the add/remove mixes button icon 597, at which time new information may be provided in the entry windows and saved by selecting the save button icon 605. Selection of the cancel button icon 606 may return the user to the mixes screen shown in FIG. 102. Selection of the delete button icon 607 may cause the information displayed in the entry windows to be deleted from the list 596 shown in FIG. 102.

Figure 104:
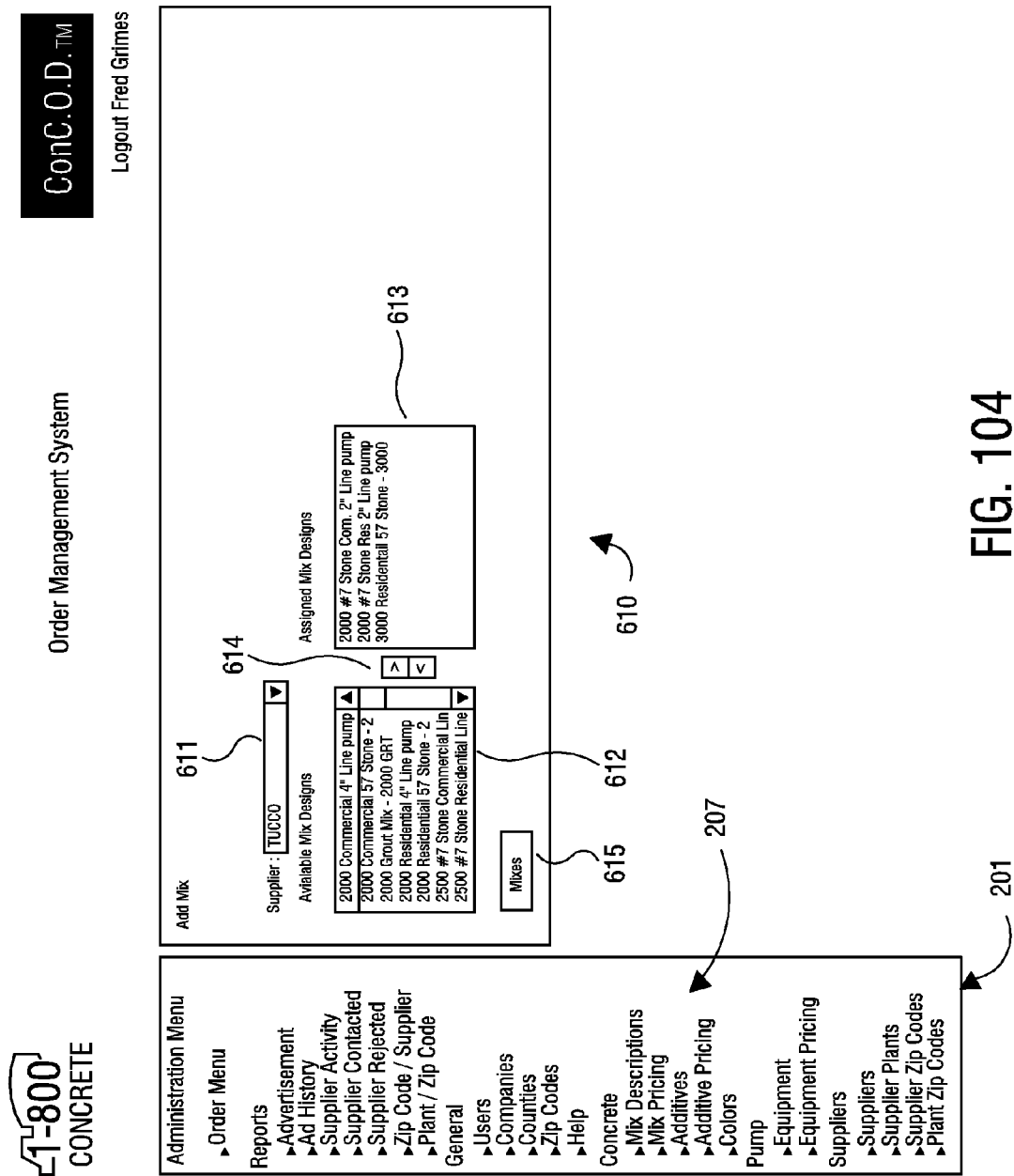
FIG. 104 illustrates an example add mix screen, responsive to selecting the add/remove mixes button icon 597 shown in FIG. 102.

FIG. 104 illustrates an example add mix screen that is responsive to selecting the add/remove mixes button icon 597 shown in FIG. 102. An add mix block 610 may include a supplier drop down menu 611, an available mix designs list 612, an assigned mix designs list 613, and a pair of add/remove buttons 614. The supplier drop down menu 611 initially display the same supplier name displayed in the supplier drop down menu 591 (FIG. 102). However, the supplier drop down menu may be used to select a different supplier if desired. The available mix designs list 612 may include all those mix designs previously entered with the mix description maintenance screen shown in FIG. 101. To show that the supplier chosen with the supplier drop down menu 611 can provide a specific mix design, the user highlights the desired mix design and then may select the add/remove button 614 having an arrow that indicates moving the desired mix design from the available mix design list 612 to the assigned mix design list 613. Similarly, the user may remove a mix design from the assigned mix designs list 613 by highlighting that specific mix design and selecting the add/remove button 614 that indicates moving that mix design from the assigned mix design list 613 to the available mix design list 612. Selection of the mixes button icon 615 may cause the order management system to display the mixes screen shown in FIG. 102 for the selected supplier.

Figure 105:
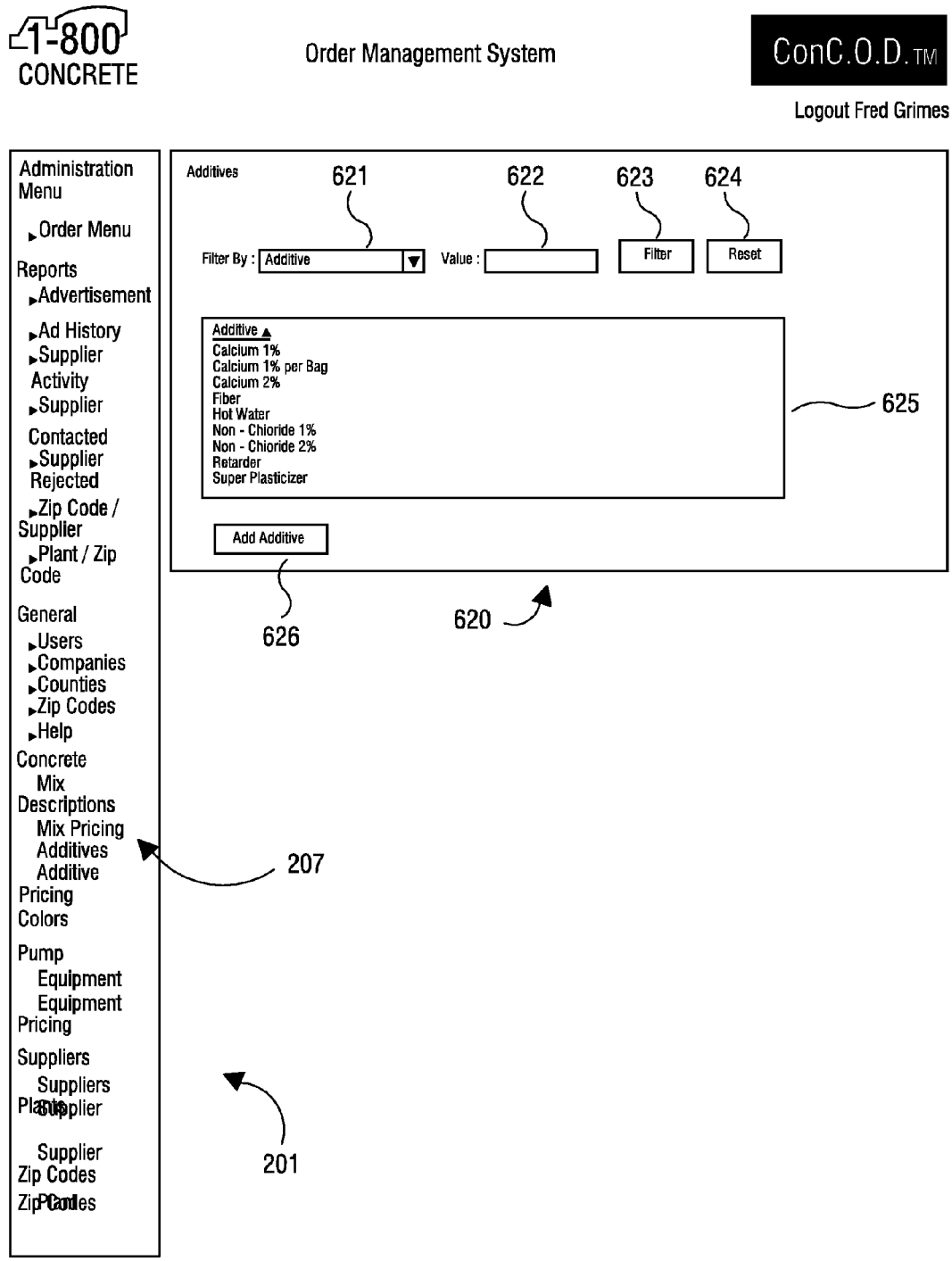
FIG. 105 illustrates an example additive screen, responsive to selecting the additives subject icon of the concrete subject group 207.

FIG. 105 illustrates an example additive screen, responsive to selecting the additives subject icon of the concrete subject group 207. An additive block 620 may include a data field drop down menu 621, a value entry window 622, a filter button icon 623, and a reset button icon 624. By placing a desired term in the value entry window 622 and selecting the filter button icon 623, a user can display the desired additive. Selection of the reset button icon 624 clears the information selected with the additive drop down menu 621 and the value entry window 622. The additives block further may include a list of all additives previously entered into the order management system's database.

Figure 106:
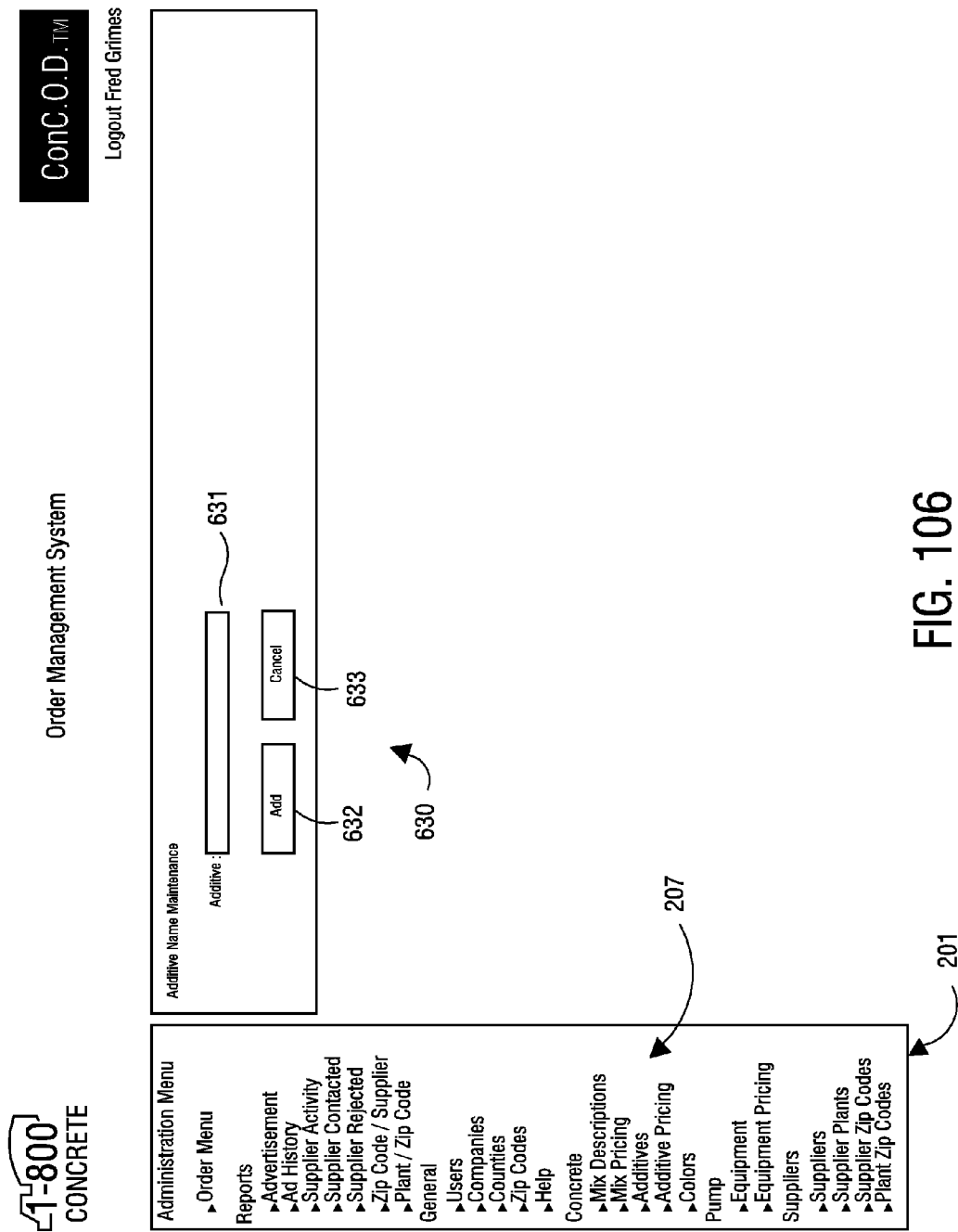
FIG. 106 illustrates an example additive name maintenance screen, responsive to selection of the add additive button icon 626 shown in FIG. 105.

FIG. 106 shows an example additive name maintenance screen, responsive to selection of the add additive button icon 626 shown in FIG. 105. An additive name maintenance block 630 may include an additive entry window 631, and add button icon 632, and a cancel button icon 633. To add an additive name to the additive list 625 shown in FIG. 105, a user may enter an additive name in the additive entry window 631 and may select the add button icon 632. Selection of the cancel button icon 633 may result in the order management system returning the user to the additive screen shown in FIG. 105.

Figure 107:
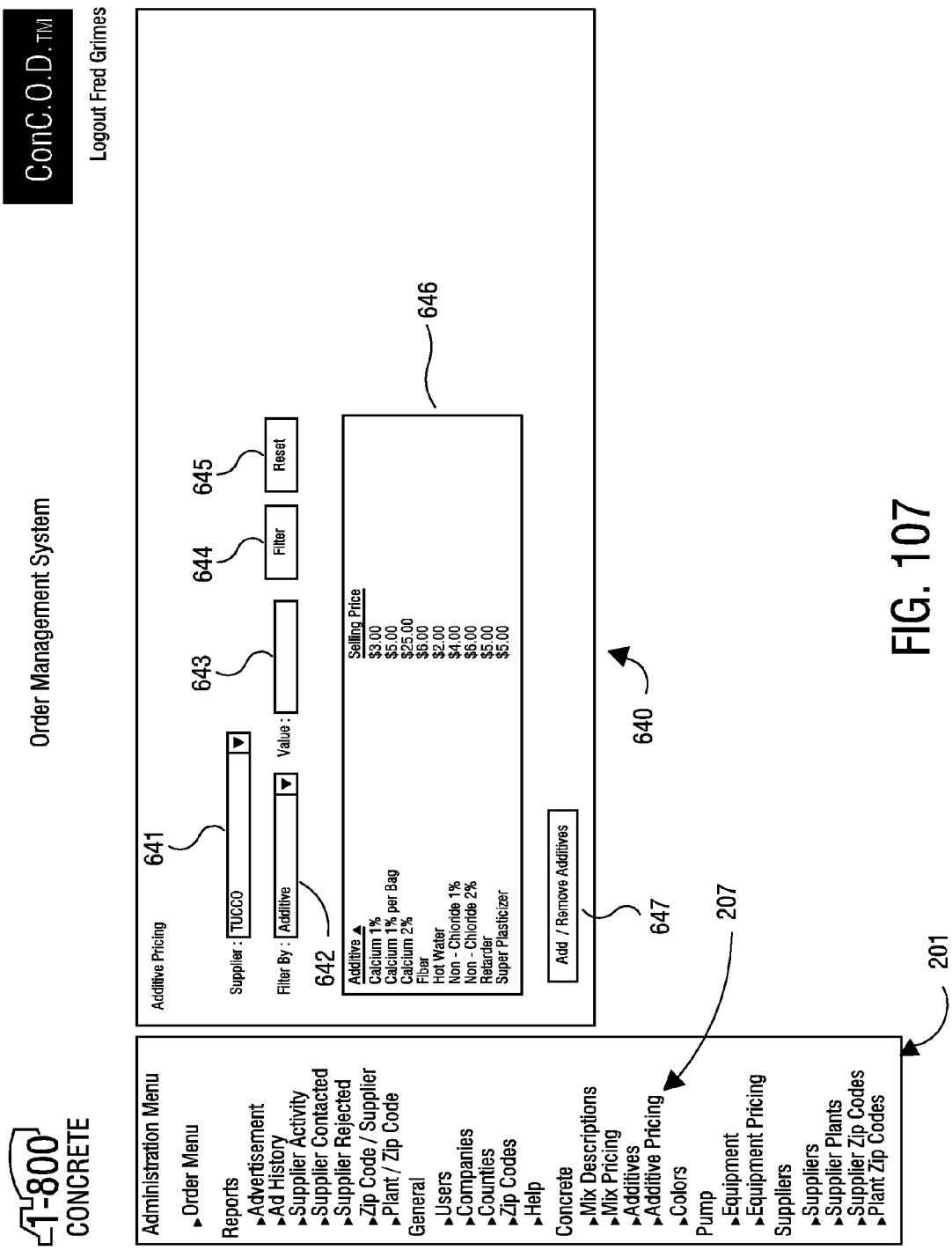
FIG. 107 illustrates an example additive pricing screen, responsive to selection of the additive pricing subject icon from the concrete subject group 207.

FIG. 107 shows an example additive pricing screen that is responsive to selection of the additive pricing subject icon from the concrete subject group 207. An additive pricing block 640 may include a supplier drop down menu 641, an additive drop down menu 642, and a value entry window 643. To display an individual additive, a user may select the desired supplier and enters the name of the desired additive in the value entry window 643. Selection of the filter button icon 644 may cause that additive and selling price to be displayed. Selection of the reset button icon 644 may cause the previously entered information to be cleared. The additive pricing block 640 may further include a list of all the available additives from the selected supplier and their associated selling prices. A reset button icon may be selected to reset the additive pricing block 640. In addition, additives may be added and removed for an additive list 646 by selecting an add/remove additive button icon 647.

Figure 108:
FIG. 108 illustrates an example additive maintenance screen, responsive to a user selecting a specific additive name from the additive list 646.

FIG. 108 illustrates an example additive maintenance screen, responsive to the user clicking on a specific additive name from the additive list 646 (FIG. 107). An additive maintenance block 650 may include an additive entry window 651, a supplier drop down menu 652, and a selling price entry window 653. Information previously entered into the order management system's database is displayed in its corresponding entry windows for the selected additive. This information may be amended directly and those amendments saved by selection of the save button icon 654. Selection of the cancel button icon 655 returns the user to the additive pricing screen shown in FIG. 107. Selection of the delete button icon 656 causes the pricing information related to the selected additive to be deleted from the database.

Figure 109:
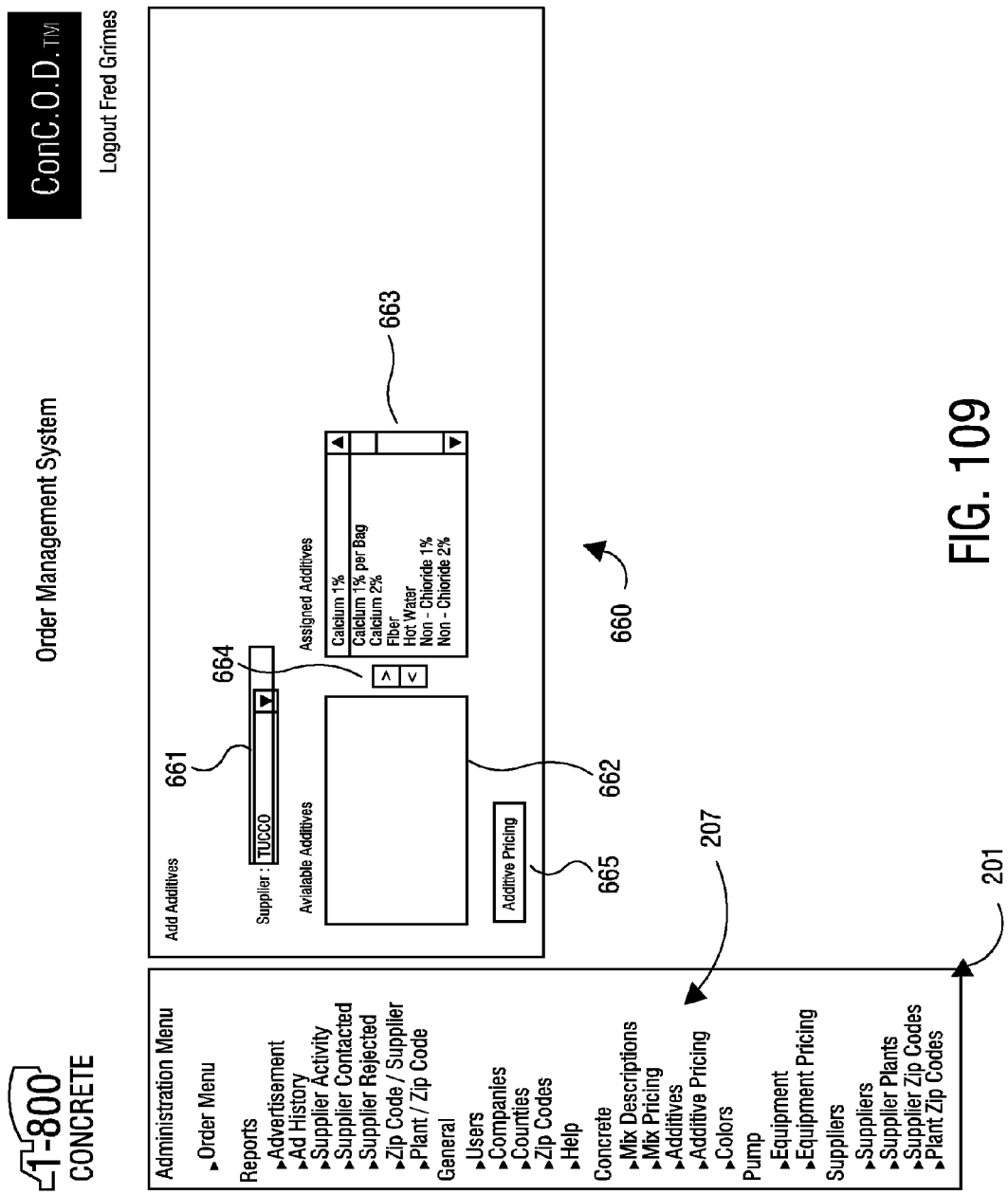
FIG. 109 illustrates an example add additive screen, responsive to selection of the add/remove additives button icon 647 of FIG. 107.

FIG. 109 illustrates an example add additive screen, responsive to selection of the add/remove additives button icon 647 shown in FIG. 107. An add additive's block 660 may include a supplier drop down menu 661, an available additives list 662, an assigned additives list 663, and a pair of add/remove buttons 664. Additives may be moved between the available additives list 662 and the assigned additives list 663 simply by highlighting the desired additive and then selecting the add/remove button 664 which corresponds to the desired direction of movement of the additive. Selection of the additive pricing button icon 665 may return the user to the additive pricing screen shown in FIG. 107. In addition, additive pricing may be achieved by selecting an additive pricing return button icon 665, which may be located in add additives block 660.

Figure 110:
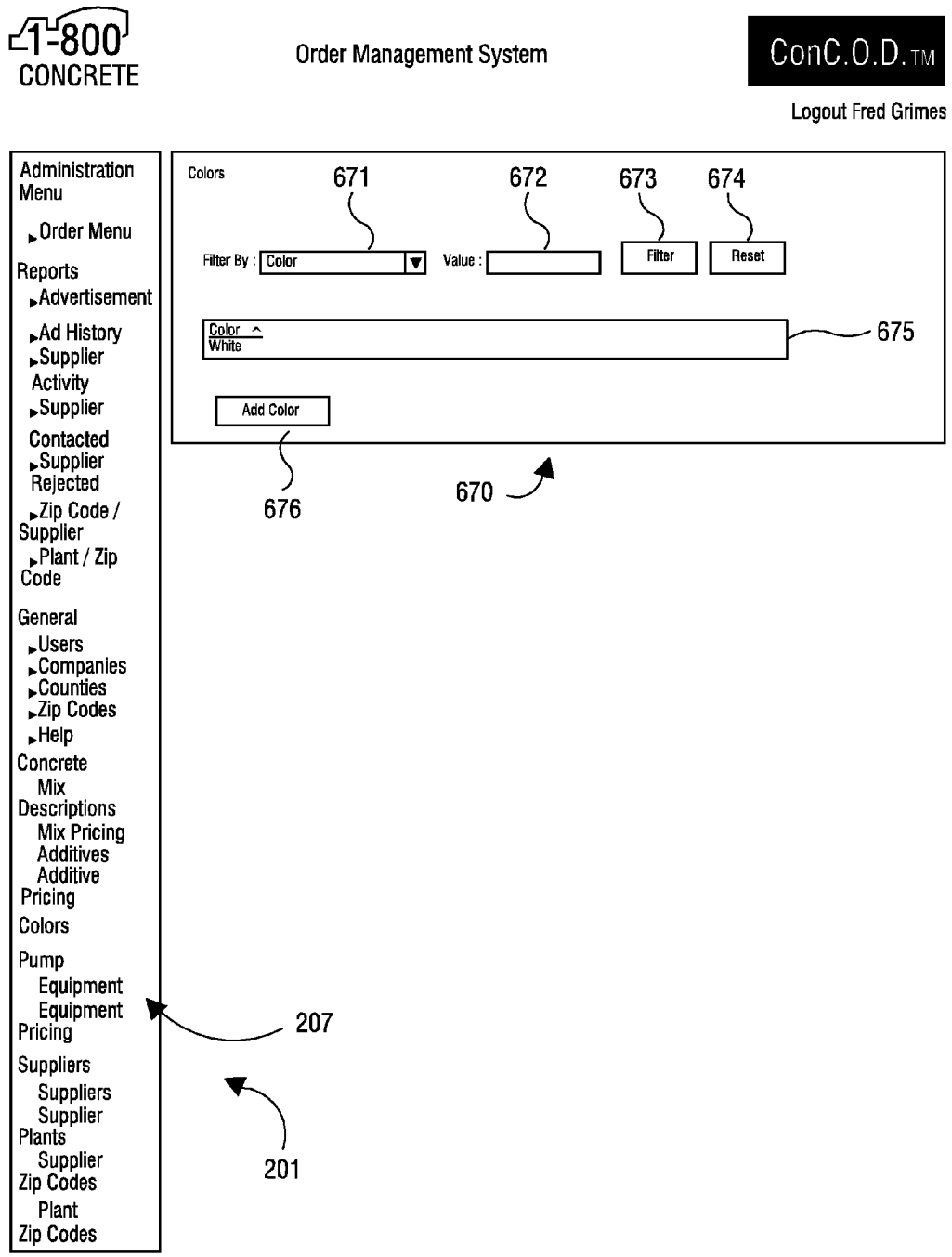
FIG. 110 illustrates an example color screen responsive to selection of the colors subject icon of the concrete subject group 207.

FIG. 110 illustrates an example color screen responsive to selection of the colors subject icon of the concrete subject group 207. A color block 670 may include a data field drop down menu 671 and a value entry window 672. Selection of the filter button icon 673 may cause the order management system to search for any term displayed in the value entry window 672 within the selected data field of the data field drop down menu 671. The color block 670 further may include a listing of all available colors 675 for the concrete. In addition, color block 670 may be reset by selecting reset block icon 674. Colors may be added by selecting add color button icon 676.

Figure 111:
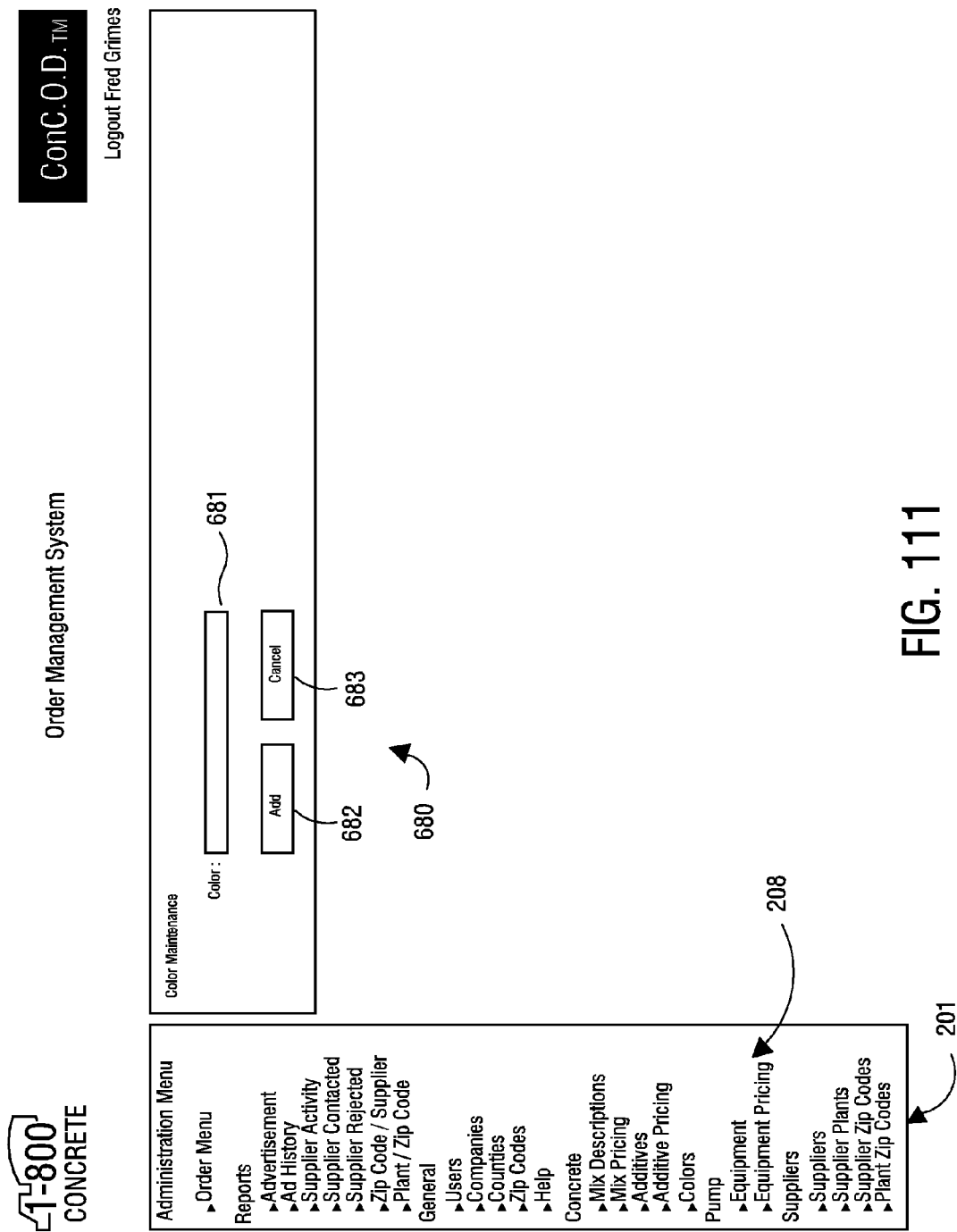
FIG. 111 illustrates an example color maintenance screen including a color maintenance block 680 having a color entry window 681.

FIG. 111 illustrates an example color maintenance screen including a color maintenance block 680 having a color entry window 681. To include a new color on the color list 675 shown in FIG. 110, a user lists that color in the color entry window 681 and selects the add button icon 682. Selection of the cancel button icon 683 returns the user to the colors screen shown in FIG. 110.

Figure 112:
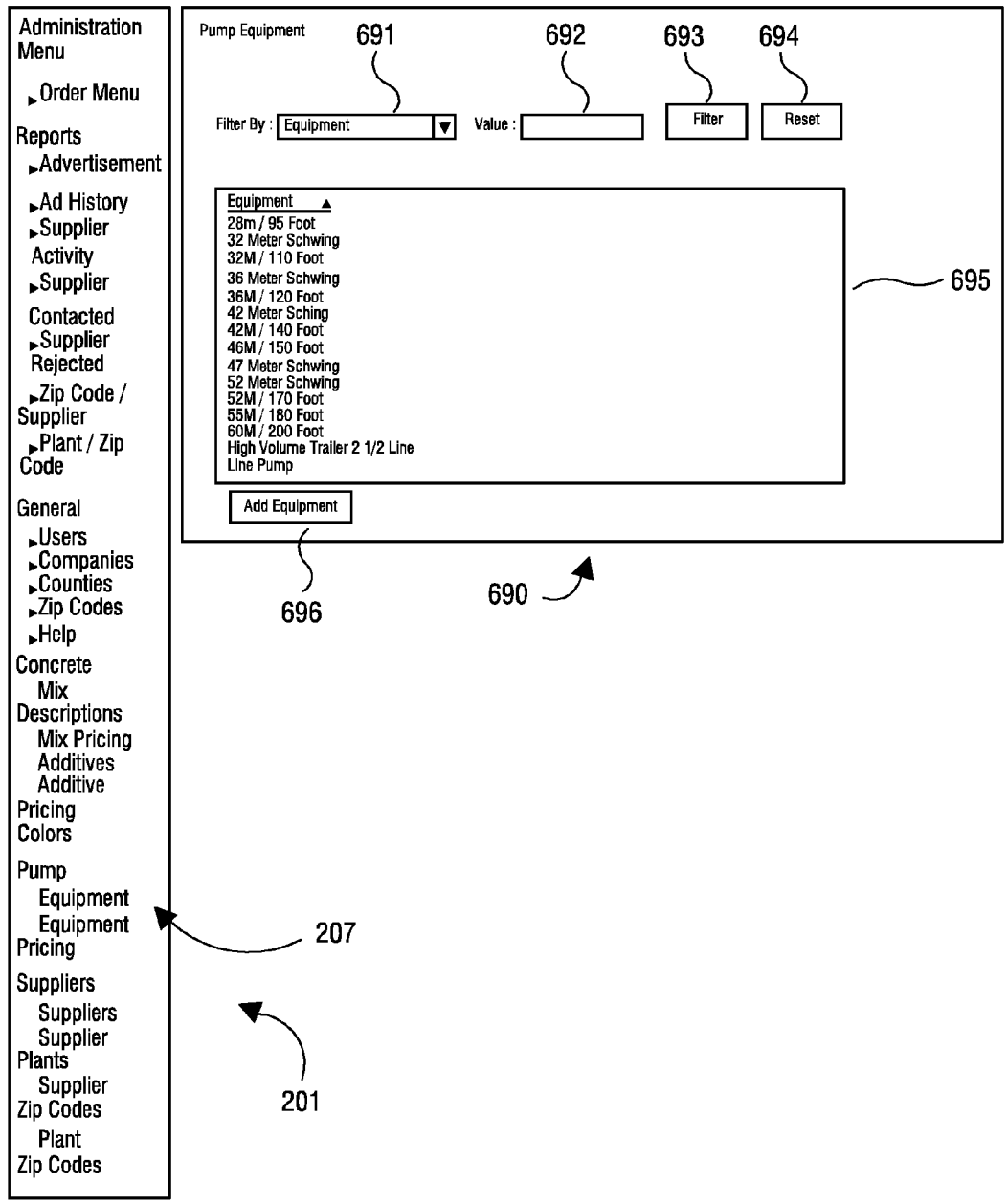
FIG. 112 illustrates an example pump equipment screen, responsive to selection of the equipment subject icon from the pump subject group 208.

FIG. 112 illustrates an example pump equipment screen, responsive to selection of the equipment subject icon from the pump subject group 208. A pump equipment block 690 may include an equipment drop down menu 691 and a value entry window 692. Selection of the filter button icon 693 may cause the order management system to search through the selected data field of the data field drop down menu 691 for the term entered in the value entry window 692. If a match is found, those pieces of equipment including the desired term in the selected data field may be listed. The pump equipment block 690 may further include a list of all pump equipment 695 that has been previously entered into the database of the order management system. Selection of the add equipment button icon 696 may cause the equipment name maintenance screen shown in FIG. 113 to be displayed. An equipment name maintenance block 700 may include an equipment entry window 701 and an add button icon 702 that may be selected to cause the equipment listed in the equipment entry window 701 to be added to the equipment list 695 of FIG. 112. Selection of the cancel button icon 703 causes the order management system to display the pump equipment screen shown in FIG. 112. In addition, pump equipment block 690 may be reset by selecting reset block 694. A user may add equipment by selecting add equipment block 696.

Figure 113:
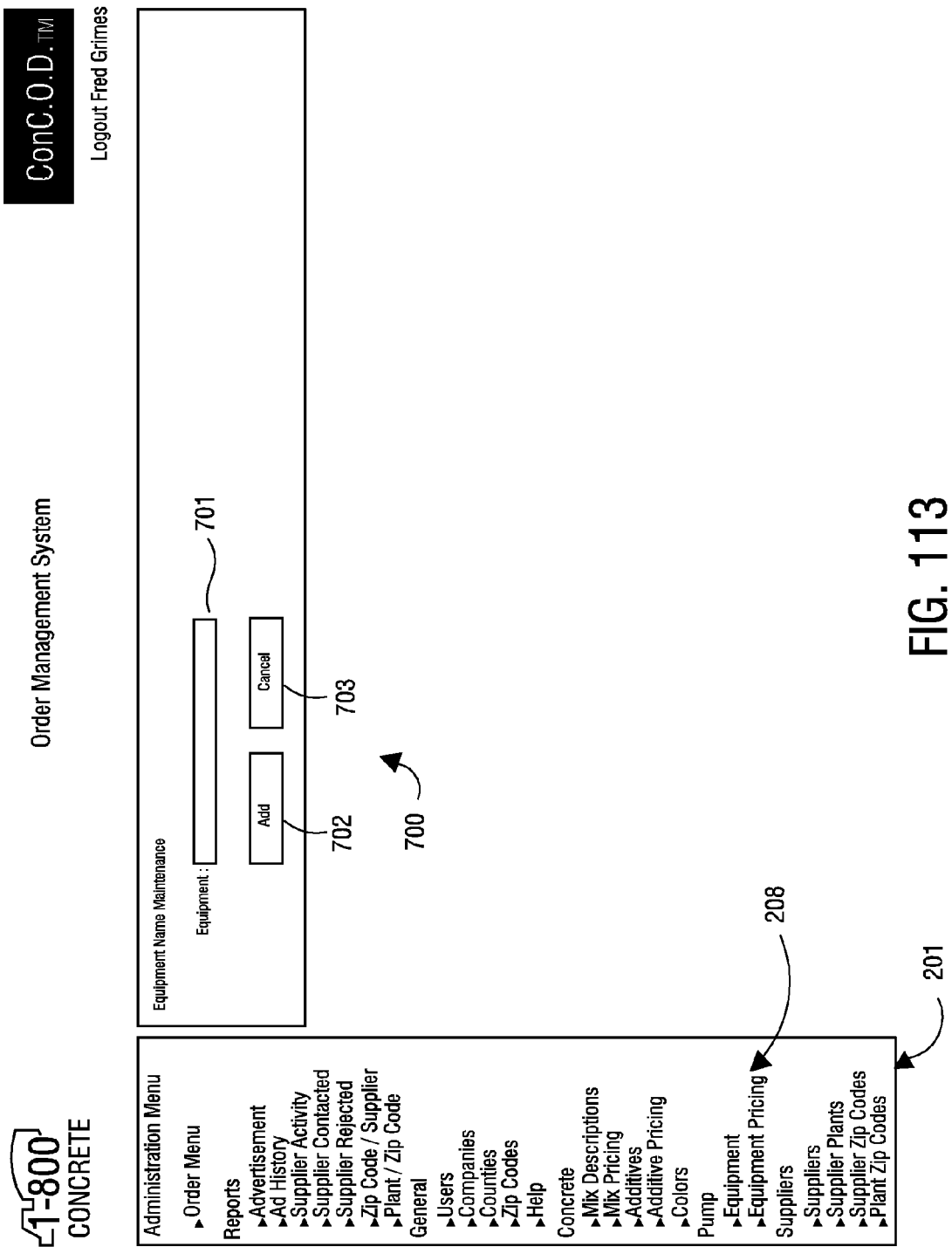
FIG. 113 is an example equipment name maintenance screen, responsive to selection of the add equipment icon 696 of FIG. 112.

FIG. 113 is an example equipment name maintenance screen, responsive to selection of the add equipment icon 696 of FIG. 112. As illustrated, equipment name maintenance block 700 may include an equipment window 701, an add button icon 702 and a cancel button icon 703.

Figure 114:
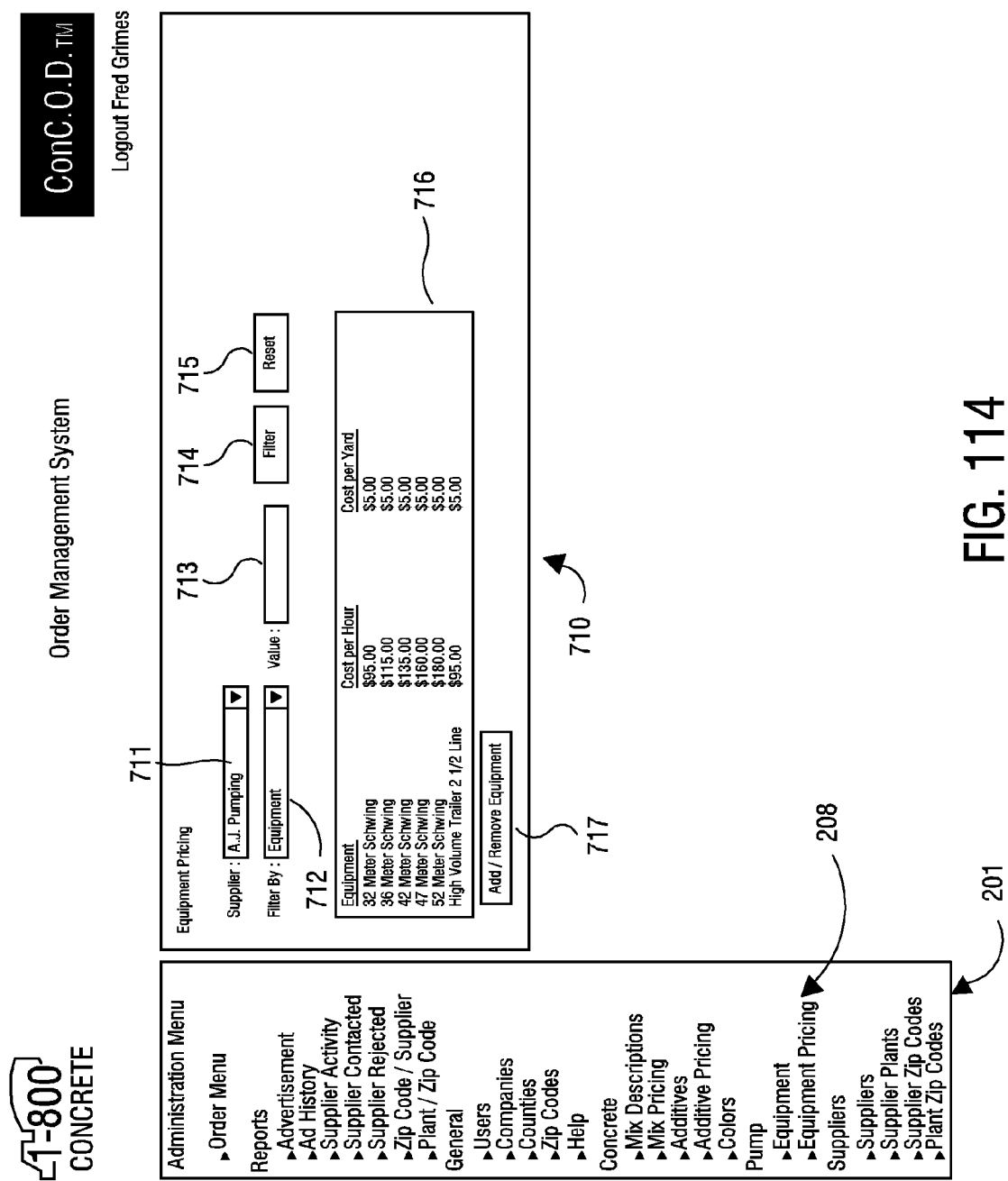
FIG. 114 illustrates an example equipment pricing screen, responsive to selection of the equipment pricing subject icon of the pump subject group 208.

FIG. 114 shows an example equipment pricing screen, responsive to selection of the equipment pricing subject icon of the pump subject group 208. An equipment pricing block may include a supplier drop down menu 711, an equipment drop down menu 712, and a value entry window 713. Selecting the filter button icon 714 may cause the order management system to search the selected data field from the data field drop down window 712 for the term entered in the value entry window 713. Any piece of equipment including the selected term within the selected data field will be listed. Selecting the reset button icon 715 may clear the information previously entered in the supplier drop down menu 711, the data field drop down menu 712, and the value entry window

713. In addition, add/remove equipment button icon may be selected to add equipment to equipment list 716.

Figure 115:
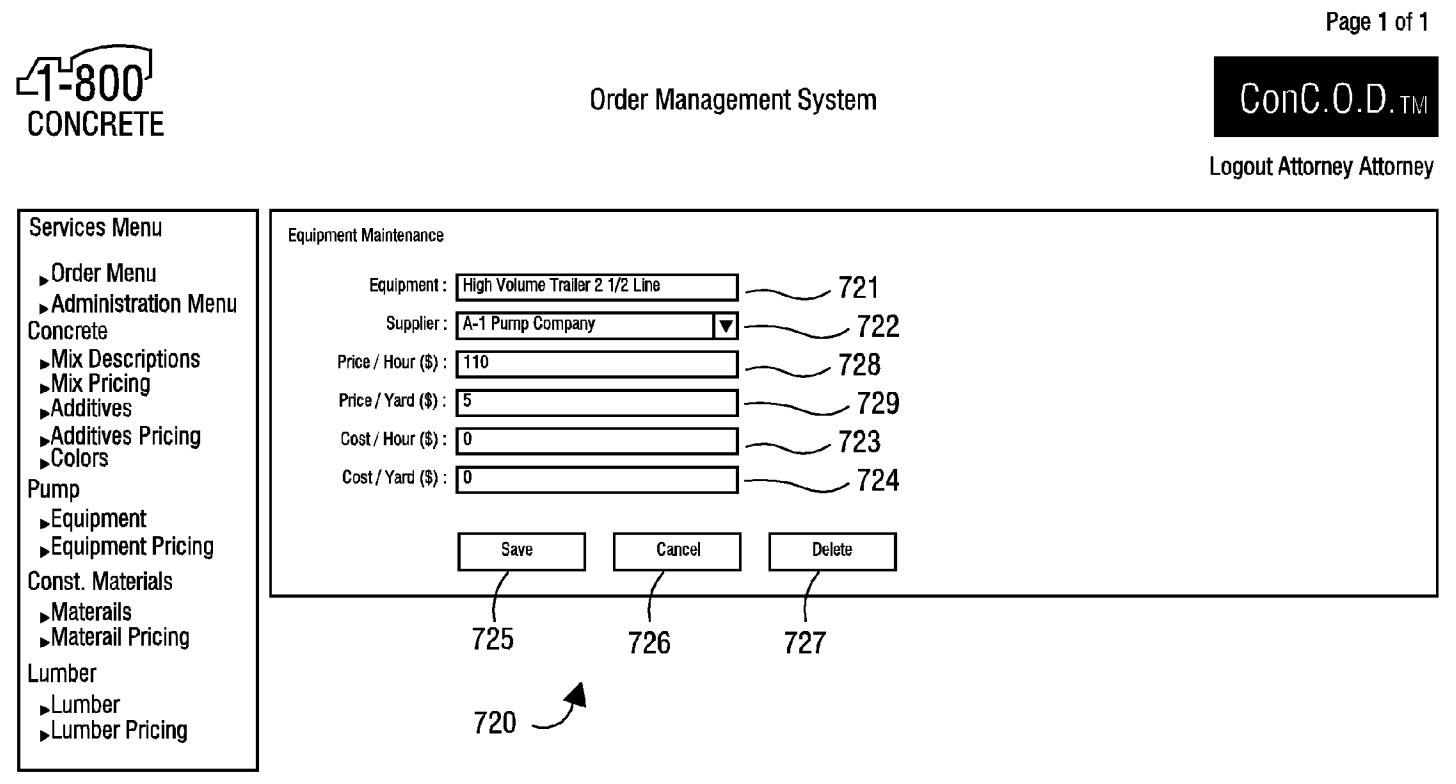

FIG. 115 illustrates an example equipment maintenance screen, responsive to selection of a particular piece of equipment from the equipment list 716 by the user. An equipment maintenance block 720 may include an equipment entry window 721, a supplier pull down menu 722, a price per hour entry window 728, a price per yard entry window 729, a cost per hour entry window 723, and a cost per yard entry window 724. Equipment pricing information previously entered into the order management system database may be displayed in these entry windows and may be amended. Amendments to this information may be saved by selecting the save button icon 725. Selecting the cancel button icon 726 allows the user to cancel any amendments made in the equipment maintenance block 720, and the user is returned to the equipment pricing screen shown in FIG. 114. Selection of the delete button icon 727 allows a user to delete the pricing information and equipment information from the equipment listing 716 shown in FIG. 114.

Figure 116:
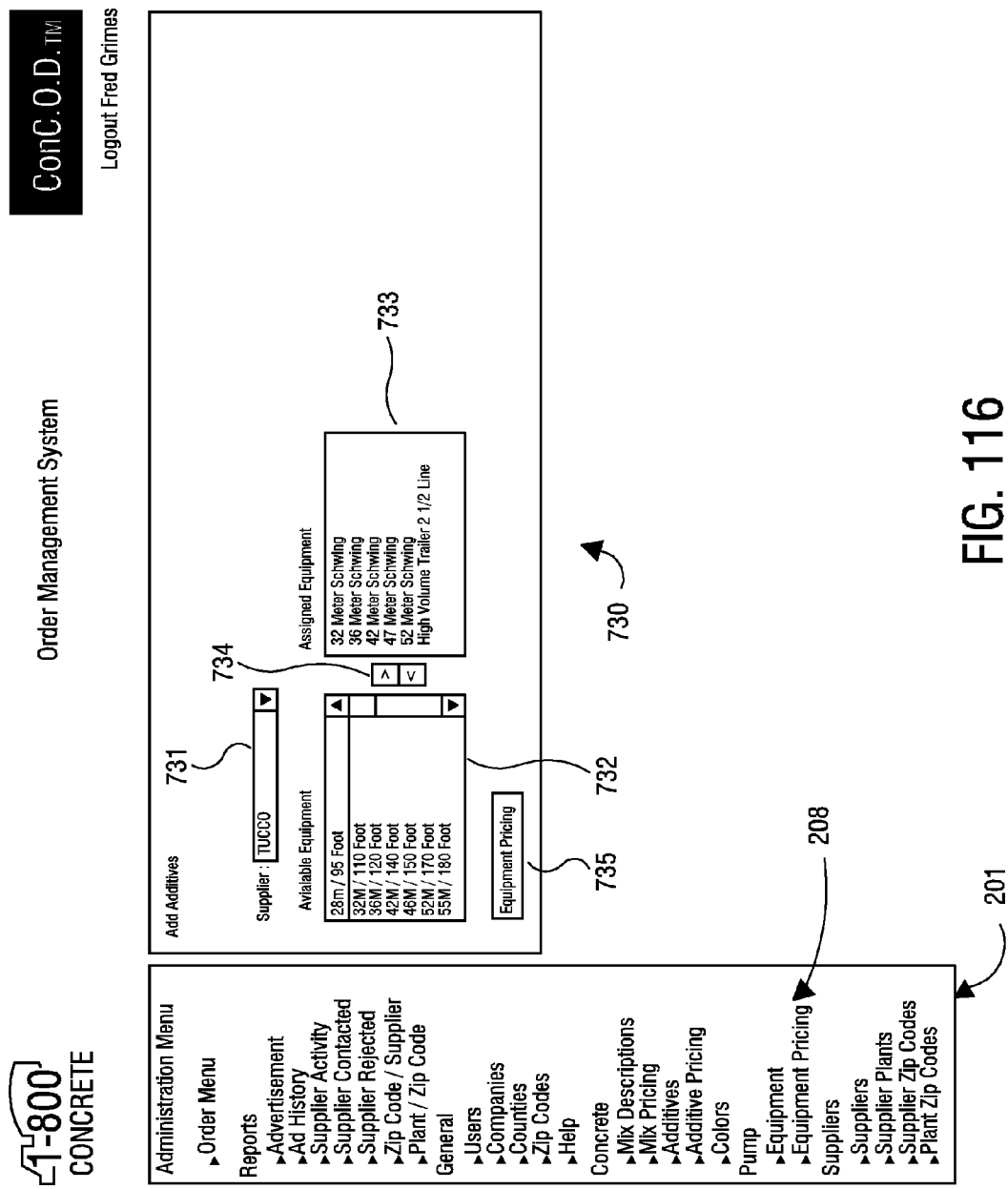

FIG. 116 is an example add equipment screen, responsive to the selection of the add/remove equipment button icon 717 shown in FIG. 114. An add equipment block 730 may include a supplier drop down menu 731, an available equipment list 732, an assigned equipment list 733, and a pair of add/remove buttons 734. A user can move equipment back and forth between the available equipment list 732 and the assigned equipment list 733 by highlighting the desired piece of equipment and selecting the add/remove button 734 corresponding to the direction in which the highlighted equipment should move. Selection of the equipment pricing button icon 735 causes the equipment pricing screen shown in FIG. 114 to be displayed.

Figure 117:
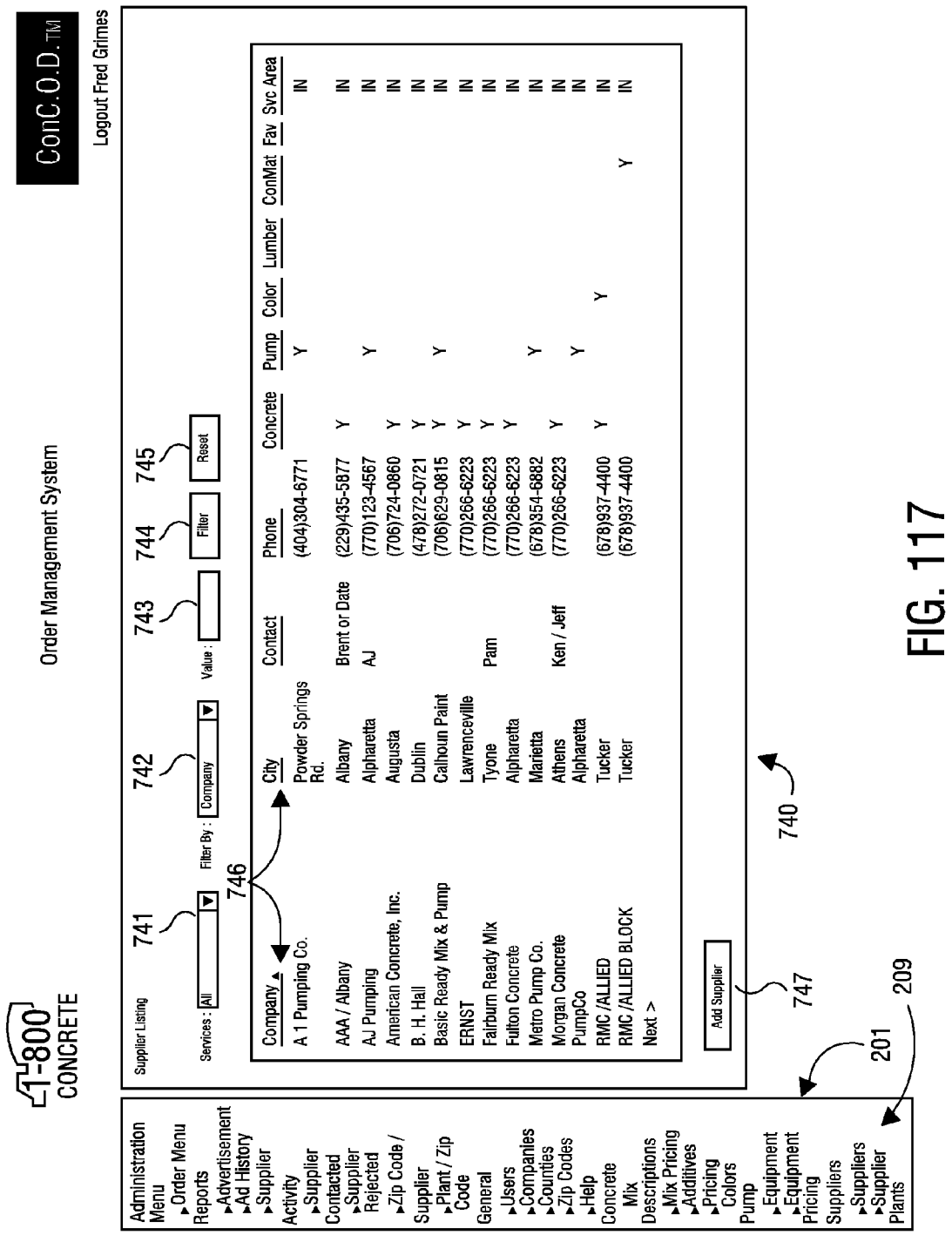

FIG. 117 illustrates an example supplier listing screen, responsive to selection of the suppliers subject icon from the suppliers subject group 209. A supplier listing block 740 may include a services drop down menu 741. The services crop down menu 741 allows the list of suppliers to be narrowed by displaying only those suppliers that provide the selected service from the services drop down menu 741. The services drop down menu can include, but is not limited to, concrete, pumps, color, lumber, construction materials, etc. The supplier listing block also includes a data field drop down menu 742 for selecting a desired data field 746. Some exemplary data fields include, but are not limited to, company, city, contact, phone number, and service area. By placing a desired term in the value entry window 743 and selecting the filter button icon 744, a user can cause the order management system to search for that term within the selected data field 746 of the data field drop down window 742. The order management system may provide a listing of those companies that have the desired term in the desired data field. The reset button icon 745 causes the previously selected and entered information to be cleared. In addition, selection of add supplier button icon 747 allows for the addition of another supplier into supplier listing block 740.

Figure 118:

FIG. 118 illustrates an example supplier maintenance screen, responsive to the selection of the add supplier button icon 747 shown in FIG. 117. A supplier maintenance block 750 may include data entry windows 751, data drop down menus 752, and data checkboxes 753 for entering information related to a new supplier. Selection of the add button icon 754 may cause the order management system to save this information to one or more databases so that it may be accessed at a later date. Selection of the cancel button icon 755 may cause the order management system to display the supplier listing screen shown in FIG. 117.

Figure 119:
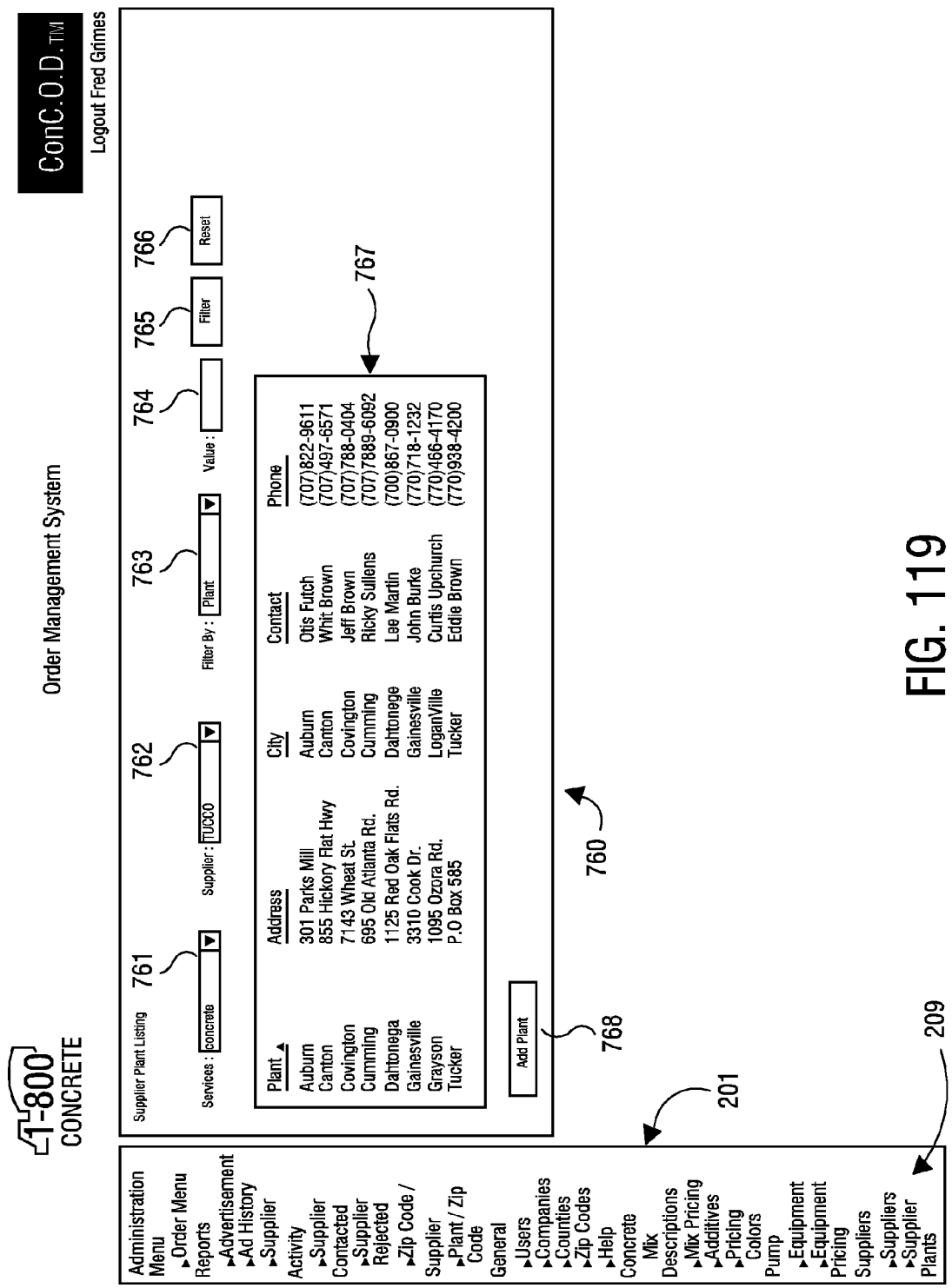

FIG. 119 illustrates an example supplier plant listing screen, responsive to selection of the supplier plants subject icon of the suppliers subject group 209. A supplier plant listing block 760 may include a services drop down menu 761, a supplier drop down menu 762, a data field drop down menu 763, and a value entry window 764. By entering a desired term in the value entry window 764 and selecting the filter button icon 765, a user causes the order management system to search the selected data field of the data field drop down menu 763 for the desired term. One may note that as shown, only the plants of the selected supplier of concrete may be searched for the desired term. Selection of the reset button icon 766 may cause the previously entered information to be deleted. In addition, add plant button icon 768 may be selected to add a supplier plant to supplier plant list 767.

Figure 120:
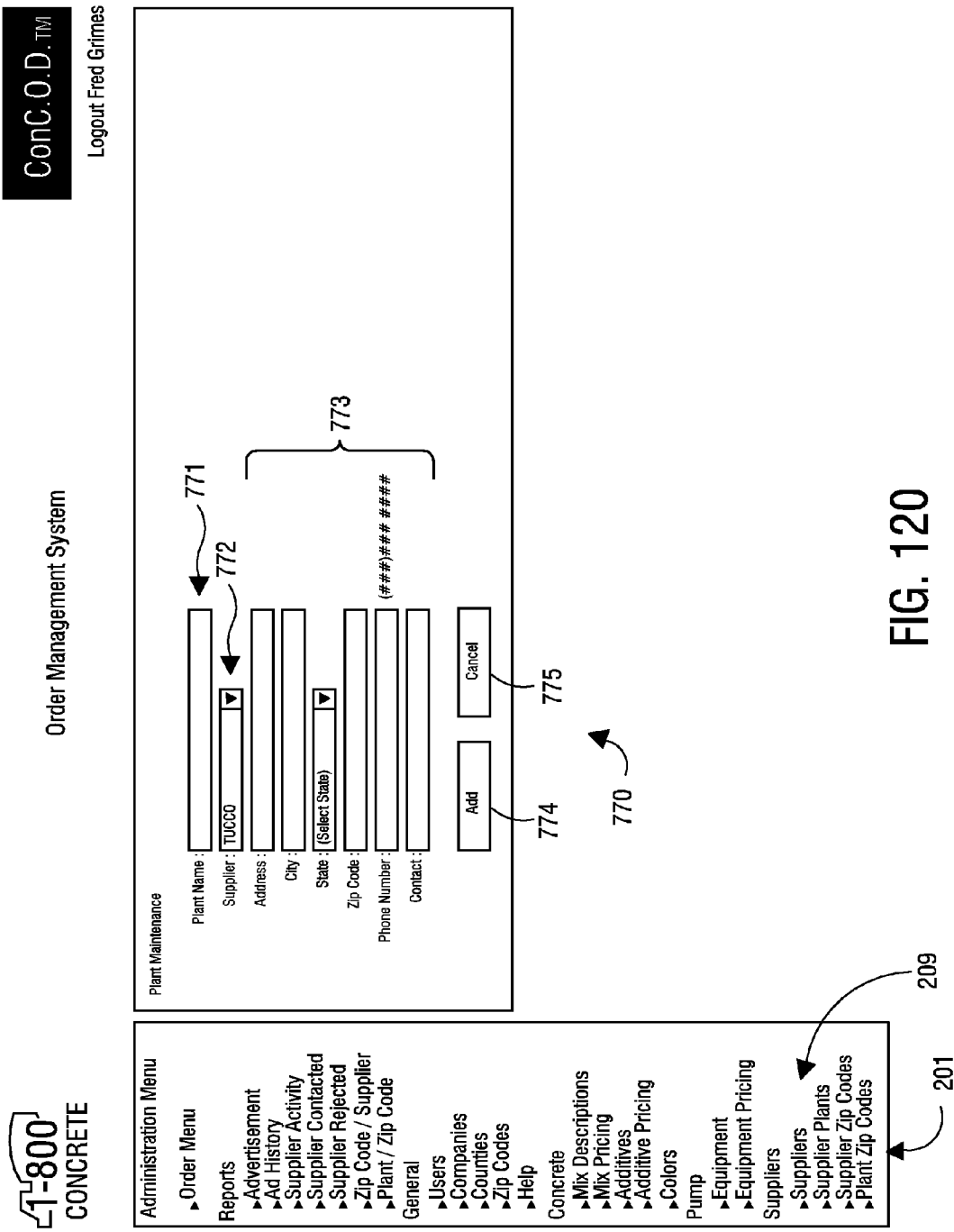

FIG. 120 illustrates an example plant maintenance screen, responsive to selection of the add plant button icon 768 shown in FIG. 119. As shown, a plant maintenance block includes a data entry field 773 that may include data entry windows 771 and data pull down menus 772. The plant maintenance block 770 may allow individual plants of various suppliers, as selected by the data drop down menu 772, and their corresponding information to be added to the supplier plant list 767 shown in FIG. 119. Selection of the add button icon 774 causes the order management system to add the entered information into a corresponding database. Selection of the cancel button icon 775 causes the user to be returned to the supplier plant listing screen shown in FIG. 119.

Figure 121:
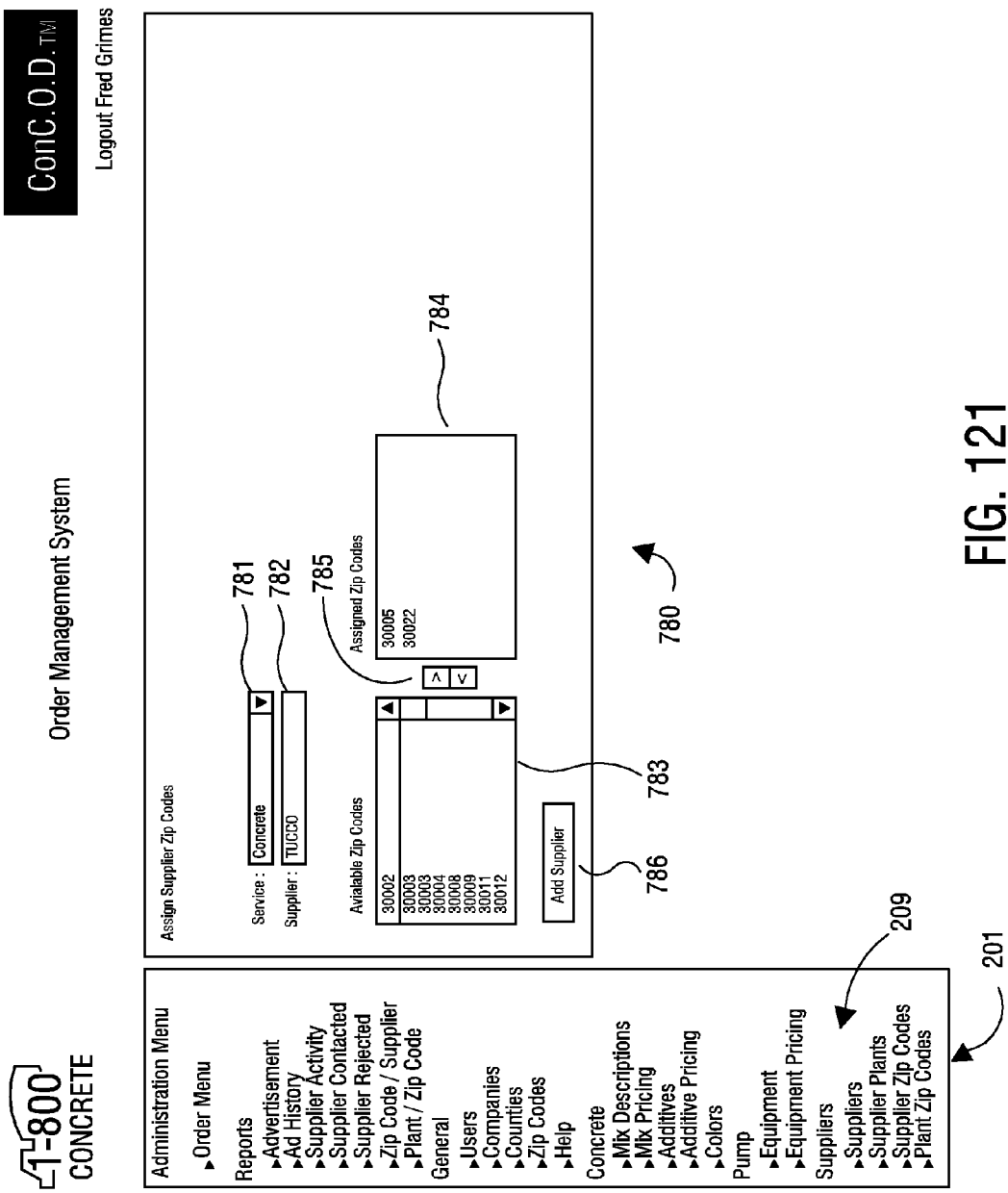

FIG. 121 illustrates an example assigned supplier zip code screen, responsive to selection of the supplier zip code subject icon of the suppliers subject group 209. An assigned supplier zip code block 780 may include a services drop down menu 781, a supplier drop down menu 782, a list of available zip codes 783, and a list of assigned zip codes 784. The assigned supplier zip code block 780 allows the user to assign zip codes to a desired supplier for a desired service. For example, a user may assign a zip code to a supplier by highlighting the desired zip code in the available zip code list 783 and then selecting the appropriate add/remove button 785 to cause the desired zip code to move into the assigned zip code list 784. The reverse operation may also be used to remove a desired zip code from the assigned zip code list 784. Selection of the add supplier button icon 786 causes the order management system to display the supplier maintenance screen shown in FIG. 118.

FIG. 122 illustrates an example assigned plant zip code screen, responsive to selection of the plant zip code subject icon from the suppliers subject group 209. An assigned plant zip code block 790 may include a services drop down menu 791, a supplier drop down menu 792, a plant drop down menu 793, and a number of ranking checkboxes 794. To record the ranking of a plant or a supplier for a particular service in an assigned zip code, a user may select the desired plant using the plant drop down menu 793 and then select the appropriate ranking checkbox 794. The user may also select the desired zip code from the available zip code list 795 and the button from the pair of add/remove buttons 797 that indicates movement of the selected zip code into the assigned zip code-ranking list 796. Selection of the appropriate add/remove button 797 may cause the selected zip code and its associated ranking from the checkboxes 794 to be recorded in the databases of the order management system. In this manner, the order management system is able to determine which supplier and which plant is the primary, secondary, tertiary, etc., source for the selected service in a given zip code. Selection of the add plant button icon 798 may cause the order management system to display the plant maintenance screen as shown in FIG. 120.

FIG. 123A is an example ready mix supplier/producer service agreement in connection with outsourcing a concrete order, similar to that discussed with regard to FIGS. 1-122. As illustrated in FIG. 123A (and FIG. 123B), the supplier/producer service agreement may include provisions that indicate responsibility on various aspects of the services provided. As FIG. 123A demonstrates, the outsourcing entity (here, 1-800-concrete) guarantees payment to the concrete supplier (here, RM-Pro) from customers responding to advertisements or who are transferred from dispatchers of RM-Pro. In consideration, RM-Pro, in this example agrees to ten conditions listed in FIG. 123A. As is evident, the outsourcing entity may agree to any of a number of conditions, depending on the particular situation.

FIG. 123B is an alternate example ready mix supplier/producer service agreement in connection with outsourcing a concrete order, similar to that discussed with regard to FIGS. 1-122. The differences between the ready mix supplier/producer service agreement of FIGS. 123A and 123B illustrate that different agreements may occur between the outsourcing entity and different suppliers or producers. The agreement of FIG. 123B illustrates that RM-SUP (the supplier) agrees to the 13 conditions, whereas RM-PRO of FIG. 123A only agreed to 10 conditions.

FIG. 124 is an example finisher service agreement in connection with outsourcing a concrete order, similar to that discussed with regard to FIGS. 1-122. As illustrated in FIG. 124, the finisher service agreement may include provisions that indicate responsibility on various aspects of the services provided. The outsourcing entity (here, 1-800-concrete) agrees to provide clients for the finisher and guarantees payment for all work performed from clients for the finisher. In consideration, the finisher agrees to the 8 conditions listed in FIG. 124. As is evident, a finisher agreement of FIG. 124 may take any of a number of forms, and include any of a number of conditions, depending on the particular situation.

FIG. 125 is an example concrete pump service agreement in connection with outsourcing a concrete order, similar to that discussed with regard to FIGS. 1-122. As illustrated in FIG. 125, the concrete pump company service agreement may include provisions that indicate responsibility of various services provided. This particular agreement provides that the outsourcing entity (here, 1-800-concrete) will provide client for the concrete pump company and guarantees payment for any such work. In consideration, the concrete pump company agrees to the 15 conditions listed in FIG. 125. As is evident, a concrete pump service agreement of FIG. 125 may take any of a number of forms, and include any of a number of conditions, depending on the particular situation.

FIGS. 126A-B is an example job estimate for creating an estimate for a concrete order, similar to that discussed with regard to FIGS. 1-122. As illustrated in FIGS. 126A-B, a job estimate form may include a number of different data to form a projected cost. In addition, disclaimers to the estimate may also be included to describe various conditions of the estimate. As is evident, the job estimate form agreement of FIGS. 126A-B may take any of a number of forms, and may include any of a number of conditions, depending on the particular situation.

FIGS. 127A-B is an example job estimate for creating an estimate for a concrete order, similar to that discussed with regard to FIGS. 1-122. FIGS. 127A-B provide different organization for the estimate. In addition, FIGS. 127A-B also provide different disclaimers and information. As is evident, any number of other configurations may be implemented depending on the particular estimate.

FIG. 128 is an example pour confirmation for a concrete order, similar to that discussed with regard to FIGS. 1-122. As illustrated in FIG. 128, a pour confirmation document may include data indicating various aspects of the concrete poured. This pour confirmation includes order number, plant, pour date, total yardage poured, supplier ticket number, additional charges, comment and dispatcher signature. As is evident, the pour confirmation document of FIG. 128 may take any of a number of forms, and include any of a number of conditions, depending on the particular situation.

FIG. 129A is a block diagram depicting an example network infrastructure 1000 for implementing an embodiment of the service outsourcing system (SOS) 1520 similar to that discussed with regard to FIGS. 1-122. A central server 1500 may be coupled to the Internet 1100, with or without an intermediary Internet Service Provider (not shown), as is true for other components shown. As is well known, the Internet 1100 comprises and is coupled to a host of other networks (e.g., LANs, wide area networks, regional area networks, etc.) and users, such as individual user computer 1170 or corporate user server 1040. The corporate user server 1040 can further communicate to other workstations (not shown) via a local area network (LAN) or other communication networks. The central server 1500 may be provided with one or more central databases, for example central database 1300, and may be coupled to the Internet, among other networks not shown. Although the database 1300 is shown external to the central server 1500, one skilled in the art would understand that the database 1300 can be integrated in the central server 1500 in some embodiments. The central server 1500 includes the service outsourcing system 1520, which can support one or more other servers that can be provided across many locales. The corporate server 1040 and user computer 1170 can access the central server via browser software, according to well-known mechanisms.

In one embodiment, the central database 1300 can be maintained and updated, and licensed out for use by one or more users or facilities, such as a corporate server 1040. Access to the central database 1300 can be implemented over the Internet 1100, or in other embodiments, a local copy can be maintained at the corporate server 1040. The mechanisms by which the corporate server 1040 can access the central database 1300 includes CGI (Common Gateway Interface), ASP (Application Service Provider), Java, among others.

One skilled in the art will also understand that the information of the database 1300 can be stored on a digital video disc (DVD) or other storage medium. Further, one skilled in the art would understand that communication among the various components in the example network infrastructure 1000 can be provided using one or more of a plurality of transmission mediums (e.g., Ethernet, T1, hybrid fiber/coax, etc.) and protocols (e.g., via HTTP and/or FTP, etc.).

FIG. 129B is a block diagram of the example central server 1500 that in one example embodiment can implement the SOS 1520. Further, one skilled in the art will understand that additional components or different components with similar functionality can be included in the central server 1500, and/or some components can be omitted, in other embodiments. The SOS 1520 can be implemented in software, as an executable program, and is executed by a special or general-purpose digital computer, such as a personal computer (PC; IBM-compatible, Apple-compatible, or otherwise), workstation, minicomputer, or mainframe computer.

The SOS 1520 includes a user-interface (UI) module 1540 and a search engine 1570. The user-interface module 1540 provides display functions according to well-known underlying display generation and formatting mechanisms. The search engine 1570 provides database search methodologies according to mechanisms well-known in the art.

If implemented in hardware, as in an alternative embodiment, the SOS 1520 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Generally, in terms of hardware architecture, as shown in FIG. 129B, the central server 1500 includes a processor 1600, memory 1580, and one or more input and/or output (I/O) devices 1700 (or peripherals) that are communicatively coupled via a local interface 1800. The local interface 1800 can be, for example but not limited to, one or more buses or other wired or wireless connections, as is known in the art. The local interface 1800 may have additional elements, which are omitted for simplicity, such as controllers, buffers (caches), drivers, repeaters, and receivers, to enable communications. Further, the local interface 1800 may include address, control, and/or data connections to enable appropriate communications among the aforementioned components.

The processor 1600 is a hardware device capable of executing software, particularly that stored in memory 1580. The processor 1600 can be any custom made or commercially available processor, a central processing unit (CPU), an auxiliary processor among several processors associated with the central server 1500, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

Memory 1580 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1580 may incorporate electronic, magnetic, optical, and/or other types of storage media. Note that memory 1580 can have a distributed architecture, where various components are situated remote from one another, but can be accessed by the processor 160.

The software in memory 1580 may include one or more separate programs, each of which comprises an ordered listing of executable instructions for implementing logical functions. In the example of FIG. 129B, the software in the memory 1580 includes the SOS 1520 and a suitable operating system (O/S) 1560. A nonexhaustive list of examples of suitable commercially available operating systems 1560 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 1560 essentially controls the execution of other computer programs, such as the SOS 1520, and provides scheduling, input-output control, file and data management, memory management, and communication control and related services.

The SOS 1520 can be a source program, executable program (object code), script, and/or any other entity comprising a set of instructions to be performed. When a source program, then the program needs to be translated via a compiler, assembler, interpreter, or the like, which may or may not be included within memory 1580, so as to operate properly in connection with the operating system 1560. Furthermore, the SOS 1520 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, ASP, and Ada.

The I/O devices 1700 may include input devices, for example but not limited to, a keyboard, mouse, scanner, microphone, etc. Furthermore, the I/O devices 1700 may also include output devices, for example but not limited to, a printer, display, etc. Finally, the I/O devices 1700 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The SOS 1520 may also communicate with the database 1300 via the local interface 1800. As described above, the local database 1300 can be external to or integral to the central server 1500.

When the central server 1500 is in operation, the processor 1600 may be configured to execute software stored within memory 1580, to communicate data to and from memory 1580, and to generally control operations of the central server 1500 pursuant to the software. The SOS 1520 and the operating system 1560, in whole or in part, but typically the latter, are read by the processor 1600, perhaps buffered within the processor 1600, and then executed.

When the SOS 1520 is implemented in software, as is shown in FIG. 129B, the SOS 1520 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The SOS 1520 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should also be understood that other embodiments are included within the scope of the present disclosure that are not related to concrete, but instead involve other types of products and/or services. Furthermore, the scope of the present disclosure includes subsets of the various method steps and system components discussed herein.

It should be emphasized that many variations and modifications may be made to the above-described embodiments. All such modifications and variations are intended to be included herein within the scope of this disclosure and protected by the following claims.

At least the following is claimed:

1. A service outsourcing system for providing at least one purchaser with concrete, comprising:
   at least one central server;
   at least one data storage component, coupled to the at least one central server;
   an interactive electronic ordering guide, provided by the at least one central server, the interactive electronic ordering guide configured to provide a user option to place at least one concrete order, the at least one concrete order comprising a job site location;
   wherein the outsourcing system is configured to receive at least one concrete order,
   wherein the outsourcing system is further configured to determine, from the at least one data storage component, a list of potential concrete suppliers associated with at least a portion of the received concrete order,
   wherein the outsourcing system is further configured to provide the list of potential suppliers,
   wherein the outsourcing system is further configured to rank the potential suppliers according to the job site location;
   wherein the outsourcing system is further configured to provide an option to select at least one selected concrete supplier from the list of at least one potential concrete supplier,
   wherein the outsourcing system is further configured to provide an estimate from the at least one selected concrete supplier, in response to selection of the at least one selected concrete supplier,
   wherein the service outsourcing system is further configured to determine whether the purchaser has contacted another concrete supplier;
   wherein the service outsourcing system is further configured to outsource the concrete order with the selected concrete supplier; and
   wherein the service outsourcing system is further configured to provide an advertisement report to an administrator.

2. The system of claim 1, wherein the service outsourcing system is further configured to communicate data via the Internet.

3. The system of claim 1, wherein the service outsourcing system is further configured to access the central database utilizing at least one of a Common Gateway Interface (CGI), an Application Service Provider (ASP), and JAVA®.

4. The system of claim 1, wherein the service outsourcing system Comprises at least one of discrete logic circuitry, Application Specific Integrated Circuitry (ASIC), a Programmable Gate Array (PGA), and a Field Programmable Gate Array (FPGA).

5. The system of claim 1, wherein the service outsourcing system is further configured to provide at least one interactive menu screen for verifying whether a purchaser is registered with the service outsourcing system.

6. The system of claim 1, wherein the service outsourcing system is further configured to provide at least one interactive menu screen for creating at least one concrete order estimate.

7. The system of claim 6, wherein the concrete order estimate is determined based on at least one of location, amount of concrete desired, date of service, and concrete supplier.

8. The system of claim 1, wherein the service outsourcing system is further configured to outsource the concrete order with the concrete supplier based on the concrete order's job site location.

9. The system of claim 1, wherein the service outsourcing system is further configured to outsource the concrete order with the concrete supplier, wherein the concrete supplier comprises at least one of a concrete producing company, a pump company, a lumber company, a construction materials company, and a general contractor.

10. The system of claim 1, wherein the service outsourcing system is further configured to provide at least one interactive menu screen for calculating the approximate volume of concrete desired.

11. The system of claim 1, wherein service outsourcing system is further configured to provide at least one interactive menu screen configured to provide an option to select at least one of the following: concrete supplier, job site location, order type, truck type, concrete type, mix information, additives, color, equipment, supplies, time of service, and date of service.

12. The system of claim 1, wherein the service outsourcing system is further configured to provide electronic payment capabilities for the purchaser.

13. The method of claim 1, wherein the outsourcing system is further configured to receive at least one parameter related to a desired site of the concrete and determining, from the received at least one parameter, at least one of the following: a desired amount of concrete, a type of concrete, a concrete additive type, and a desired delivery method.

14. A computer implemented method for providing at least one purchaser with concrete, comprising:
   receiving at least one concrete order via an order management system accessible over a network, wherein the at least one concrete order comprises order data, wherein the order data comprises a job site location;
   determining, by the order management system, whether the purchaser has contacted another concrete supplier;
   determining by the order management system, based on the order data, from a plurality of previously stored concrete suppliers, a list of potential concrete suppliers;
   ranking, by the order management system, the potential suppliers according to the job site location;
   providing a user option to select at least one selected concrete supplier from the list of potential concrete suppliers;
   receiving data via the order management system indicating the at least one selected concrete supplier from the list of potential concrete suppliers;
   in response to selection of the at least one selected concrete supplier, providing an estimate from the at least one selected concrete supplier;

outsourcing the concrete order to the at least one selected concrete supplier; and providing an advertisement report to an administrator.

15. The method of claim 14, further comprising providing at least one concrete order estimate based on the order data.

16. The method of claim 14, further comprising prioritizing the potential concrete supplier.

17. The method of claim 14, wherein the order data further comprises at least one of the following: a concrete supplier, an order type, a truck type, a concrete type, mix information, additives, concrete color, equipment, supplies, time of service, and date of service.

18. The method of claim 14, further comprising associating at least one potential concrete supplier to at least one geographical area.

19. The method of claim 18, further comprising presenting the purchaser with the potential concrete supplier associated with the geographical area corresponding to the job site location.

20. The method of claim 14, further comprising receiving payment from the purchaser.

21. The method of claim 20, wherein receiving payment from the purchaser comprises electronically receiving payment from the purchaser, based on at least one of the following: an order type, a truck type, a concrete type, mix information, additives, concrete color, equipment, supplies, time of service, and date of service.

22. The method of claim 14, further comprising calculating an approximate volume of concrete desired.

23. The method of claim 14, further comprising verifying whether the purchaser is a registered user.

24. A computer program stored on a tangible computer readable medium, the computer program comprising executable logic effective to perform the steps of:

receiving at least one concrete order via an order management system accessible over a network, wherein the concrete order comprises order data, wherein the order data comprises a job site location;

determining whether the purchaser has contacted another concrete supplier;

accessing previously stored data to determine a list of potential concrete suppliers based on the order data;

ranking the potential suppliers according to the job site location;

providing a user option to select at least one selected concrete supplier from the list of potential concrete suppliers;

receiving data indicating selection of the at least one selected concrete supplier from the list of potential concrete suppliers;

in response to receiving data indicating selection of the at least one selected concrete supplier, providing an estimate from the at least one selected concrete supplier; and outsourcing the concrete order with the selected concrete supplier; and providing an advertisement report to an administrator.

25. The computer program of claim 24, the executable logic further effective to perform the step of providing at least one concrete order estimate based on the order data.

26. The computer program of claim 24, the executable logic further effective to perform the step of prioritizing the potential concrete supplier.

27. The computer program of claim 24, wherein the order data further comprises at least one of a concrete supplier, an order type, a truck type, a concrete type, mix information, additives, concrete color, equipment, supplies, time of service, and date of service.

28. The computer program of claim 24, the executable logic further effective to perform the step of designating at least one concrete supplier to at least one geographical area.

29. The computer program of claim 28, the executable logic further effective to perform the step of presenting the purchaser with the at least one concrete supplier designated to the geographical area corresponding to the job site location.

30. The computer program of claim 24, the executable logic further effective to perform the step of receiving payment from the purchaser.

31. The computer program of claim 30, wherein logic receiving payment from the purchaser comprises logic electronically receiving payment from the purchaser.

32. The computer program of claim 24, the executable logic further effective to perform the step of calculating an approximate volume of concrete desired.

33. The computer program of claim 24, the executable logic further effective to perform the step of verifying whether the purchaser is a registered user.

* * * * *